US012686173B2

(12) United States Patent  (10) Patent No.: US 12,686,173 B2
Portela et al.  (45) Date of Patent: Jul. 21, 2026

(54) FABRICATION AND DESIGN OF COMPOSITES WITH ARCHITECTED LAYERS

(71) Applicant: California Institute of Technology, Pasadena, CA (US)

(72) Inventors: Carlos M. Portela, Pasadena, CA (US); Andrey Vyatskikh, Irvine, CA (US); Julia R. Greer, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 1708 days.

(21) Appl. No.: 16/206,163

(22) Filed: Nov. 30, 2018

(65) Prior Publication Data

US 2020/0023584 A1 Jan. 23, 2020

Related U.S. Application Data

(63) Continuation-in-part of application No. 16/151,186, filed on Oct. 3, 2018, now Pat. No. 10,833,318.

(Continued)

(51) Int. Cl.
| | |
|---|---|
| *B29C 64/30* | (2017.01) |
| *B29C 64/10* | (2017.01) |
| *B33Y 10/00* | (2015.01) |
| *B33Y 40/20* | (2020.01) |
| *B33Y 80/00* | (2015.01) |
| *F16F 7/12* | (2006.01) |

(52) U.S. Cl.
CPC .............. *B29C 64/30* (2017.08); *B29C 64/10* (2017.08); *B33Y 10/00* (2014.12); *B33Y 40/20* (2020.01); *B33Y 80/00* (2014.12); *F16F 7/121* (2013.01)

(58) Field of Classification Search
CPC ......... B29C 64/30; B29C 64/10; B33Y 10/00; B33Y 40/20; B33Y 80/00; F16F 7/121; F16F 2224/0225; F16F 7/00; F16F 7/104
See application file for complete search history.

(56) References Cited

U.S. PATENT DOCUMENTS

| | | |
|---|---|---|
| 4,966,757 A | 10/1990 | Lewis et al. |
| 5,384,171 A | 1/1995 | Prucher |

(Continued)

FOREIGN PATENT DOCUMENTS

| | | |
|---|---|---|
| JP | 2017/140824 | 8/2017 |
| WO | WO 2016/066843 | 5/2016 |

OTHER PUBLICATIONS

Abueidda, D. et al. (Apr. 2016) "Effective conductivities and elastic moduli of novel foams with triply periodic minimal surfaces," *Mechanics of Materials* 95: 102-115.

(Continued)

*Primary Examiner* — Sarang Afzali
*Assistant Examiner* — Darrell C Ford
(74) *Attorney, Agent, or Firm* — Leydig, Voit & Mayer, Ltd.

(57) ABSTRACT

In an aspect, a composite material system comprises: a structure having an architected three-dimensional geometry; wherein said three-dimensional geometry is monolithic and deterministic; and a matrix phase; wherein said matrix phase at least partially infiltrates said structure. In some embodiments, the three-dimensional geometry is a nano- or micro-architected three-dimensional geometry.

49 Claims, 86 Drawing Sheets

Related U.S. Application Data

(60) Provisional application No. 62/593,768, filed on Dec. 1, 2017, provisional application No. 62/567,352, filed on Oct. 3, 2017.

(56) References Cited

U.S. PATENT DOCUMENTS

| | | | |
|---|---|---|---|
| 5,507,477 A | 4/1996 | Manning et al. | |
| 5,965,249 A | 10/1999 | Sutton et al. | |
| 6,582,812 B1 | 6/2003 | Grylls et al. | |
| 6,929,866 B1 | 8/2005 | Williams et al. | |
| 7,026,045 B2 | 4/2006 | Rettenbacher et al. | |
| 7,070,755 B2 | 7/2006 | Klett et al. | |
| 7,382,959 B1 | 6/2008 | Jacobsen | |
| 7,653,279 B1 | 1/2010 | Jacobsen | |
| 7,687,132 B1 | 3/2010 | Gross et al. | |
| 7,955,504 B1* | 6/2011 | Jovanovic | B01D 63/088 |
| | | | 210/321.71 |
| 8,320,727 B1 | 11/2012 | Jacobsen et al. | |
| 9,217,084 B2 | 12/2015 | Schaedler et al. | |
| 9,278,318 B2* | 3/2016 | Anderson | B01D 71/0212 |
| 9,362,553 B2 | 6/2016 | Lahiri et al. | |
| 9,375,864 B2 | 6/2016 | Hundley et al. | |
| 9,379,418 B2 | 6/2016 | Wang et al. | |
| 9,405,067 B2 | 8/2016 | Yang et al. | |
| 9,533,887 B1* | 1/2017 | Polsky | C01B 32/20 |
| 9,590,228 B1 | 3/2017 | Wang et al. | |
| 9,660,292 B2 | 5/2017 | Rust, III et al. | |
| 9,758,382 B1 | 9/2017 | Roper et al. | |
| 9,823,143 B2 | 11/2017 | Twelves et al. | |
| 9,938,623 B1 | 4/2018 | Schaedler et al. | |
| 10,115,844 B2* | 10/2018 | Noyes | H01M 4/583 |
| 10,661,513 B2 | 5/2020 | Stephenson et al. | |
| 2007/0095012 A1 | 5/2007 | Kang et al. | |
| 2009/0320398 A1 | 12/2009 | Gouvea | |
| 2010/0047434 A1* | 2/2010 | Kumar | C23C 24/103 |
| | | | 623/11.11 |
| 2010/0068623 A1 | 3/2010 | Braun et al. | |
| 2010/0291401 A1* | 11/2010 | Medina | B23K 26/32 |
| | | | 219/121.66 |
| 2010/0323207 A1* | 12/2010 | Pinault | C01B 32/162 |
| | | | 427/249.1 |
| 2011/0045346 A1 | 2/2011 | Chiang et al. | |
| 2011/0111283 A1 | 5/2011 | Rust, III et al. | |
| 2011/0171518 A1 | 7/2011 | Dunn et al. | |
| 2012/0077095 A1 | 3/2012 | Roumi et al. | |
| 2013/0330611 A1 | 12/2013 | Chen et al. | |
| 2014/0141224 A1 | 5/2014 | Pasquali et al. | |
| 2014/0315093 A1 | 10/2014 | Greer et al. | |
| 2014/0336680 A1 | 11/2014 | Medina et al. | |
| 2015/0205903 A1 | 7/2015 | Or-Bach et al. | |
| 2015/0207138 A1 | 7/2015 | Barker et al. | |
| 2016/0126558 A1 | 5/2016 | Lewis et al. | |
| 2017/0023084 A1 | 1/2017 | Guest et al. | |
| 2017/0072638 A1 | 3/2017 | Hayes et al. | |
| 2018/0088462 A1 | 3/2018 | Vyatskikh et al. | |
| 2018/0117872 A1 | 5/2018 | Abu Al-Rub et al. | |

OTHER PUBLICATIONS

Amato, L. et al. (2015) "Dense high-aspect ratio 3D carbon pillars on interdigitated microelectrode arrays," *Carbon* 94: 792-803.

An, S.J. et al. (Aug. 2016) "The state of understanding of the lithium-ion-battery graphite solid electrolyte interphase (SEI) and its relationship to formation cycling," *Carbon*, 105: 52-76.

Arthur, T.S. et al. (2011) "Three-dimensional electrodes and battery architectures," *MRS Bulletin* 36(7): 523-531.

Bae, C.J. et al. (publicly available 2012) "Design of Battery Electrodes with Dual-Scale Porosity to Minimize Tortuosity and Maximize Performance," *Adv. Mater.* 25(9): 1254-1258. (published 2013).

Barg, S. et al. (2014) "Mesoscale assembly of chemically modified graphene into complex cellular networks," *Nat. Commun.* 5: 4328.

Bates, J.B. et al. (2000) "Thin-film lithium and lithium-ion batteries," *Solid State Ionics* 135(1-4): 33-45.

Bauer, J. et al. (publicly available Feb. 2016) "Approaching theoretical strength in glassy carbon nanolattices," *Nat. Mater.* 15: 438-444. (published Apr. 2016).

Bauer, J. et al. (2014) "High-strength cellular ceramic composites with 3D microarchitecture," *Proc. Natl. Acad. Sci. U.S.A.* 111(7): 2453-2458.

Bazant, Z.P. & Xiang, Y. (1997) "Size effect in compression fracture: Splitting crack band propagation," *J. Eng. Mech.* 13: 162-172.

Billaud, J. et al. (Jul. 2016) "Magnetically aligned graphite electrodes for high-rate performance Li-ion batteries," *Nat. Energy* 1: 16097.

Bruley, J. et al. (1995) "Quantitative near-edge structure analysis of diamond-like carbon in the electron microscope using a two-window method," *J. Microsc.* 180(1): 22-32.

Buiel, E. & Dahn, J.R. (1999) "Li-insertion in hard carbon anode materials for Li-ion batteries," *Electrochim. Acta* 45(1-2): 121-130.

Buqa, H. et al. (2005) "High Rate Capability of Graphite Negative Electrodes for Lithium-Ion Batteries," *J. Electrochem. Soc.* 152(2): A474-A481.

Burckel, D.B. et al. (2009) "Lithographically Defined Porous Carbon Electrodes," *Small* 5(24): 2792-2796.

Burckel, D.B. et al. (2010) "Pyrolysis of two-dimensional and three-dimensional interferometrically patterned resist structures," *J. of Vacuum Sci. & Technology B* 28: C6P14.

Cancado, G.L. et al. (2006) "General equation for the determination of the crystallite size of nanographite by Raman spectroscopy," *Appl. Phys. Lett.* 88: 163106.

Cannarella, J. et al. (2014) "Stress evolution and capacity fade in constrained lithium-ion pouch cells," *J. Power Sources*, 245: 745-751.

Cao, A. et al. (2005) "Super-compressible foam-like carbon nanotube films," *Science* 310(5752): 1307-1310.

Challis, V.J. (2014) "High specific strength and stiffness structures produced using selective laser melting," *Mater. Design* 63: 783-788.

Chen, X. et al. (Oct. 2017) "Cellular carbon microstructures developed by using stereolithography," *Carbon* 123: 34-44.

Chen, Z. et al. (2011) "Three-dimensional flexible and conductive interconnected graphene networks grown by chemical vapour deposition," *Nat. Mater.* 10: 424-428.

Chung, D.W. et al. (2013) "Validity of the Bruggeman relation for porous electrodes," *Model. Simul. Mater. Sci. Eng.* 21(7): 074009.

Cirigliano, N. et al. (2014) "3D Architectured Anodes for Lithium-Ion Microbatteries with Large Areal Capacity," *Energy Technology* 2(4): 362-369.

Cowlard F.C. & Lewis, J.C. (1967) "Vitreous carbon-a new form of carbon," *J. Mater. Sci.* 2(6): 507-512.

Dahbi, M. et al. (Apr. 2017) "Synthesis of hard carbon from argan shells for Na-ion batteries," *J. Mater. Chem. A* 5(20): 9917-9928.

Dahn, J.R. et al. (1995) "Mechanisms for Lithium Insertion in Carbonaceous Materials," *Science* 270(5236): 590-593.

Daniel, I.M. et al. (2009) "Interfiber/interlaminar filuare of composites under multi-axial states of stress," *Composites Science and Technology*, 69(6): 764-771.

Danner, T. et al. (Dec. 2016) "Thick electrodes for Li-ion batteries: A model based analysis," *J. Power Sources* 334: 191-201.

Deshpande, V.S. et al. (2001) "Effective properties of the octet-truss lattice material," *J. Mech. Phys. Solids* 49(8): 1747-1769.

Deubel, M. et al. (publicly released 2005) "3D-2D-3D photonic crystal heterostructures fabricated by direct laser writing." *Optics Lett.* 31(6): 805-807. (published 2006).

Dikin, D. et al. (2007) "Preparation and characterization of graphene oxide paper," *Nature* 448: 457-460.

Dunlay, W.A. et al. (1989) "A proposed uniaxial compression test for high strength ceramics," *DTIC Document*.

Dusoe, K.J. et al. (Oct. 2017) "Ultrahigh elastic strain energy storage in metal-oxide-infiltrated patterned hybrid polymer nanocomposites," *Nano Lett.* 17(12): 7416-7423.

(56)　　　　　References Cited

OTHER PUBLICATIONS

Du, Z. et al. (publicly available Feb. 2017) "Understanding limiting factors in thick electrode performance as applied to high energy density Li-ion batteries," *J. Appl. Electrochem.* 47(3): 405-415. (published Mar. 2017).

Ebner, M. et al. (2014) "Tortuosity Anisotropy in Lithium-Ion Battery Electrodes," *Adv. Energy Mater.* 4(5): 1301278.

Eckel, Z.C. et al. (Jan. 2016) "Additive manufacturing of polymer-derived ceramics," *Science* 351(6268): 58-62.

Etiemble, A. et al. (2014) "3D morphological analysis of copper foams as current collectors for Li-Ion batteries by means of X-ray tomography," *Mater. Sci. Eng. B*, 187: 1-8.

Fairen-Jimenez, D. et al. (2007) "Adsorption of benzene, toluene, and xylenes on monolithic carbon aerogels from dry air flows," *Langmuir* 23(20): 10095-10101.

Ferrari, A.C. et al. (2000) "Interpretation of Raman spectra of disordered and amorphous carbon," *Phys. Rev. B*, 61, 14095.

Freymann, G. et al. (2010) "Three-Dimensional Nanostructures for Photonics," *Adv. Funct. Mater.* 20(7): 1038-1052.

Fu, K. et al. (publicly available Feb. 2016) "Graphene Oxide-Based Electrode Inks for 3D-Printed Lithium-Ion Batteries," *Adv. Mater.* 28(13): 2587-2594. (published Apr. 2016).

Fu, S.Y. et al. (2000) "Tensile properties of short-glass-fiber-and short-carbon-fiber-reinforced polypropylene composites," Composites Part A 31(10): 1117-1125.

Gallagher, K. et al. (publicly available Nov. 2015) "Optimizing Areal Capacities through Understanding the Limitations of Lithium-Ion Electrodes," *J. Electrochem. Soc.* 163(2): A138-A149. (published 2016).

Gao, H. et al. (2003) "Materials become insensitive to flaws at nanoscale: lessons from nature," *Proc. Natl. Acad. Sci. U.S.A.* 100(10): 5597-5600.

Gogotsi, Y. (2015) "Not just graphene: The wonderful world of carbon and related nanomaterials," *MRS Bull.*40(12): 1110-1121.

Goriparti, S. et al. (2014) "Review on recent progress of nanostructured anode materials for Li-ion batteries," *J. Power Sources* 257: 421-443.

Greer, J.R. et al. (2005) "Size dependence of mechanical properties of gold at the micron scale in the absence of strain gradients," *Acta Mater.* 53(6): 1821-1830.

Greer, J.R.& Hosson, J.T. (2011) "Plasticity in small-sized metallic systems: Intrinsic versus extrinsic size effect," *Prog. Mater. Sci.* 56(6): 654-724.

Griffith, K.J. et al. (Jul. 2018) "Niobium tungsten oxides for high-rate lithium-ion energy storage," *Nature* 559: 556-563.

Gu, X.W. & Greer J.R. (2015) "Ultra-strong architected Cu meso-lattices," *Extreme Mech. Lett.* 2: 7-14.

Hamm, C.E. et al. (2003) "Architecture and material properties of diatom shells provide effective mechanical protection," *Nature* 421: 841-843.

Harris, P.J. (2005) "New perspectives on the structure of graphitic carbons," *Crit. Rev. Solid State* 30(4): 235-253.

Hashin, Z. (1983) "Analysis of Composite Materials—A Survey," *Journal of Applied Mechanics*, 50(3): 481-505.

Heinl, P. et al. (2008) "Cellular Ti—6Al—4V structures with interconnected macro porosity for bone implants fabricated by selective electron beam melting," *Acta Biomaterialia*, 4(5): 1536-1544.

Hofmann, G. et al. (2000) "An investigation of the relationship between position within coater and pyrolytic carbon characteristics using nanoindentation," *Carbon* 38(5): 645-653.

Hou, H. et al. (publicly available Mar. 2017) "Carbon Anode Materials for Advanced Sodium-Ion Batteries," *Adv. Energy Mater.* 7(24): 1602898. (published Dec. 2017).

Hu, M. et al. (Jun. 2017) "Compressed glassy carbon: An ultrastrong and elastic interpenetrating graphene network," *Sci. Adv.* 3: e1603213.

Hur, J.I. et al. (2018) "High Areal Energy Density 3D Lithium-Ion Microbatteries," *Joule*, 2(6): 1187-1201.

Irisarri, E. et al. (2015) "Review-Hard carbon Negative Electrode Materials for Sodium-Ion Batteries," *J. Electrochem. Soc.* 162(14): A2476-A2482.

Ishikawa, T. et al. (1982) "Elastic Behavior of Woven Hybrid Composites," *Journal of Composite Materials*, 16(1): 2-19.

Iwashita, N. et al. (2001) "Elasto-plastic deformation of glass-like carbons heat-treated at different temperatures," *Carbon* 39(10): 1525-1532.

Jacobsen, A.J. et al. (2011) "Vitreous carbon micro-lattice structures," *Carbon* 49(3): 1025-1032.

Jang, D. et al. (2012) "Deformation mechanisms in nanotwinned metal nanopillars," *Nat. Nanotechnol.* 7: 594-601.

Jang, D. et al. (2013) "Fabrication and deformation of three-dimensional hollow ceramic nanostructures," *Nat. Mater.* 12: 893-898.

Jang, D. & Greer, J.R. (2010) "Transition from a strong-yet-brittle to a stronger-and-ductile state by size reduction of metallic glasses," *Nat. Mater.* 9: 215-219.

Jennings, A.T. & Greer J.R. (2011) "Tensile deformation of electroplated copper nanopillars," *Phil. Mag.* 91(7-9): 1108-1120.

Ji, H. et al. (2012) "Ultrathin Graphite Foam: A Three-Dimensional Conductive Network for Battery Electrodes," *Nano Lett.* 12(5): 2446-2451.

Jordan, J. et al. (2005) "Experimental trends in polymer nanocomposites—a review," *Mater. Sci. Eng. A* 393(1-2): 1-11.

Kaae, J.L. (1971) "Structure and mechanical properties of isotropic pyrolytic carbons deposited below 1600° C.," *J. Nucl. Mater.* 38(1): 42-50.

Kaae, J.L. (1972) "The mechanical properties of glassy and isotropic pyrolytic carbons," *J. Biomed. Mater. Res.* 6(3): 279-282.

Kang, B. & Ceder, G. (2009) "Battery materials for ultrafast charging and discharging," *Nature* 458: 190-193.

Kawamura, K. & Jenkins, G.M. (1972) "Mechanical properties of glassy carbon fibres derived from phenolic resin," *J. Mater. Sci.* 7(10): 1099-1112.

Kim, C.S. & Ahn, S.H. (2014) "Mechanical behavior of microscale carbon pillar fabricated by focused ion beam induced deposition," *Int. J. Precis. Eng. Man.* 15(7): 1485-1488.

Kotlensky, W.V. & Martens, H.E. (1965) "Tensile Properties of Glassy Carbon to 2,900° C.," *Nature* 206: 1246.

Lacey, S.D. et al. (publicly available Jan. 2018) "Extrusion-Based 3D Printing of Hierarchically Porous Advanced Battery Electrodes," *Adv. Mater.* 30(12): 1705651. (published Mar. 2018).

Lai, A. et al. (2013) "Shape memory and superelastic ceramics at small scales," *Science* 341(6153): 1505-1508.

Lai, J. et al. (Jan. 2018) "3D Porous Carbonaceous Electrodes for Electrocatalytics Applications," *Joule* 2: 1-18.

Lai, W. et al. (2010) "Ultrahigh-Energy-Density Microbatteries Enabled by New Electrode Architecture and Micropackaging Design," *Adv. Mater.* 22(20): E139-E144.

Lee, C. et al. (2008) "Measurement of the elastic properties and intrinsic strength of monolayer graphene," *Science* 321(5887): 385-388.

Lee, J.A. et al. (2008) "Fabrication and characterization of free-standing 3D carbon microstructures using multi-exposures and resist pyrolysis," *J. Micromech. Microeng.* 18(3): 035012.

Lee, J.S. et al. (2012) "Three-dimensional nano-foam of few-layer graphene grown by CVD for DSSC," *Phys. Chem. Chem. Phys.* 14(22): 7938-7943.

Lee, K.T. et al. (2005) "Synthesis and Rate Performance of Monolithic Macroporous Carbon Electrodes for Lithium-Ion Secondary Batteries," *Adv. Funct. Mater.* 15(4): 547-556.

Li, J. et al. (Apr. 2017) "A hybrid three-dimensionally structured electrode for lithium-ion batteries via 3D printing," *Mater. & Des.* 119: 417-424.

Li, J. et al. (2017; month unknown) "3D Printed Hybrid Electrodes for Lithium-Ion Batteries," *J. Electrochem. Soc.* 77(11): 1209-1218.

Li, X. & Gao, H. (Mar. 2016) "Smaller and stronger," *Nat. Mater.* 15: 373-374.

Libonati, F. et al. (publicly available May 2016) "Bone-inspired materials by design: Toughness amplification observed using 3D printing and testing," *Adv. Eng. Mater.* 18(8): 1354-1363. (published Aug. 2016).

(56) References Cited

OTHER PUBLICATIONS

Lim, C. et al. (Oct. 2016) "Analysis of geometric and electrochemical characteristics of lithium cobalt oxide electrode with different packing densities," *J. Power Sources* 328: 46-55.

Liontas, R. & Greer J.R. (Jul. 2017) "3D nano-architected metallic glass: Size effect suppresses catastrophic failure," *Acta. Mater.* 133: 393-407.

Liu, C. et al. (Aug. 2017) "Fabrication and Characterization of 3D-Printed Highly- Porous 3D $LiFePO_4$ Electrodes by Low Temperature Direct Writing Process," *Materials* 10(8): 934.

Liu, C. et al. (2014) "An all-in-one nanopore battery array," *Nature Nanotechnology*, 9: 1031-1039.

Lopez-Honorato, E. et al. (2008) "Structure and mechanical properties of pyrolytic carbon produced by fluidized bed chemical vapor deposition," *Nucl. Eng. Des.* 238(11): 3121-3128.

Lowry, M.B. et al. (2010) "Achieving the ideal strength in annealed molybdenum nanopillars," *Acta Mater.* 58(15): 5160-5167.

Lu, L. et al. (2004) "Ultrahigh strength and high electrical conductivity in copper," *Science* 304(5669): 422-426.

Lucas, R. et al. (2014) "Strong, lightweight, and recoverable three-dimensional ceramic nanolattices," *Science* 345 (6202): 1322-1326.

Maggi A. et al. (Nov. 2017) "Three-dimensional nano-architected scaffolds with tunable stiffness for efficient bone tissue growth," *Acta Biomater.* 63: 294-305.

Manoharan, M.P. et al. (2010) "Elastic properties of 4-6 nm-thick glassy carbon thin films," *Nanoscale Res. Lett.* 5: 14.

Marks, T. et al. (2011) "A Guide to Li-Ion Coin-Cell Electrode Making for Academic Researchers," *J. Electrochem. Soc.* 158(1): A51-A57.

Messner, M.C. (Nov. 2016) "Optimal lattice-structured materials," *J. Mech. Phys. Solids* 96: 162-183.

Meza, L.R. et al. (Nov. 2017) "Reexamining the mechanical property space of three-dimensional lattice architectures," *Acta. Mater.* 140: 424-432.

Meza, L.R. et al. (2015) "Resilient 3D hierarchical architected metamaterials," *Proc. Natl. Acad. Sci. U.S.A.* 112(37): 11502-11507.

Meza, L.R. et al. (2014) "Strong, lightweight, and recoverable three-dimensional ceramic nanolattices," *Science* 345(6202): 1322-1326.

Miranda, D. et al. (Mar. 2016) "Computer simulations of the influence of geometry in the performance of conventional and unconventional lithium-ion batteries," *Applied Energy* 165: 318-328.

Moshtev, R. & Johnson, B. (2000) "State of the art of commercial Li ion batteries," *J. Power Sources* 91(2): 86-91.

Muth, J.T. et al. (Feb. 2017) "Architected cellular ceramics with tailored stiffness via direct foam writing," *Proc. Natl. Acad. Sci. USA* 114(8): 1832-1837.

Nitta, N. et al. (2015) "Li-ion battery materials: present and future," *Mater. Today* 18(5): 252-264.

Ogihara, N. et al. (2006) "Disordered carbon negative electrode for electrochemical capacitors and high-rate batteries," *Electrochim. Acta* 52(4): 1713-1720.

Oku, T. et al. (2008) "Effects of ion irradiation on the hardness properties of graphites and C/C composites by indentation tests," *J. Nucl. Mater.* 381(1-2): 92-97.

Panasonic (Dec. 2009) "Headquarter News: Panasonic Develops High-Capacity Lithium-Ion Battery Cells That Can Power Laptops and Electric Vehicles," http://news.panasonic.com/global/press/data/en091225-3/en091225-3.html. Accessed Sep. 28, 2017.

Pawlyta, M. et al. (2015) "Raman microspectroscopy characterization of carbon blacks: Spectral analysis and structural information," *Carbon N. Y.* 84: 479-490.

Plimpton, S. (1995) "Fast parallel algorithms for short-range molecular dynamics," *J. Comp. Phys.* 117(1): 1-19.

Portela, C.M. et al. (Jul. 2018) "Impact of node geometry on the effective stiffness of non-slender three-dimensional truss lattice architectures," *Extreme Mech. Lett.* 22: 138-148.

Qin, X. et al. (2011) "Hierarchically porous and conductive $LiFePO_4$ bulk electrode: binder-free and ultrahigh volumetric capacity Li-ion cathode," *J. Mater. Chem.* 21(33):12444-12448.

Qin, Z. et al. (Jan. 2017) "The mechanics and design of a lightweight three-dimensional graphene assembly," *Sci. Adv.* 3: e1601536.

Qu, L. et al. (2008) "Carbon nanotube arrays with strong shear binding-on and easy normal lifting-off," *Science* 322(5899): 238-242.

Qu, R. & Zhang, Z. (2013) "A universal fracture criterion for high-strength materials," *Sci. Rep.* 3: 1117.

Rasool, H.I. et al. (2013) "Measurement of the intrinsic strength of crystalline and polycrystalline graphene," *Nat. Commun.* 4: 2811.

Robertson, J. (1986) "Amorphous carbon," *Adv. Phys.* 35(4): 317-374. (Table 1: [1] Dischler and Brandt (1985), [5] Hauser (1975), [6] Fink et al. (1983)).

Roylance, D. (2001) "Stress-Strain Curves," MIT Course, http://web.mit.edu/course/3/3.11/www/modules/ss.pdf. Accessed Oct. 2018.

Sadezky, A. et al. (2005) "Raman microspectroscopy of soot and related carbonaceous materials: Spectral analysis and structural information," *Carbon* 43(8): 1731-1742.

Saleh, M.S. et al. (Oct. 2018) "3D printed hierarchically-porous microlattice electrode materials for exceptionally high specific capacity and areal capacity lithium ion batteries," *Addit. Manuf.* 23: 70-78.

Sander, J.S. et al. (Jul. 2016) "High-performance battery electrodes via magnetic templating," *Nat. Energy* 1: 16099.

Sanders, P.G. et al. (1997) "Elastic and tensile behavior of nanocrystalline copper and palladium," *Acta Mater* 45(10): 4019-4025.

Schaedler, T.A. et al. (2011) "Ultralight metallic microlattices," *Science* 334(6058): 962-965.

Singh, M. et al. (2015) "Thick Electrodes for High Energy Lithium Ion Batteries," *J. Electrochem. Soc.* 162(7): A1196-A1201.

Smekens, J. et al. (Feb. 2016) "Influence of Electrode Density on the Performance of Li-Ion Batteries: Experimental and Simulation Results," *Energies* 9(2): 104.

Song, Z. et al. (publicly available Dec. 2014) "Defect-detriment to graphene strength is concealed by local probe: the topological and geometrical effects," *ACS Nano* 9(1): 401-408. (published 2015).

Stein, I.Y. et al. (Jun. 2017) "Structure-mechanical property relations of non- graphitizing pyrolytic carbon synthesized at low temperatures," *Carbon* 117: 411-420.

Stevens, D.A. & Dahn, J.R. (2000) "High Capacity Anode Materials for Rechargeable Sodium-Ion Batteries," *J. Electrochem. Soc.* 147(4): 1271-1273.

Stuart, S.J. et al. (2000) "A reactive potential for hydrocarbons with intermolecular interactions," *J. Chem. Phys.* 112: 6472-6486.

Sun, K. et al. (2013) "3D Printing of Interdigitated Li-Ion Microbattery Architectures," *Adv. Mater.* 25(33): 4539-4543.

Swain, M.V. & Field, J.S. (1996) "Investigation of the mechanical properties of two glassy carbon materials using pointed indenters," *Philos. Mag. A* 74(5): 1085-1096.

Tehrani, M. et al. (2013) "Mechanical characterization and impact damage assessment of a woven carbon fiber reinforced carbon nanotube-epoxy composite," *Composites Science and Technology*, 75: 42-48.

Thakur, M. et al. (2012) "Freestanding Macroporous Silicon and Pyrolyzed Polyacrylonitrile As a Composite Anode for Lithium Ion Batteries," *Chem. Mater.* 24(15): 2998-3003.

Thiel, M. et al. (2009) "Three-Dimensional Bi-chiral Photonic Crystals," *Adv. Mater.* 21(46): 4680-4682.

Torrents, A. et al. (2012) "Characterization of nickel-based microlattice materials with structural hierarchy from the nanometer to the millimeter scale," *Acta. Mater.* 60(8): 3511-3523.

Valdevit, L. et al. (2013) "Compressive strength of hollow microlattices: Experimental characterization, modeling, and optimal design," *J. Mater. Res.* 28(17): 2461-2473.

Vetter, J. et al. (2005) "Ageing mechanisms in lithium-ion batteries," *J. Power Sources* 147(1-2): 269-281.

Vyatskikh, A. et al. (Feb. 2018) "Additive manufacturing of 3D nano-architected metals," *Nat. Commun.* 9: 593.

Vyatskikh, A. et al. (Jun. 2018) "Additive manufacturing of polymer-derived titania for one-step solar water purification," *Mater. Today Commun.* 15: 288-293.

(56)  References Cited

OTHER PUBLICATIONS

Wang, C. et al. (2004) "C-MEMS for the Manufacture of 3D Microbatteries," *Electrochem. Solid-State Lett.* 7(11): A435-A438.
Wang, H. et al. (Jan. 2017) "Synthesis of single-crystal-like nanoporous carbon membranes and their application in overall water splitting," *Nat. Commun.* 8: 13592.
Wang, H. et al. (Jun. 2017) "Ultralight, scalable, and high-temperature-resilient ceramic nanofiber sponges," *Sci. Adv.* 3(6): e1603170.
Wang, J. et al. (2012) "Pitch modified hard carbons as negative materials for lithium-ion batteries," *Electrochim. Acta* 74: 1-7.
Wang, J.S. et al. (2011) "Formulation and characterization of ultra-thick electrodes for high energy lithium-ion batteries employing tailored metal foams," *J. Power Sources* 196(20): 8714-8718.
Wegst, U.G.K. et al. (publicly available Oct. 2014) "Bioinspired structural materials," *Nat. Mater.* 14: 23-36. (published 2015).
Wei, T.S. et al. (publicly available Mar. 2018) "3D Printing of Customized Li-Ion Batteries with Thick Electrodes," *Adv. Mater.* 30(16): 1703027. (published Apr. 2018).
Wei, Y. et al. (2012) "The nature of strength enhancement and weakening by pentagon-heptagon defects in graphene," *Nat. Mater.* 11: 759-763.
Weiner, S. & Wagner, H.D. (1998) "The material bone: structure-mechanical function relations," *Annu. Rev. Mater. Sci.* 28: 271-298.
Wenzel, S. et al. (2011) "Room-temperature sodium-ion batteries: Improving the rate capability of carbon anode materials by templating strategies," *Energy Environ. Sci.* 4(9): 3342-3345.
Whittingham, M.S. (2012) "History, Evolution, and Future Status of Energy Storage," *Proc. IEEE* 100: 1518-1534.
Wicks, S.S. et al. (2010) "Interlaminar and intralaminar reinforcement of composite laminates with aligned carbon nanotubes," *Composites Science and Technology*, 70(1): 20-28.
Wood, V. (2018) "X-ray tomography for battery research and development," *Nat. Rev. Mater.*, 3: 293-295.
Wu, B. et al. (2005) "Mechanical properties of ultrahigh-strength gold nanowires," *Nat. Mater.* 4: 525-529.
Xiao, X. et al. (2012) "Lithographically Defined Three-Dimensional Graphene Structures," *Am. Chem. Soc.* 6(4): 3573-3579.
Xing, W. et al. (1996) "Optimizing Pyrolysis of Sugar Carbons for Use as Anode Materials in Lithium-Ion Batteries," *J. Electrochem. Soc.* 143(10): 3046-3052.
Yajima, S. et al. (1972) "Micro-hardness of pyrolytic graphite and siliconated pyrolytic graphite," *Tanso* 69: 41-47.
Yang, G.F. et al. (2015) "Ultra-thick Li-ion battery electrodes using different cell size of metal foam current collectors," *RSC Adv.* 5: 16702-16706.

Yang, J. et al. (2012) "Study of nano-porous hard carbons as anode materials for lithium ion batteries," *Mater. Chem. Phys.* 135(2-3): 445-450.
Zeschky, J. et al. (2003) "Preceramic polymer derived cellular ceramics," *Composites Science and Technology*, 63(16): 2361-2370.
Zhang, H. et al. (2015) "Fluidized bed chemical vapor deposition of pyrolytic carbon-III. Relationship between microstructure and mechanical properties," *Carbon* 91: 346-357.
Zhang, P. et al. (2014) "Fracture toughness of graphene," *Nat. Commun.* 5: 3782.
Zhang, Q. et al. (Jan. 2016) "Three-Dimensional Printing of Graphene Aerogels," *Small*, 12.
Zhang, X. et al. (Jun. 2018) "Three-dimensional high-entropy alloy-polymer composite nanolattices that overcome the strength-recoverability trade-off," *Nano. Lett.* 18(7): 4247-4256.
Zhang, Y. et al. (2014) "Microstructures and properties of high-entropy alloys," *Prog. Mater. Sci.* 61: 1-93.
Zhao, J.X. et al. (1985) "The fracture toughness of glassy carbons at elevated temperatures," *Carbon* 23(1): 15-18.
Zheng, T. et al. (1995) "High-Capacity Carbons Prepared from Phenolic Resin for Anodes of Lithium-Ion Batteries," *J. Electrochem. Soc.* 142(11): L211-L214.
Zheng, X. et al. (Jul. 2016) "Multiscale metallic metamaterials," *Nat. Mater.* 15: 1100-1106.
Zheng, X. et al. (2014) "Ultralight, ultrastiff mechanical metamaterials," *Science* 344(6190): 1373-1377.
Zhou, Y.N. et al. (2013) "Nanostructured thin film electrodes for lithium storage and all-solid-state thin-film lithium batteries," *J. Power Sources* 234: 310-332.
Zhu, C. et al. (2015) "Highly compressible 3D periodic graphene aerogel microlattices," *Nat. Commun.* 6: 6962.
Search Report and Written Opinion, dated Dec. 18, 2019, corresponding to International Application No. PCT/US2018/063306 (filed Nov. 30, 2018), 13 pp.
Extended European Search Report and Search Opinion, dated Nov. 18, 2021, corresponding to European Application No. 18920051.2, 16 pp.
Notification of Reasons for Refusal, dated Nov. 8, 2022, corresponding to Japanese Application No. 529,530/2020, 6 pp.
Supplementary Partial European Search Report and Provisional Opinion, dated Jul. 15, 2021, corresponding to European Application No. 18920051.2, 14 pp.
Al Nasiri, N. et al. (2015), "Effect of microstructure and slow crack growth on lifetime prediction of monolithic silicon carbide," *Materials Science & Engineering A*, vol. 627, pp. 290-295.

* cited by examiner

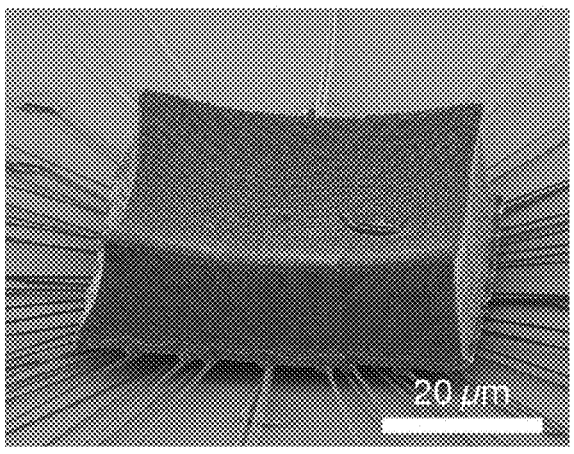
FIG. 13A
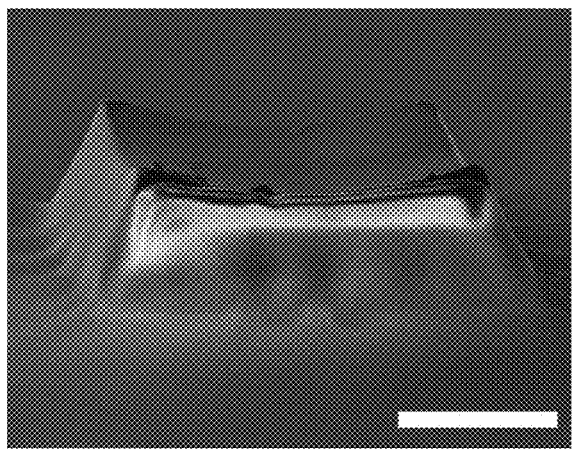
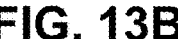
FIG. 13B
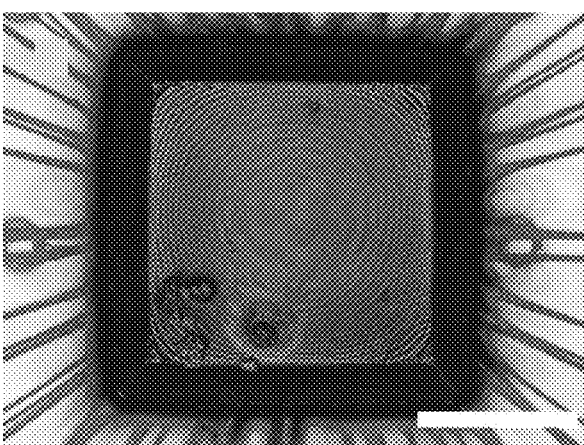
FIG. 13C

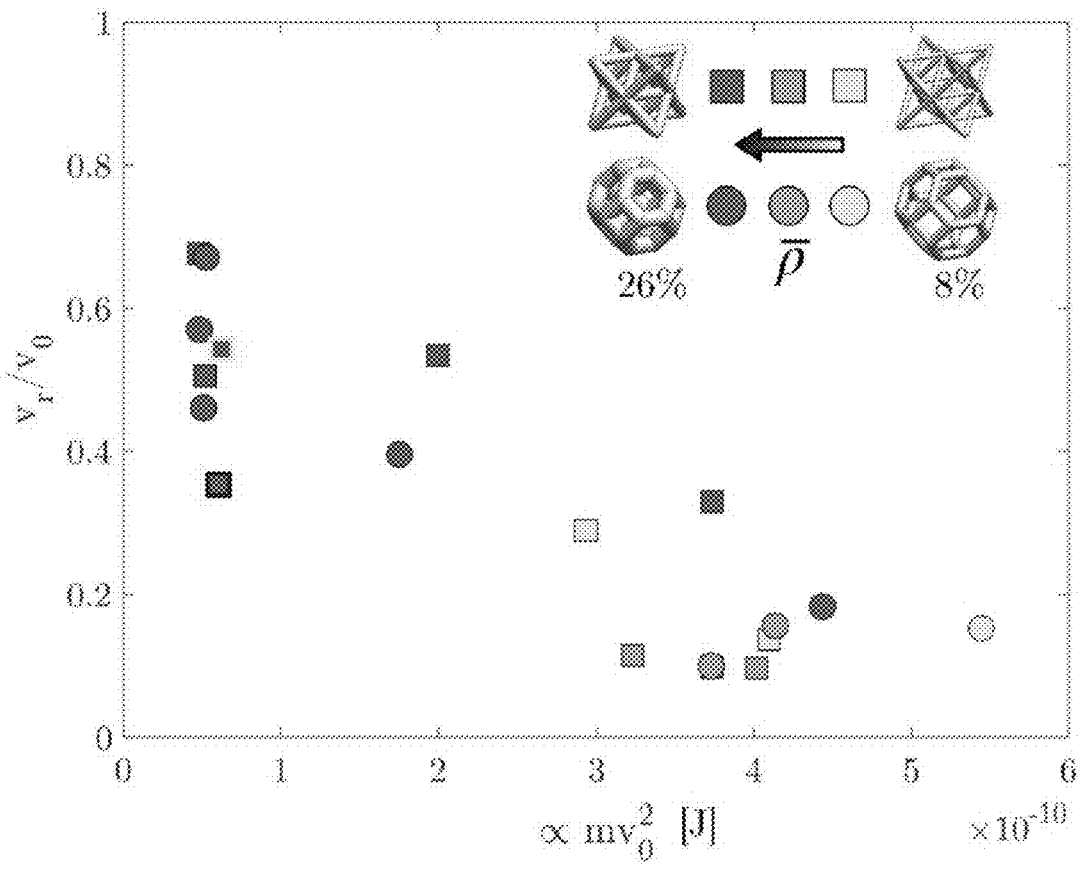
FIG. 17
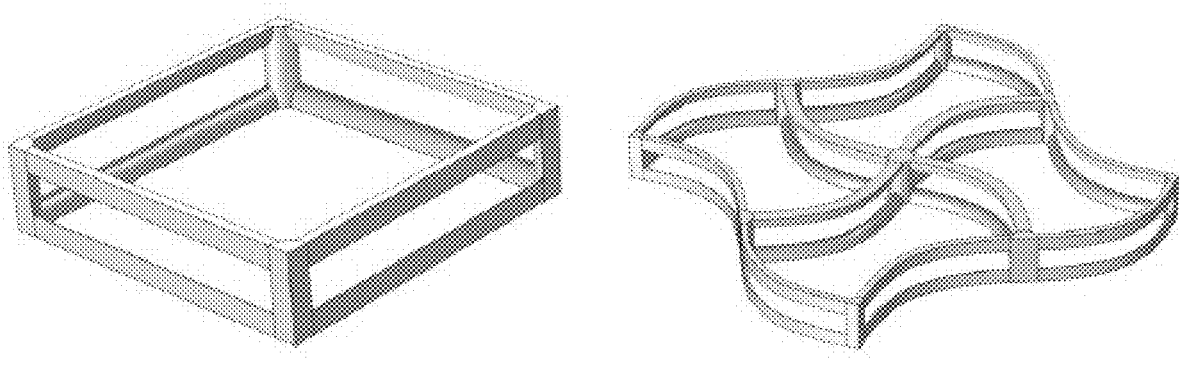
FIG. 18A                    FIG. 18B

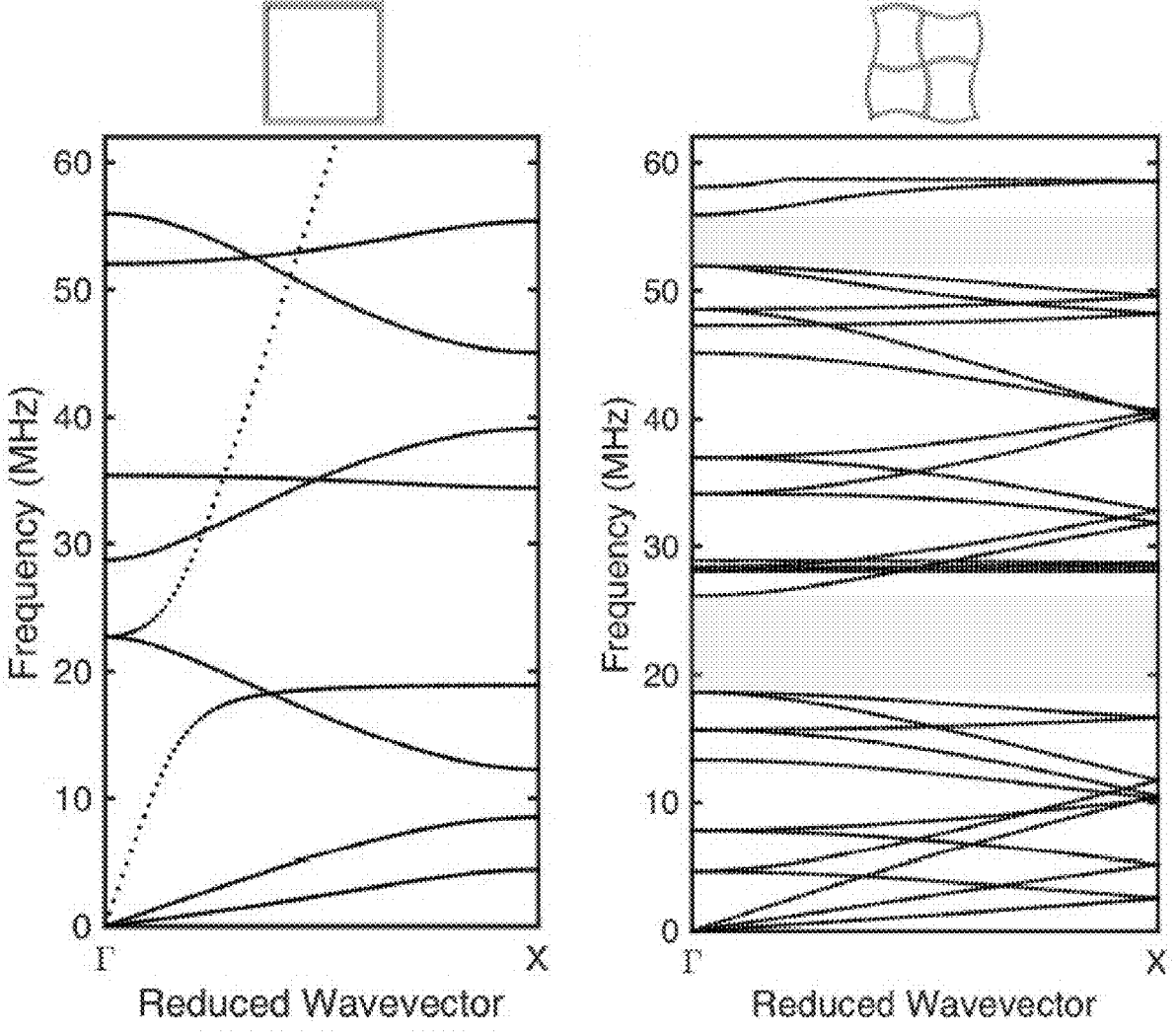
FIG. 19A                    FIG. 19B

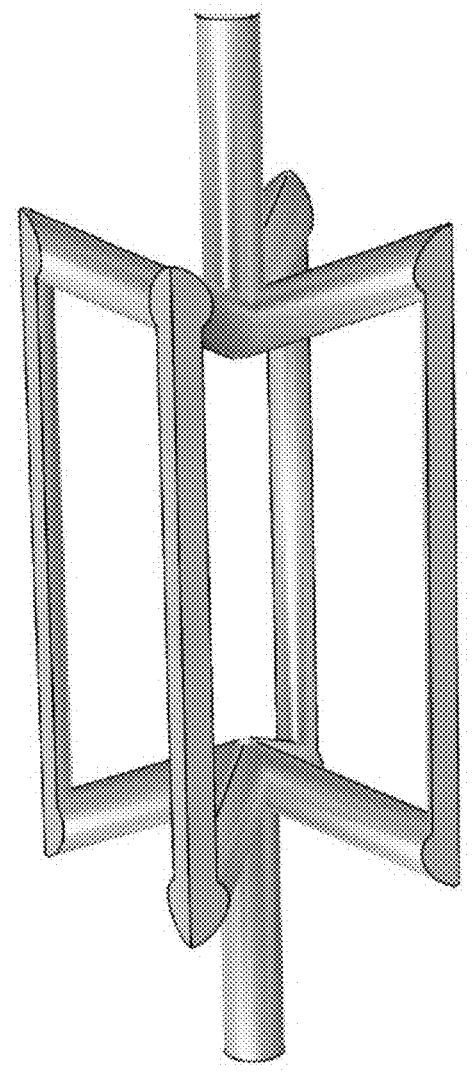
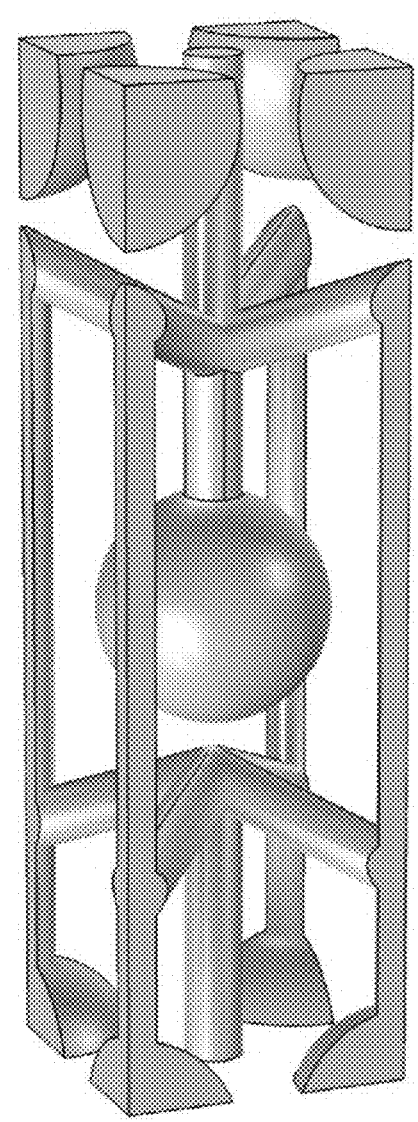
FIG. 20A        FIG. 20B

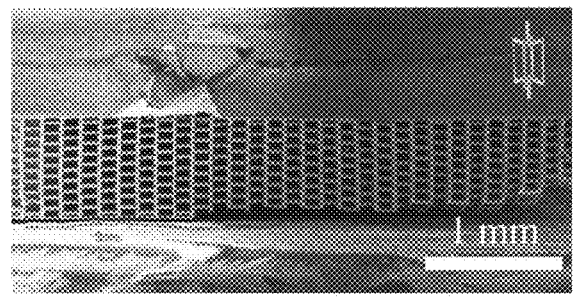
FIG. 23A
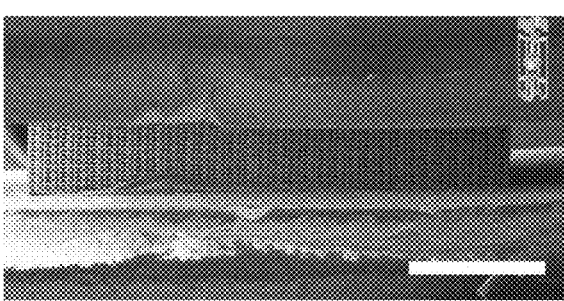
FIG. 23B
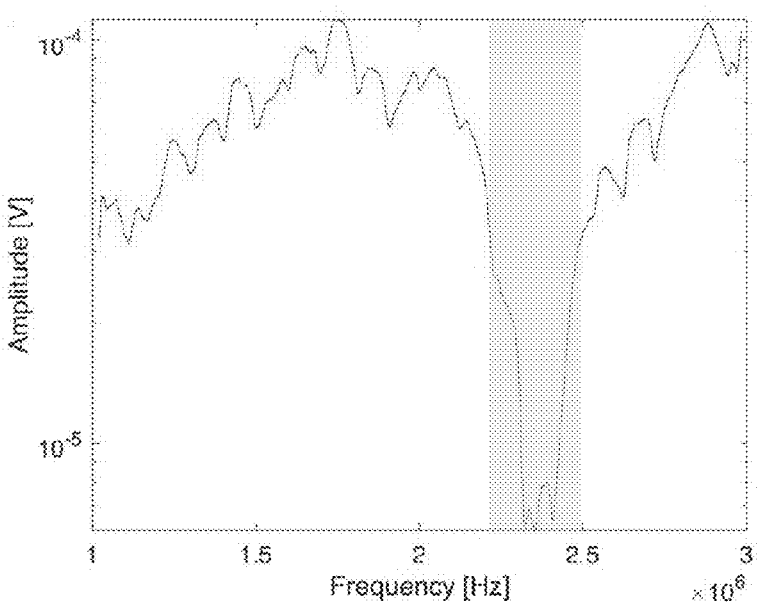
FIG. 23C
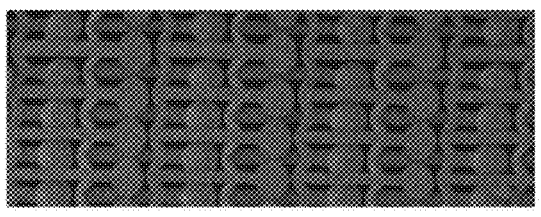
FIG. 23D
FIG. 23E

$E^*/E_s$ $E^*/E_s$

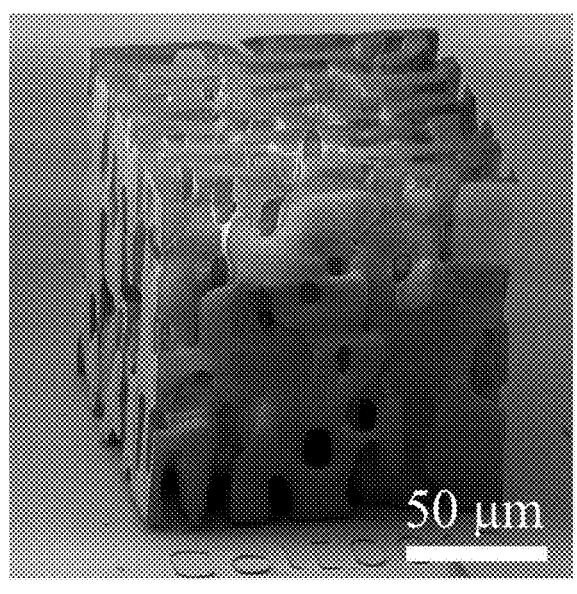
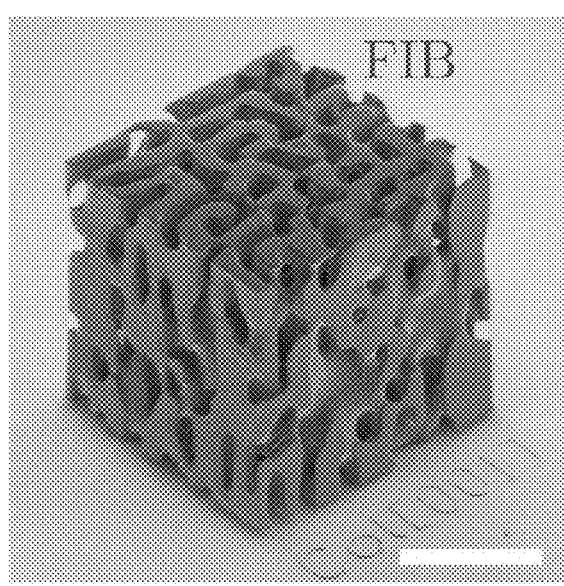
FIG. 28A          FIG. 28B
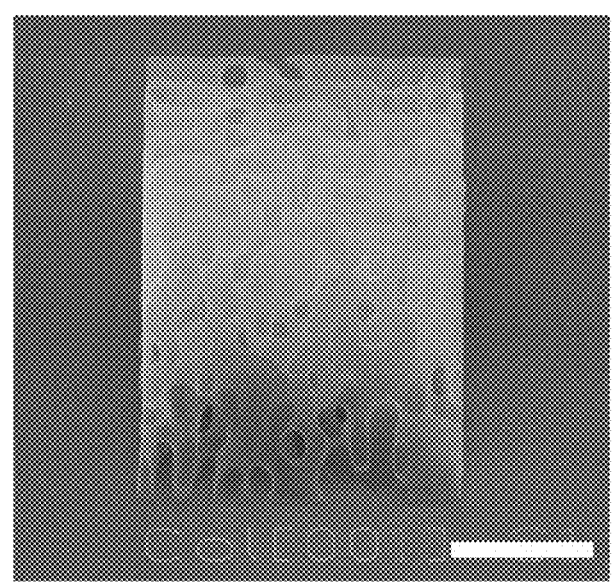
FIG. 28C

FIG. 29A          FIG. 29B
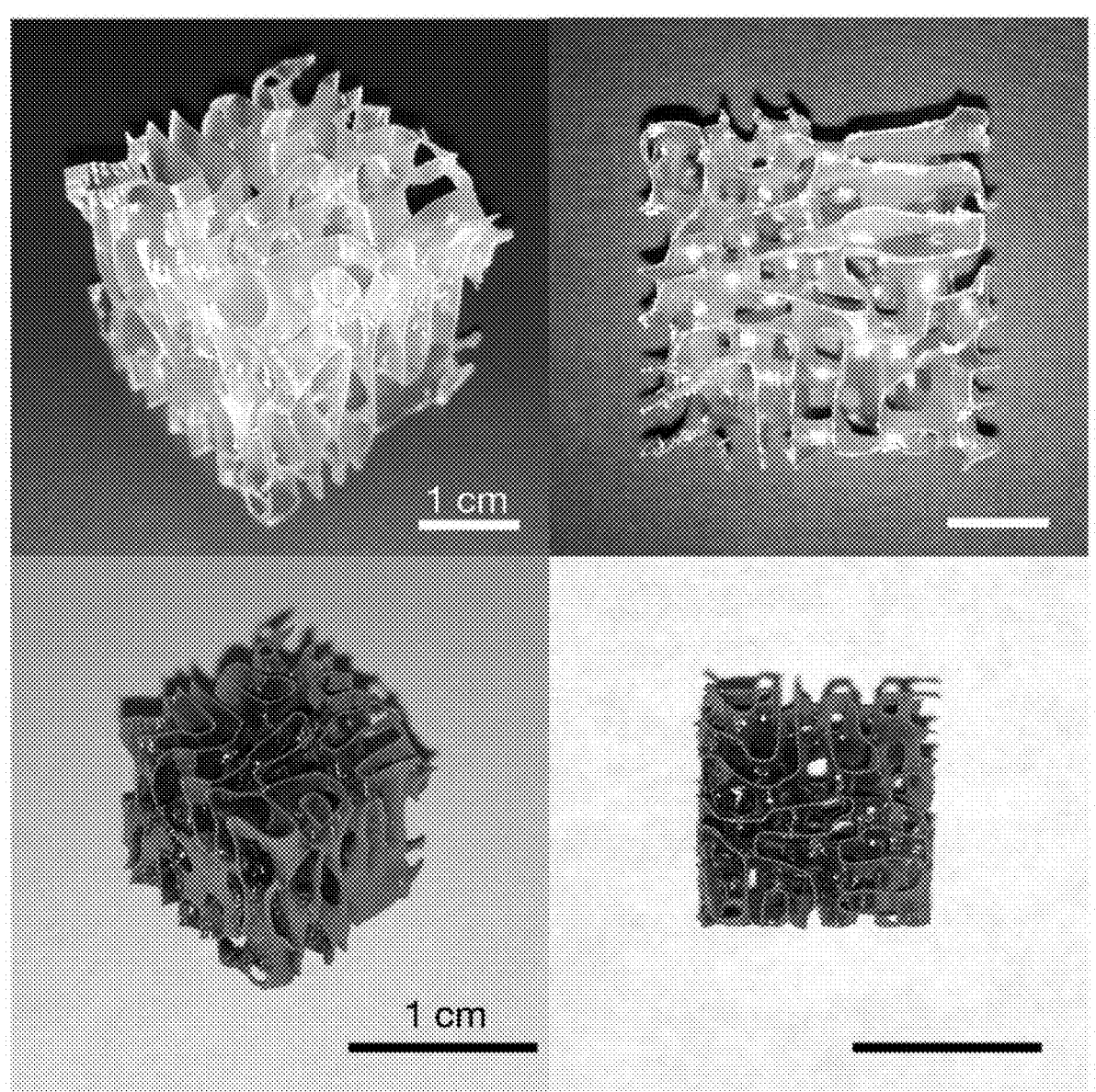
FIG. 29C          FIG. 29D

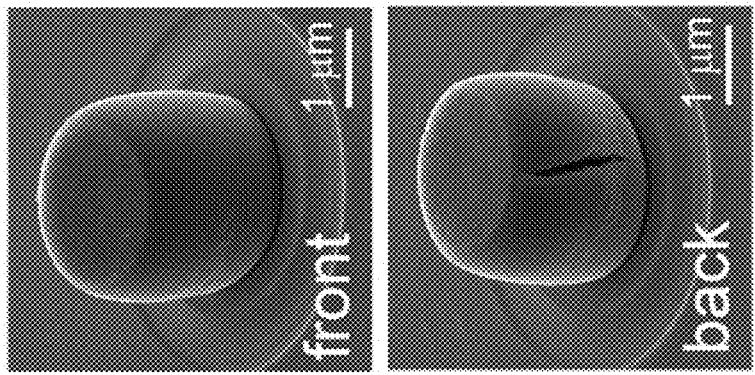
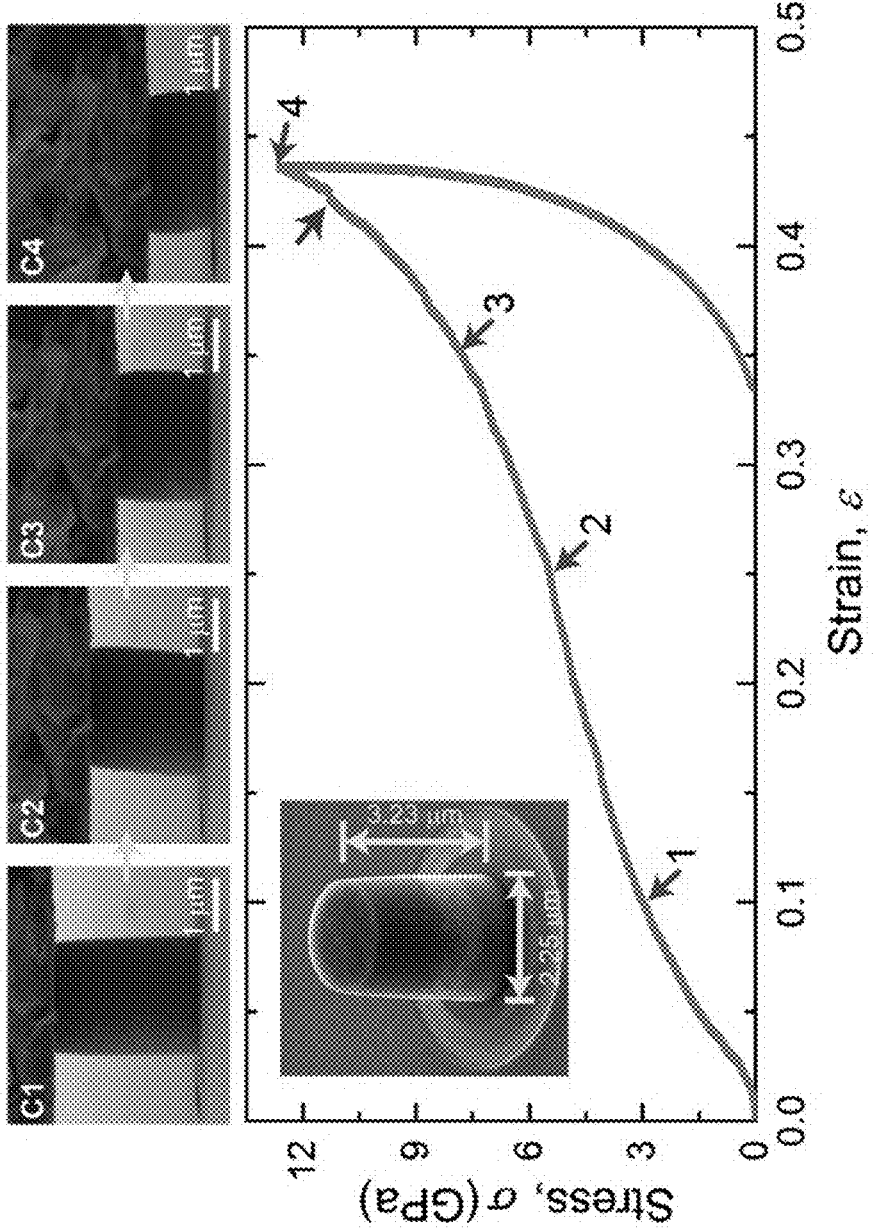
FIG. 34C

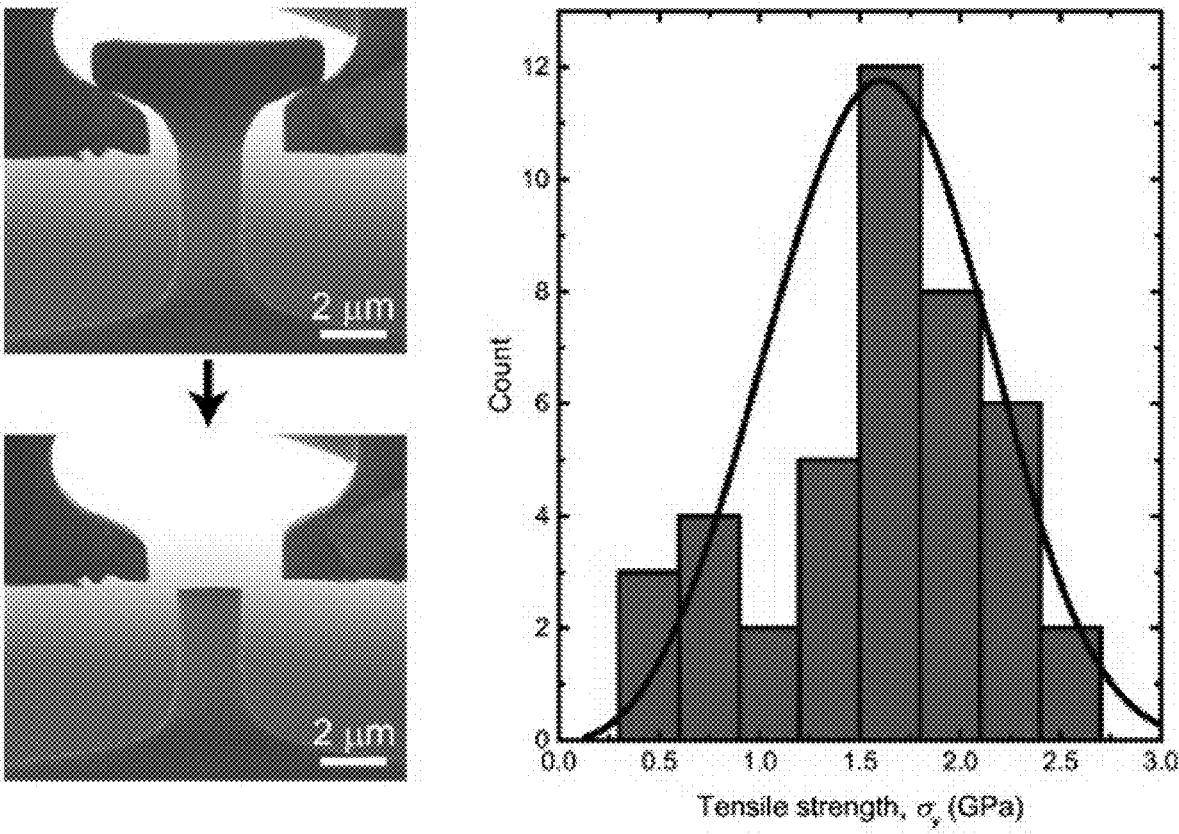
FIG. 34E                             FIG. 34F sp
sp²
sp³

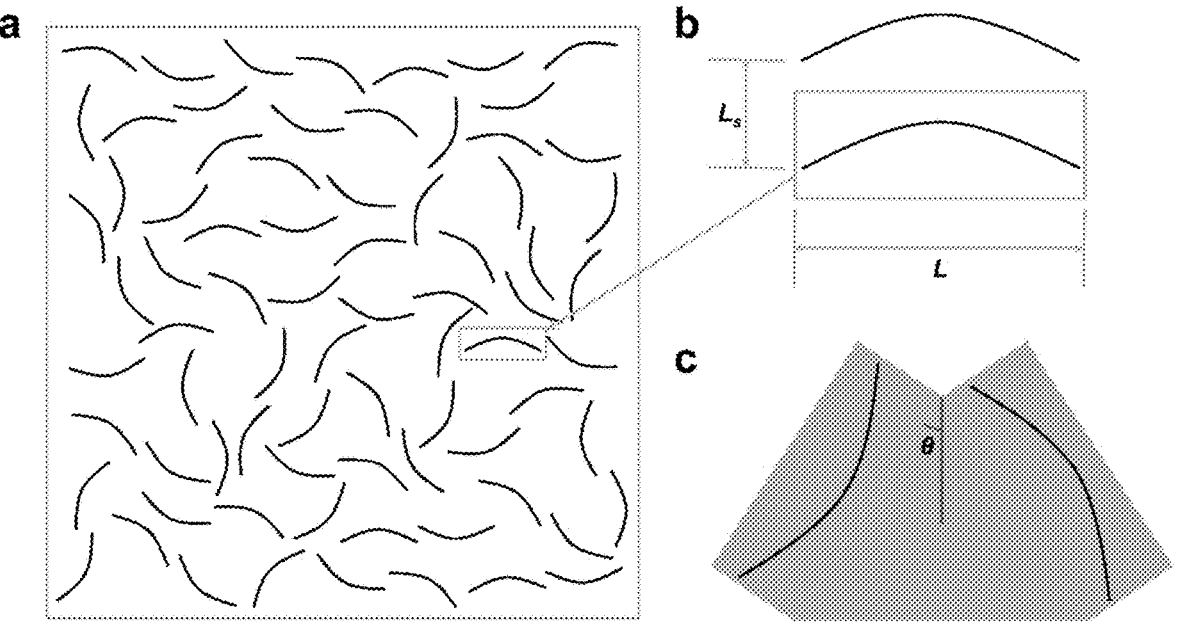
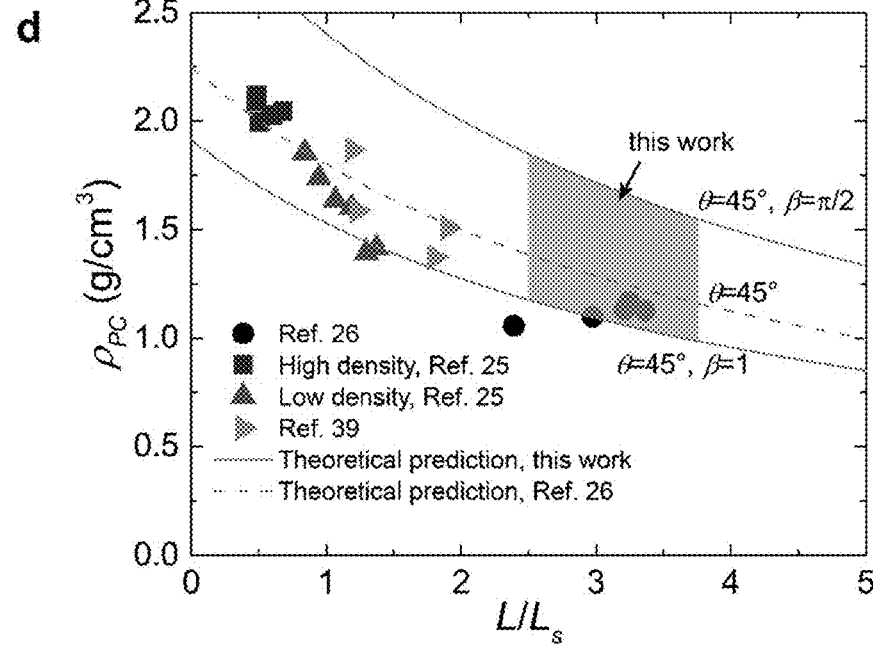
FIG. 41

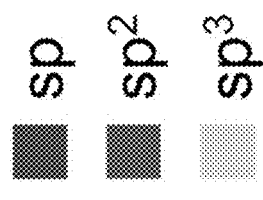
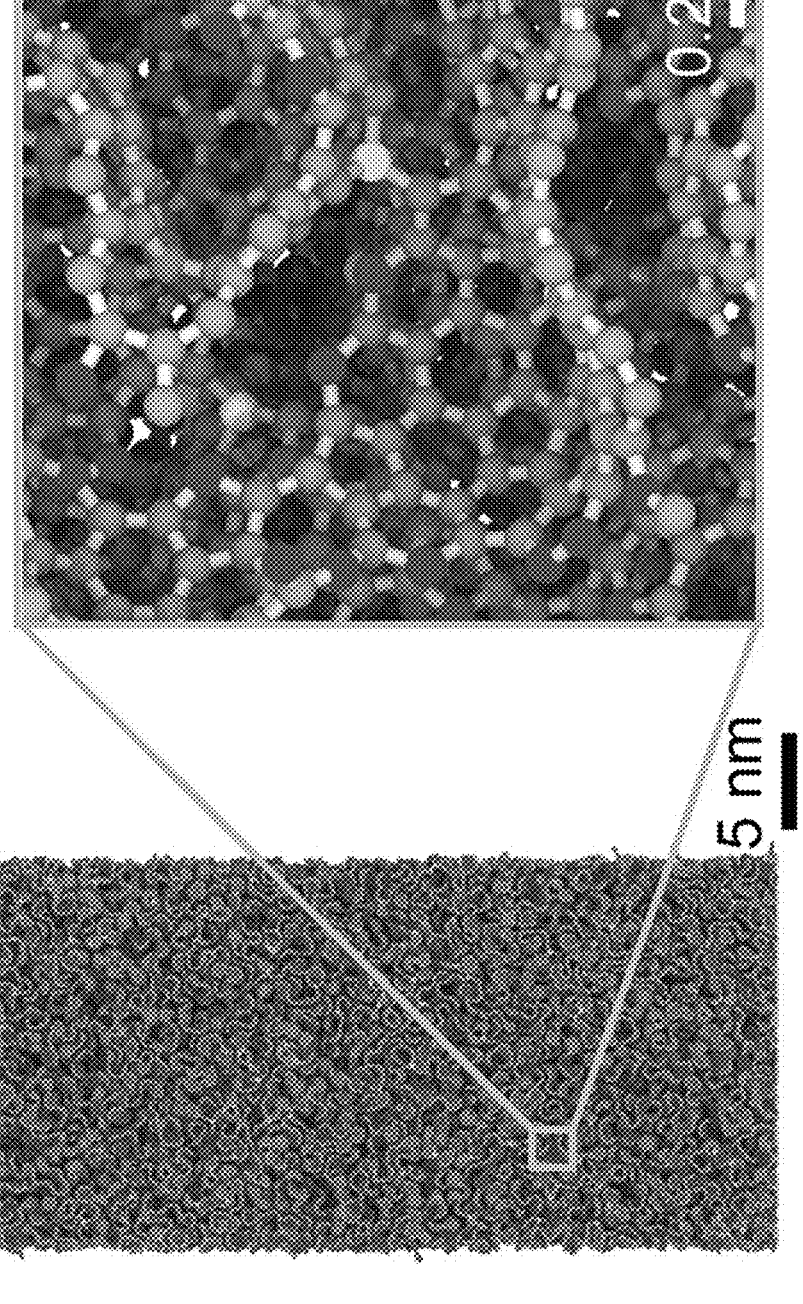
FIG. 44

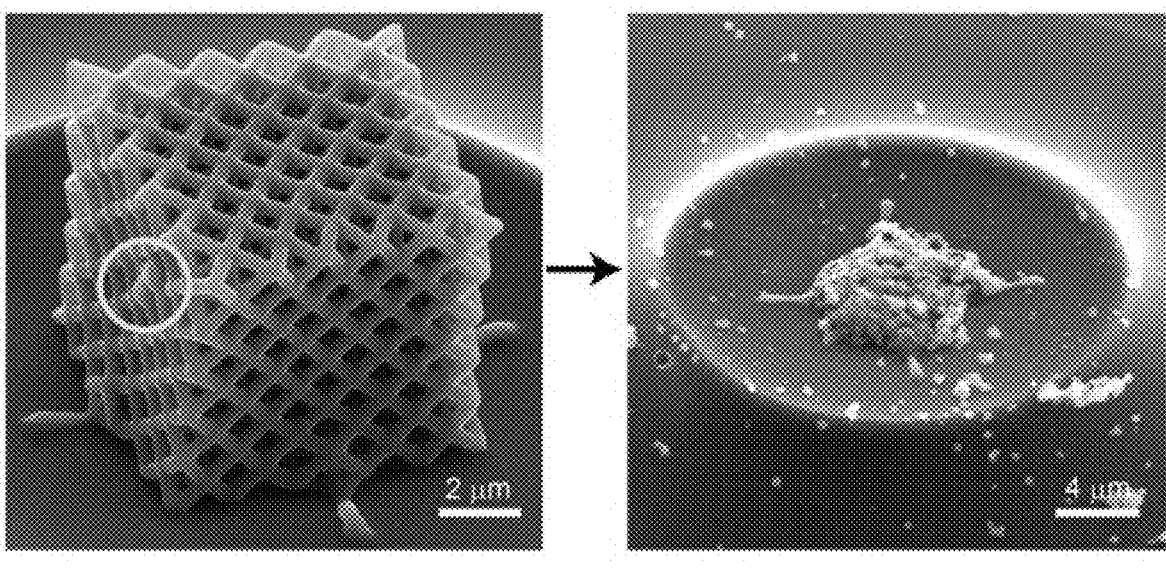
FIG. 49C                    FIG. 49D
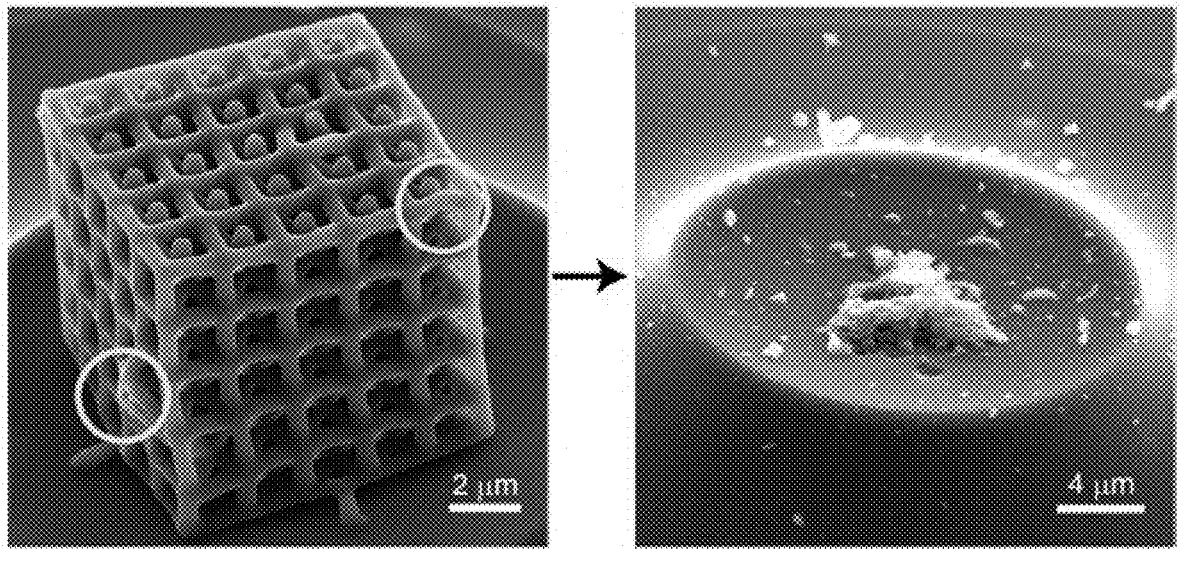
FIG. 49E                    FIG. 49F 1 cm

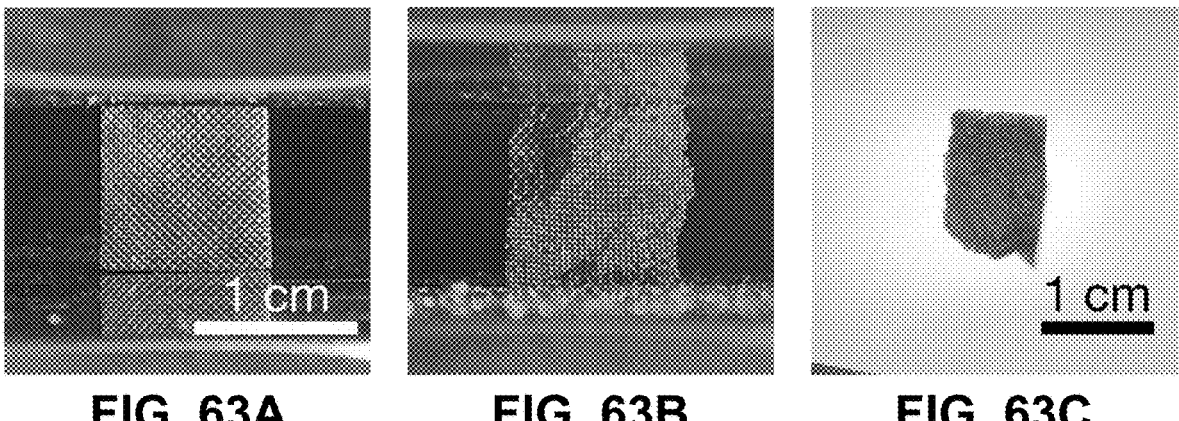
FIG. 63A FIG. 63B FIG. 63C
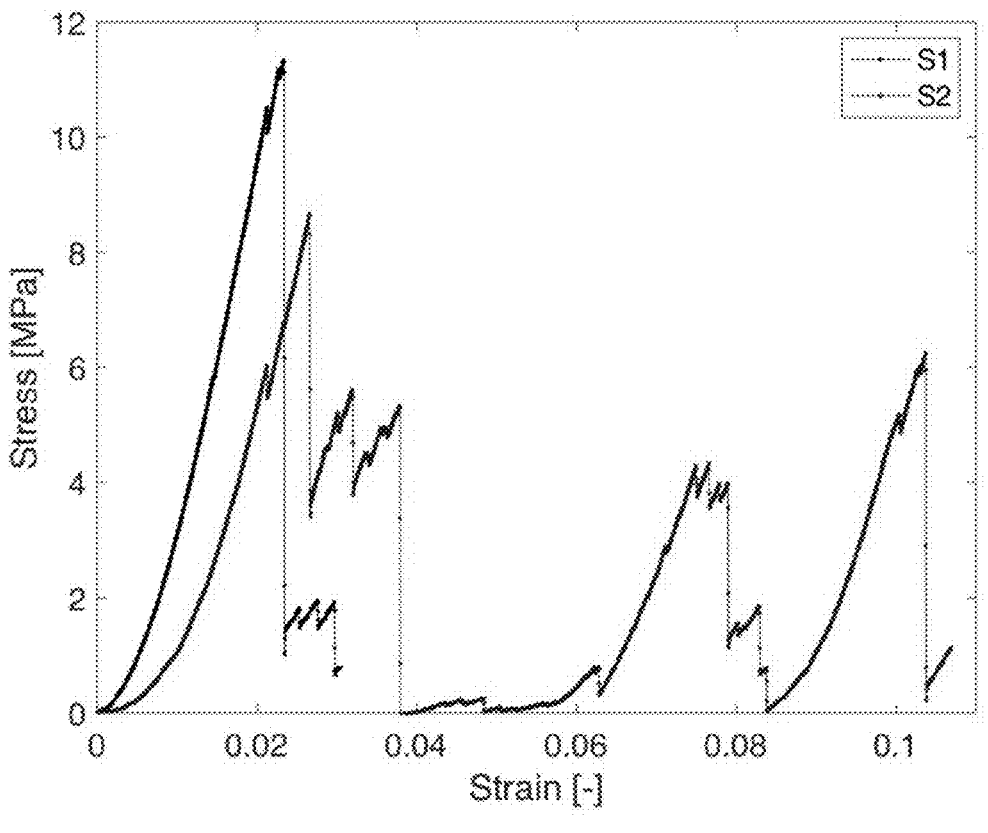
FIG. 63D

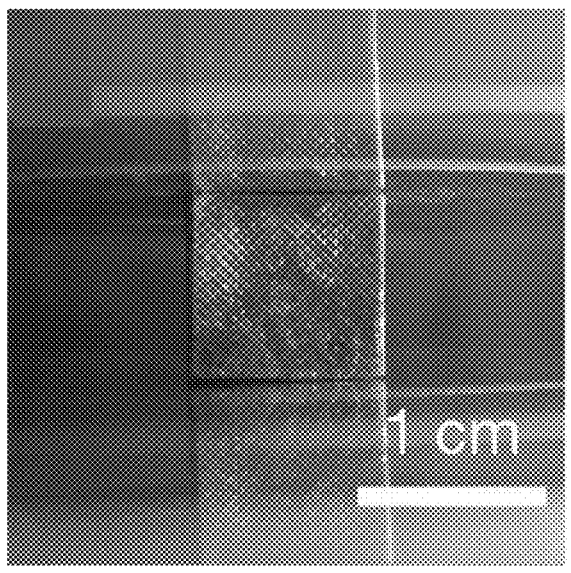
FIG. 64A            FIG. 64B
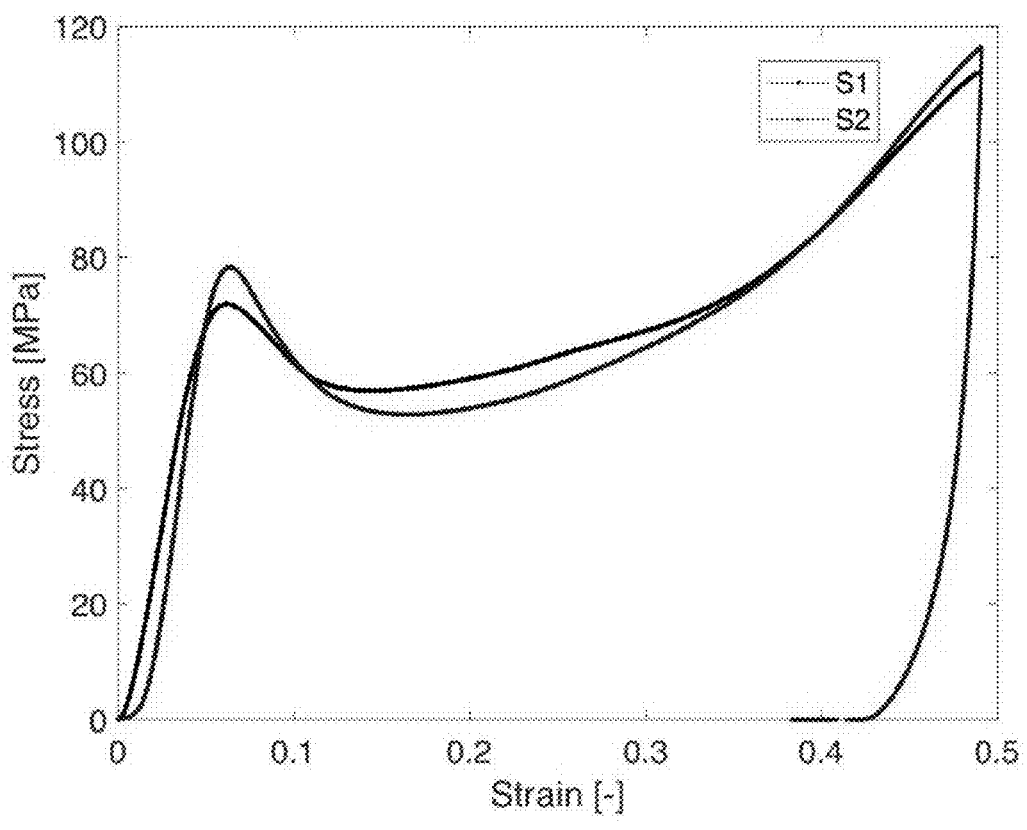
FIG. 64C

FABRICATION AND DESIGN OF COMPOSITES WITH ARCHITECTED LAYERS

CROSS-REFERENCE TO RELATED APPLICATIONS

This application claims the benefit of and priority to U.S. Provisional Patent Application No. 62/593,768, filed Dec. 1, 2017, and is a continuation-in-part of U.S. patent application Ser. No. 16/151,186, filed Oct. 3, 2018, which claims the benefit of priority to U.S. Provisional Patent Application No. 62/567,352, filed Oct. 3, 2017, all of which are hereby incorporated by reference in their entirety to the extent not inconsistent herewith.

STATEMENT REGARDING FEDERALLY SPONSORED RESEARCH OR DEVELOPMENT

This invention was made with government support under Grant No. N00014-16-1-2431 and Grant No. N00014-16-1-2827 awarded by the Office of Naval Research. The government has certain rights in the invention.

BACKGROUND OF INVENTION

The present invention relates to composite material systems, methods of making such composite material systems, which include a structure having an architected and monolithic three-dimensional geometry and a matrix phase. For example, the three-dimensional geometry may include a continuous and interconnected network of features having any variety of shapes or configurations, including curved and surface features, while the matrix phase may at least partially infiltrate the structure.

Composite materials are comprised of one or more materials which form disordered or ordered phases and combine to provide for properties or behavior which may be different from that of the individual materials. Usually these phases are classified as reinforcement phases, with high stiffness or strength properties; or matrix phases, which fill the remaining volume and possess inferior stiffness or strength properties. A composite can be broadly characterized by the volume ratio between the reinforcing and matrix phases, the geometry of the phases, and the constitutive properties of each phase[1].

Composite materials with disordered phases may include short fibers, particles, or randomly assorted components, which do not yield a continuous reinforcing phase. In these materials, the only continuous phase is the matrix, which infiltrates the remaining volume around the reinforcement particles. The matrix phase serves to distribute the load between the stiffer/stronger reinforcement particles. Alternatively, ordered-phase composite materials may include aligned long fibers (discontinuous phase) or even truss-like (continuous phase) geometries as the reinforcing phase, which are surrounded by a continuous matrix phase. Both ordered and unordered composite materials can have a mechanical response that varies from isotropic (i.e., behavior independent of the probing direction) to anisotropic (i.e., behavior dependent on material orientation).

Carbon fiber composites are a form of ordered-phase composites that have been applied in aerospace, automotive, marine, armor, and even sporting-equipment applications. Their wide-spread use relies on their high stiffness-to-density ratio, fatigue properties, and resistance to extreme environments[2]. The fundamental building-blocks of a carbon fiber composite are the fibers, which compose the ordered reinforcing phase that is not continuous—the discrete fibers are only coupled through the matrix phase. An arrangement of fibers impregnated by a matrix phase form a two-dimensional sub-component of a carbon composite part; the lamina.

Discontinuity and anisotropy of the carbon phase in carbon fiber composites is associated with several modes of failure. To reduce the anisotropy, woven-fiber laminae have been made which increase contact between discrete fibers of a lamina[3], albeit forming a reinforcing phase that is still discontinuous. Isotropy can be attained with unidirectional fiber laminae by forming a laminate; a collection of laminae of varying fiber orientations that are bonded through a matrix phase. Modifying the orientation of the fibers in each lamina will determine the degree of anisotropy of the laminate as well as the (commonly undesired) stretching-bending coupling. Due to their construction, carbon fiber laminates can fail through a variety of mechanisms that include fiber buckling (in compression), interfiber failure, and interlaminar failure[4]. Fiber buckling is preeminent in compression loading of a lamina due to the high slenderness of the fibers in the matrix, which are otherwise unsupported in-plane. Interfiber and interlaminar failure occurs due to the discontinuous nature of the reinforcing phase, which relies on the matrix phase to distribute load both through-thickness and in-plane.

Composite materials with continuous reinforcing and matrix phases have been reported, the majority of which have a foam as the reinforcing phase[5-9]. Foams are exemplary stochastic structures, in direct contrast to deterministic structure. Attempts at fixing the discontinuous nature of carbon fibers include adding phases composed of particles, such as carbon nanotubes, to promote adhesion between fiber-matrix and interlaminar interfaces[10,11]. While this approach may increase the strength of these materials, the particles do not form a continuous carbon phase, which still results in failure between laminae (the weakest interface). Other works report ordered truss-like networks as the reinforcing phase with the use of polymer waveguide processes. The geometry of these truss-like networks is limited to straight ray patterns that commence at a material edge, and a finite range of angles between connecting truss elements[12]. Functional grading of composites through these waveguide processes is subject to the same constraints, while decreasing the structural integrity of the reinforcing phase[13, 14] Damping materials have been reported using these waveguide patterns, requiring one or more viscoelastic phases as coatings to dissipate energy[15,16].

In a few cases, fabrication of 3D carbon structures that are not limited to architectures defined by polymer waveguides has been demonstrated using additive manufacturing (AM) of polymer samples. Glassy carbon nanostructures with close to theoretical strength have been fabricated using two-photon lithography (TPL), a process that suffers from extremely low throughput, limiting its practical applications[17]. Cellular carbon microstructures have been produced using stereolithography (SL)[18] and printing of graphene aerogels[19]. However, each of these lithographic structures suffer from a variety of disadvantages, such as failing to provide for a direct fabrication of composite parts with the net shape defined by a 3D carbon network, functional grading, damping properties, impact absorption properties, or tunability of these or other properties.

The composite material systems, and methods of making the systems, provided here address these and other challenges associated with conventional composite materials, thereby providing systems and methods that are highly tunable for a wide array of applications and parameter-space requirements.

SUMMARY OF THE INVENTION

Provided herein are composite material systems and methods for making composite material systems useful for a wide array of applications, and which address challenges and limitations of conventional systems and methods. Applications for which these systems are useful include, but certainly are not limited to, aerospace (e.g., landing gear shock absorption), automotive (e.g., brake assembly vibration mitigation), medicine (e.g., medical devices requiring particular mechanical properties), military (e.g, body armor), marine devices, and sporting-equipment. For example, the systems disclosed herein are useful for impact energy mitigation and/or vibration damping. The disclosed systems and methods are highly tunable and deterministic, such that they may be adapted and tuned according to a desired application and set of properties. For example, the composite material systems disclosed herein may include functional grading via a plurality of three-dimensional geometries continuously interconnected together. For example, the composite material systems may include highly tunable and deterministic resonator features which provide for precise control and tunability of damping behavior of the composite material system.

In an aspect, a composite material system comprises: a structure having an architected three-dimensional geometry; wherein said three-dimensional geometry is monolithic and deterministic; and a matrix phase; wherein said matrix phase at least partially infiltrates said structure. In some embodiments, the three-dimensional geometry is a nano- or micro-architected three-dimensional geometry. In some embodiments, the structure is at least 1%, at least 2%, at least 5%, at least 10%, at least 15%, at least 20%, at least 30%, at least 50%, at least 75%, at least 90%, or preferably for some applications substantially 100% by-volume (vol. %) infiltrated by the matrix phase. In some embodiments, the structure is at least 1%, at least 2%, at least 5%, at least 10%, at least 15%, at least 20%, at least 30%, at least 50%, at least 75%, at least 90%, or preferably for some applications substantially 100% by-mass (mass %) infiltrated by the matrix phase.

The composite material systems, structures, and/or three-dimensional geometries disclosed herein may have a variety of physical and mechanical properties or embodiments, including impacting absorption and/or damping behavior, unobtainable or otherwise difficult to obtain in conventional material systems.

In some embodiments of the systems and methods disclosed herein, the structure, the composite material system, or both, is characterized by an area-normalized impact energy mitigation metric ($\psi$) selected from the range of $2\times10^4$ J/m² to $4\times10^5$ J/m². In some embodiments of the systems and methods disclosed herein, the structure, the composite material system, or both, is by an area-normalized impact energy mitigation metric ($\psi$) that is at least $2\times10^4$ J/m², optionally at least $2.6\times10^5$ J/m², or preferably for some applications at least $3.2\times10^5$ J/m². In some embodiments of the systems and methods disclosed herein, the structure, the composite material system, or both, is characterized by a density-normalized impact energy mitigation metric ($\psi$) selected from the range of $1.9\times10^6$ J/kg to $4\times10^6$ J/kg. In some embodiments of the systems and methods disclosed herein, the structure, the composite material system, or both, is characterized by a density-normalized impact energy mitigation metric ($\psi$) selected from the range of $1.9\times10^6$ J/kg to $3.2\times10^6$ J/kg, preferably for some applications selected from the range of $1\times10^6$ J/kg to $5\times10^6$ J/kg, preferably for some applications selected from the range of $1\times10^6$ J/kg to $1\times10^7$ J/kg, and optionally for some applications selected from the range of $3\times10^6$ J/kg to $1\times10^7$ J/kg. In some embodiments of the systems and methods disclosed herein, the structure, the composite material system, or both, is characterized by mitigation of impact energy having energy selected from the range of 1 J to at least 900 J.

In some embodiments of the systems and methods disclosed herein, the structure, the composite material system, or both, is characterized by a restitution coefficient that is selected from the range of 0.8 to 0.7. In some embodiments of the systems and methods disclosed herein, the structure, the composite material system, or both, is characterized by a restitution coefficient that is selected from the range of 0.8 to 0.3. In some embodiments of the systems and methods disclosed herein, the restitution coefficient is determined when a particle is accelerated at said structure, said particle having a diameter that is at least 10-times greater than a physical dimension of a unit cell of the structure, optionally the particle size is 7 μm to 14 μm, and said particle having a velocity selected from the range of 500 m/s to 1100 m/s. In some embodiments of the systems and methods disclosed herein, the restitution coefficient corresponds to a structure having a relative density selected from the range of 8% to 26%.

In some embodiments of the systems and methods disclosed herein, the composite material system is configured to absorb impact energy substantially via said structure. In an embodiment, the composite material system absorbs at least 20% more impact energy than absorbed by the structure alone under otherwise identical conditions.

In some embodiments of the systems and methods disclosed herein, the structure, the composite material system, or both, is characterized by at least one vibrational frequency band gap. In some embodiments of the systems and methods disclosed herein, the at least one vibrational frequency band gap is at least one complete vibrational frequency band gap. In some embodiments of the systems and methods disclosed herein, at least one vibrational frequency band gap is at least one partial vibrational frequency band gap. In some embodiments of the systems and methods disclosed herein, the structure, the composite material system, or both, is characterized by at least one partial vibrational frequency band gap and at least one at least one complete vibrational frequency band gap. In some embodiments of the systems and methods disclosed herein, the at least one vibrational frequency band gap is deterministic. In some embodiments of the systems and methods disclosed herein, the at least one vibrational frequency band gap is within the range of 0.1 MHz to 100 MHz, preferably for some applications within the range of 0.1 MHz to 200 MHz. In some embodiments of the systems and methods disclosed herein, the at least one vibrational frequency band gap is at least one of 52 MHz to 55 MHz, 19-26 MHz, 14-21 MHz, 46-52 MHz, 1.4 MHz to 1.5 MHz, or 2.4±0.1 MHz. In some embodiments of the systems and methods disclosed herein, the at least one vibrational frequency band gap corresponds to the structure being exposed to a continuous vibration, a pulsed vibration, or a combination of these. In some embodiments of the systems and methods disclosed herein, the at least one vibrational frequency band gap is characterized by a width selected from the range of 0.1 to 200 MHz, optionally for some applications 0.1 to 100 MHz, optionally for some applications 100 Hz to 10 MHz, optionally for some applications 0.1 to 20 MHz, preferably for some applications 0.1 to 10 MHz, optionally for some applications 0.1 to 5 MHz, or preferably for some applications 0.1 to 1 Hz. For example, at least one vibrational frequency band gap corresponds to frequencies relevant to ultrasonic frequencies for medical applications. Broad vibrational frequency band gap widths (e.g., 200 MHz) may be beneficial for dissipating a wide range of stimuli/vibrations for various applications. Narrow vibrational frequency band gap widths (e.g., 1 MHz) may be beneficial for filtering certain stimuli/vibrations for various applications. In some embodiments, the composite material system includes broad, narrow, or both broad and narrow vibrational frequency band gap(s). It is also noted that vibrational frequency band gap (e.g., width thereof) may scale linearly with the characteristic length in the architecture, because the Bragg condition states that significant effects might occur at frequencies where $\Delta L = c/f$, where $\Delta L$ is the characteristic dimension of the microstructure, c is the speed of sound in the material, and f is the frequency. In some embodiments of the systems and methods disclosed herein, the structure, the composite material system, or both, is characterized by a damping ratio of at least 1.2%, preferably at least 3.5%, more preferably at least 7%, and still more preferably at least 9%. In some embodiments of the systems and methods disclosed herein, the structure, the composite material system, or both, is characterized by a damping ratio of at least 1.2% to 3.5% in a longitudinal direction. In some embodiments of the systems and methods disclosed herein, the structure, the composite material system, or both, is characterized by a damping ratio of at least 7% to 9% in a transverse direction. In an embodiment, damping ratio corresponds to the ratio between energy dissipated in a cycle and the maximum energy stored in the cycle.

In some embodiments of the systems and methods disclosed herein, the three-dimensional geometry comprises at least one surface feature. Exemplary surface features include, but are not limited to, sheets, surfaces, hollow spheres, hollow ellipses, and shells. In some embodiments of the systems and methods disclosed herein, the three-dimensional geometry comprises at least one surface feature, wherein at least a portion of said at least one surface feature is characterized by a non-zero Gaussian curvature. In some embodiments of the systems and methods disclosed herein, the three-dimensional geometry comprises at least one surface feature, wherein at least a portion of said at least one surface feature is characterized by a non-zero mean curvature. In some embodiments of the systems and methods disclosed herein, the three-dimensional geometry comprises at least one surface feature, wherein at least a portion of said at least one surface feature is characterized by a zero mean curvature. In some embodiments of the systems and methods disclosed herein, the three-dimensional geometry comprises at least one surface feature, wherein said at least one surface feature is characterized by a non-uniform Gaussian curvature or a non-uniform mean curvature. In some embodiments of the systems and methods disclosed herein, the three-dimensional geometry comprises at least one surface feature, wherein said at least one surface feature is characterized by a non-uniform Gaussian curvature. In some embodiments of the systems and methods disclosed herein, the three-dimensional geometry comprises at least one surface feature, wherein said at least one surface feature is characterized by a non-uniform mean curvature. In some embodiments of the systems and methods disclosed herein, the three-dimensional geometry comprises at least one surface feature, wherein said at least one surface feature is characterized by a uniform Gaussian curvature or a uniform mean curvature. In some embodiments of the systems and methods disclosed herein, the three-dimensional geometry comprises at least one surface feature, wherein said at least one surface feature is characterized by a uniform Gaussian curvature. In some embodiments of the systems and methods disclosed herein, the three-dimensional geometry comprises at least one surface feature, wherein said at least one surface feature is characterized by a uniform mean curvature. In some embodiments of the systems and methods disclosed herein, the three-dimensional geometry comprises at least one surface feature, wherein a thickness dimension of said at least one surface feature is non-uniform throughout said at least one surface feature. In some embodiments of the systems and methods disclosed herein, the three-dimensional geometry comprises at least one surface feature, wherein a thickness dimension of said at least one surface feature is uniform throughout said at least one surface feature.

In some embodiments of the systems and methods disclosed herein, the three-dimensional geometry is characterized as a spinodal geometry. In some embodiments of the systems and methods disclosed herein, the structure is characterized by a slope of normalized effective elastic modulus versus relative density that is selected from the range of 1 to 1.3, optionally 1 to 1.5, or optionally 1 to 1.35.

In some embodiments of the systems and methods disclosed herein, the three-dimensional geometry comprises a resonator. In some embodiments of the systems and methods disclosed herein, the three-dimensional geometry is characterized by a unit cell geometry, said unit cell geometry comprising a resonator. In some embodiments of the systems and methods disclosed herein, the resonator comprises a micro-inertia feature connected to at least one other feature of said three-dimensional geometry. In some embodiments of the systems and methods disclosed herein, the resonator comprises a micro-inertia feature, and wherein another feature of said three-dimensional geometry comprises said micro-inertia feature. In some embodiments of the systems and methods disclosed herein, the resonator comprises a cantilever beam feature and a micro-inertia feature connected to an end of said cantilever beam feature. For example, a micro-inertia feature may be embedded within another feature, such as a structural member, such as a beam or a surface. For example, a micro-inertia may be at nodes of a beam structure or at the hinges of a surface-based geometry.

In some embodiments of the systems and methods disclosed herein, the structure is characterized by deterministic anisotropic impact energy absorption, for example having impact energy absorption, or an impact energy absorption metric, such as restitution coefficient, at least 1% greater, at least 20% greater, at least 100% greater, preferably for some applications at least 1000% greater, or still more preferably for some applications at least 10000% greater along a first direction (e.g., X, Y, Z, or any direction or vector in between) than along a second direction. In some embodiments of the systems and methods disclosed herein, the structure is characterized by deterministic anisotropic elasticity, for example having elasticity at least 1% greater, at least 20% greater, at least 100% greater, preferably for some applications at least 1000% greater, or still more preferably for some applications at least 10000% greater along a first direction (e.g., X, Y, Z, or any direction or vector in between) than along a second direction. In some embodiments of the systems and methods disclosed herein, the structure is characterized by deterministic anisotropic damping, for example having damping, or a damping metric, such as damping ratio, at least 1% greater, at least 20% greater, at least 100% greater, preferably for some applications at least 1000% greater, or still more preferably for some applications at least 10000% greater along a first direction (e.g., X, Y, Z, or any direction or vector in between) than along a second direction. For example, vibrations, such as vibrations within a particular frequency range, such as any frequency or range described herein, may follow along a deterministically determined pathway or component(s) of a composite material system, a structure thereof, or a three-dimensional geometry thereof. In some embodiments of the systems and methods disclosed herein, the structure exhibits vibrational Bragg scattering and the structure does not exhibit vibrational local resonance. In some embodiments of the systems and methods disclosed herein, the structure exhibits vibrational local resonance and the structure does not exhibit vibrational Bragg scattering. In some embodiments of the systems and methods disclosed herein, the structure is characterized by deterministic isotropic impact energy absorption. In some embodiments of the systems and methods disclosed herein, the structure is characterized by deterministic isotropic elasticity. In some embodiments of the systems and methods disclosed herein, the structure is characterized by deterministic isotropic damping.

The systems and methods disclosed herein are compatible with a wide variety of materials, or combinations of materials. The structure may be formed of any one or more materials compared with additive manufacturing, for example.

In some embodiments of the systems and methods disclosed herein, the structure comprises a carbon allotrope material, a polymer, a ceramic material, a metal material, or any combination thereof. In some embodiments of the systems and methods disclosed herein, the structure comprises at least one of: a carbon allotrope material, a polymer, a ceramic material, or any combination thereof. In some embodiments of the systems and methods disclosed herein, the structure comprises one or more carbon allotrope materials. In some embodiments of the systems and methods disclosed herein, the structure comprises at least 50% by volume of one or more carbon materials. In some embodiments of the systems and methods disclosed herein, the structure comprises a plurality of features characterized by a core that is at least 50% by volume of one or more carbon materials.

In some embodiments of the systems and methods disclosed herein, the three-dimensional geometry is a node-free geometry. In some embodiments of the systems and methods disclosed herein, the structure comprises at least one hollow feature. In some embodiments of the systems and methods disclosed herein, the structure comprises at least one feature that is at least partially hollow, such as a hollow truss, for example. For example, a spinodal geometry may comprise at least one hollow portion or feature.

In some embodiments of the systems and methods disclosed herein, the structure is formed via additive manufacturing.

In some embodiments of the systems and methods disclosed herein, the three-dimensional geometry comprises at least one longitudinal feature, wherein at least a portion of said at least one longitudinal feature is characterized by a non-zero curvature along a longitudinal direction of said feature. In some embodiments of the systems and methods disclosed herein, the three-dimensional geometry comprises at least one longitudinal feature, wherein said at least one longitudinal feature is characterized by a non-uniform curvature along a longitudinal direction of said feature. In some embodiments of the systems and methods disclosed herein, the three-dimensional geometry comprises at least one longitudinal feature having at least one cross-sectional dimension that is non-uniform along a longitudinal direction of said feature. In some embodiments of the systems and methods disclosed herein, the three-dimensional geometry comprises at least one feature having a cross-sectional shape that is non-uniform. In some embodiments of the systems and methods disclosed herein, the said three-dimensional geometry comprises at least one longitudinal feature having a longitudinal axis oriented perpendicular to a thickness direction of said structure. For example, a thickness direction corresponds to an axis along which each layer is formed in a layer-by-layer additive manufacturing process.

In some embodiments of the systems and methods disclosed herein, the structure defines a three-dimensional external boundary shape; and wherein said three-dimensional geometry comprises at least one feature that intersects said boundary shape at only one or zero points of intersection.

In some embodiments of the systems and methods disclosed herein, a three-dimensional external boundary shape defined by said structure corresponds to a shape of the composite material system. In some embodiments of the systems and methods disclosed herein, a three-dimensional external boundary shape defined by said structure is hollow. For example, a three-dimensional external boundary shape defined by said structure may be in the form of a hollow tube, a hollow cone, a hollow ellipse, or other configuration.

In some embodiments of the systems and methods disclosed herein, the three-dimensional geometry is an overall three-dimensional geometry comprising at least a primary three-dimensional geometry and a secondary three-dimensional geometry, wherein said primary and said secondary three-dimensional geometries are different. For example, the structure may include structural functional grading of three-dimensional geometries, such that the structure includes a plurality of geometries at least two of which are directly continuous and interconnected, and all of which are directly or indirectly continuous and interconnected. For example, the structure may include compositional functional grading. Via structural functional grading (i.e., a plurality of three-dimensional geometries; i.e., the three-dimensional geometry comprises at least a primary three-dimensional geometry and a secondary three-dimensional geometry), the structure or composite material system may have functional grading of impact energy absorption behavior and/or damping behavior.

In some embodiments of the systems and methods disclosed herein, the matrix phase comprises at least a primary matrix phase and a secondary matrix phase. For example, a first portion of the structure may be infiltrated by a primary matrix phase and a second portion of the structure may be infiltrated by a secondary matrix phase. The primary and secondary matrix phases may be different. For example, the primary and secondary matrix phases may have different compositions. For example, the primary matrix phase may be a different polymer or resin than the second matrix phase. In some embodiments of the systems and methods disclosed herein, the structure comprises a closed region that is free of said matrix phase. In some embodiments of the systems and methods disclosed herein, the structure is enclosed within said matrix phase. In some embodiments of the systems and methods disclosed herein, the structure is enclosed within said matrix phase such that no portion of said structure exists beyond external boundaries of said matrix phase.

In some embodiments of the systems and methods disclosed herein, at least a portion of said three-dimensional geometry is characterized as a tetrakaidecahedron, Weaire-Phelan geometry, honeycomb geometry, auxetic geometry, an octet-truss geometry, an octahedron, a diamond lattice, a 3D kagome geometry, a tetragonal geometry, a cubic geometry, a tetrahedron, a space-filling polyhedron, a periodic minimal surface, a triply periodic minimal surface geometry, a spinodal geometry, a chiral geometry, or a combination of these. In some embodiments of the systems and methods disclosed herein, at least a portion of said three-dimensional geometry is characterized as a tetrakaidecahedron, auxetic geometry, an octet-truss geometry, an octahedron, a diamond lattice, a 3D kagome geometry, a tetragonal geometry, a cubic geometry, a tetrahedron, a space-filling polyhedron, a periodic minimal surface, a triply periodic minimal surface geometry, a spinodal geometry, a chiral geometry, or a combination of these when viewing the three-dimensional geometry in a beam-based, shell-based, open-cell-based, or closed-cell-based representation. In some embodiments of the systems and methods disclosed herein, at least a portion of said three-dimensional geometry is characterized by a beam- or shell-based geometry; wherein said beam- or shell-based geometry is not symmetric, is not periodic, or is not regularly tessellated. In some embodiments of the systems and methods disclosed herein, features comprise one or more of struts, beams, ties, trusses, sheets, surfaces, spheres, ellipses, and shells.

In some embodiments of the systems and methods disclosed herein, the three-dimensional geometry is characterized by a plurality of features independently having physical dimensions independently selected to a tolerance within 100 nm. In some embodiments of the systems and methods disclosed herein, the three-dimensional geometry is characterized by a plurality of features independently having physical dimensions independently selected to a tolerance within 3 $\mu$m. In some embodiments of the systems and methods disclosed herein, the structure is characterized by a relative density selected from the range of 5% to 99.9%, optionally 5% to 60%, optionally 0.1% to 60%, optionally 0.1% to 99.9%, or optionally 8% to 30%. In some embodiments of the systems and methods disclosed herein, the structure is characterized by a relative density selected from the range of 8% to 60%. In some embodiments of the systems and methods disclosed herein, the structure is characterized by a plurality of features independently having at least one physical dimension less than or equal to 50 $\mu$m, optionally selected from the range 100 to 200 $\mu$m. In some embodiments of the systems and methods disclosed herein, the three-dimensional geometry is characterized by a plurality of features, wherein at least a portion of said features independently have one or more average cross sectional physical dimensions (e.g., thickness, width, diameter, etc.) selected over the range of 50 nm to 200 $\mu$m, preferably for some applications 2 nm to 200 $\mu$m, preferably for some applications 10 nm to 200 $\mu$m, optionally 50 $\mu$m or less, optionally 200 nm or less, or optionally selected from the range 100 $\mu$m to 200 $\mu$m. For example, a spinodal geometry may be substantially hollow including walls or shells with substantially 10 nm thickness. For example, the structure may comprise a hollow feature, such as a hollow beam or truss, having an inner diameter and an outer diameter, such that a cross-sectional physical dimension is a thickness- or difference between the inner and outer radii- or an overall thickness or diameter of the feature, such as a beam or truss.

For example, an inner radius may be substantially 250 nm and an outer radius may be substantially 900 nm. In some embodiments of the systems and methods disclosed herein, at least a portion of said features are characterized by one or more average longitudinal physical dimensions selected over the range of 10 nm to 2000 $\mu$m. In some embodiments of the systems and methods disclosed herein, the three-dimensional geometry is characterized by a unit cell geometry, the unit cell having at least one overall physical dimension selected from the range of 10 nm to 20 $\mu$m, optionally 100 nm to 20 $\mu$m, optionally 1 $\mu$m to 20 $\mu$m, optionally 5 $\mu$m to 20 $\mu$m, or optionally 1 $\mu$m to 200 $\mu$m. For example, the unit cell may have a tetragonal geometry with length, width, and thickness of 20 $\mu$m, 20 $\mu$m, and 5 $\mu$m.

In some embodiments of the systems and methods disclosed herein, the composite material system comprises at least one additional phase. In some embodiments of the systems and methods disclosed herein, an additional phase is a void or a region free of the structure and of the matrix phase. In some embodiments of the systems and methods disclosed herein, the structure, the matrix phase, or both, comprises adhesion-promoting additive(s). In an embodiment, adhesion-promoting additives increase adhesion between the structure and the matrix phase compared to adhesion without said additives. Additives may be present during formation of the structure, such as being present in a precursor material during additive manufacturing of the structure. Additives may be deposited onto the structure after the structure is at least partially formed. Additives may be introduced during infiltration of the structure with the matrix phase. Additives may be added to a matrix phase or matrix phase precursor prior to infiltration.

In some embodiments of the systems and methods disclosed herein, the structure is characterized by an elasticity, said elasticity of said structure being deterministic.

In some embodiments of the systems and methods disclosed herein, the structure is substantially undamaged by impact from an $SiO_2$ particle having a diameter selected from the range of 7 $\mu$m to 14 $\mu$m and a velocity selected from the range of 500 m/s to 1100 m/s. In some embodiments of the systems and methods disclosed herein, the structure is substantially undamaged by impact from an $SiO_2$ particle having a diameter that is at least one order-of-magnitude (at least 10 times) larger than an overall dimension of the unit cell characterizing the structure's three-dimensional geometry.

In some embodiments of the systems and methods disclosed herein, the structure is characterized as having a bending-dominated mode. In some embodiments of the systems and methods disclosed herein, the structure is characterized as having a stretching-dominated mode.

In some embodiments of the systems and methods disclosed herein, the structure is characterized by an average specific strength (strength-to-density ratio) selected from the range of 0.14 to 1.90 GPa g$^{-1}$ cm$^3$. In some embodiments of the systems and methods disclosed herein, the structure is characterized by an average density selected from the range of 0.24 to 1.0 g cm$^{-3}$. In some embodiments of the systems and methods disclosed herein, the structure is characterized by an average Young's modulus selected from the range of 0.16 to 18.6 GPa. In some embodiments of the systems and methods disclosed herein, the structure is characterized by an average Young's modulus selected from the range of 0.16 to 440 GPa. In some embodiments of the systems and methods disclosed herein, the structure is characterized by a compressive strength selected from the range of 5 MPa to 20 GPa. In some embodiments of the systems and methods disclosed herein, the structure is characterized by a strain-to-failure value of greater than or equal to 20%. In some embodiments of the systems and methods disclosed herein, the structure is characterized by a strength-to-failure value of greater than or equal to 1 GPa.

In some embodiments of the systems and methods disclosed herein, the carbon allotrope material is selected from the groups consisting of glassy carbon, graphitic carbon, amorphous carbon, pyrolytic carbon, graphite, carbon black, and any combination thereof. In some embodiments of the systems and methods disclosed herein, the carbon allotrope material comprises pyrolytic carbon.

In some embodiments of the systems and methods disclosed herein, the structure comprises a coating. In some embodiments of the systems and methods disclosed herein, the coating comprises a metal, a ceramic, or a combination thereof.

In some embodiments of the systems and methods disclosed herein, the matrix phase comprises one or more material selected from the group consisting of a polymer, an epoxy, a carbon allotrope, a ceramic, a metal, a viscous fluid, or any combination thereof.

In an aspect, a method of making a composite material system, said method comprising steps of: preparing a structure via an additive manufacturing process; wherein: said structure has an architected three-dimensional geometry; and said three-dimensional geometry is monolithic and deterministic; and infiltrating said structure with a matrix phase such that said structure is at least partially infiltrated by said matrix phase; thereby making said composite material system. In some embodiments, the structure is at least 1%, at least 2%, at least 5%, at least 10%, at least 15%, at least 20%, at least 30%, at least 50%, at least 75%, at least 90%, or preferably for some applications substantially 100% by-volume infiltrated by the matrix phase. In some embodiments, the structure is at least 1%, at least 2%, at least 5%, at least 10%, at least 15%, at least 20%, at least 30%, at least 50%, at least 75%, at least 90%, or preferably for some applications substantially 100% by-mass infiltrated by the matrix phase. In some embodiments of the systems and methods disclosed herein, the three-dimensional geometry is a nano- or micro-architected three-dimensional geometry. In some embodiments, the method further comprises designing said three-dimensional geometry using a computer-aided design technique. In some embodiments, the step of designing comprises determining said three-dimensional geometry based on computational spinodal decomposition. In some embodiments, the step of designing comprises determining at least one vibrational frequency band gap of said structure, such that said at least one vibrational frequency band gap of said structure is deterministic. In some embodiments, the step of designing comprises determining an elasticity of said structure, such that said elasticity of said structure is deterministic. In some embodiments, the step of designing comprises determining a restitution coefficient of said structure, such that said restitution coefficient of said structure is deterministic. In some embodiments, the step of designing comprises determining an area-normalized impact energy mitigation metric (L) of said structure, such that said area-normalized impact energy mitigation metric (L) of said structure is deterministic. In some embodiments, the additive manufacturing process is selected from the group consisting of: a sterolithographic (SLA) technique; a digital light processing (DLP) technique; a continuous liquid interface production technique; a micro-stereolithographic (p-SLA) technique; a two-photon polymerization lithography technique; an interference lithography technique; a holographic lithography technique; a stimulated emission depletion (STED) lithography technique; other vat photo-polymerization technique; a material extrusion technique; a powder bed fusion technique; a material jetting technique; and a combination of these. In some embodiments, the additive manufacturing process is a three-dimensional lithography technique. In some embodiments, the step of preparing said structure comprises forming a three-dimensional framework; said step of preparing further comprising treating said three-dimensional framework to prepare said structure; said step of treating comprising a pyrolysis process. In some embodiments, the method further comprises applying a coating on said structure. In some embodiments, the method further comprises etching a portion of said structure such that said structure comprises at least one hollow feature, at least a portion of said at least one hollow feature comprising said coating. In some embodiments, the step of infiltrating comprises a process selected from the group consisting of sonication, vacuum exposure, and any combination thereof. In some embodiments, the method further comprises post-treating said composite material system, said step of post-treating comprising a cure process. In some embodiments, the step of preparing comprises selecting a precursor material selected from the group consisting of a resin, a metal, a ceramic, a polymer, and any combination of these. In some embodiments, the step of preparing comprises selecting a precursor material selected from the group consisting of an organic resin, a hybrid organic-inorganic resin, a metal, a metallic alloy, a ceramic, a polymer, and any combination of these. Useful organic resins include, but are not limited to, acrylic-based, thiol-based, polyurethane-based, and epoxy-based resins. Useful hybrid organic-inorganic resins include, but are not limited to, siloxanes and metal alkoxide-derived precursors, such as those described in US Patent Publication 2018/0088462, which is hereby incorporated by reference. In some embodiments, the precursor material further comprises additives. Useful additives include, but are not limited to, metal and/or ceramic particles (e.g., nanoparticles), other inorganic and/or organic additives, solutions of inorganic and/or organic materials that either form a single phase with the resin, or suspensions and emulsions forming a secondary phase with the resin, inorganic particles, inorganic fibers, organic binders, polymer powder, metal powder, ceramic powder, metal wires (e.g., micro- or nano-wires), metal salt solution, metal ion solution, and any combinations of these. For example, precursors for extrusion techniques may include thermoplastic polymers and low melting point metals, with additives that include inorganic particles, fibers, etc. For example, material feed stocks for powder bed-based techniques may include metal, ceramic, and polymer powders. For example, precursor for binder jet-based techniques use may include these powders in combination with organic binders. For example, precursors for direct energy deposition techniques may include metal powders and metal wires. As additional examples, other feedstock/precursor materials for additive manufacturing techniques may include metal and ceramic nanoparticle inks for direct ink writing and electrohydrodynamic printing, metal and polymer sheets for lamination-based processes, metal salt or metal ion solutions for electroplating-based and photoreduction-based methods, precursor gases for focused beam-based methods (FEBID/FIBID), and droplets of molten metal for laser-induced forward transfer and magnetohydrodynamic printing.

In some embodiments, the pyrolysis process is carried out over a temperature range selected from the range of 500° C. to 3000° C. and for a duration selected from the range of 1 hour to 336 hours. In some embodiments, the pyrolysis process is carried out over a temperature range select from the range of 500° C. to 900° C., optionally 500 to 1300° C. The structure is optionally exposed to vacuum and/or an inert gas, or any atmosphere substantially lacking oxygen and water vapor, during pyrolysis. In some embodiments, the pyrolysis process provides for an isotropic shrinkage of said three-dimensional framework to said structure selected from the range of 15% to 80%.

In some embodiments, the method further comprises applying an external stimulus to said structure to change at least one vibrational frequency band gap of said structure.

In some embodiments, the method does not comprise etching a template.

In some embodiments of the systems and methods disclosed herein, the composite material system has a density less than or equal to 1500 kg/m$^3$, less than or equal to 1200 kg/m$^3$, preferably for some applications less than or equal to 1000 kg/m$^3$, more preferably for some applications less than 1000 kg/m$^3$, more preferably for some applications less than or equal to 900 kg/m$^3$, more preferably for some applications less than or equal to 500 kg/m$^3$, more preferably for some applications less than or equal to 300 kg/m$^3$, more preferably for some applications less than or equal to 150 kg/m$^3$, or still more preferably for some applications less than or equal to 100 kg/m$^3$. In some embodiments of the systems and methods disclosed herein, the composite material system has a density selected from the range of 100 kg/m$^3$ to 1500 kg/m$^3$, 100 kg/m$^3$ to less than 1000 kg/m$^3$, or any subrange in between. In some embodiments of the systems and methods disclosed herein, the composite material system or structure is characterized by a Young's modulus of at least 100 MPa, optionally for some applications at least 495 MPa, preferably for some applications at least 660 MPa, more preferably for some applications at least 1000 MPa, still more preferably for some applications at least 1.82 GPa, or still more preferably for some applications at least 2.2 GPa. In some embodiments of the systems and methods disclosed herein, the composite material system or structure is characterized by a Young's modulus selected from the range of 100 MPa to 5 GPa, or any subrange in between. In some embodiments of the systems and methods disclosed herein, the composite material system or structure is characterized by a yield strength of at least 5 MPa, preferably for some applications at least 8 MPa, preferably for some applications at least 11 MPa, more preferably for some applications at least 15 MPa, more preferably for some applications at least 25 MPa, still more preferably for some applications at least 60 MPa, or still more preferably for some applications at least 100 MPa. In some embodiments of the systems and methods disclosed herein, the composite material system or structure is characterized by a yield strength selected from the range of 5 MPa to 100 MPa, or any subrange in between. In some embodiments of the systems and methods disclosed herein, the composite material system or structure is characterized by not exhibiting catastrophic failure at strain (s) selected from the range of 0.1 to at least 0.5. In some embodiments of the systems and methods disclosed herein, the composite material system or structure is characterized by flow stress of at least 70 MPa, or optionally selected from the range of 70 to 500 MPa. In some embodiments of the systems and methods disclosed herein, the composite material system or structure is characterized by a flexural strength of at least 10 MPa, preferably for some applications at least 20 MPa, or preferably for some applications selected from the range of 10 MPa to 100 MPa, or any subrange therebetween. In some embodiments of the systems and methods disclosed herein, the composite material system or structure is characterized by a bending modulus of at least 1 GPa, preferably for some applications at least 1.4 GPa, preferably for some applications at least 2 GPa, preferably for some applications at least 3.3 GPa, preferably for some applications at least 3.9 GPa, preferably for some applications at least 5 GPa, or more preferably for some applications selected from the range of 100 MPa to 10 GPa, or any subrange therebetween.

Also disclosed herein are composite material systems having any one or any combination of embodiments of composite material systems and methods disclosed herein. Also disclosed herein are methods for making material systems having any one or any combination of embodiments of composite material systems and methods disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 2A. Changing cross-sections in a single truss element. FIG. 2B. Non-zero curvature and horizontal truss elements.

FIG. 7A. Structural element fabricated from a precursor resin via DLP 3D printing and corresponding micrograph. FIG. 7B. Post-pyrolysis carbon three-dimensional continuous reinforcing phase and corresponding micrograph. FIG. 7C. Composite structural element with continuous three-dimensional phases and epoxy matrix phase.

FIG. 10A. Micrograph of full lattice suspended on a bed of spring structures. FIG. 10B. Close-up showing 5 μm octet unit cells.

FIG. 11A. Octet lattice of 26% relative density. FIG. 11B. Close-up showing sub-micron unit cells. FIG. 11C. Tetrakaidecahedron lattice of 17% relative density. FIG. 11D. Close-up on final tetrakaidecahedron geometry.

FIGS. 13A-13C. PMMA resist coating to better bond the lattice to the substrate. FIG. 13A. Initial carbon lattice. FIG. 13B. Carbon lattice with a sub-micron PMMA coating. FIG. 13C. Post-mortem confocal microscopy image showing the impact site and minor permanent deformation.

FIG. 14A. Diagram depicting a planar wave going through a lattice of thickness $x_{lat}$ and substrate thickness $x_s$. FIG. 14B. x-t diagram of the elastic plane wave for a worst-case carbon octet lattice of 60% relative density, showing that the (on-average) 4 ns of impact time are not sufficient for elastic waves to reach the substrate and reflect back to the projectile.

FIG. 15A. The original Si substrates were patterned and etched to create stilts approximately 50 μm in height. FIG. 15B. The nanowires that tethered the as-pyrolyzed sampled to the substrate were milled using a FIB. FIG. 15C. The freed sample was captured by a nano-manipulator. FIG. 15D. The sample was affixed to the stilts using Pt glue.

FIG. 17. Summary of impact experiments. A trend between impact energy, $$\alpha m v_0^2,$$

and restitution coefficient, $v_r/v_0$, can be observed. No substantial difference was observed across different architectures, while a decrease in restitution was observed for lower relative density samples. The suspended-sample experiment is shown in yellow, while the PMMA-coated one is shown in blue.

Figure 18C:
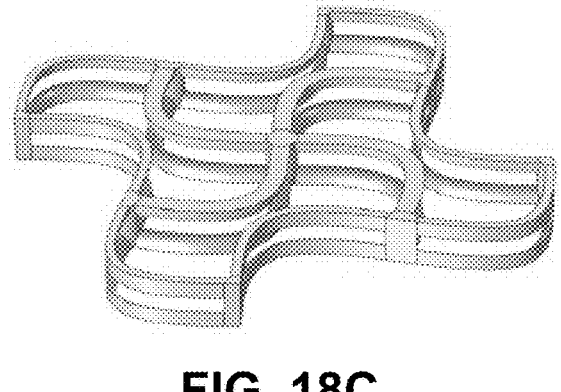
Figure 18D:
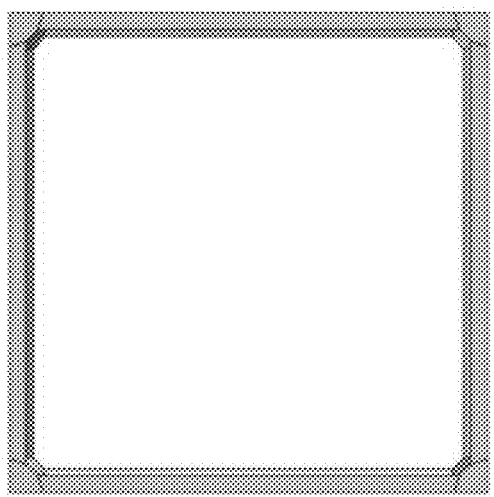
Figure 18E:
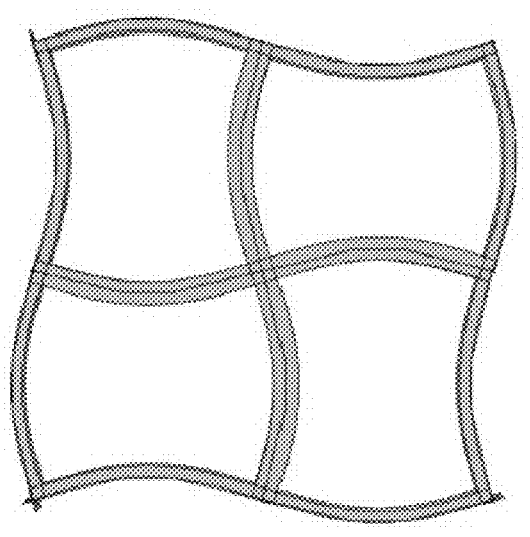
Figure 18F:
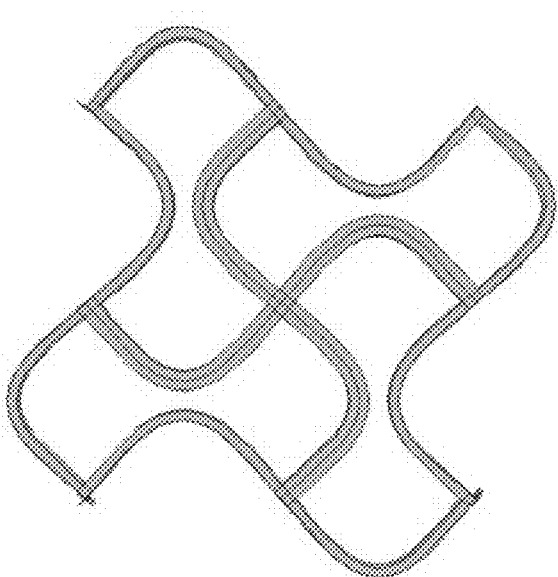

FIGS. 18A-18F. Tetragonal unit cell of interest. FIG. 18A. Unmodified tetragonal unit cell with elliptical cross-section beams in the horizontal direction and circular beams in the vertical direction, (FIG. 18B) slightly buckled geometry, (FIG. 18C) fully buckled geometry, (FIGS. 18D-18F) top views of the unit cells in FIGS. 18A-18C.

Figure 19C:
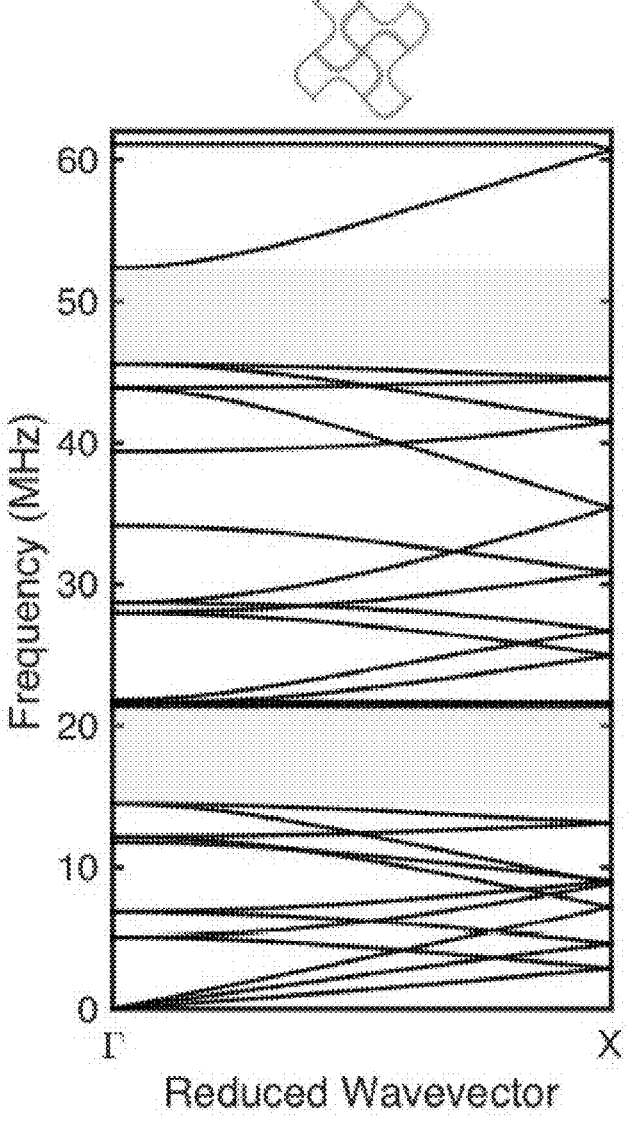
Figure 19D:
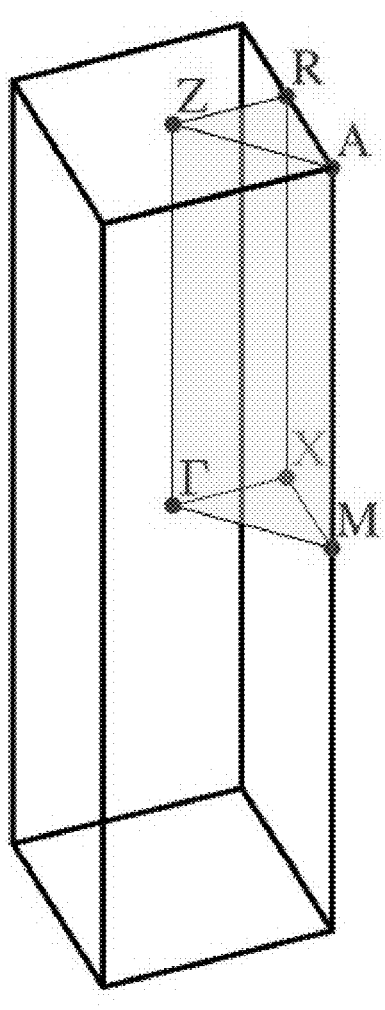

FIGS. 19A-19D. Dispersion relations for the tetragonal unit cells. FIG. 19A. Unmodified unit cell, (FIG. 19B) slightly buckled unit cell, (FIG. 19C) fully buckled unit cell, (FIG. 19D) irreducible Brillouin zone in reciprocal space. Partial band gaps are shaded in green.

FIGS. 20A-20B. Auxetic unit cell. FIG. 20A. Unmodified unit cell, (FIG. 20B) unit cell with added resonator.

Figure 21A:
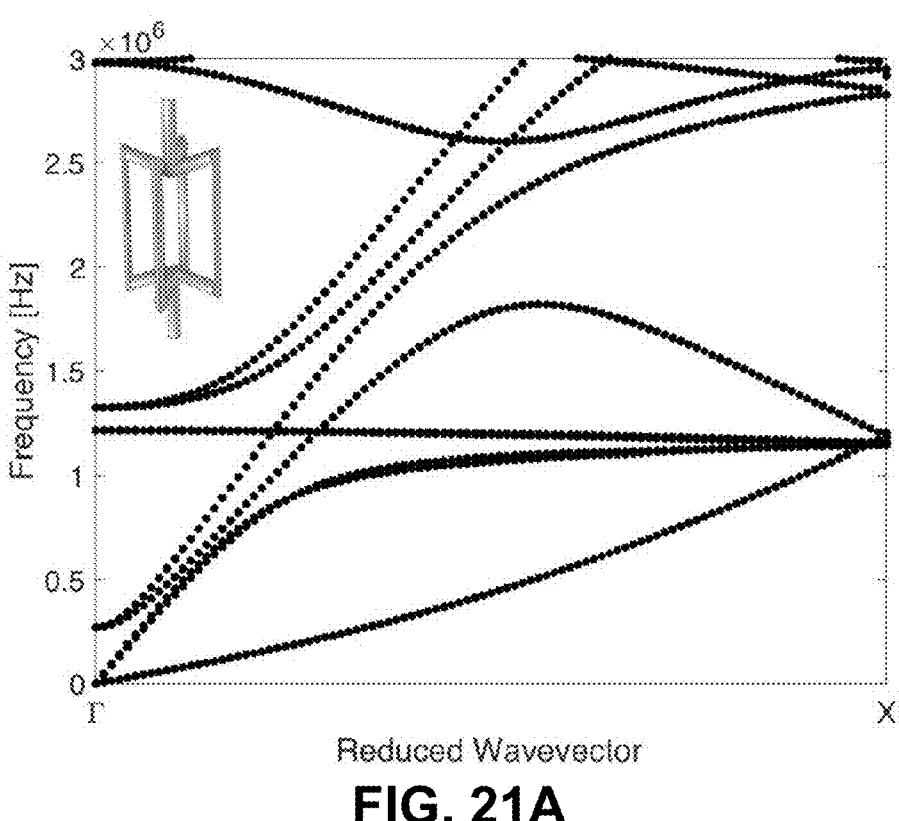
Figure 21B:
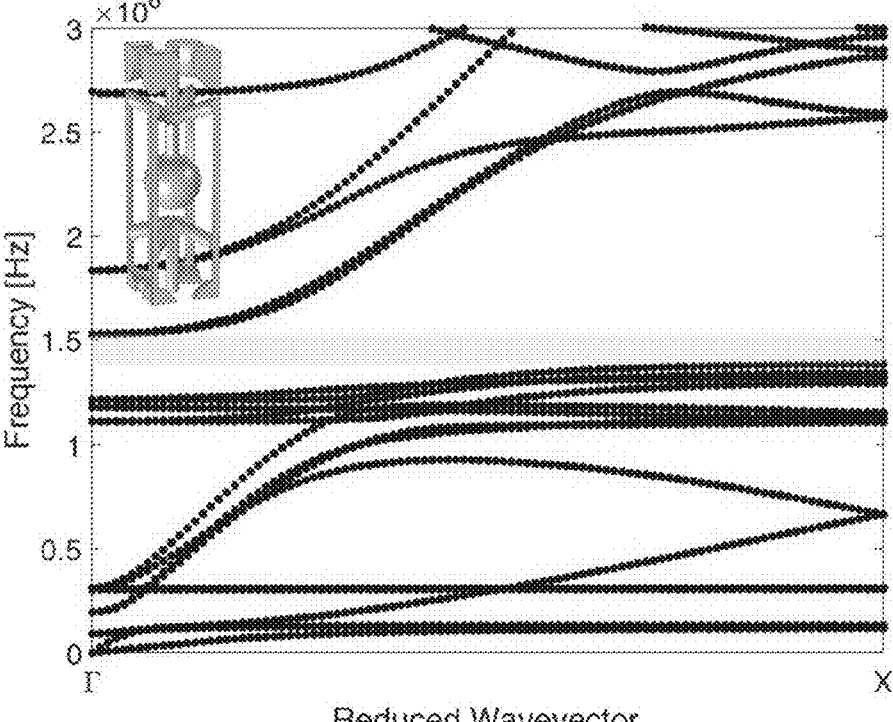

FIGS. 21A-21B. Dispersion relations of auxetic unit cells. FIG. 21A. Unmodified unit cell with no band gaps, (FIG. 21B) unit cell with resonator showing the appearance of a band gap.

Figure 22A:
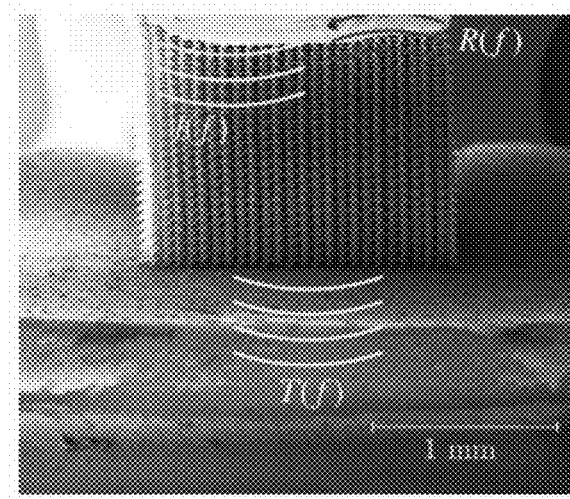
Figure 22C:
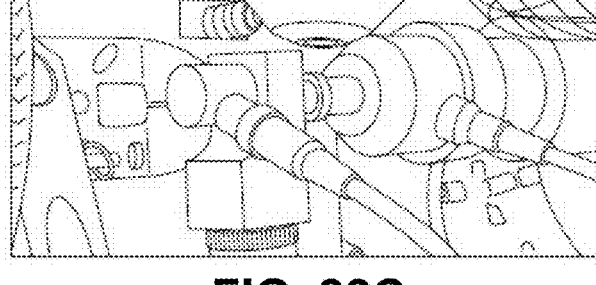
Figure 22B:
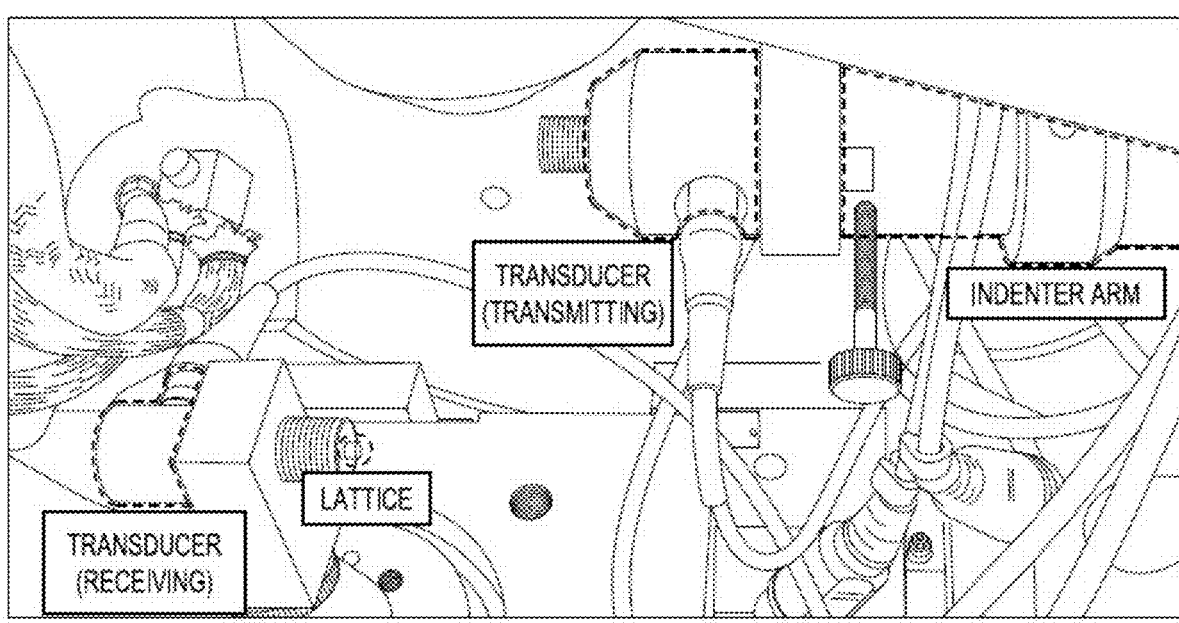

FIGS. 22A-22C. Custom ultrasonics setup. FIG. 22A. Image of the transmission experiment, where one transducer drives a signal through the material of interest and another transducer picks up the transmitted signal, (FIG. 22B) picture of the vacuum chamber and the placement of the transducers, (FIG. 22C) CCD image of the setup in vacuum, with a rubber puck between the transducers for validation purposes.

FIGS. 23A-23E. Frequency sweep experiment. FIG. 23A. Unmodified unit cell, (FIG. 23B) unit cell with resonators, (FIG. 23C) frequency sweep transmitted signal amplitude, (FIG. 23D) close up on sample with no contact, (FIG. 23E) close up on slightly strained sample due to transducer contact. A band gap centered at ~2.4 MHz was found, and is highlighted in grey.

Figure 24A:
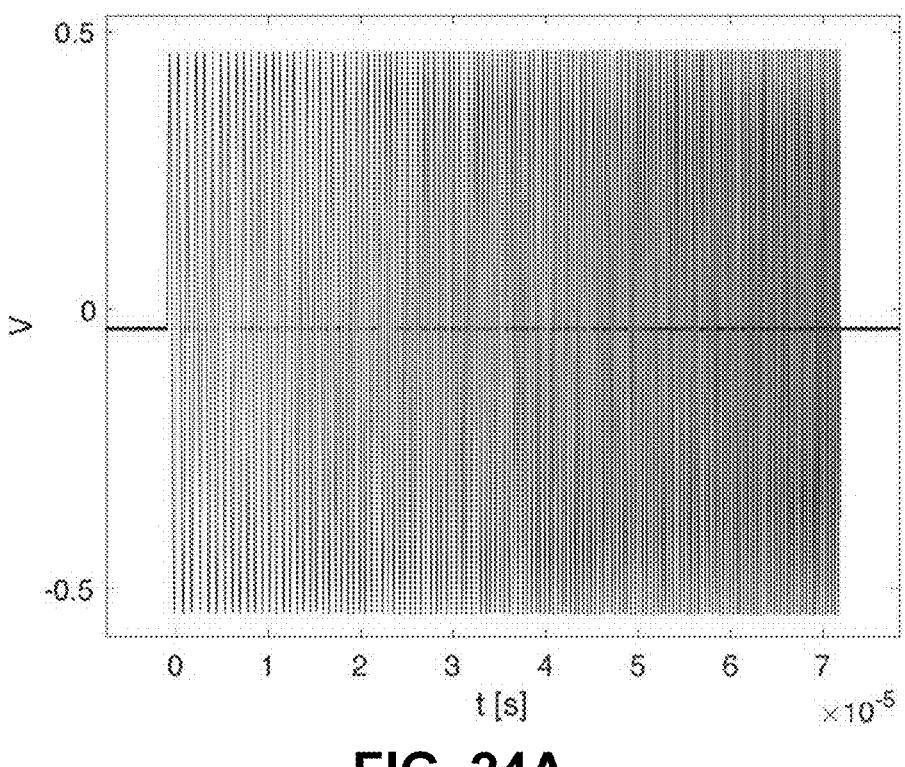
Figure 24B:
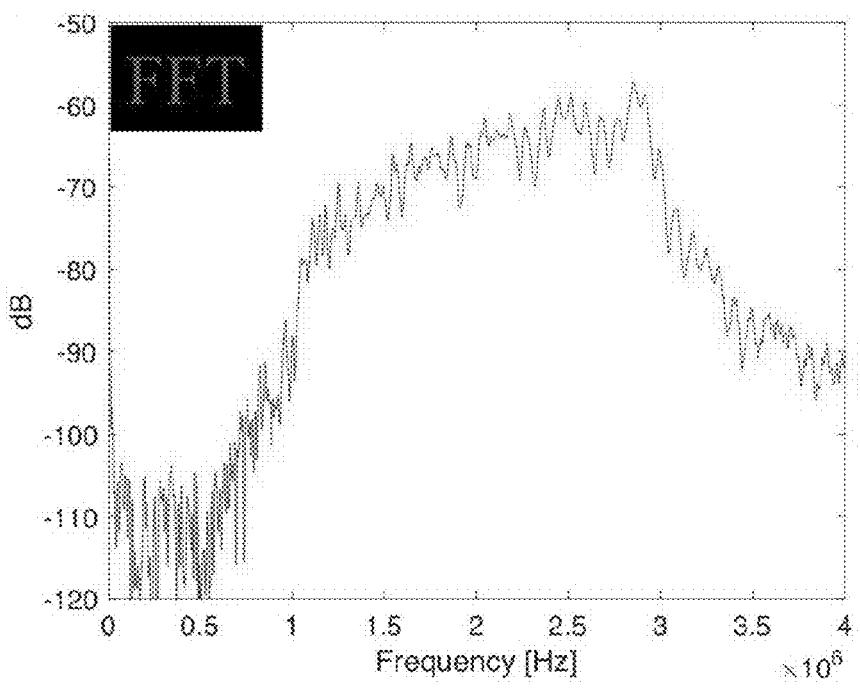
Figure 24C:
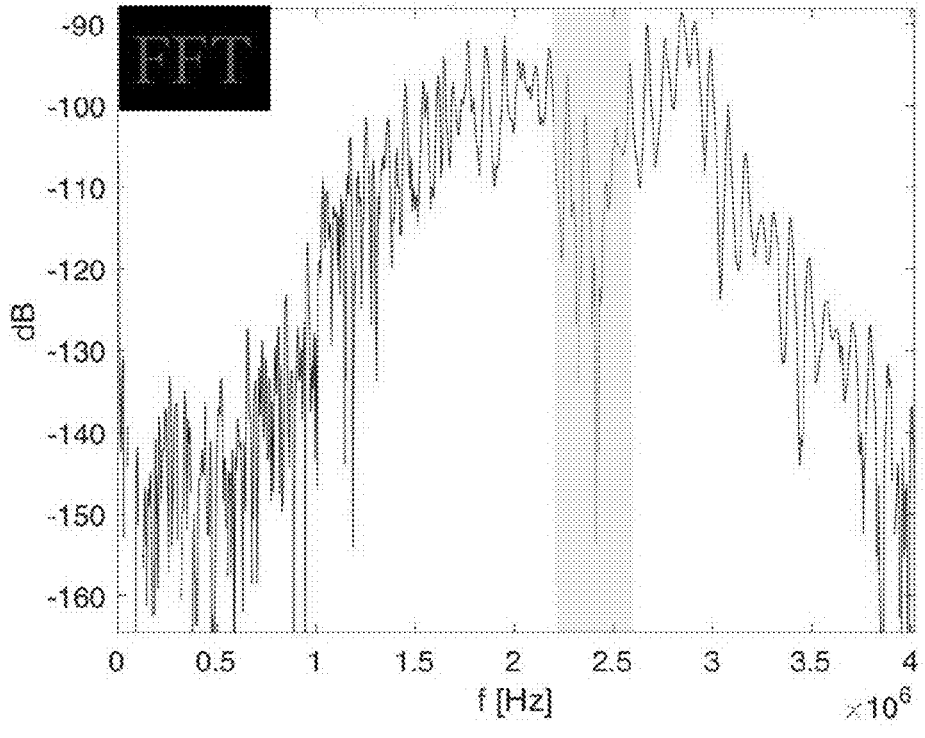

FIGS. 24A-24C. Chirp transmission experiment. FIG. 24A. Input chirp signal containing 1-3 MHz, (FIG. 24B) FFT on the transmitted signal through a rubber puck, confirming the frequency content of the chirp, (FIG. 24C) FFT of the transmitted signal through the resonator-containing sample, showing the same band gap as in the sweep experiment, centered at ~2.4 MHz.

Figures 25A, 25B:
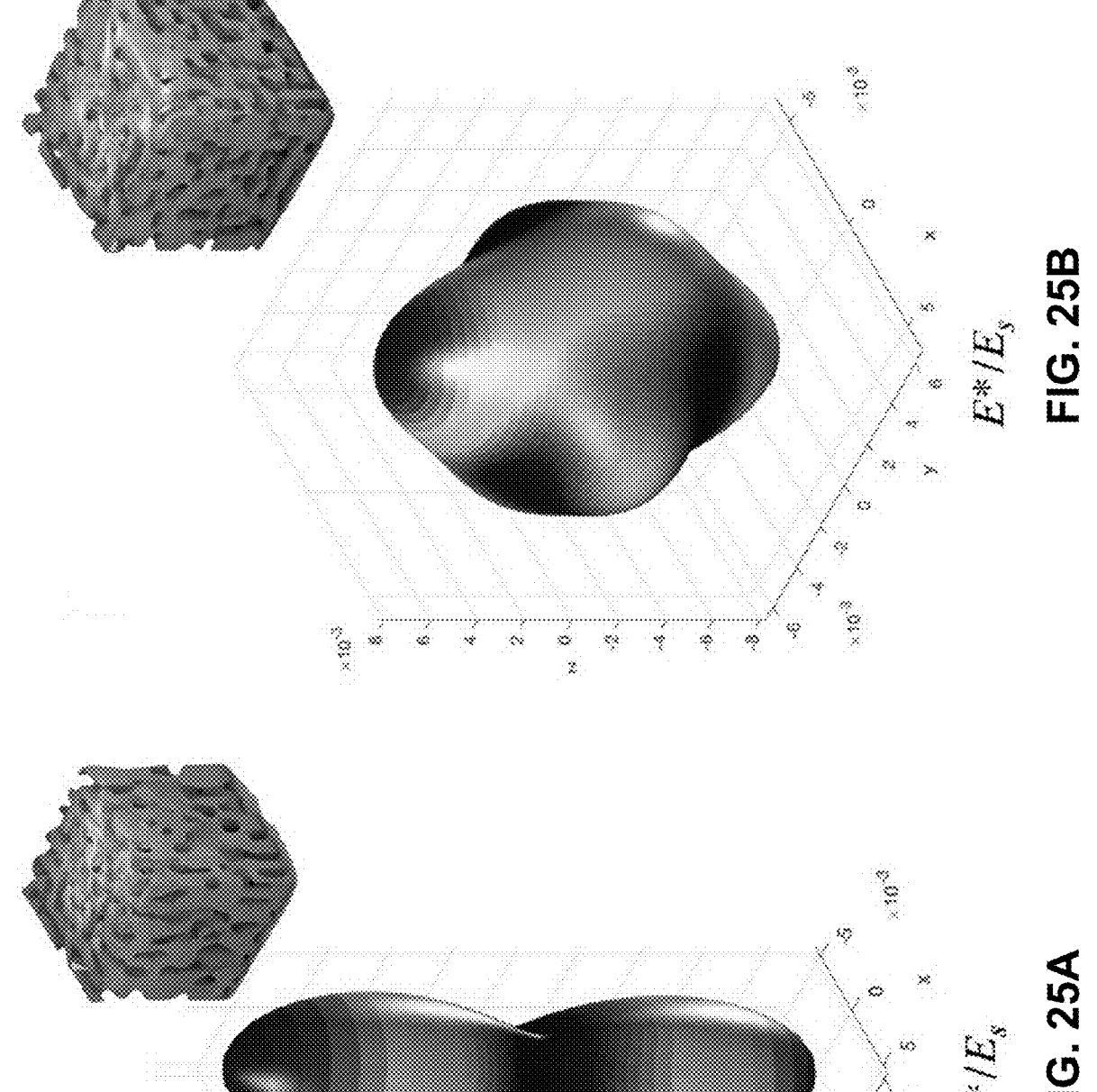
Figures 25C, 25D:
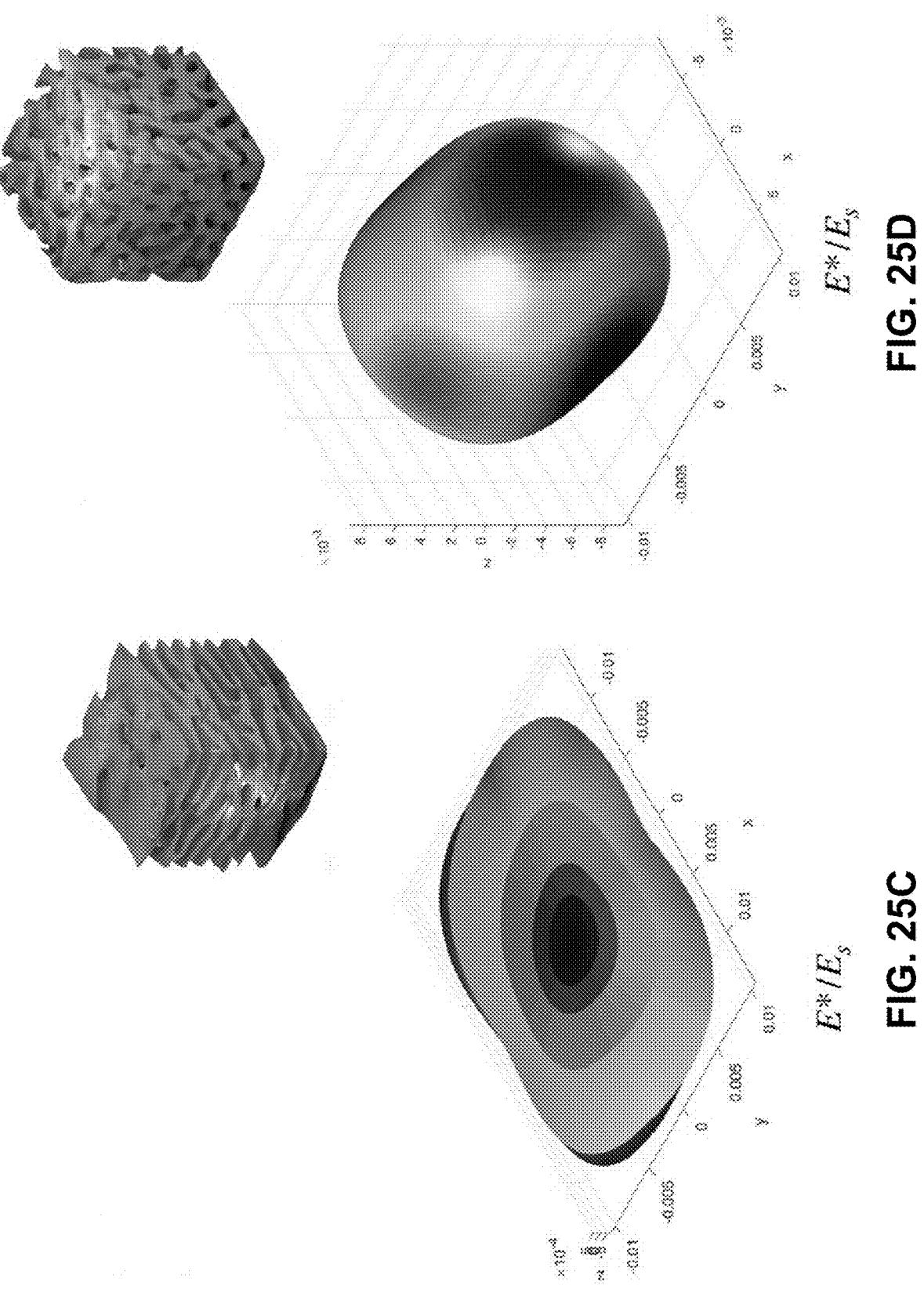

FIGS. 25A-25D. Elastic surfaces of some sample microstructures. FIG. 25A. Columnar structure depicting a stiff direction aligned with the z-axis, (FIG. 25B) cubic structure showing preferential directions aligned with the x, y, and z-axes, (FIG. 25C) lamellar structure showing a few orders-of-magnitude difference in stiffness along the x-y axes and the z-axis, (FIG. 25D) a quasi-isotropic structure.

Figure 26:
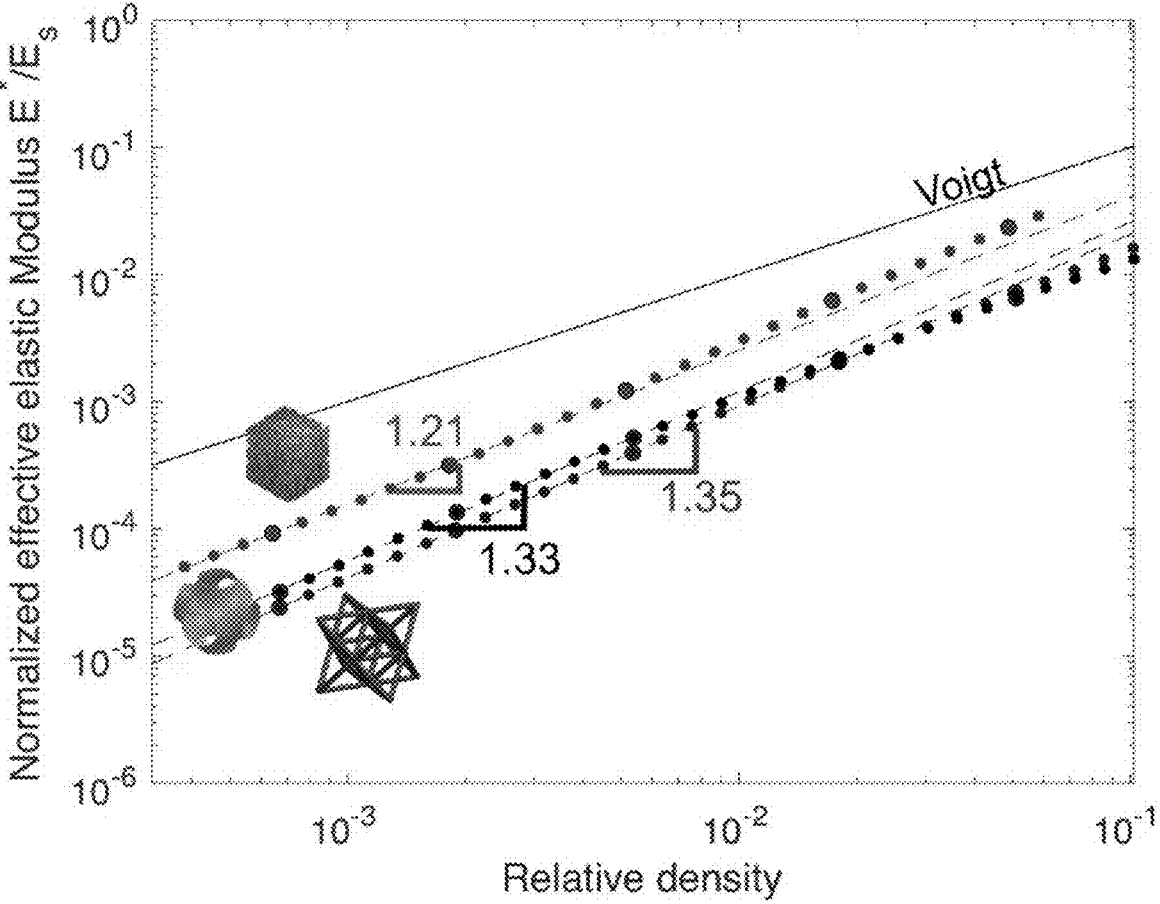

FIG. 26. Stiffness scaling as a function of relative density. Spinodal structures have a higher absolute modulus and lower, more desirable, scaling exponent.

Figure 27A:
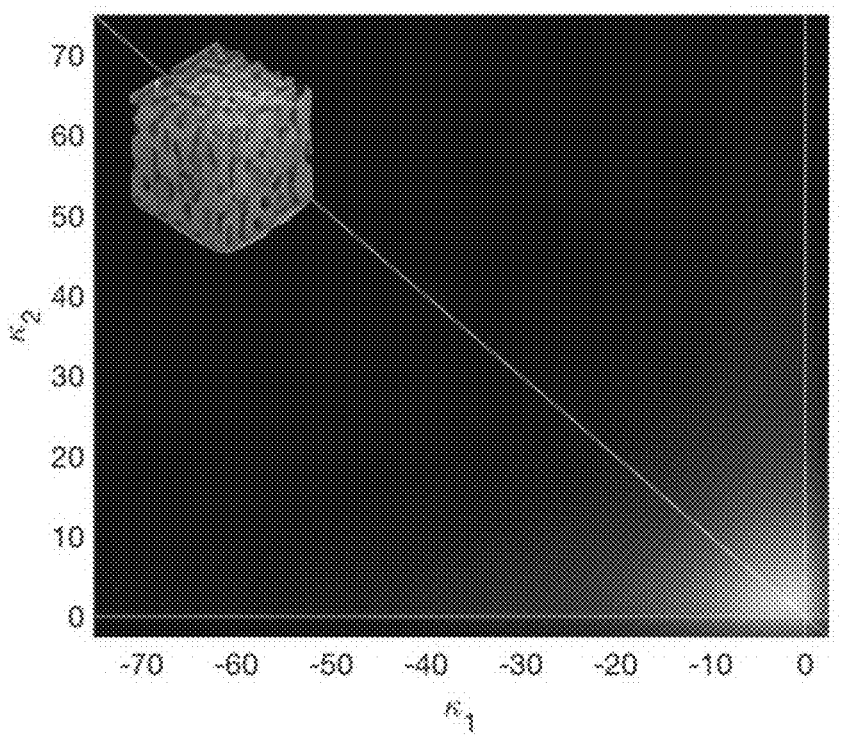
Figure 27B:
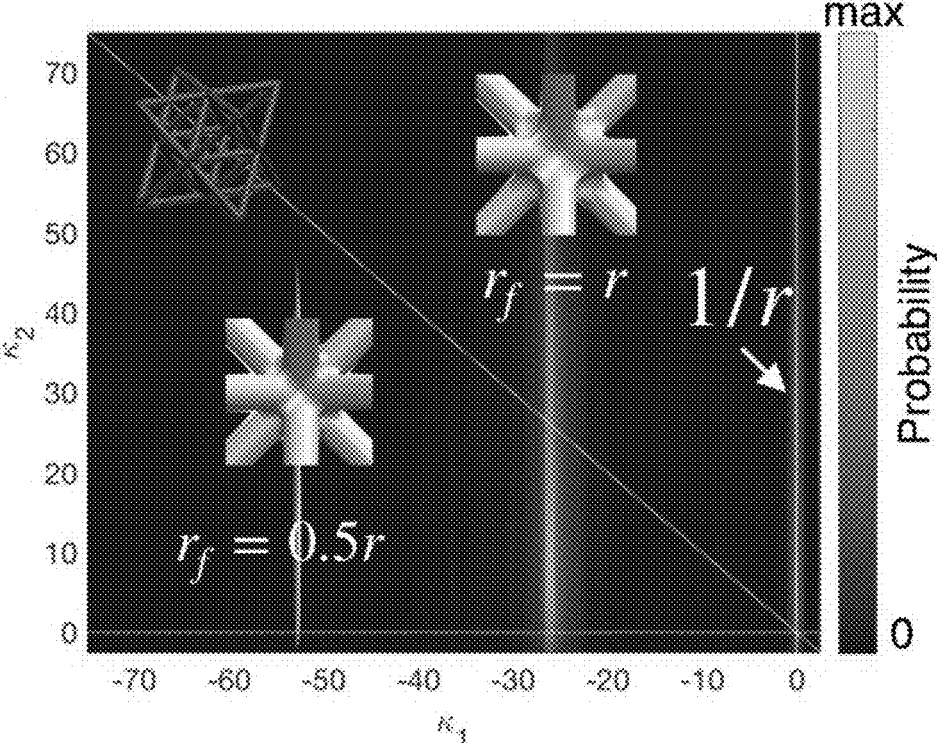

FIGS. 27A-27B. Curvature probability distributions. FIG. 27A. Columnar structure, (FIG. 27B) octet truss with 0.5r and r fillets at nodes, where r is the radius of the tubes. The absolute curvatures for the octet structure are significantly higher than those of the spinodal structure.

FIGS. 28A-28C. Shell-based spinodal structure at the nano/microscale. FIG. 28A. Polymeric structure fabricated via two-photon lithography, (FIG. 28B) coated structure after FIB milling, exposing the polymer again, (FIG. 28C) resulting shell-based spinodal structure after etching the inner polymer.

FIGS. 29A-29D. Shell-based spinodal structure at the macroscale. FIG. 29A. Polymeric columnar spinodal structure, (FIG. 29B) top view, (FIG. 29C) resulting carbon reinforcing phase, (FIG. 29D) top view.

Figure 30A:
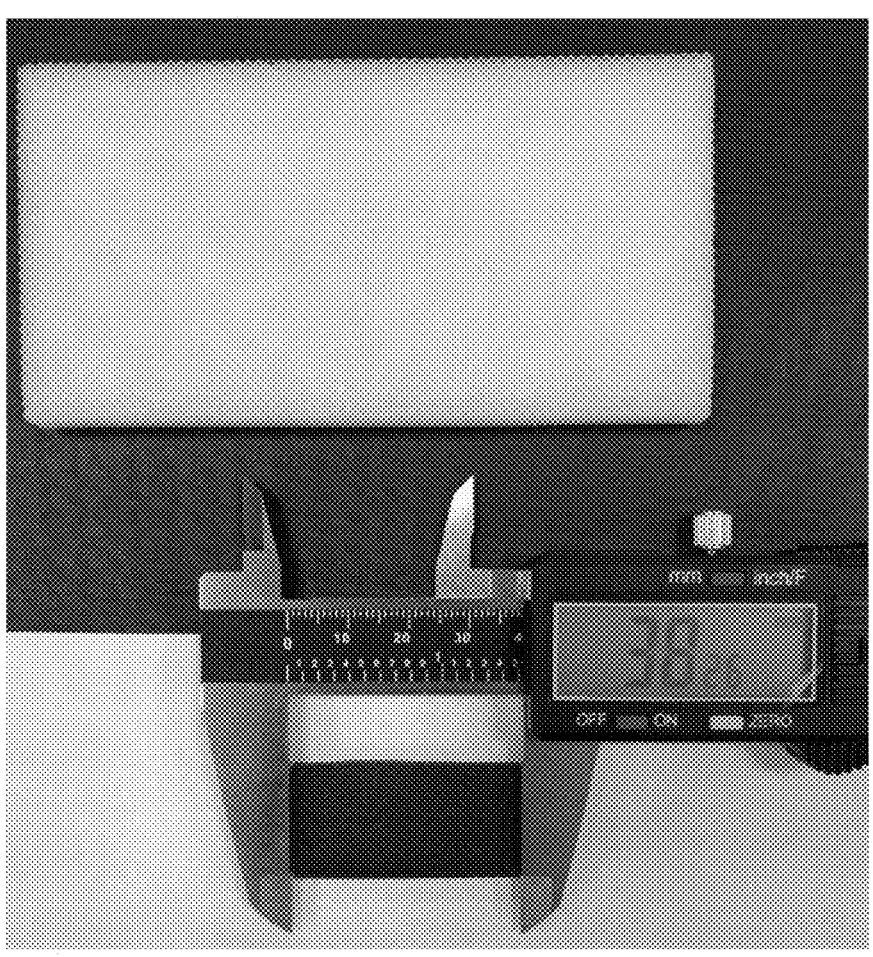
Figure 30B:
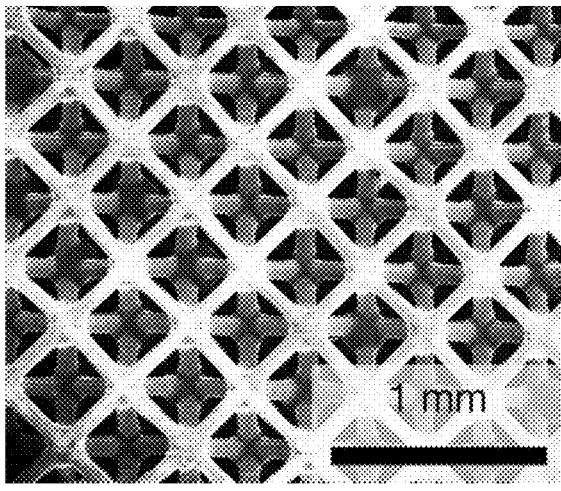
Figure 30C:
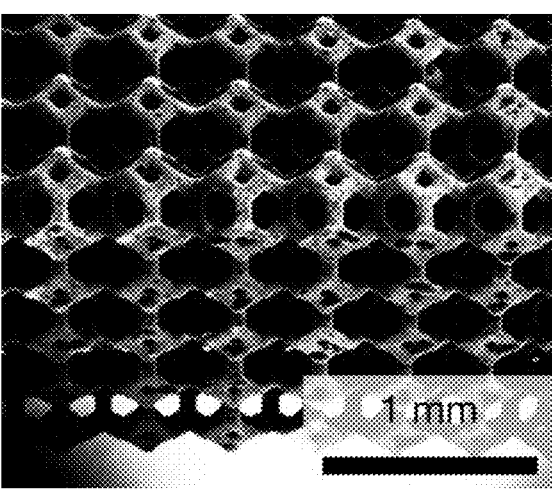

FIGS. 30A-30C. Architected plate for blast impact testing. FIG. 30A. Polymeric precursor plate and resulting pyrolyzed plate, (FIG. 30B) micrograph of an octet carbon architecture, (FIG. 30C) micrograph of a tetrakaidecahedron architecture.

Figures 31A, 31B, 31C, 31D, 31E, 31F:
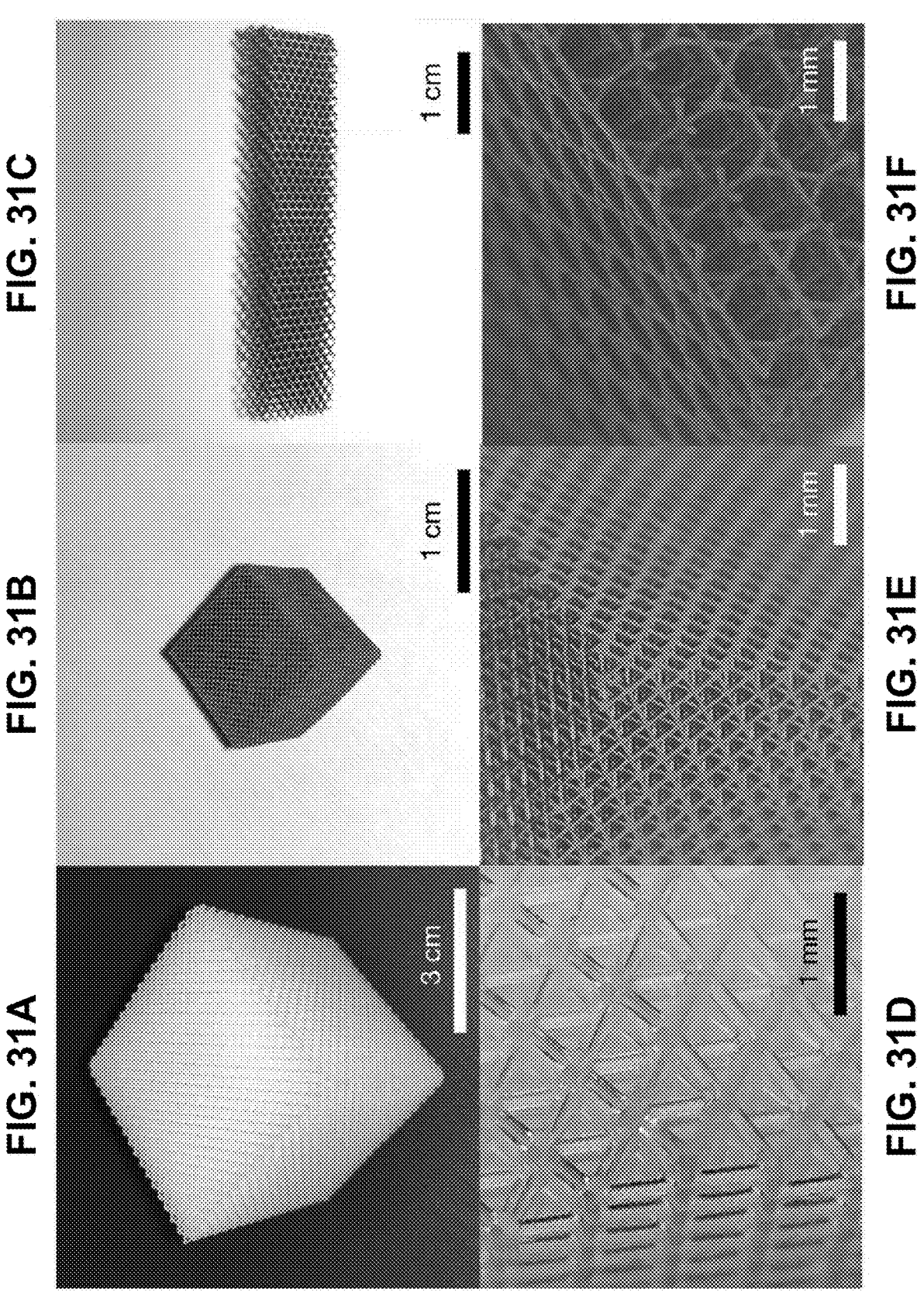

FIGS. 31A-31F. Cubes of example reinforcing phases. FIG. 31A. Polymeric octet cube, (FIG. 31B) pyrolyzed carbon octet cube from FIG. 31A, (FIG. 31C) pyrolyzed carbon 3D kagome beam, (FIGS. 31D-31F) close-ups of FIGS. 31A-31C.

Figures 32A, 32B, 32C, 32D, 32E, 32F:
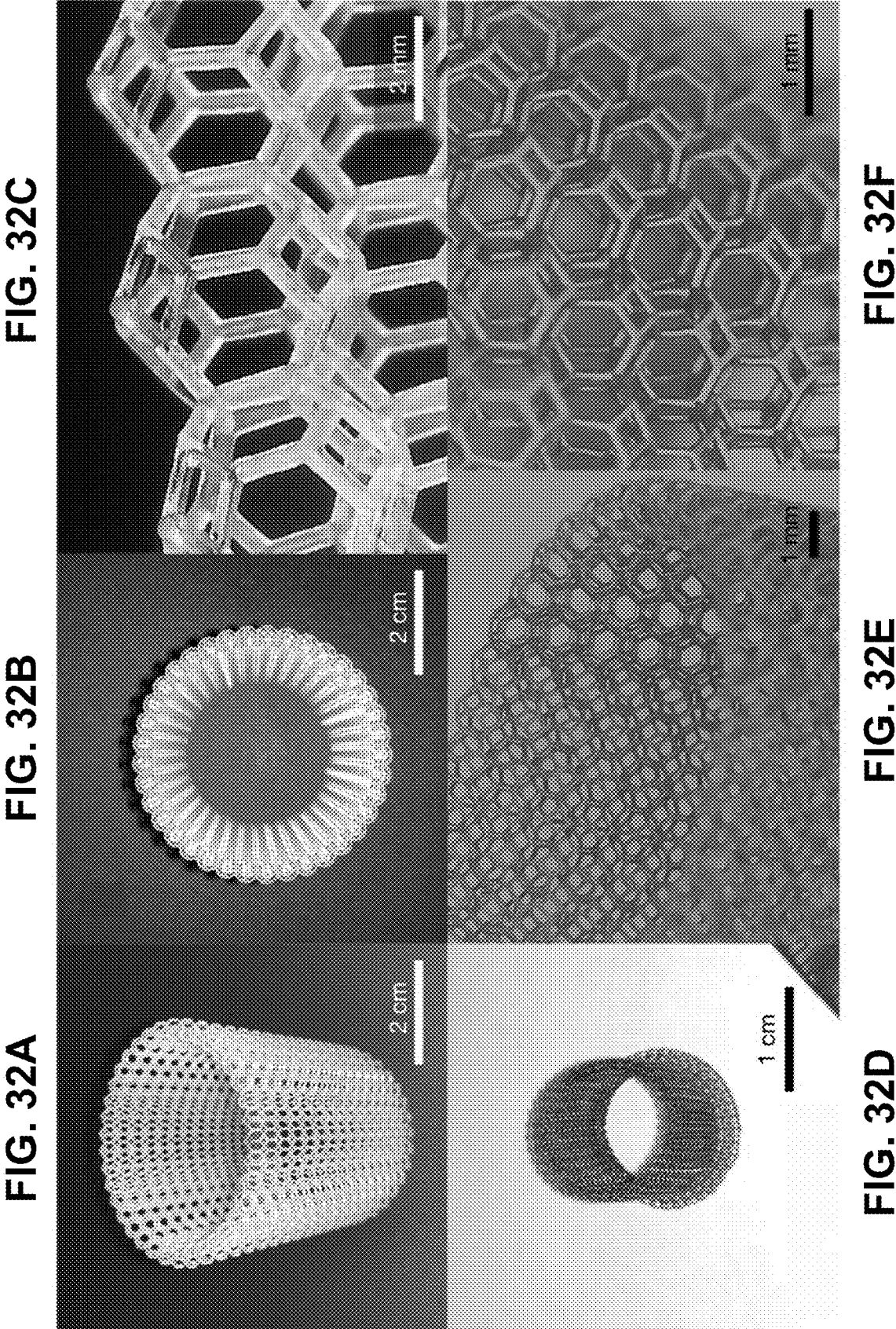

FIGS. 32A-32F. Tubular architected component. FIG. 32A. Polymeric tube with tetrakaidecahedron architecture, (FIG. 32B) top view of FIG. 32A, (FIG. 32C) close up of FIG. 32B, (FIG. 32D) pyrolyzed carbon tube with tetrakaidecahedron architecture prior to infiltration, (FIGS. 32E-32F) close-ups of FIG. 32D.

Figure 33A:
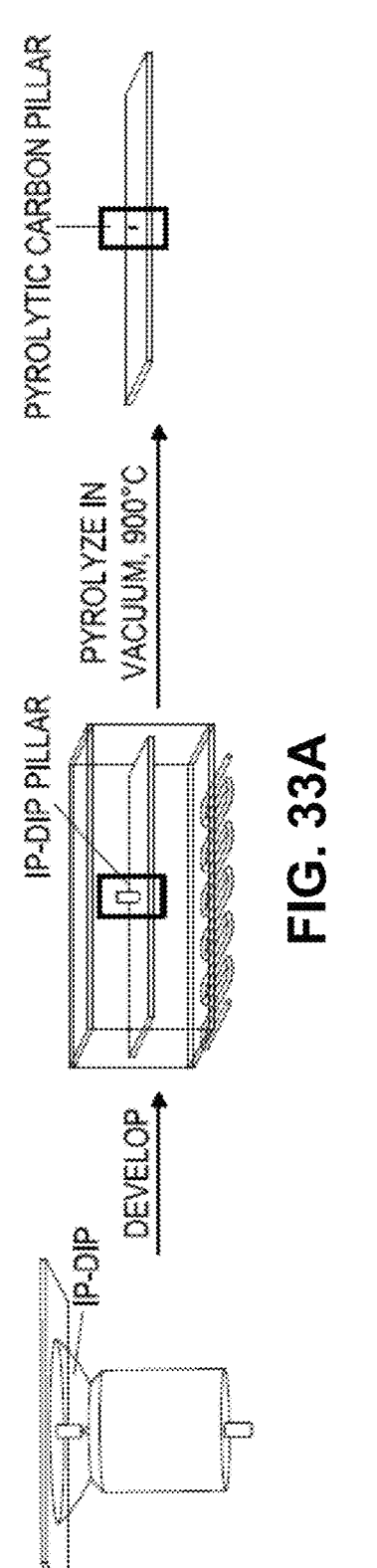
Figure 33C:
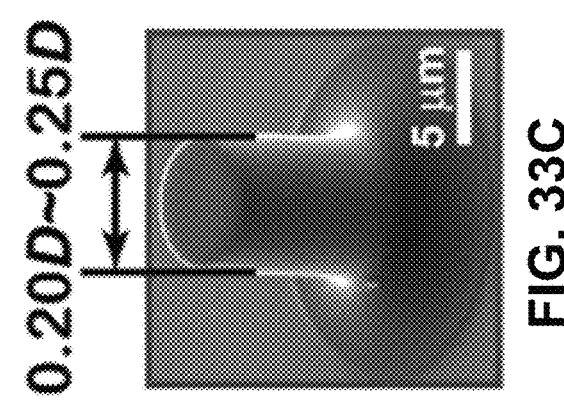
Figure 33B:
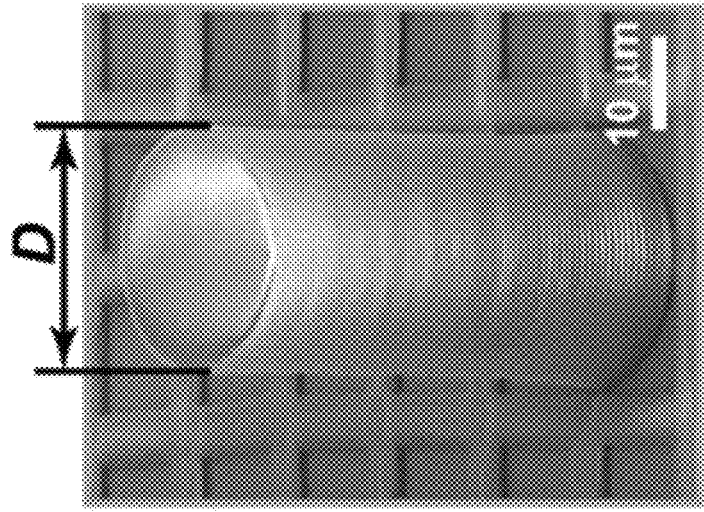
Figure 33D:
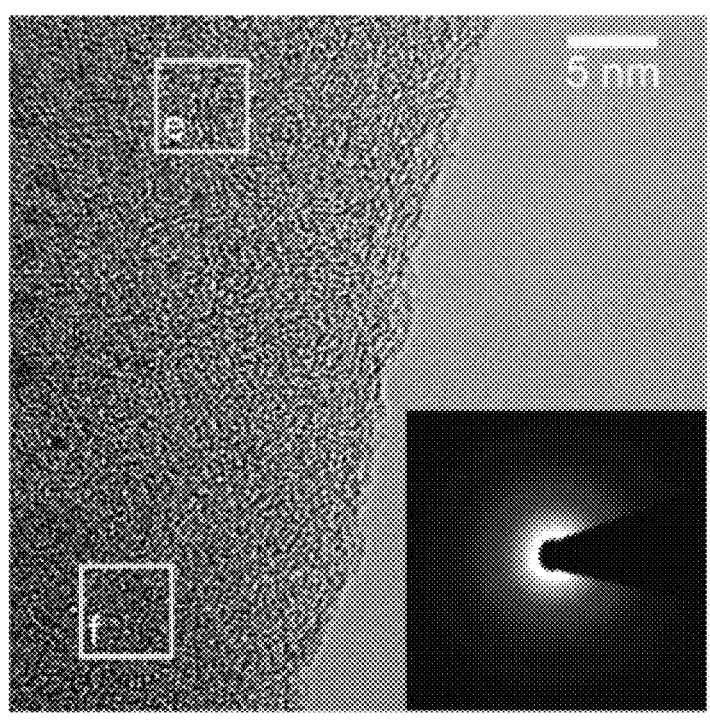
Figure 33E:
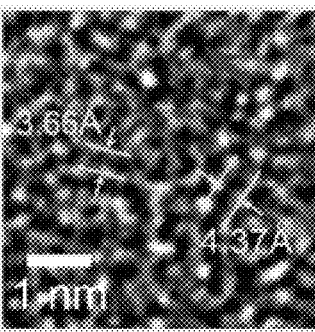
Figure 33F:
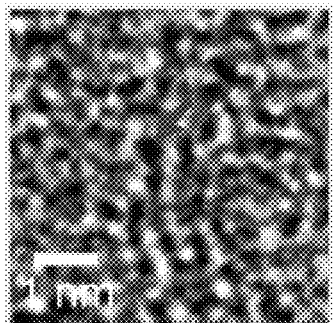
Figure 33G:
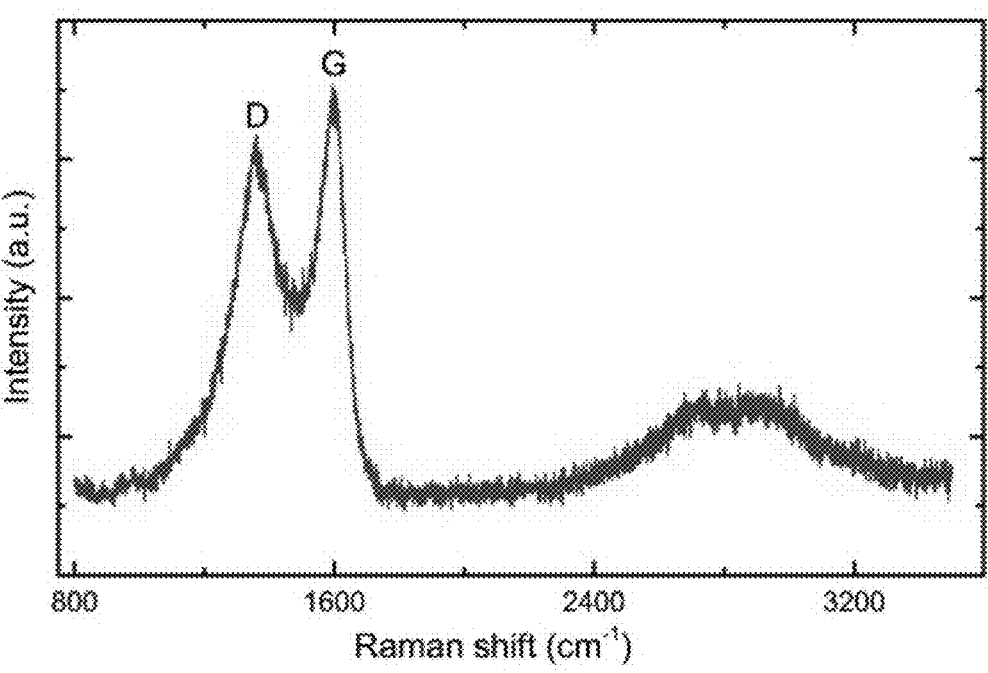
Figure 33H:
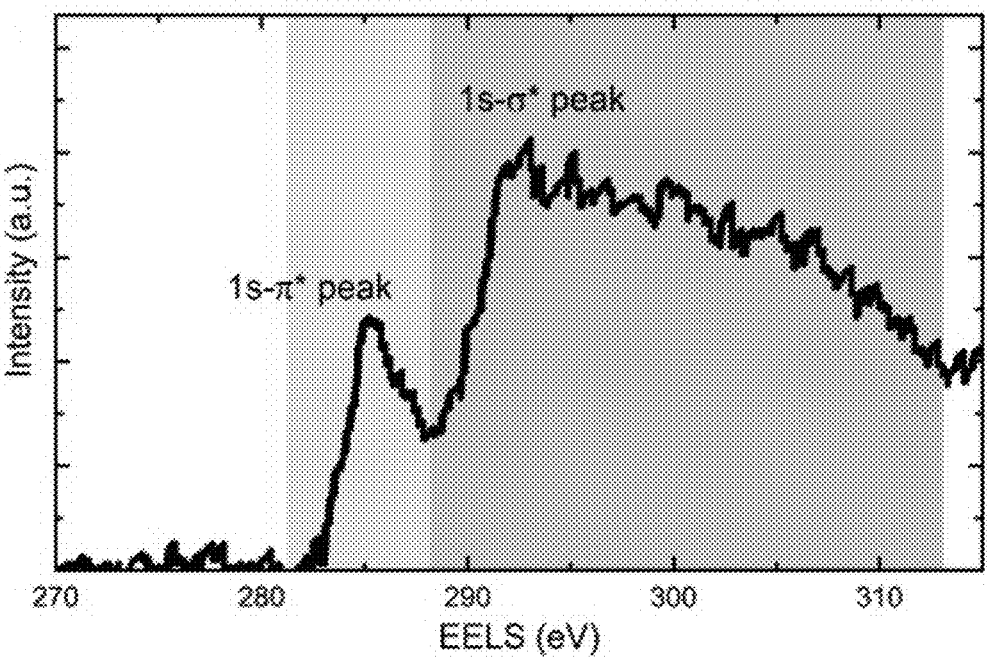

FIGS. 33A-33H. Fabrication and microstructural characterization of the pyrolytic carbon micropillars. FIG. 33A. Schematic illustration of the fabrication process. This process includes the TPL DLW of cylindrical pillars from IP-Dip polymer resin and subsequent pyrolysis under vacuum at 900° C. FIGS. 33B-33C. SEM images of a representative micropillar before and after pyrolysis, showing substantial volumetric shrinkage. FIG. 33D. Bright-field TEM image of the pyrolytic carbon. The diffraction pattern in the inset reveals its amorphous microstructure. FIGS. 33E-33F. HRTEM images of the two regions outlined by solid boxes in FIG. 33D. These images reveal the presence of some sub-nanometer-sized voids (denoted by red arrows). FIG. 33G. Raman spectrum of a pyrolytic carbon micropillar. The typical G and D bands at the energies 1359 cm$^{-1}$ and 1595 cm$^{-1}$ indicate sp$^2$-hybridization. FIG. 33H. EELS of the pyrolytic carbon, where the green and purple shaded areas correspond to the 1s-$\pi$* and 1s-$\sigma$* peaks of carbon, respectively. Quantitative analysis of the data indicates that the pyrolyzed carbon contains approximately 96.5% sp$^2$ bonds.

Figure 34A:
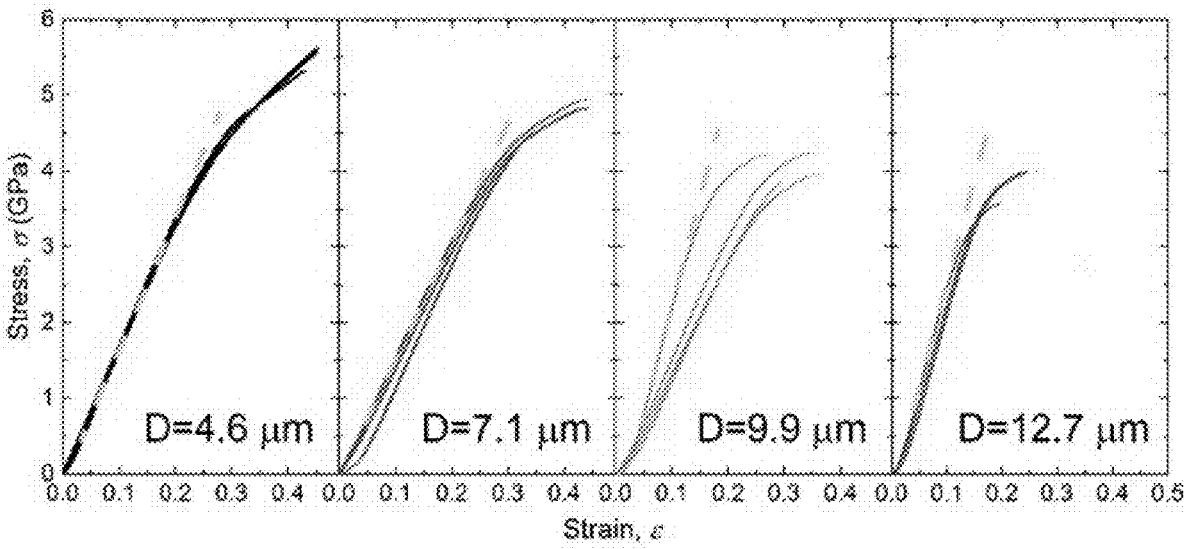
Figure 34B:
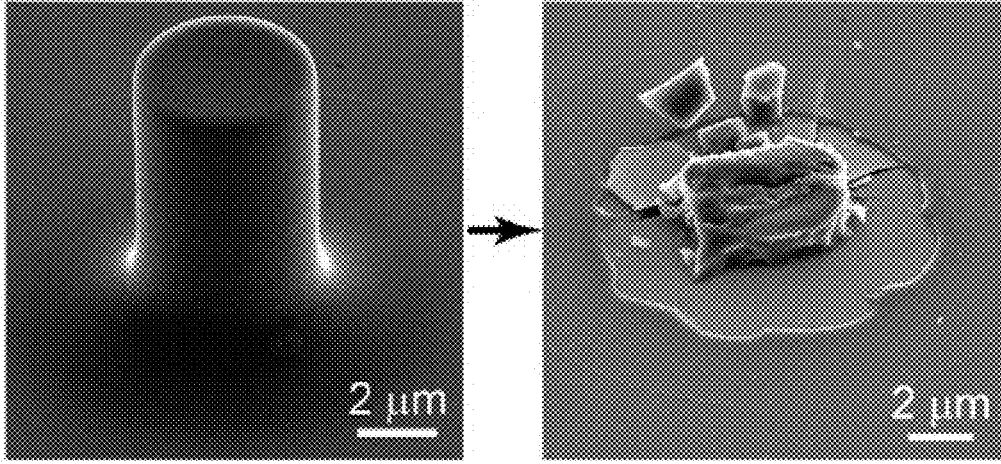
Figure 34D:
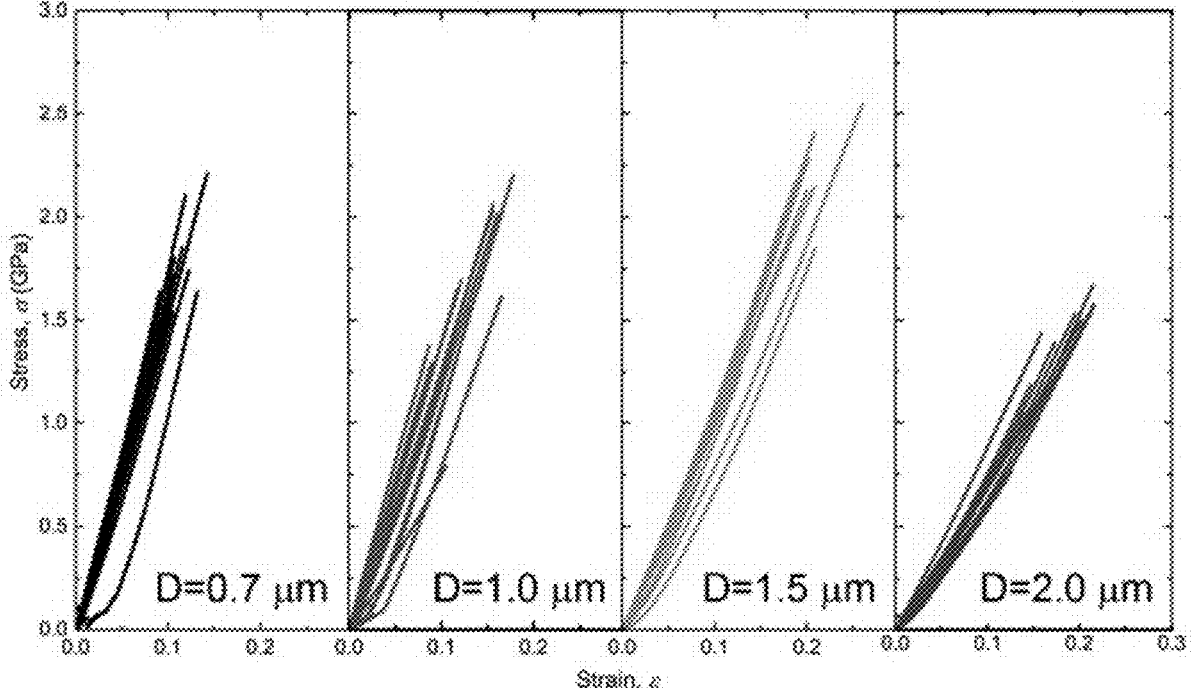

FIGS. 34A-34F. Uniaxial compression and tension experiments on the pyrolytic carbon micropillars. FIG. 34A. Compressive stress-strain data of pyrolytic carbon pillars with diameters of 4.6-12.7 μm. All of these micropillars deformed elastically up to ~20-30% strain and exhibited marginal plastic strain (~8-10%) before failure. The dashed lines indicate the linear slopes. FIG. 34B. SEM images of a typical pyrolytic carbon micropillar described in FIG. 34A before and after compression, which reveals the occurrence of brittle fracture via multiple fragments. FIG. 34C. Representative stress-strain data set from the in situ deformation of a 2.25 μm-diameter pyrolytic carbon pillar, which underwent significant plastic deformation up to 33.6% strain. The inset shows an SEM image of the micropillar before compression. A sequence of snapshots obtained during the in situ deformation is shown above the plot, with numbered frames corresponding to the same-numbered red arrows in the stress-strain curve. The SEM images on the right of the stress-strain data show the compressed micropillar from the front and back views. The nucleation and propagation of the splitting crack correspond to the strain burst indicated by the blue arrow in the stress-strain curve. FIG. 34D. Tensile stress-strain data of pyrolytic carbon dog-bone-shaped samples with gauge diameters of 0.7-2.0 μm. FIG. 34E. SEM images of a typical tensile specimen before and after the experiment. FIG. 34F. Statistical distribution of tensile fracture strengths.

Figure 35A:
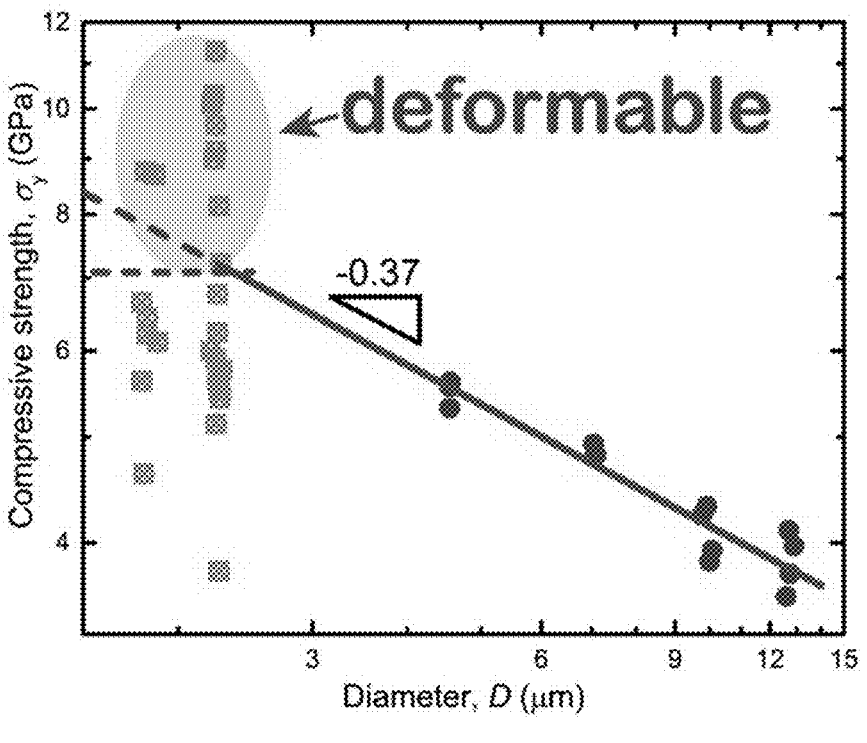
Figure 35B:
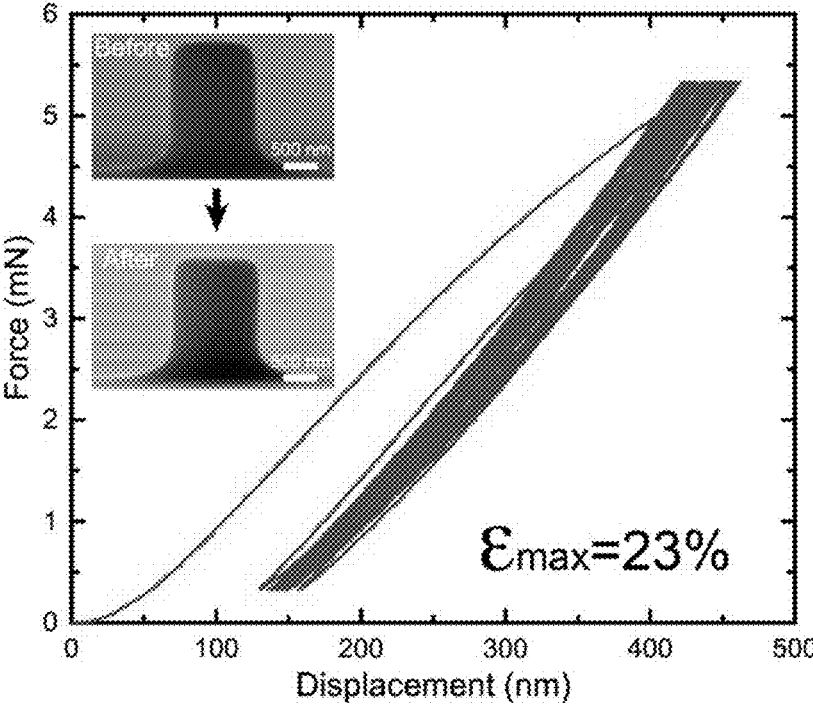

FIGS. 35A-35B. Change in strength with diameter and the ultra-large elastic limit of pyrolytic carbon micropillars. FIG. 35A. Variation in compressive strength with increasing micropillar diameter. The blue dashed line represents the average compressive strength of micropillars with diameters smaller than 2.3 μm. FIG. 35B. Twenty-cycle force-displacement curve of a deformable pillar with a diameter of 1.28 μm under a maximum compressive strain of ~23%, showing nearly full recovery in every cycle except the first cycle. The SEM images depict the pre-deformation and post-deformation pillar from 20 loading cycles.

Figure 36A:
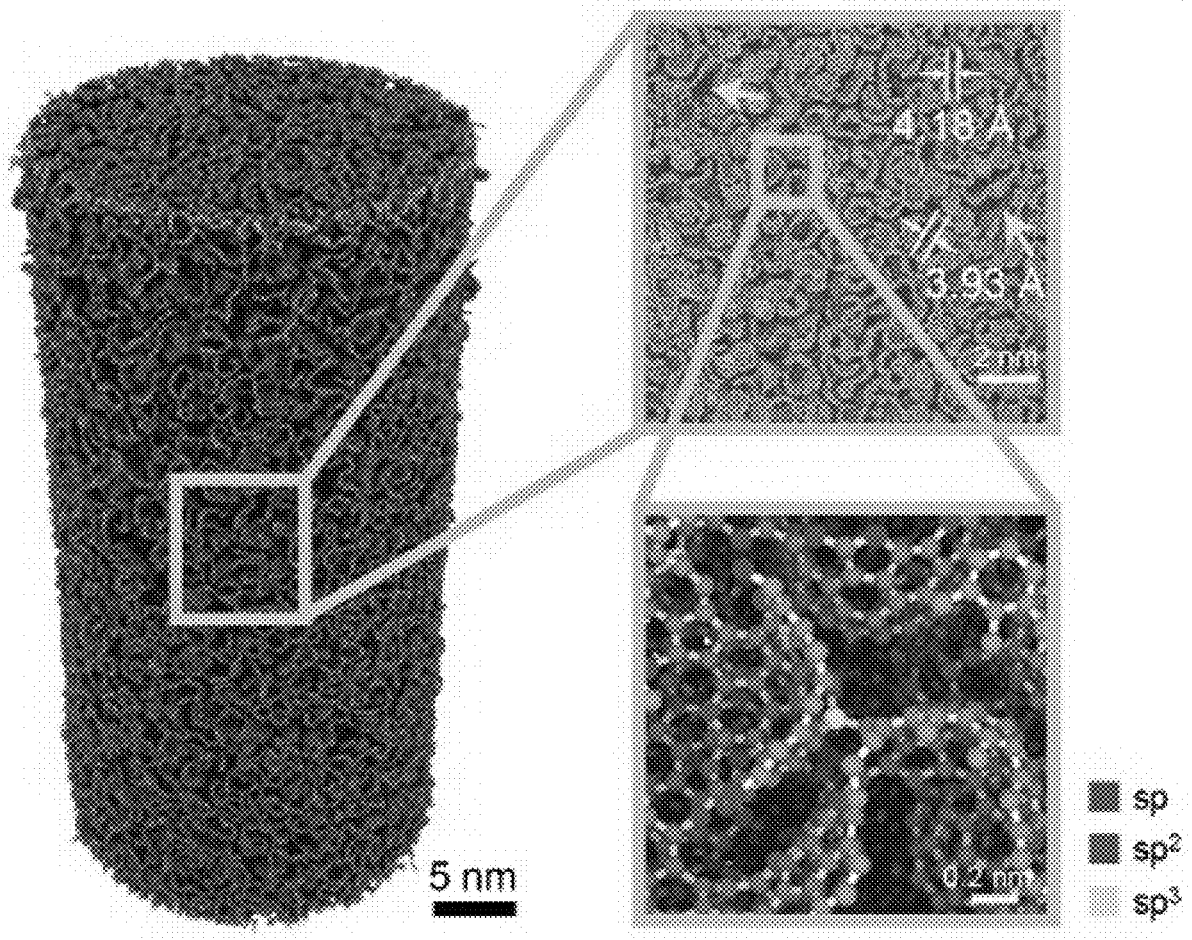
Figures 36B, 36C:
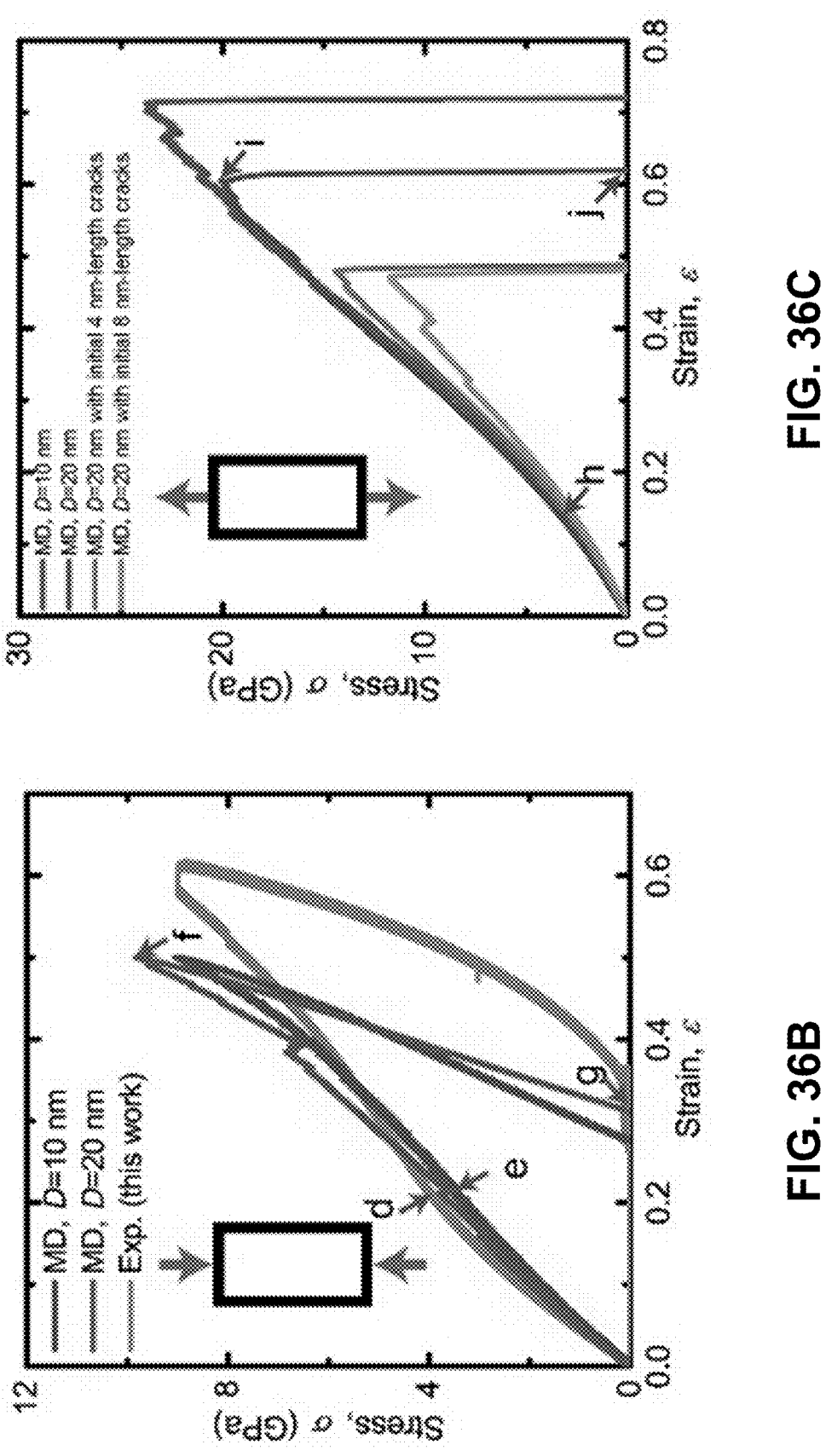
Figures 36D, 36E, 36F, 36G:
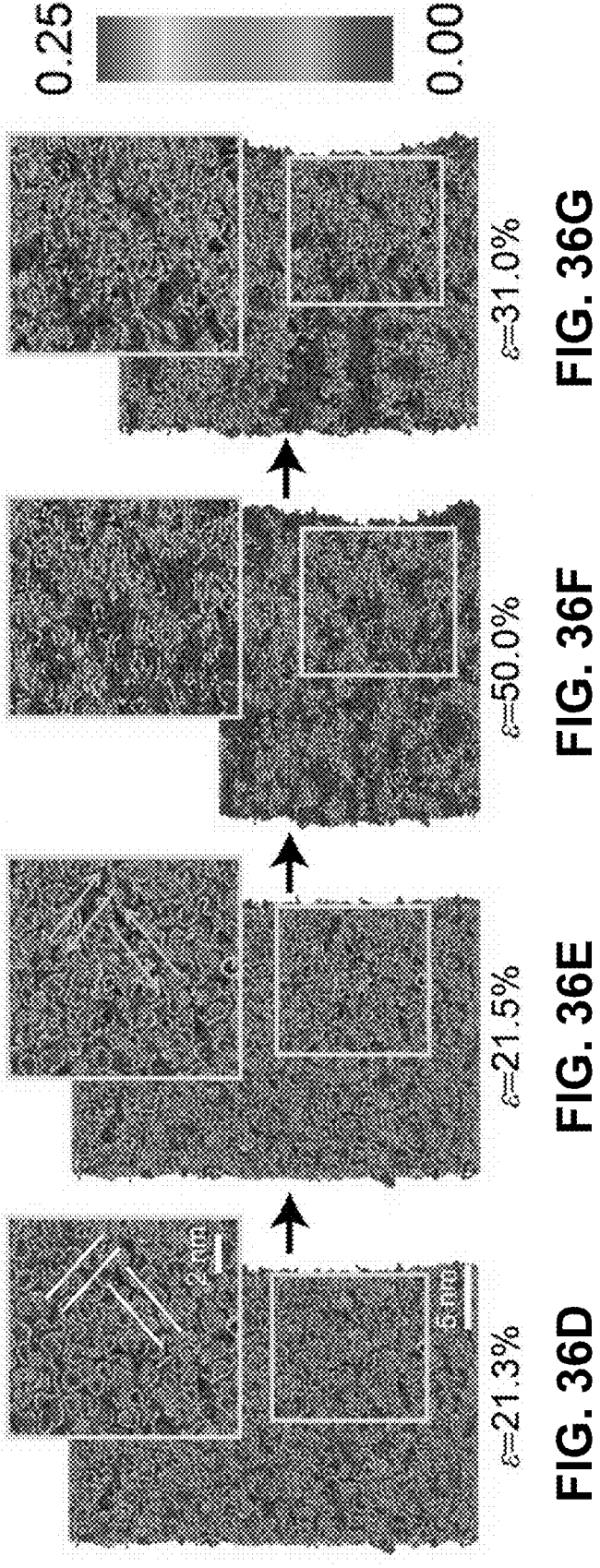
Figures 36H, 36I, 36J:
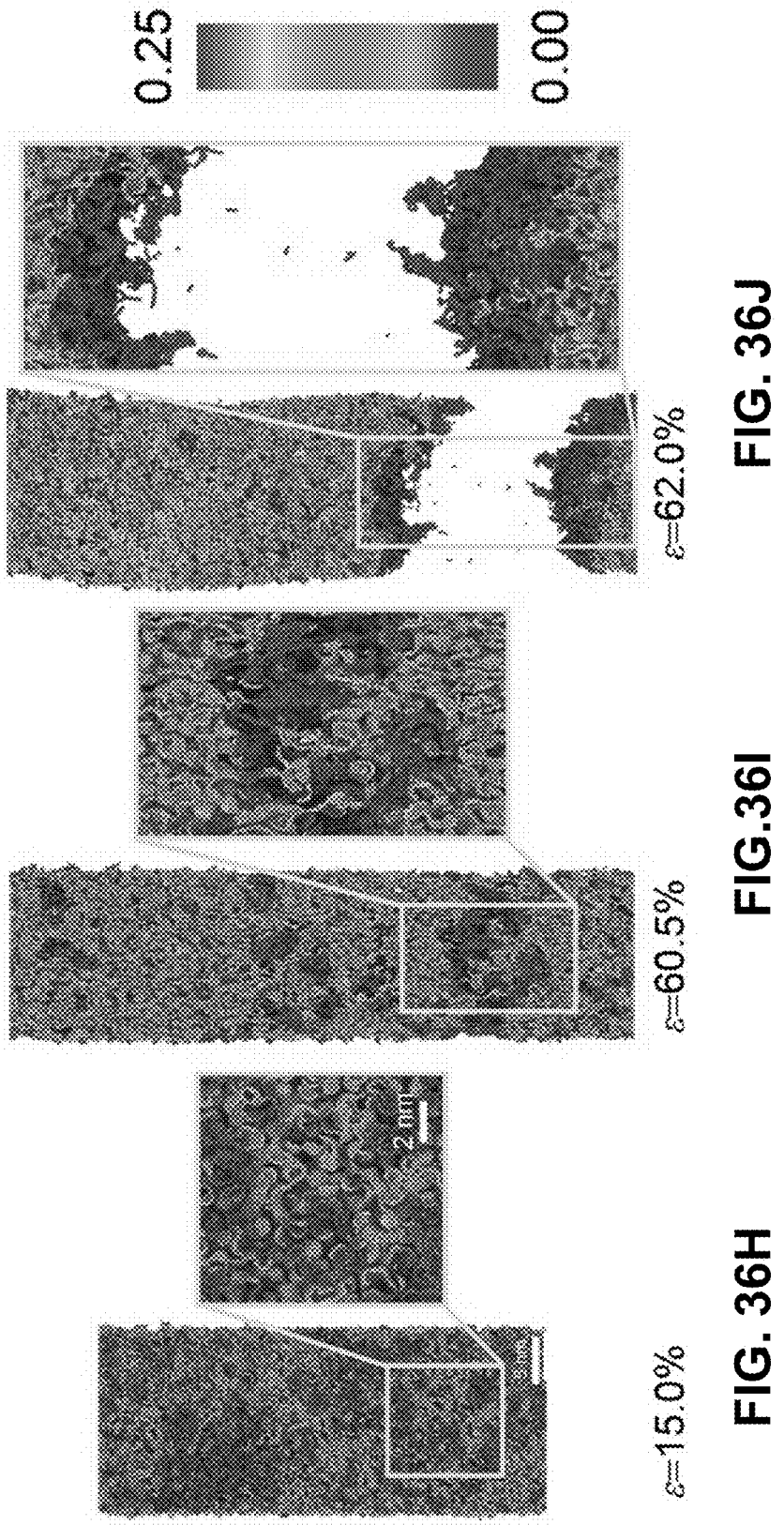

FIGS. 36A-36J. Atomistic simulations of the uniaxial compression and tension of pyrolytic carbon nanopillars. FIG. 36A. Atomic configurations and cross-sectional morphology of a simulated sample with a diameter of 20 nm. FIGS. 36B-36C. Compressive and tensile stress-strain curves of pyrolytic carbon nanopillars. FIGS. 36D-36G. Snapshots of a deformed pillar at different compressive strains. FIGS. 36H-36J. Snapshots of a deformed pillar at different tensile strains. The atoms in FIGS. 36D-36J are colored according to the von Mises atomic strain.

Figure 37A:
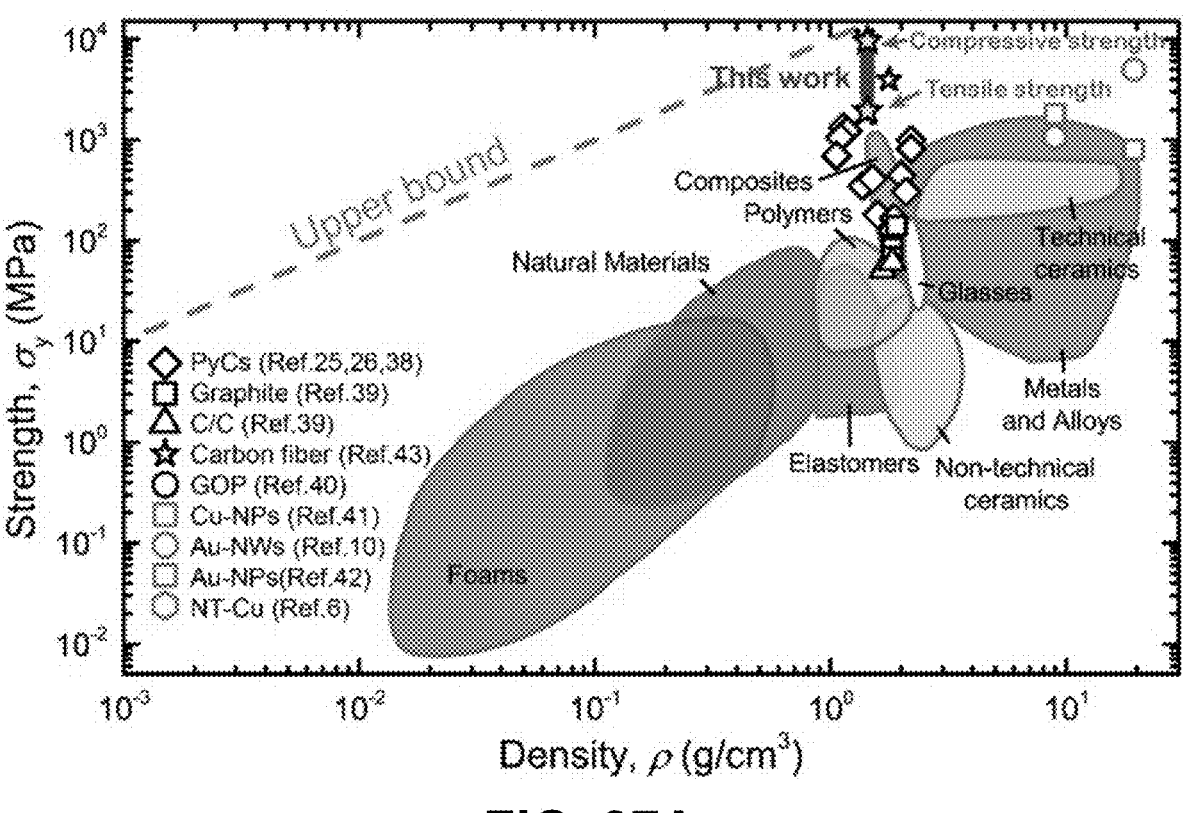
Figure 37B:
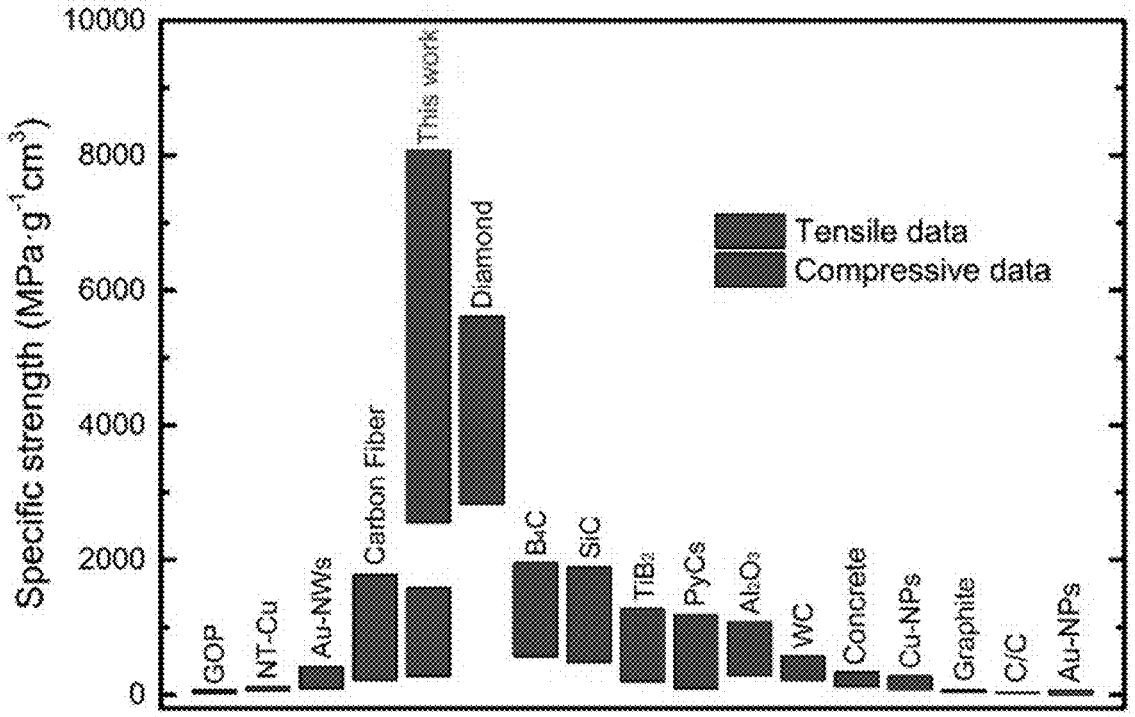
Figure 37C:
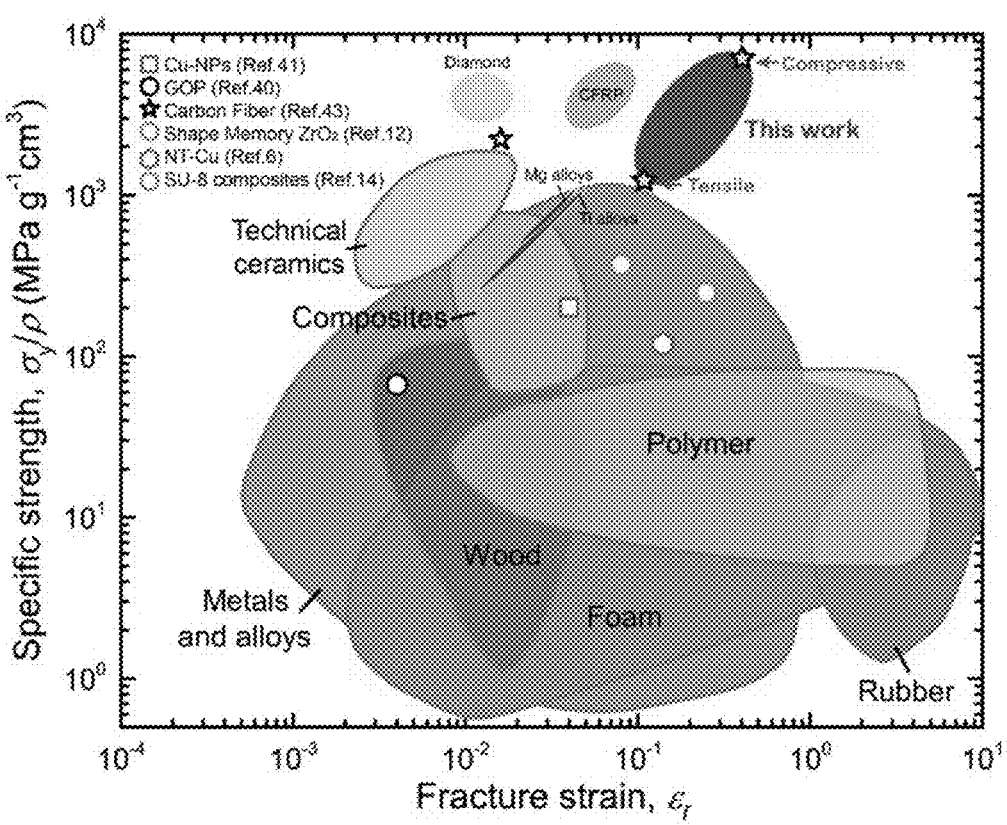

FIGS. 37A-37C. Summary of the combined ultra-high strength/specific strength and large deformability of the pyrolytic carbon micropillars. FIG. 37A. Ashby chart of strength versus density for various structural materials, including our pyrolytic carbon micropillars. FIG. 37B. Comparison of specific tensile and compressive strengths between our pyrolytic carbon micropillars and other structural materials. FIG. 37C. Summary of specific strength versus fracture strain for our pyrolytic carbon micropillars and other structural materials. The excellent combination of specific strength and deformability of our pyrolytic carbon surpasses that of almost all other materials.

Figure 38:
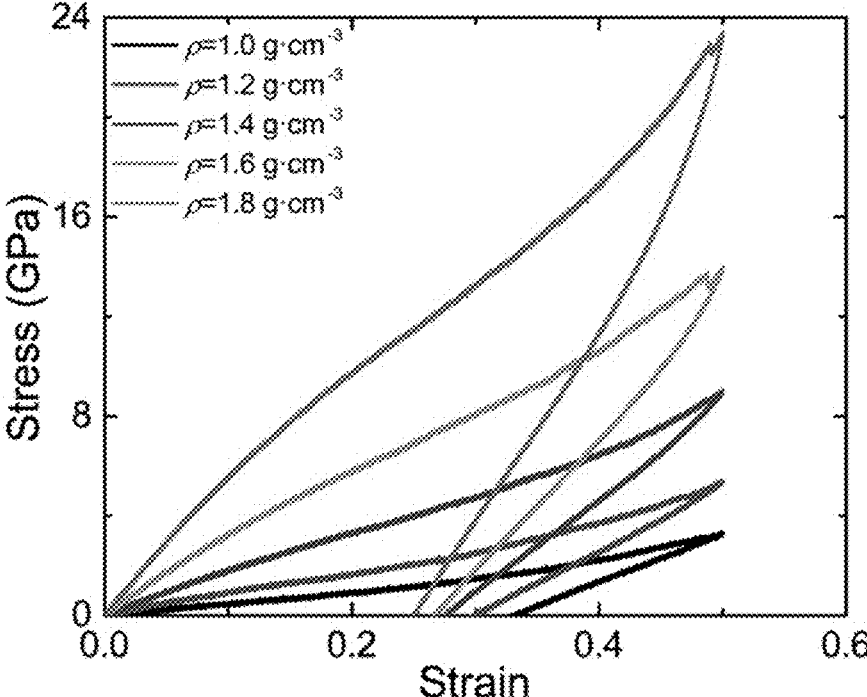

FIG. 38. Compressive stress-strain curves of simulated nanopillars with diameter of 10 nm and different densities.

Figure 39:
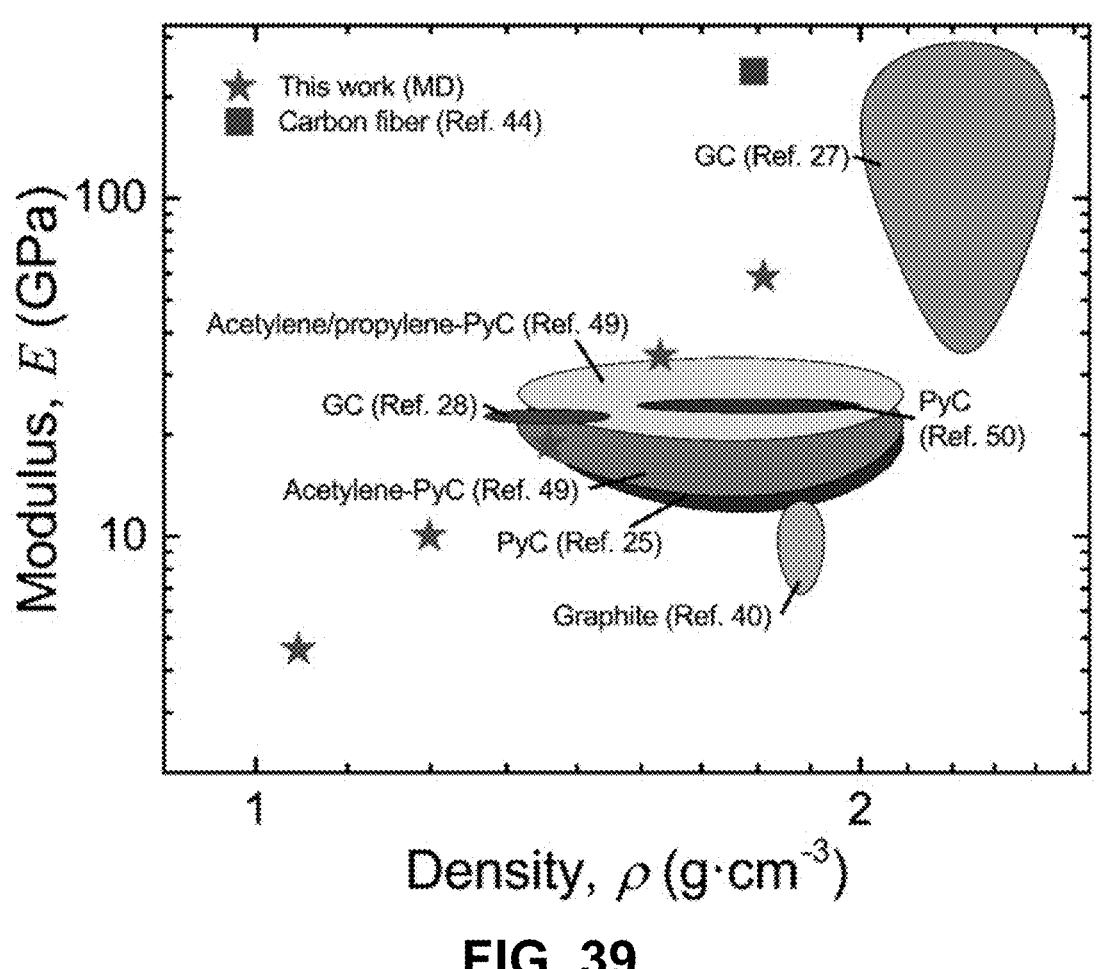
Figure 40A:
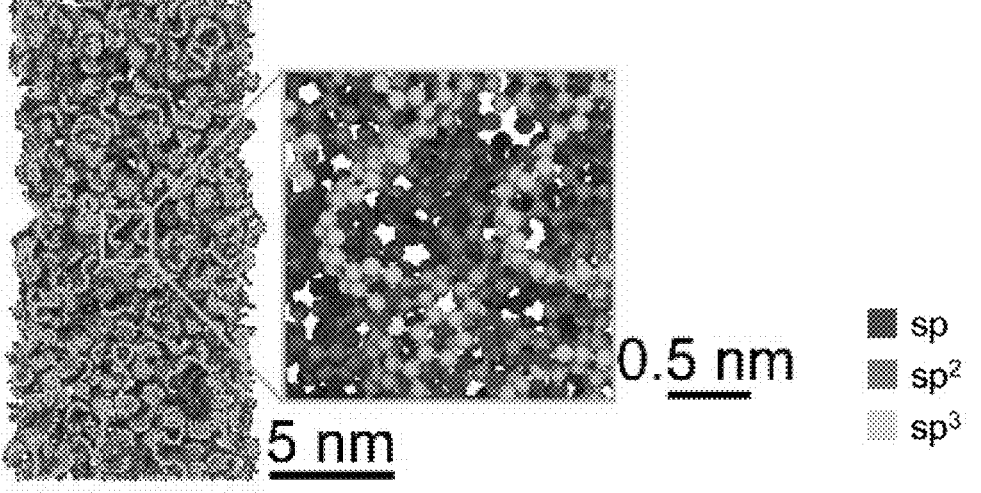
Figures 40B, 40C, 40D, 40E:
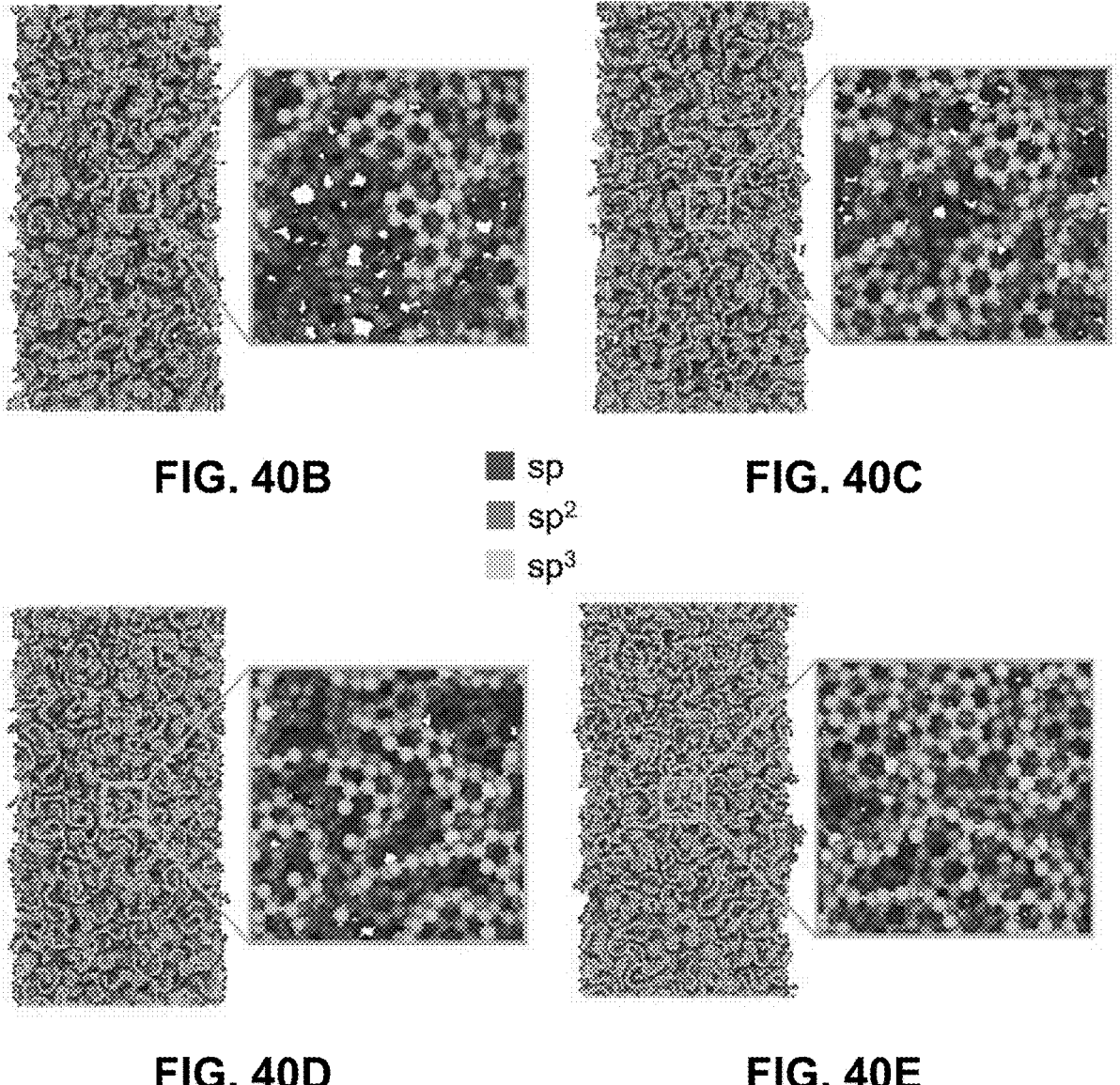

FIG. 39. Plot of Young's modulus (GPa) versus density (g/cm$^3$) corresponding to materials or structures from relevant art as well as to certain embodiments of the present invention.

FIGS. 40A-40E. Images corresponding to atomistic configurations of nanopillars formed of carbon allotrope materials. The nanopillars shown here have diameters of 10 nm and different densities of 1.0-1.8 g/cm$^3$. Presence of sp carbon, sp$^2$ carbon, and sp$^3$ carbon is identified.

FIG. 41. Model for estimation of density and comparison with densities of pyrolytic carbon reported in recent literatures. Panels (a) and (b): Illustration of packing structure of curved graphene layers in pyrolytic carbon. L is the size of curved graphene layer, and L$_s$ represents the interlayer distance between neighboring layers. Panel (c): Illustration of a typical open-structure unit cell composed of two graphene layers. Panel (d): Density of pyrolytic carbon ($\rho_{PC}$) as a function of the ratio of L/L$_s$. Solid curve is from prediction based on Eq. (1), while the dashed curve is from Ref. 26. The current extended model supplies a prediction of density of 1.0-1.8 g/cm$^3$ for pyrolytic carbon micropillars.

Figure 42:
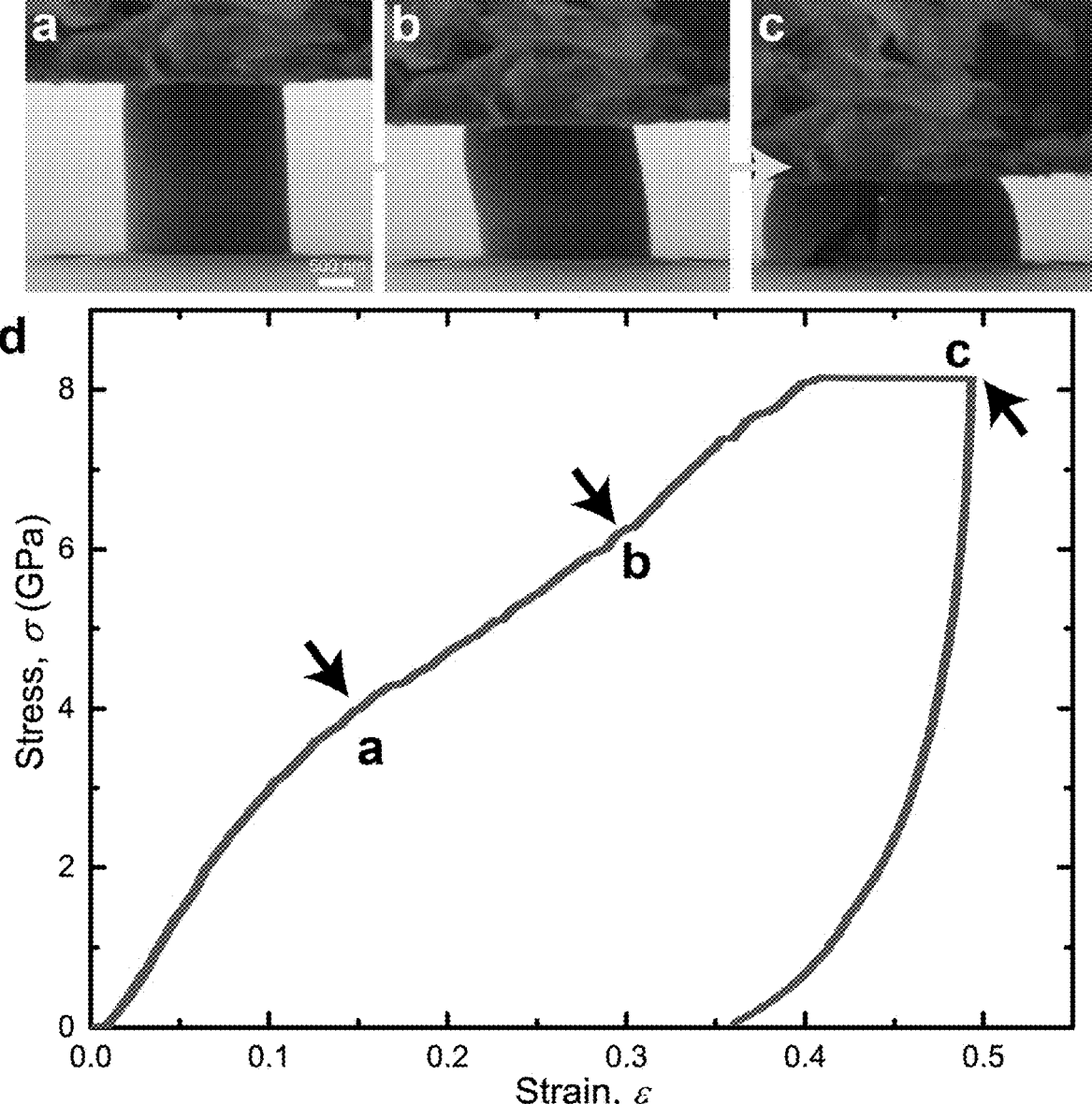

FIG. 42. In situ compression experiment of pyrolytic micropillar without the residual ring. Panels (a), (b) and (c): Snapshots of in situ compressive test on the pyrolytic carbon pillar without the residual ring. In (c), a splitting crack nucleated and rapidly propagated under high compressive stress, leading to the catastrophic fracture of the micropillar. Panel (d): Corresponding compressive stress-strain curve.

Figure 43:
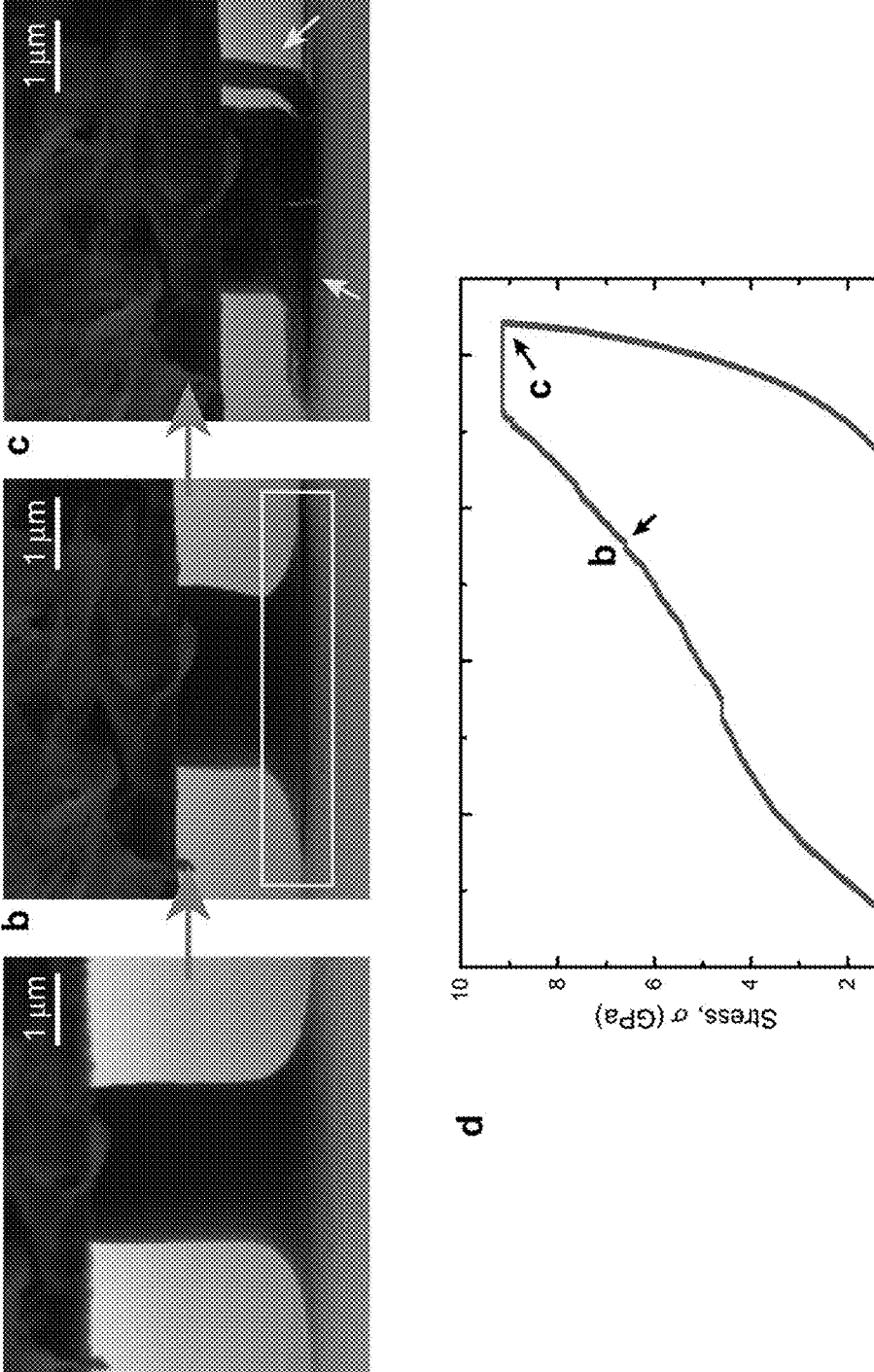

FIG. 43. Influence of residual carbon rings on compression of pyrolytic carbon micropillars. Panels (a), (b), and (c): Snapshots of in situ compressive test on the pyrolytic carbon pillar with the residual ring. Panel (d): Corresponding compressive stress-strain curve. The slight burst marked by "b" is corresponding to the bulging of the edge of the ring due to high stress concentration. The large strain burst marked by "c" represents the cleavage of the pillar as well as the peeling up of the ring.

FIG. 44. Bonding structures of pyrolytic carbon pillars used for atomistic simulations. The sp$^2$ bonds are much more ubiquitous than sp and sp$^3$ bonds. The sp bonds are mainly localized at the edges of the curved graphene layers; the sp$^3$ bonds generally connect neighboring graphene layers to one another or form at the high-energy curved surface of graphene layers.

Figure 45A:
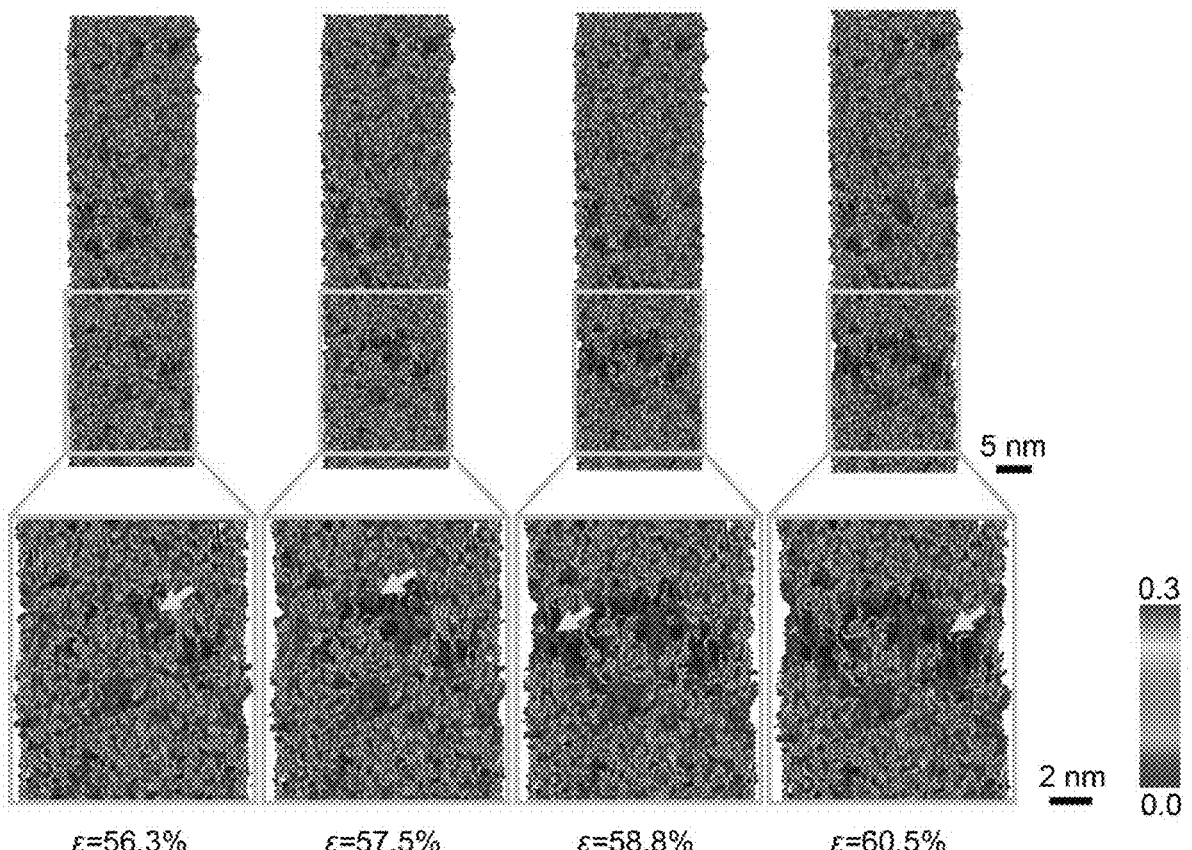
Figure 45B:
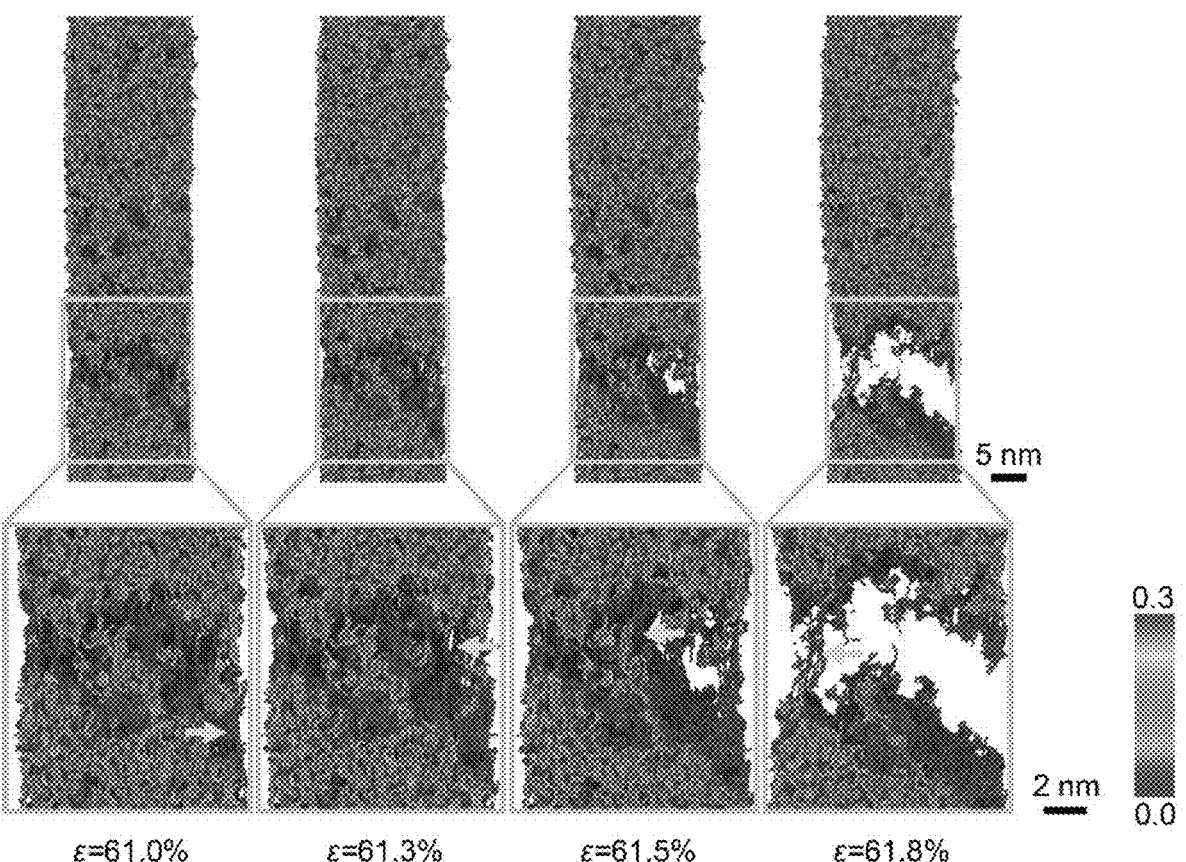

FIGS. 45A and 45B. Fracture mechanisms of pyrolytic carbon nanopillars under uniaxial tension. FIG. 45A: Snapshots of stretched nanopillars at strains of 56.3-60.5%. Nanoscale cavities (indicated by orange arrow) nucleated and grew up during stretching, and then merged with each other, leading to formation of nanoscale cracks.

FIG. 45B: Snapshots of stretched nanopillars at strains of 61.0-61.8%. As the tensile strain increases, nanoscale cracks propagated along a direction normal to tensile direction, resulting in the smooth fracture surface. All atoms in FIG. 45A and FIG. 45B are colored by atomic von Mises strain.

Figure 46:
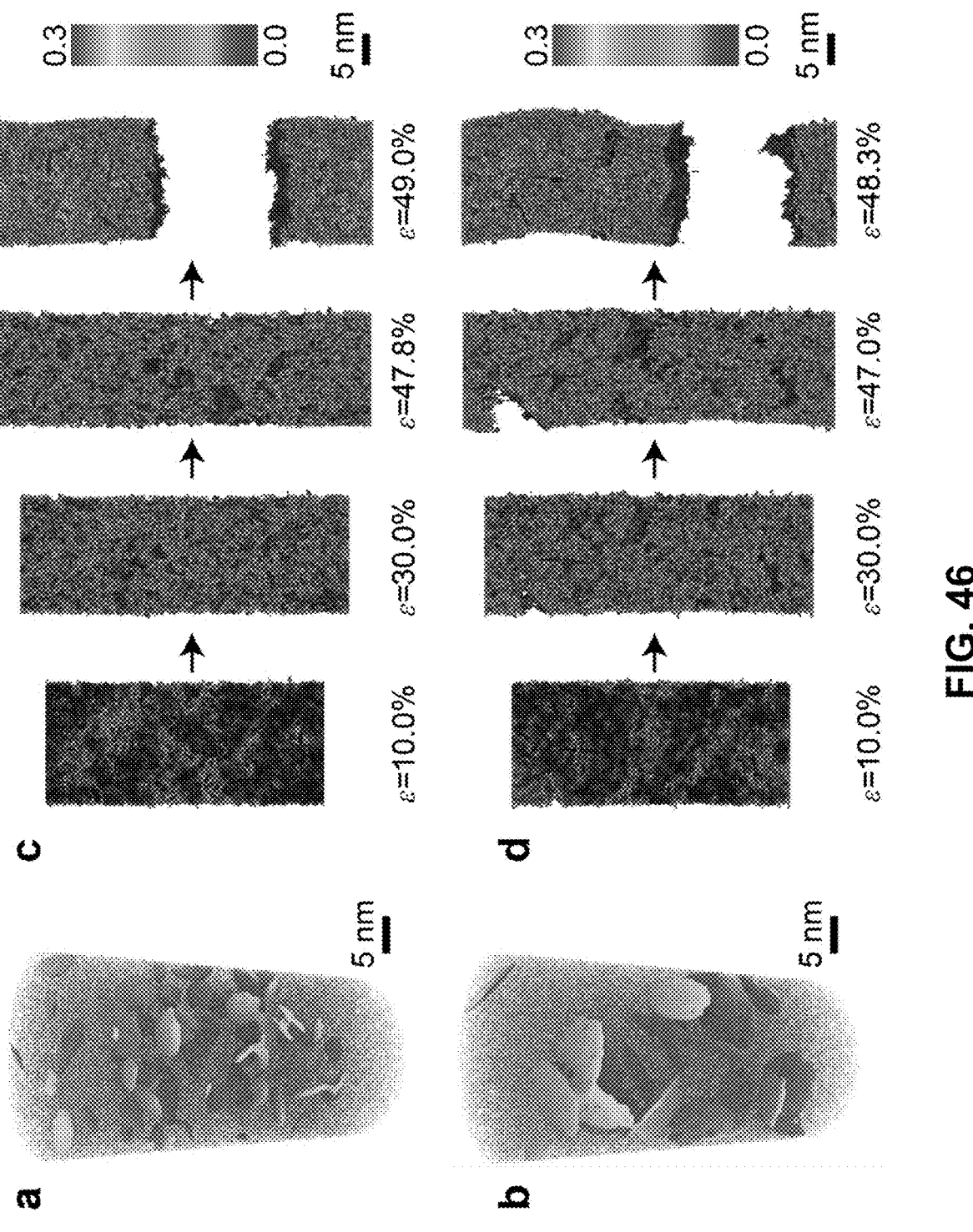

FIG. 46. Effects of initial flaws on tensile strength of pyrolytic carbon pillars. Panels (a) and (b): Atomic configurations of simulated samples containing initial cracks with length of 4 nm and 8 nm, respectively. All initial cracks are shown by the white flakes. Panels (c) and (d): A sequence of snapshots of pillars with initial cracks with length of 4 nm and 8 nm, respectively. The failure of both nanopillars always initiated from the growth and extension of pre-existing nanocracks. Both samples after failure have the smooth fracture surface, showing a brittle fracture mode. All atoms in Panel (c) and Panel (d) are colored by atomic von Mises strain.

Figure 47:
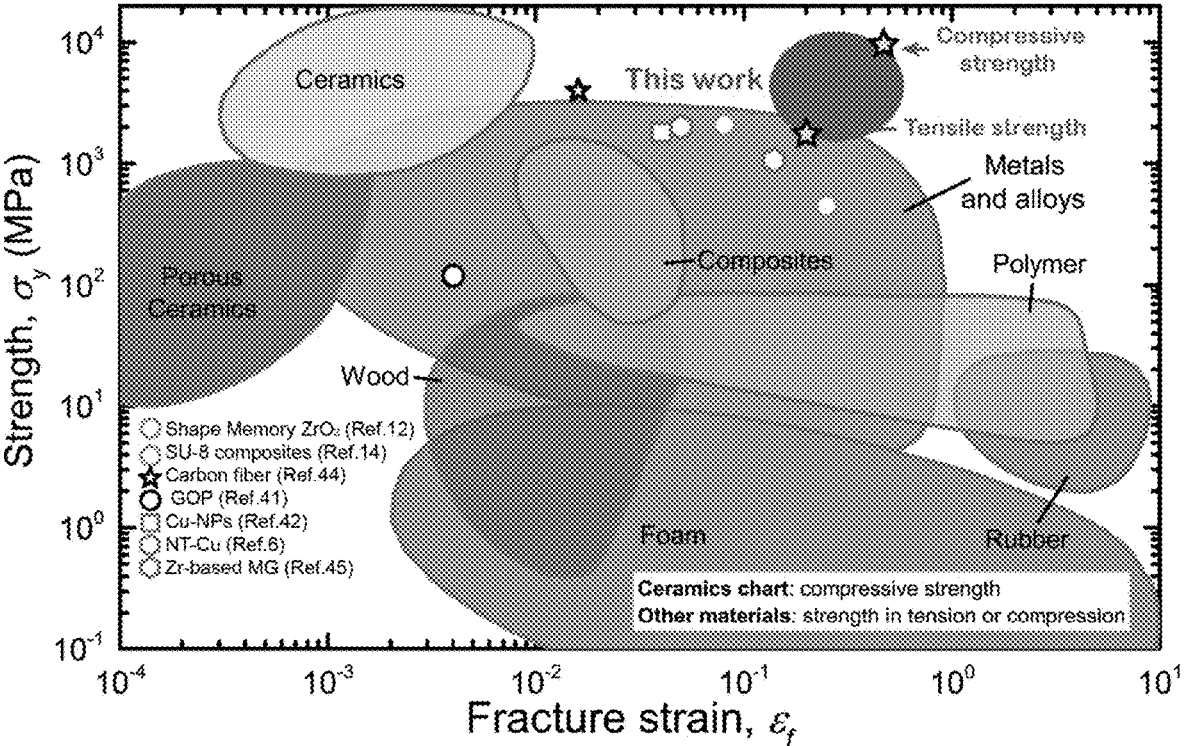

FIG. 47. Summary plot of strength versus fracture strain for our pyrolytic carbon micropillars and other structural materials.

Figures 48A, 48B, 48C, 48D, 48E:
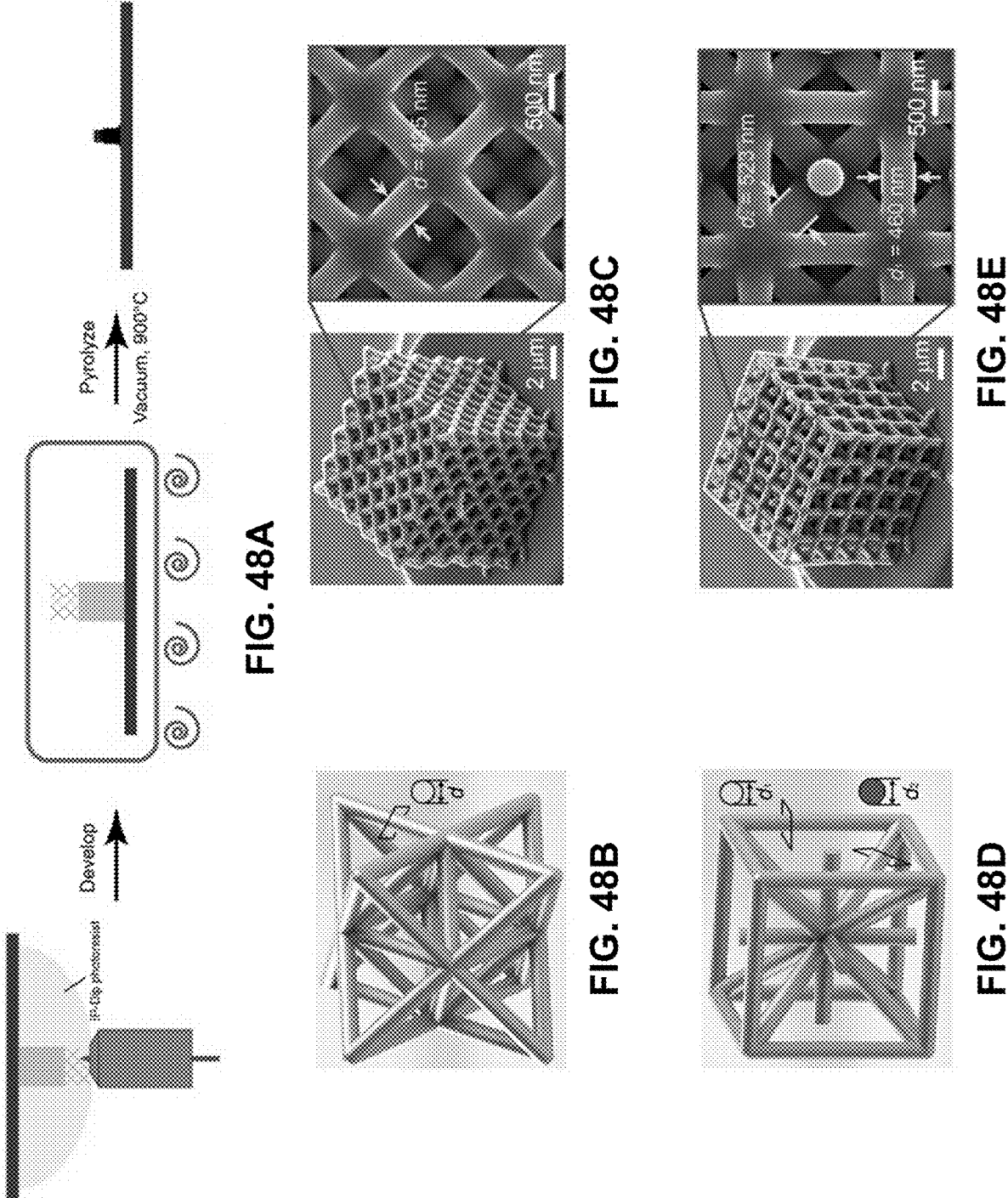
Figure 48F:
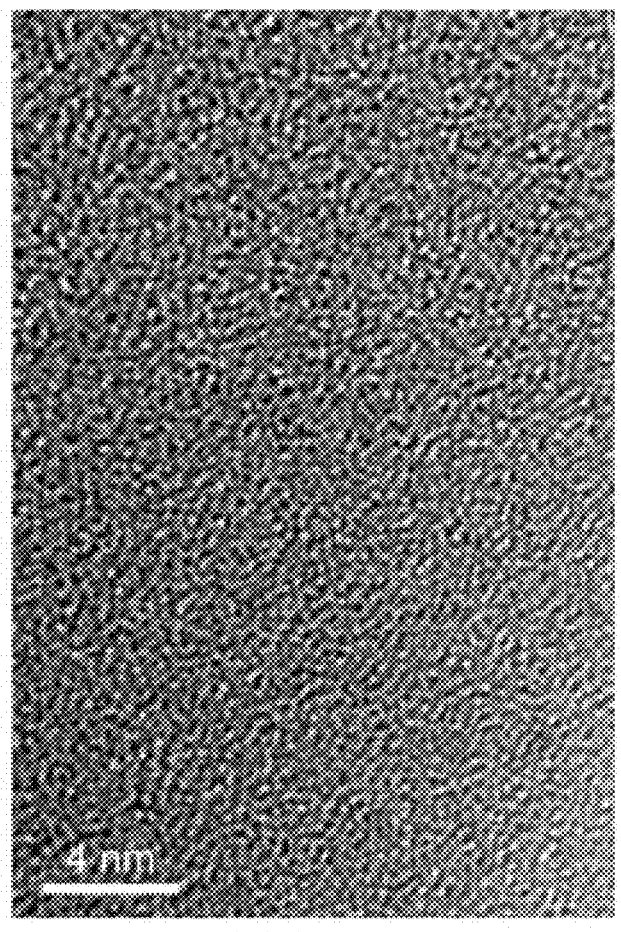

FIGS. 48A-48F. Fabrication and microstructural characterization of pyrolytic carbon nanolattices. FIG. 48A. Schematic illustration of the fabrication process of pyrolytic carbon nanolattices. CAD rendition of a (FIG. 48B) octet and (FIG. 48D) iso-truss unit cell. SEM images of (FIG. 48C) an octet nanolattice with a strut diameter of d=435 nm and (FIG. 48E) an iso-truss nanolattice fabricated with a vertical strut diameter of $d_1$=460 nm and a slanted strut diameter of $d_2$=523 nm. FIG. 48F. An HRTEM image of pyrolytic carbon extracted from the nanolattice, which indicates the amorphous nature of the pyrolytic carbon.

Figure 49A:
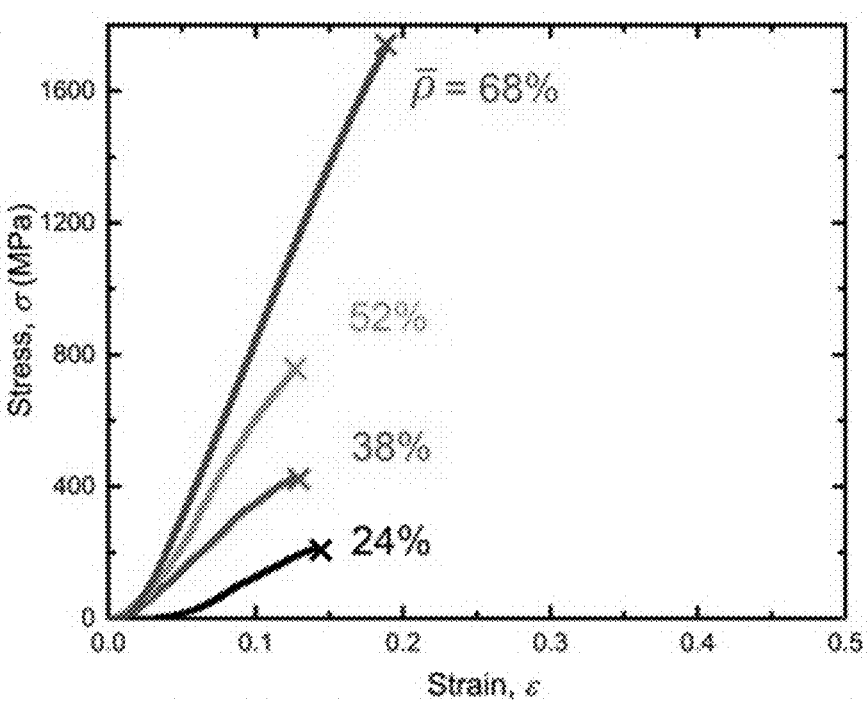
Figure 49B:
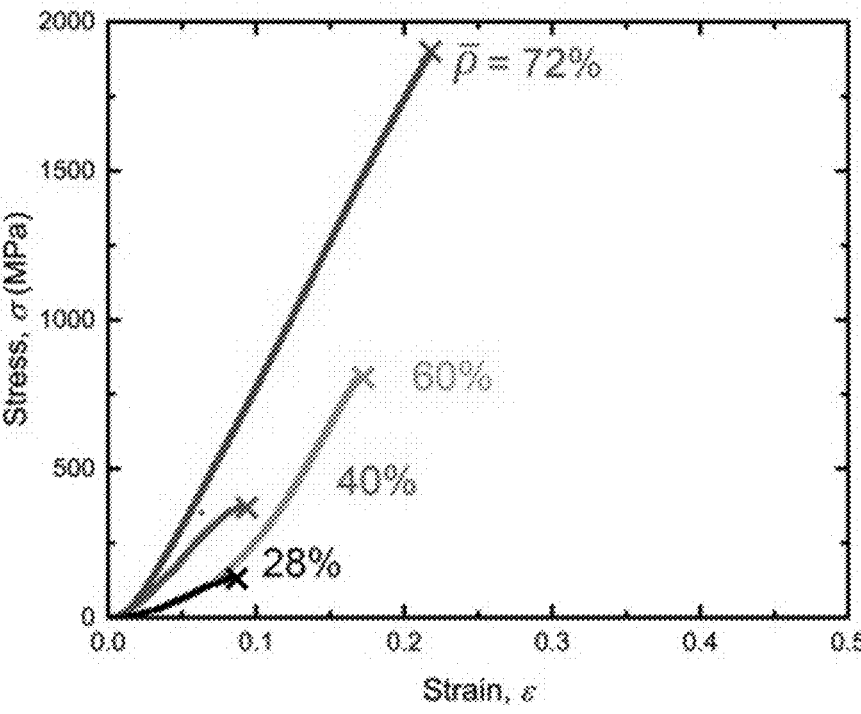

FIGS. 49A-49F. In situ uniaxial compression experiments on pyrolytic carbon nanolattices. FIGS. 49A-49B. Mechanical response of pyrolytic carbon octet- and iso-truss nanolattices with different relative densities obtained from in situ compressions. FIGS. 49C-49D. SEM images of an octet-truss nanolattice with d=382 nm before and after compression. FIGS. 49E-49F. SEM images of the iso-truss nanolattice with $d_1$=538 nm and $d_2$=612 nm before and after compression, which reveal brittle failure. Initial detectable structural imperfections caused by fabrication process are circled in (FIG. 49C) and (FIG. 49E).

Figure 50A:
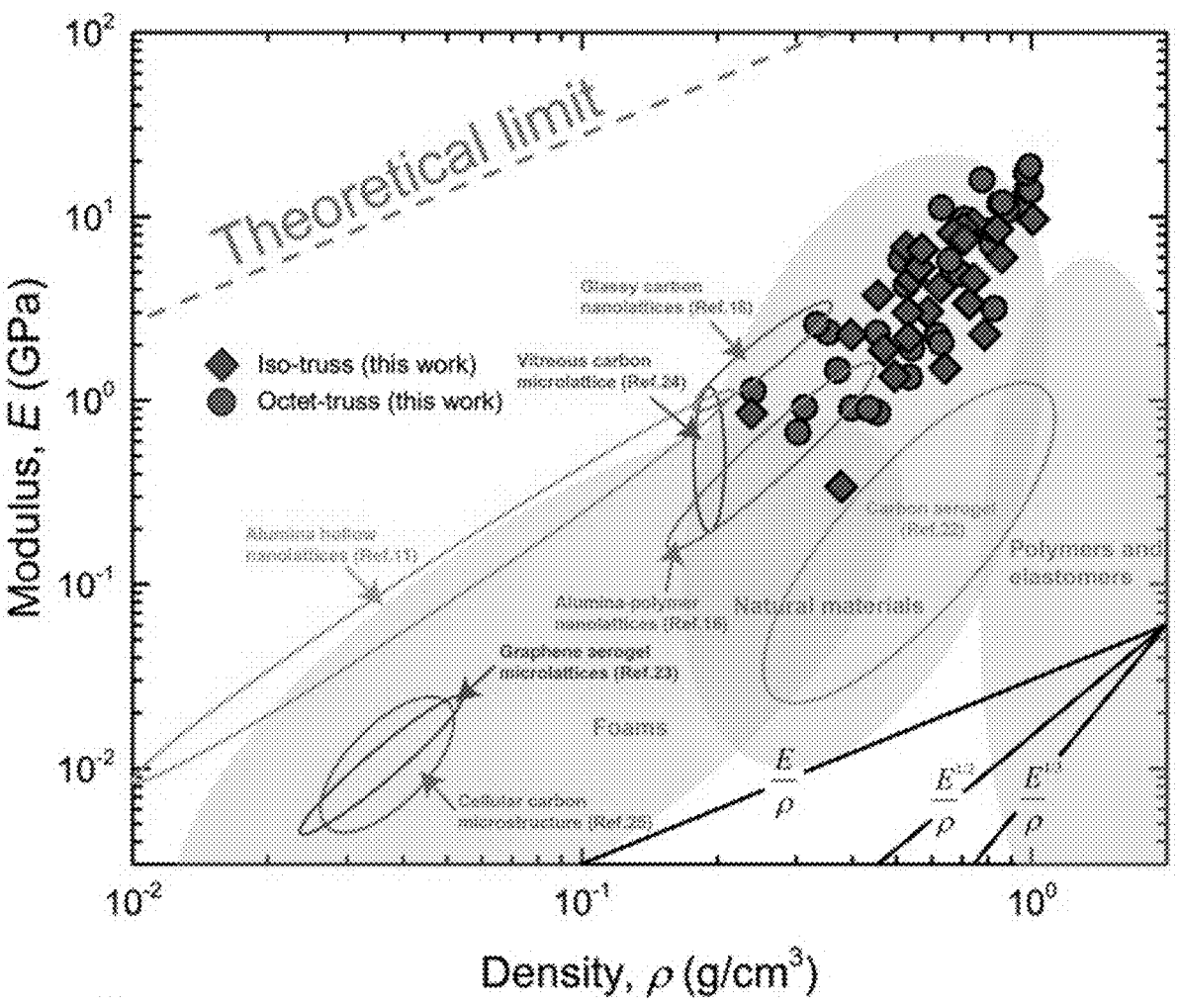
Figure 50B:
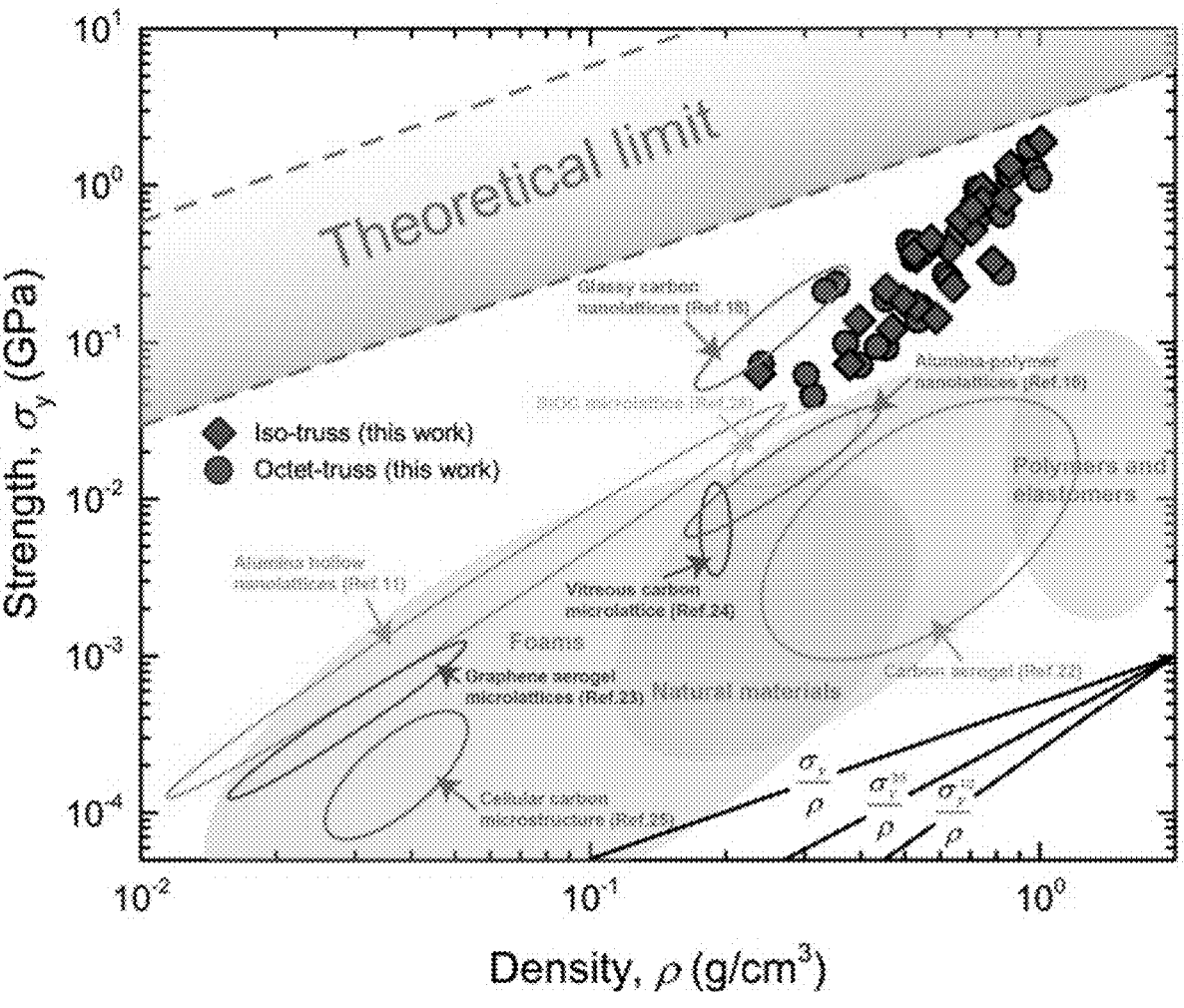

FIGS. 50A-50B. Mechanical properties versus density maps of pyrolytic carbon nanolattices. FIG. 50A. Young's modulus and (FIG. 50B) compressive strength of pyrolytic carbon nanolattices plotted versus density on a log-log scale. For comparison, these charts include several micro- and nano-architected materials reported so far, such as alumina hollow nanolattices (11), alumina-polymer nanolattices (16), glassy carbon nanolattices (18), carbon aerogel (22), graphene aerogel microlattices (23), vitreous carbon nanolattice (24), cellular carbon microstructure (25) and SiOC microlattices (26).

Figures 51A, 51B, 51C:
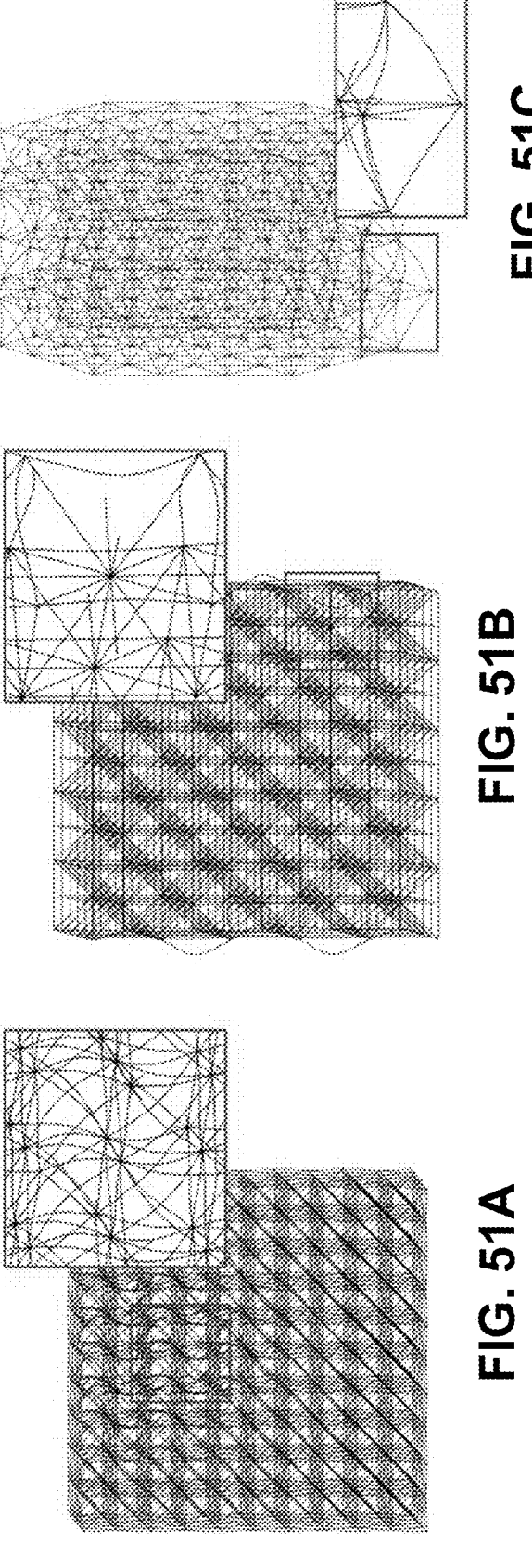
Figure 51D:
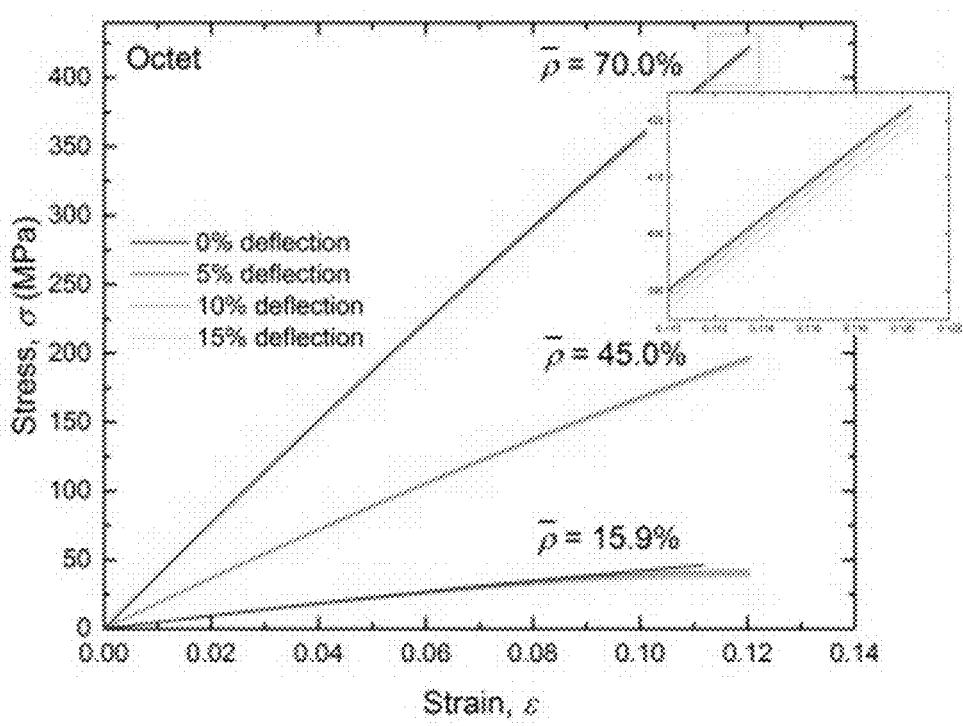
Figure 51E:
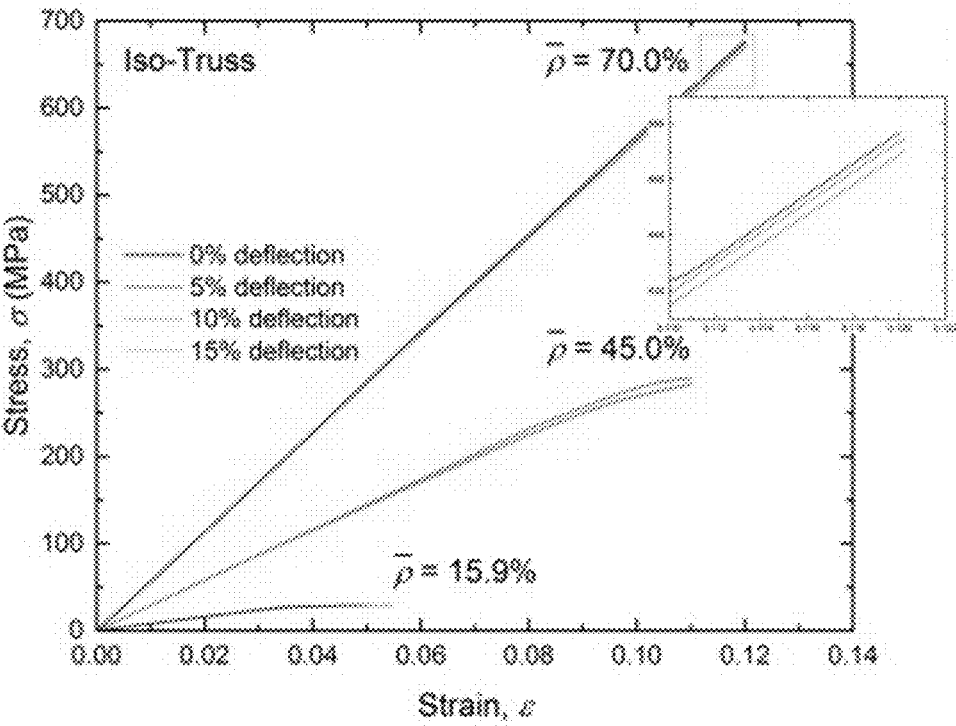
Figure 51F:
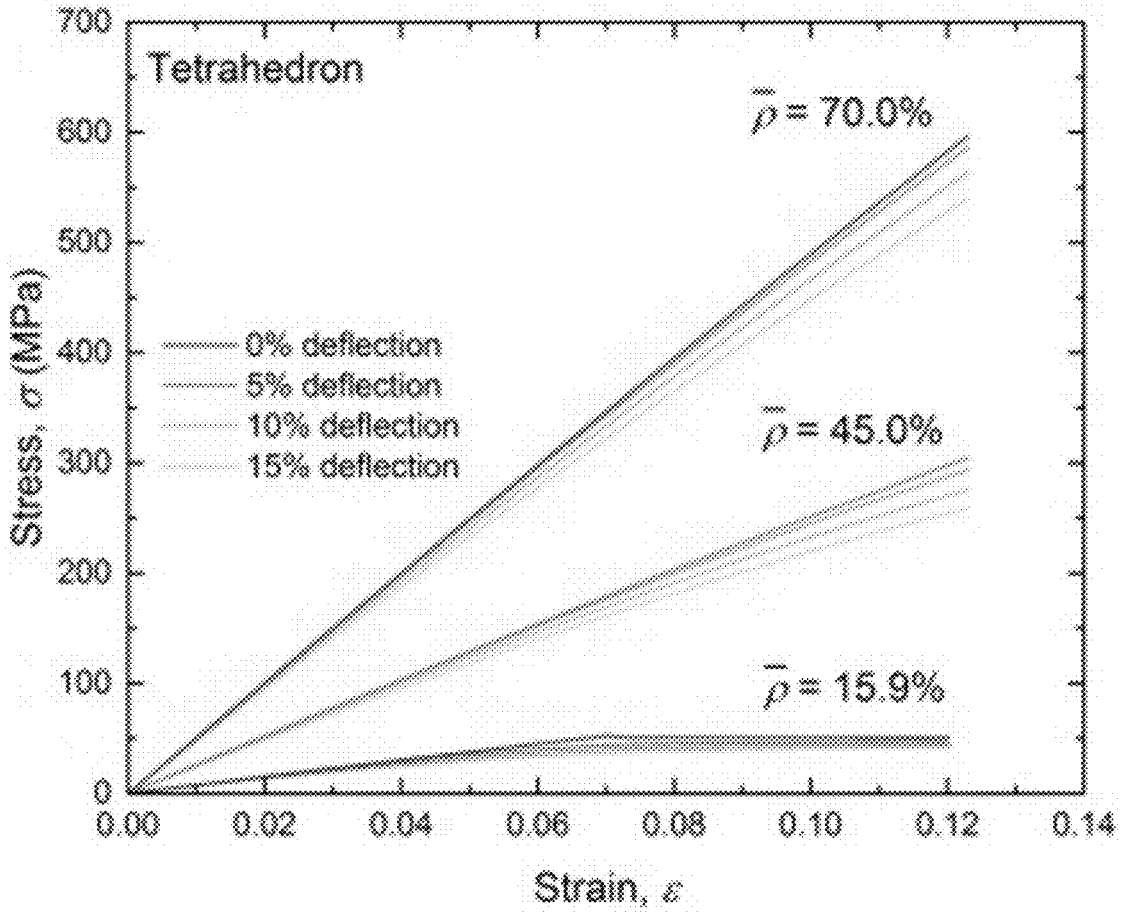

FIGS. 51A-51F. Finite-element simulations of uniaxial compression of pyrolytic carbon nanolattices with different unit cells. FIGS. 51A-51C. Simulated configurations of octet-, iso- and tetrahedron-truss nanolattices with pre-existing defects introduced by imposing the initial deflection of struts. The insets show the zoom-in views of local structures with initial deflection of struts. FIGS. 51D-51F. Compressive stress-strain curves of octet-truss, iso-truss and tetrahedron-truss nanolattices with different relative densities and initial specific deflection.

Figure 52:
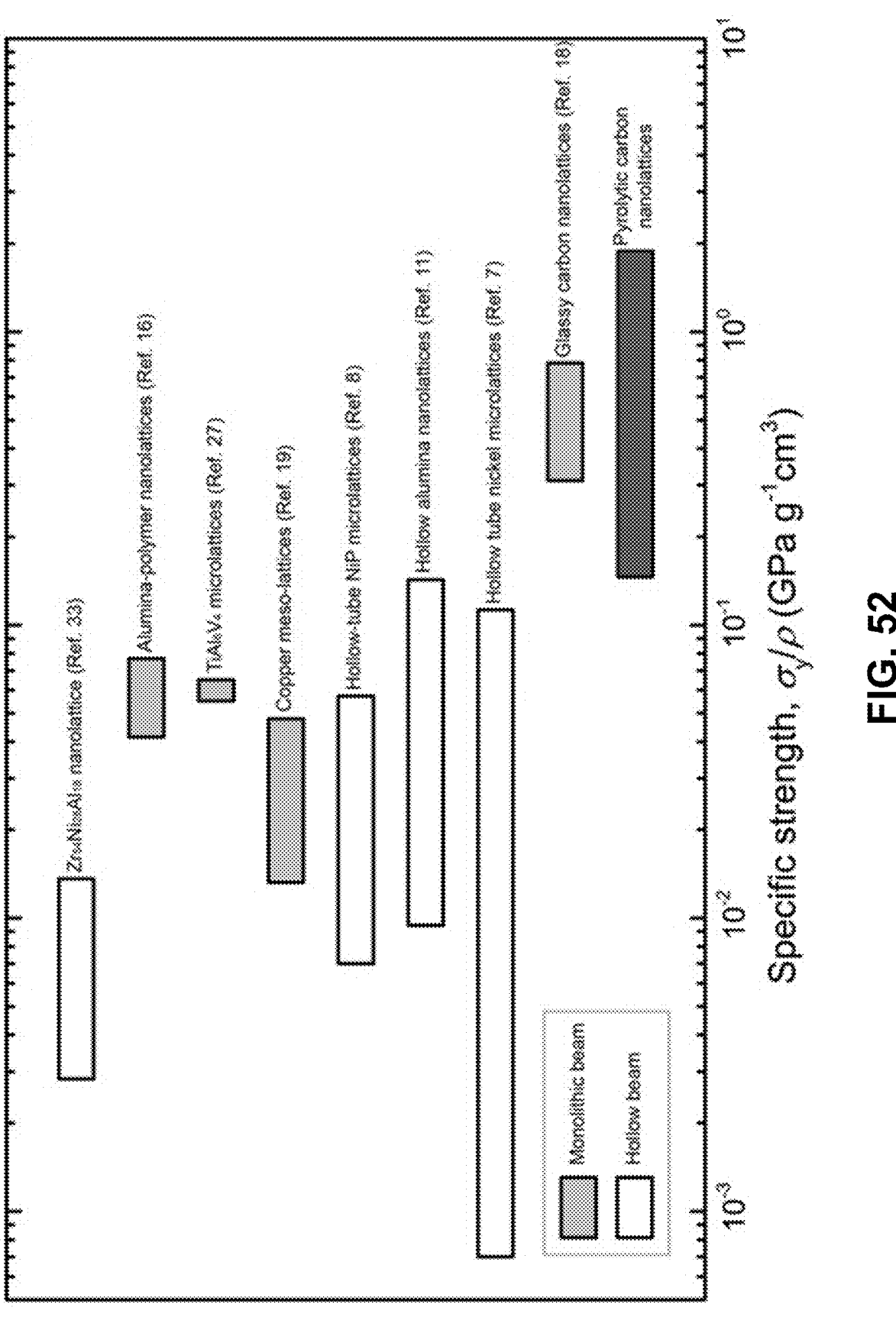

FIG. 52. Comparison of the specific strength between our pyrolytic carbon nanolattices and other micro- and nanolattices reported so far.

Figures 53A, 53B, 53C, 53D:
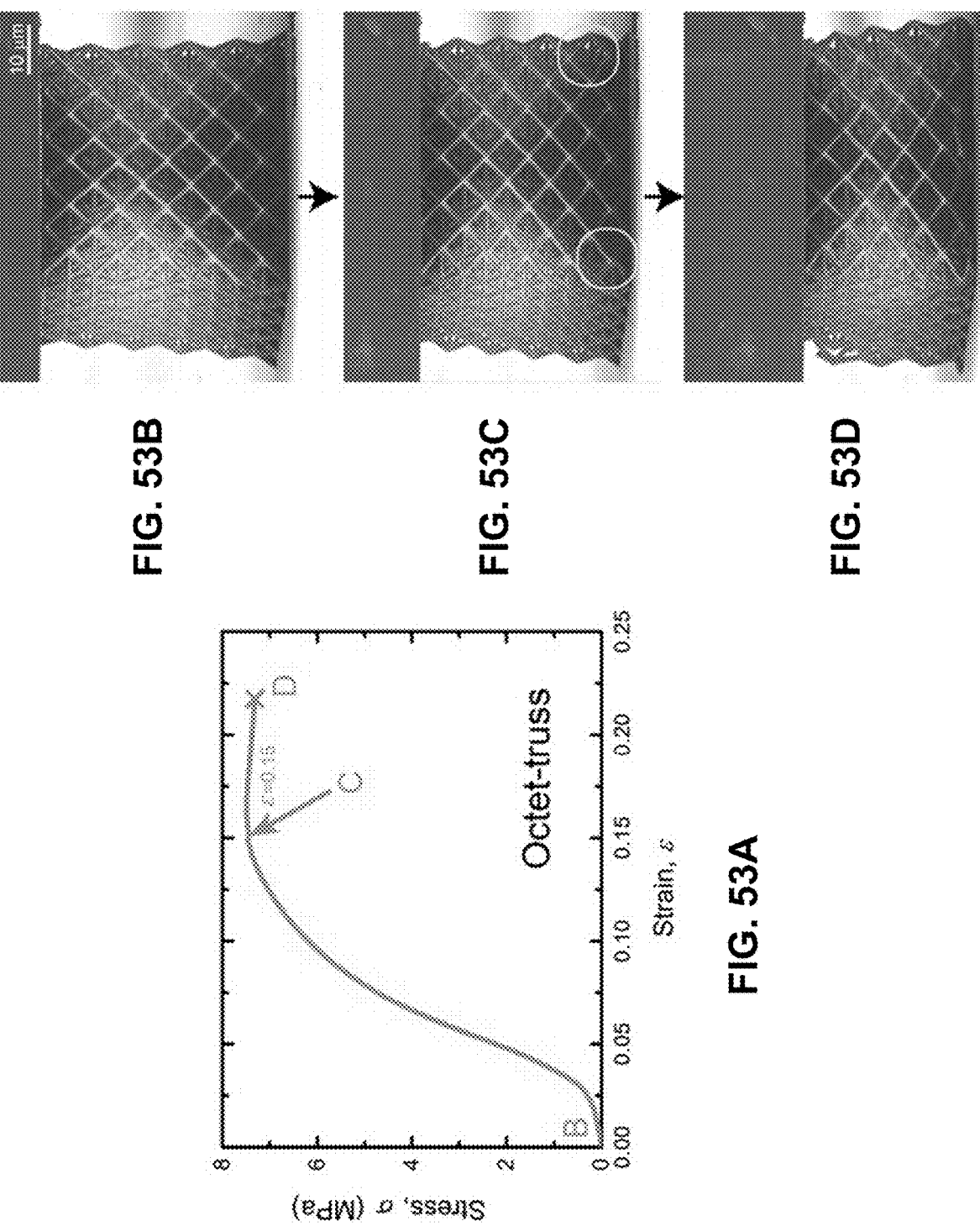
Figures 53E, 53F, 53G, 53H:
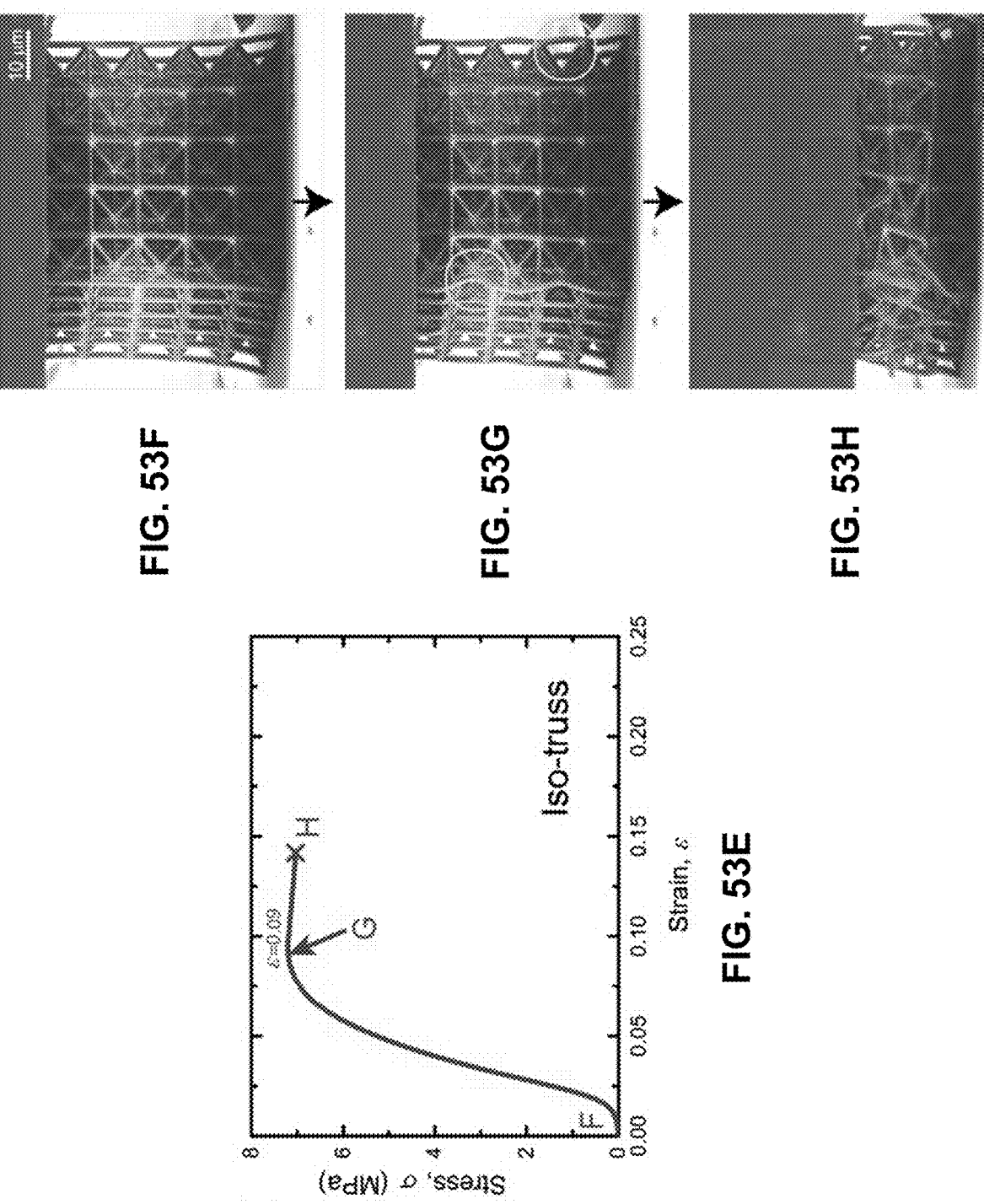

FIGS. 53A-53H. In situ compression tests on polymer nanolattices. FIG. 53A. Compressive stress-strain curve of octet-truss nanolattice with d=1.12 μm. FIGS. 53B-53D. SEM snapshots of deformed octet-truss nanolattice under different compressive strains. FIG. 53E. Compressive stress-strain curve of iso-truss nanolattice with $d_1$=1.30 μm and $d_2$=1.49 μm. FIGS. 53F-53H. SEM snapshots of deformed iso-truss nanolattice under different compressive strains. The circled regions in FIG. 53C and FIG. 53G indicate the buckling of struts during compression.

Figure 54A:
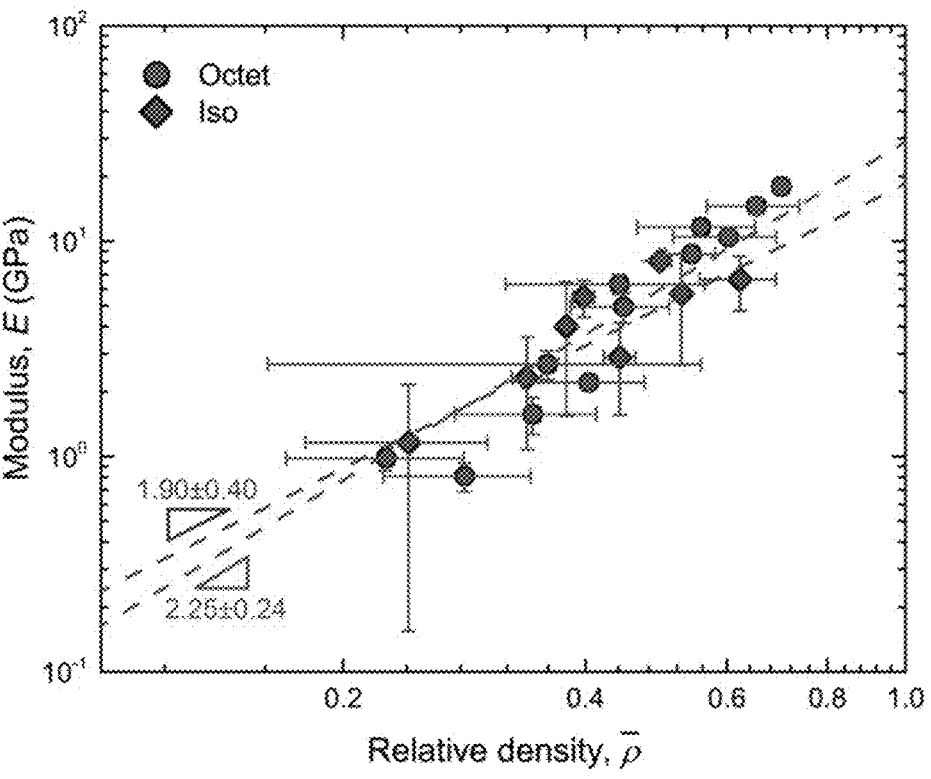
Figure 54B:
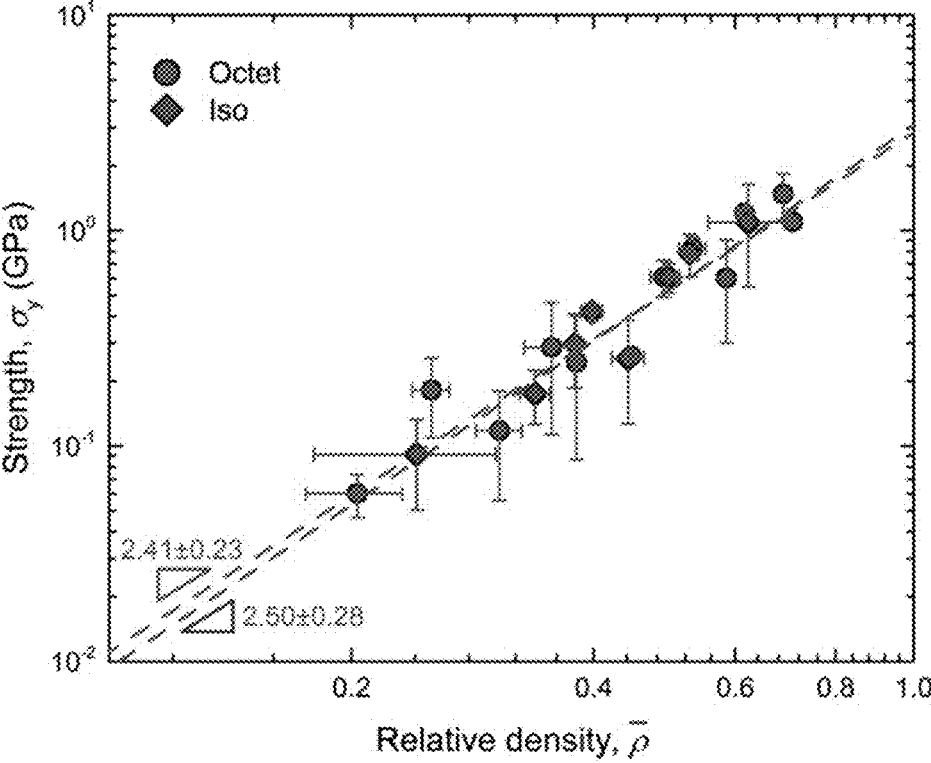

FIGS. 54A-54B. Young's modulus and compressive strength versus density of pyrolytic carbon nanolattices. Young's modulus and strength versus relative density of octet- and iso-truss pyrolytic carbon nanolattices on log-log scale. Scaling power law slopes are indicated for each architecture. Error bars represent the standard deviations from the average over some data of samples with comparable densities.

Figure 55:
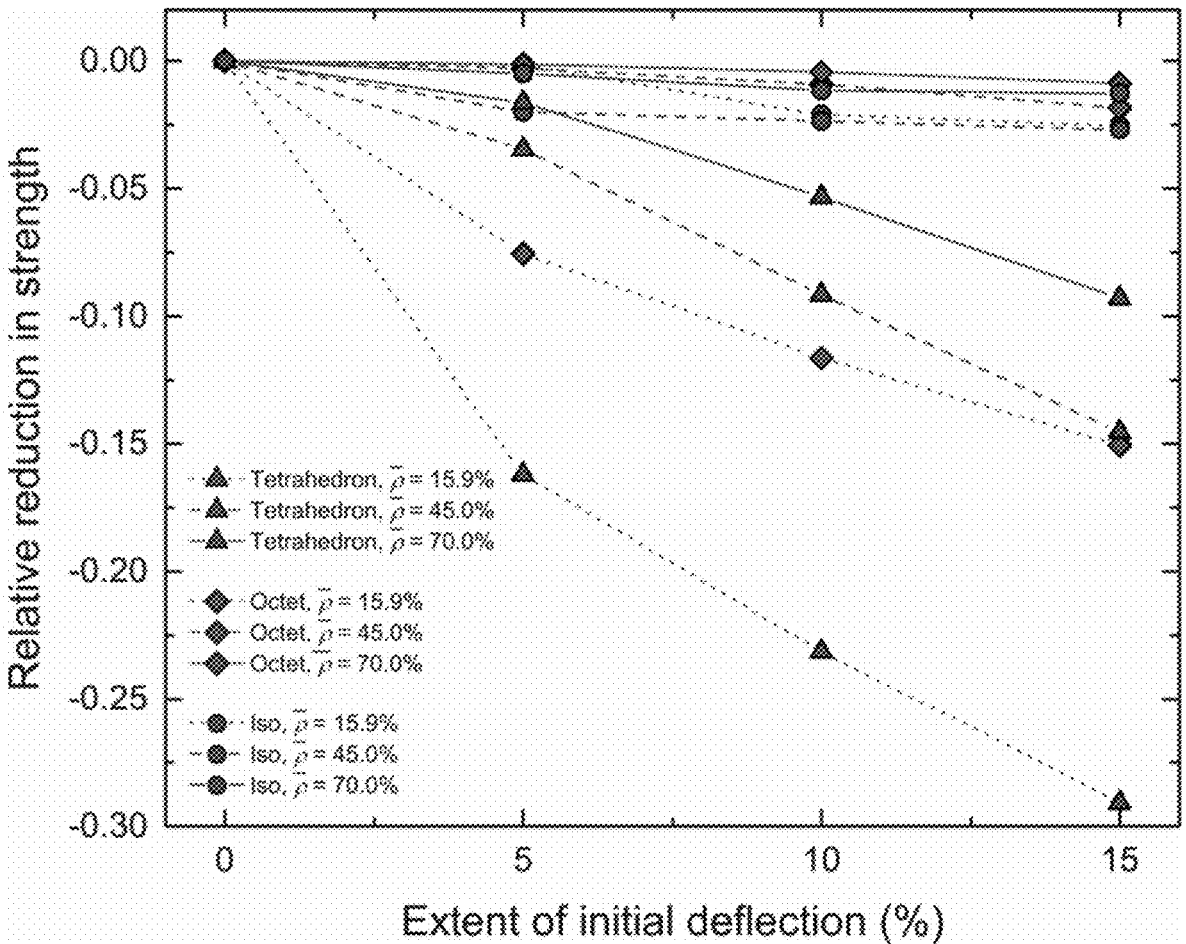

FIG. 55. Relative reduction in strength of nanolattice with initial deflection as a function of the extent of initial deflection.

Figure 56A:
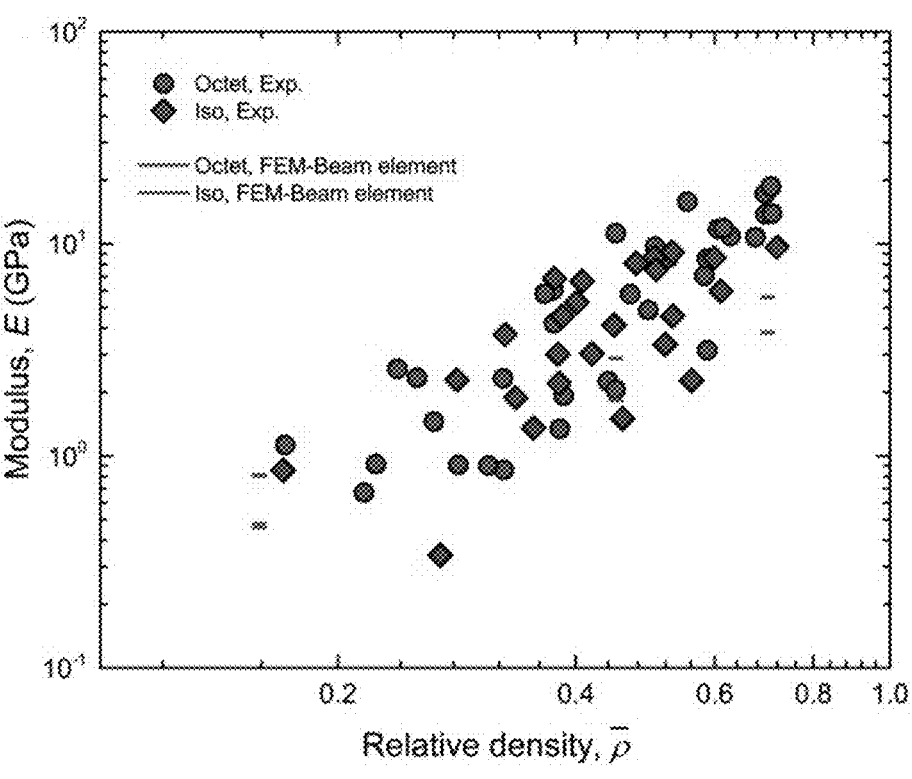
Figure 56B:
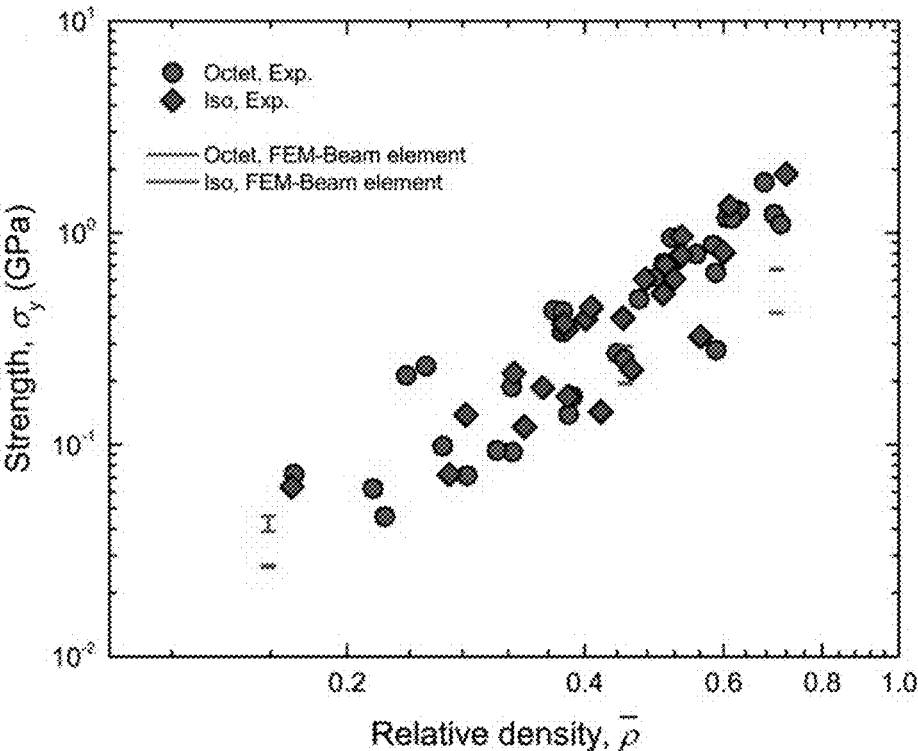

FIGS. 56A-56B. Comparison between finite-element modelling and experimental results. Modulus versus relative density and strength versus relative density from finite-element modelling and experiment. The dependences of modulus and strength of nanolattice on the relative density from finite-element modelling are consistent with those from experimental measurements.

Figure 57A:
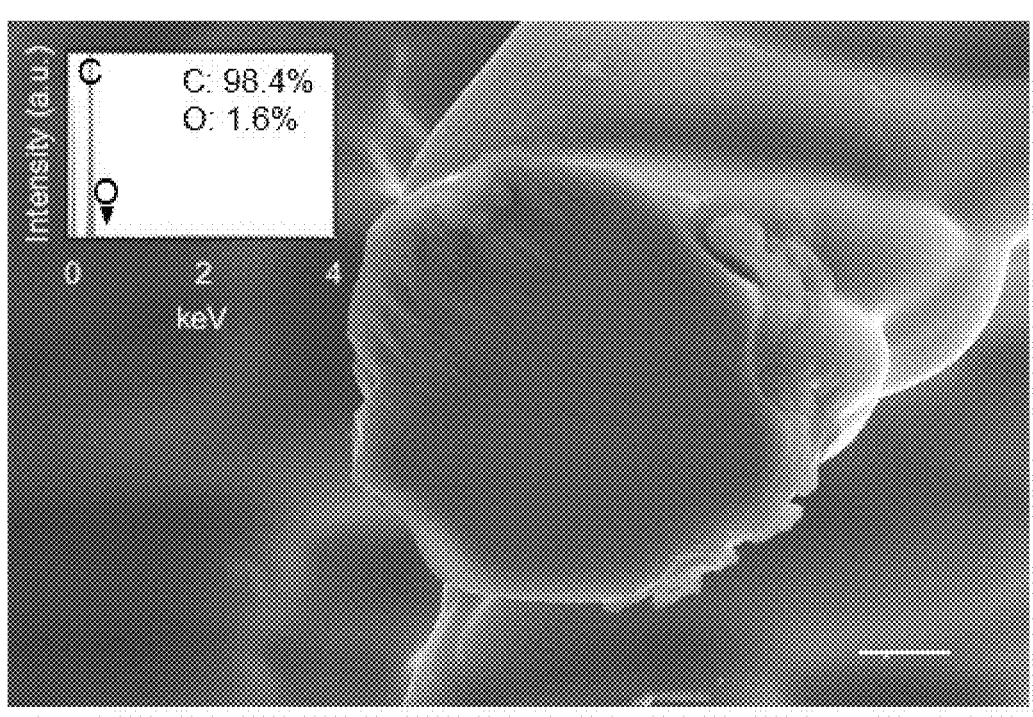
Figure 57B:
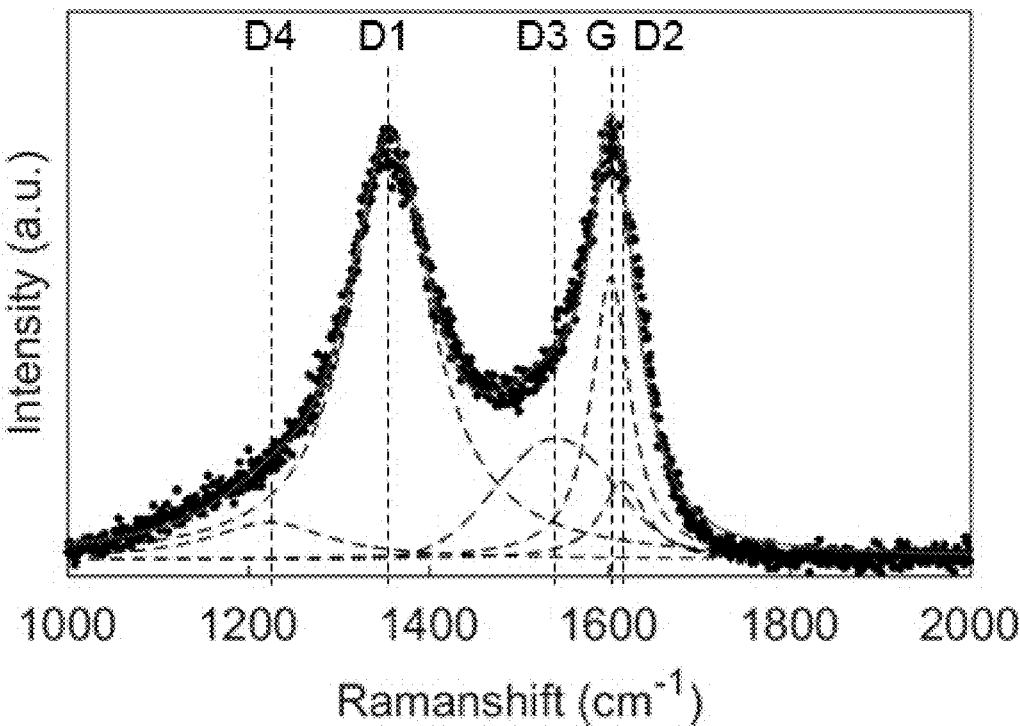
Figure 57C:
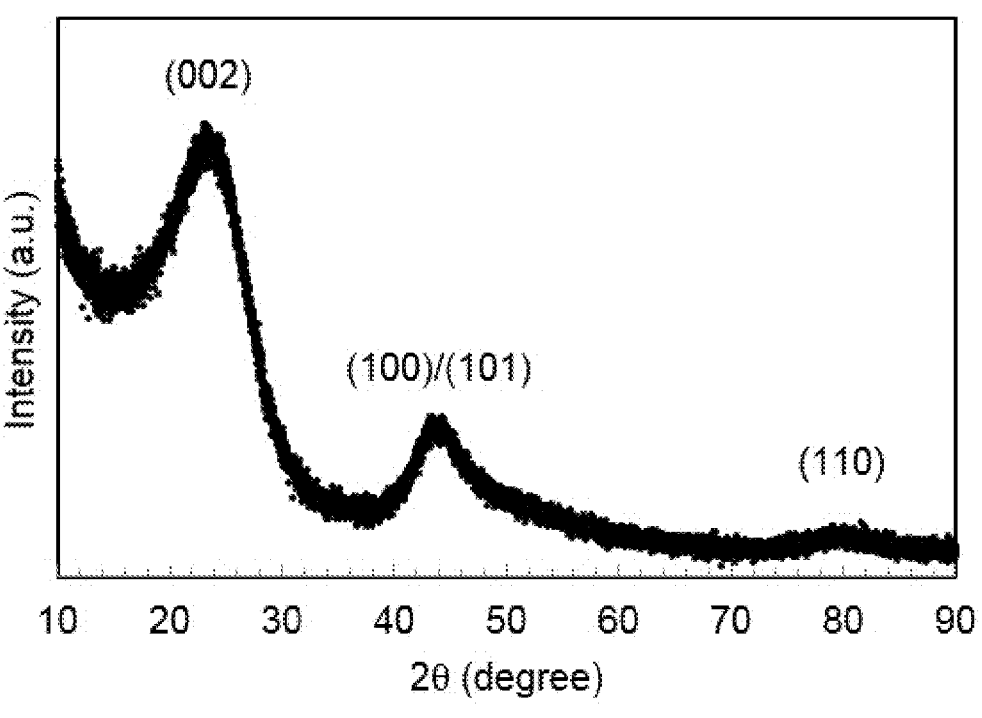
Figure 57D:
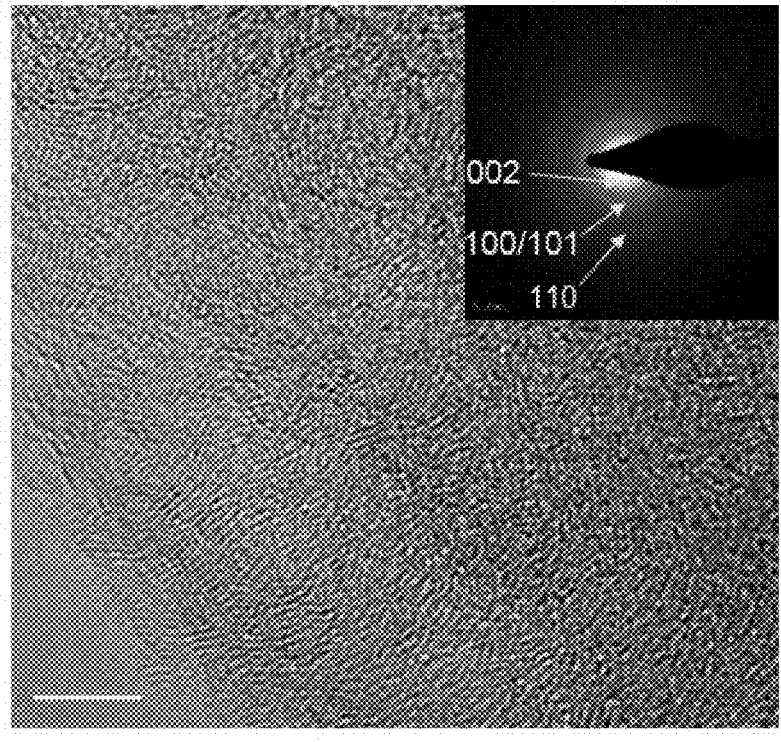

FIGS. 57A-57D. Microstructure characterization of 3D architected carbon structure. FIG. 57A. SEM image of cross-section and energy dispersive spectroscopy (EDS) spectrum on the cross-section. FIG. 57B. Raman spectrum with experimental data (●), fitted curves for each band (dot lines), and linear combination of these peaks (red line). FIG. 57C. X-ray diffraction (XRD) pattern. FIG. 57D. Transmitted electron microscope (TEM) high resolution image and diffraction pattern (inlet). Scale bars are 5 μm for FIG. 57A, and 5 nm in FIG. 57D.

Figure 58A:
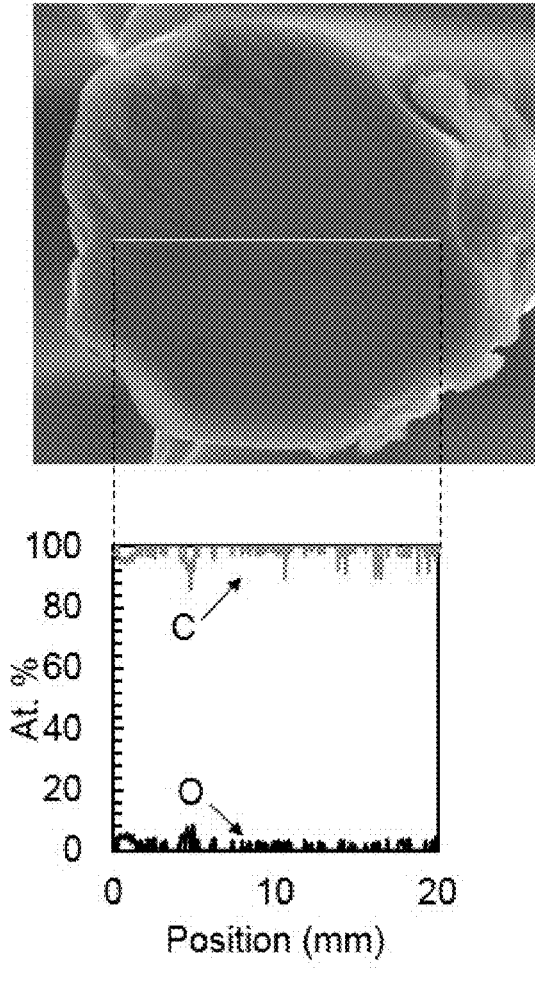
Figure 58B:
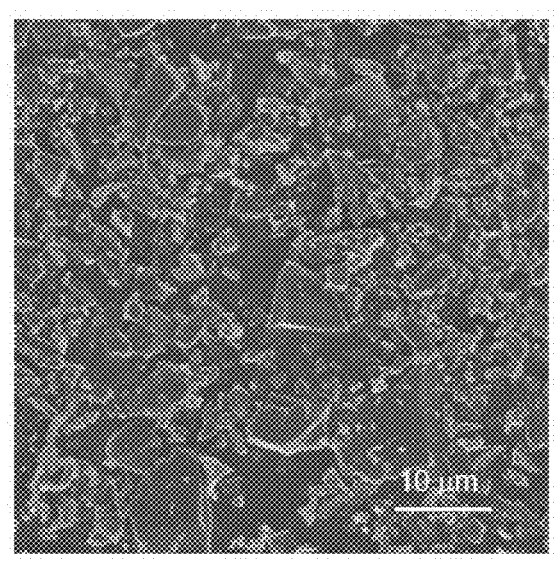

FIG. 58A. Line analysis of EDS on the cross-section. FIG. 58B. Particles crushed from the 3D architected carbon structure used for XRD analysis.

Figures 59A, 59B:
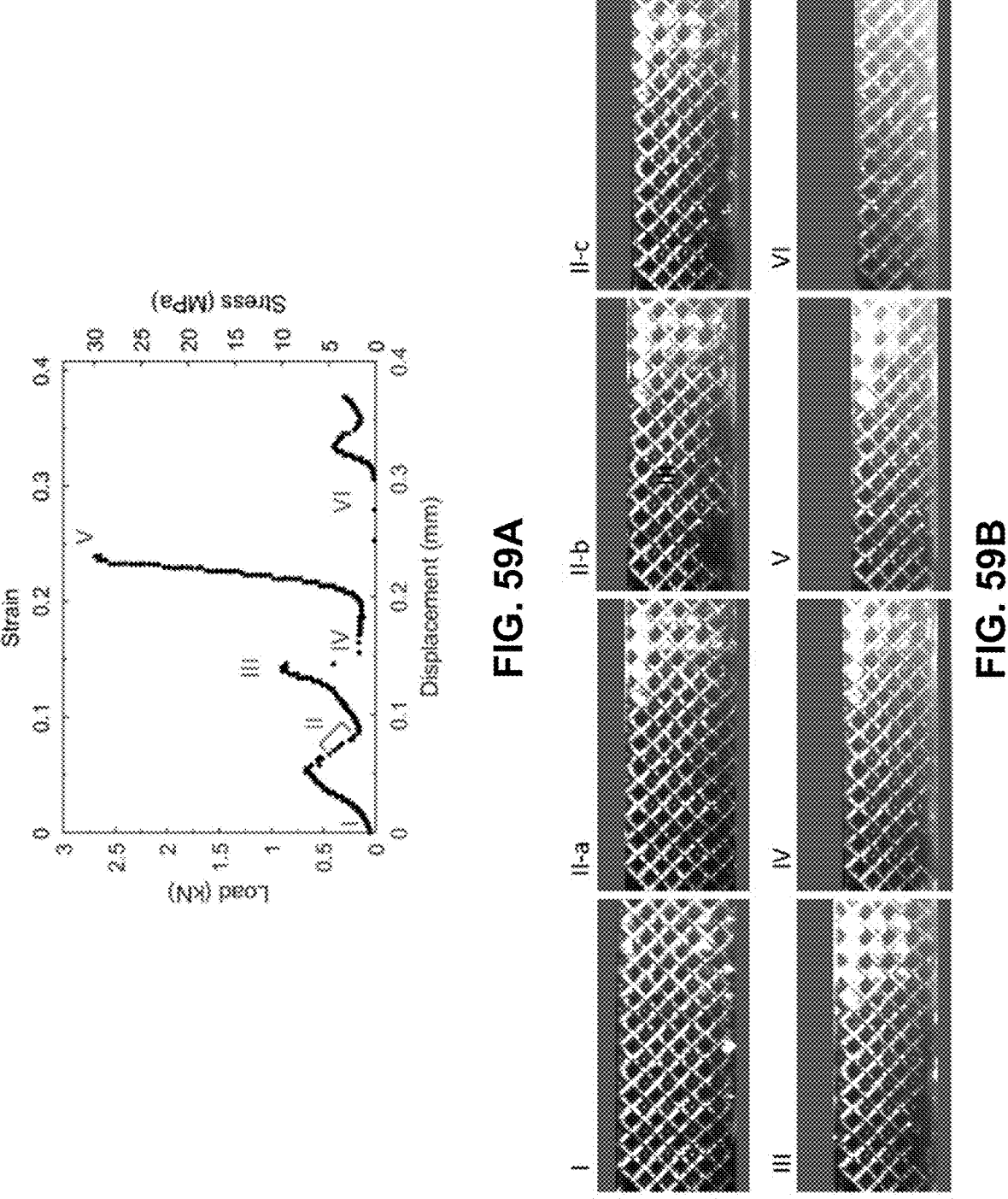

FIG. 59A. Representative stress-strain curve for compression. Roman numerals corresponds to distinct events shown in FIG. 59B. FIG. 59B. Photographic images of the compressed 3D architected carbon structure, I at the initial contact, II-a, b, c at local fractures shown in red doted-circle, III before the second stress release IV at the partial layer collapse shown by red line, V before the third stress release, and VI at the half layer collapse. Substrate and top load cell was grayed out.

Figure 60:
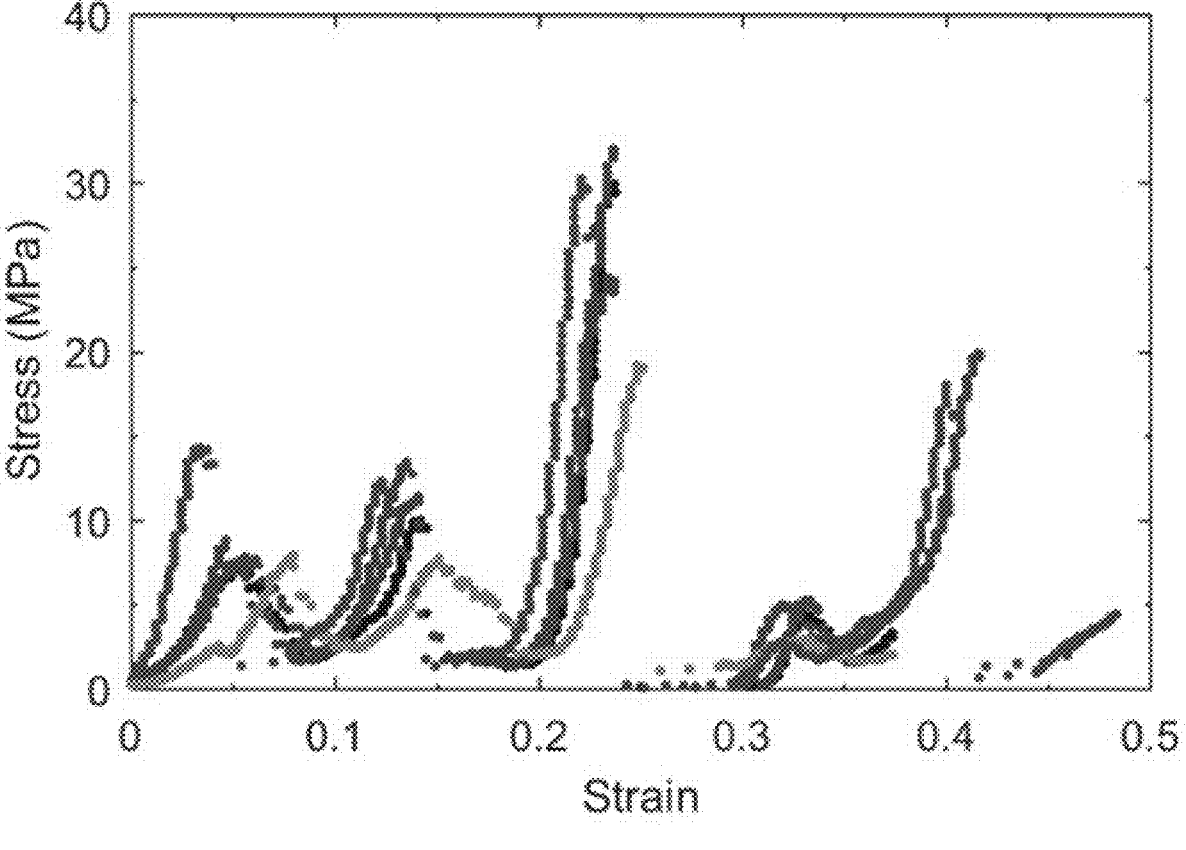

FIG. 60. Stress-strain curve of five samples of the 3D architected carbon structure.

Figure 61A:
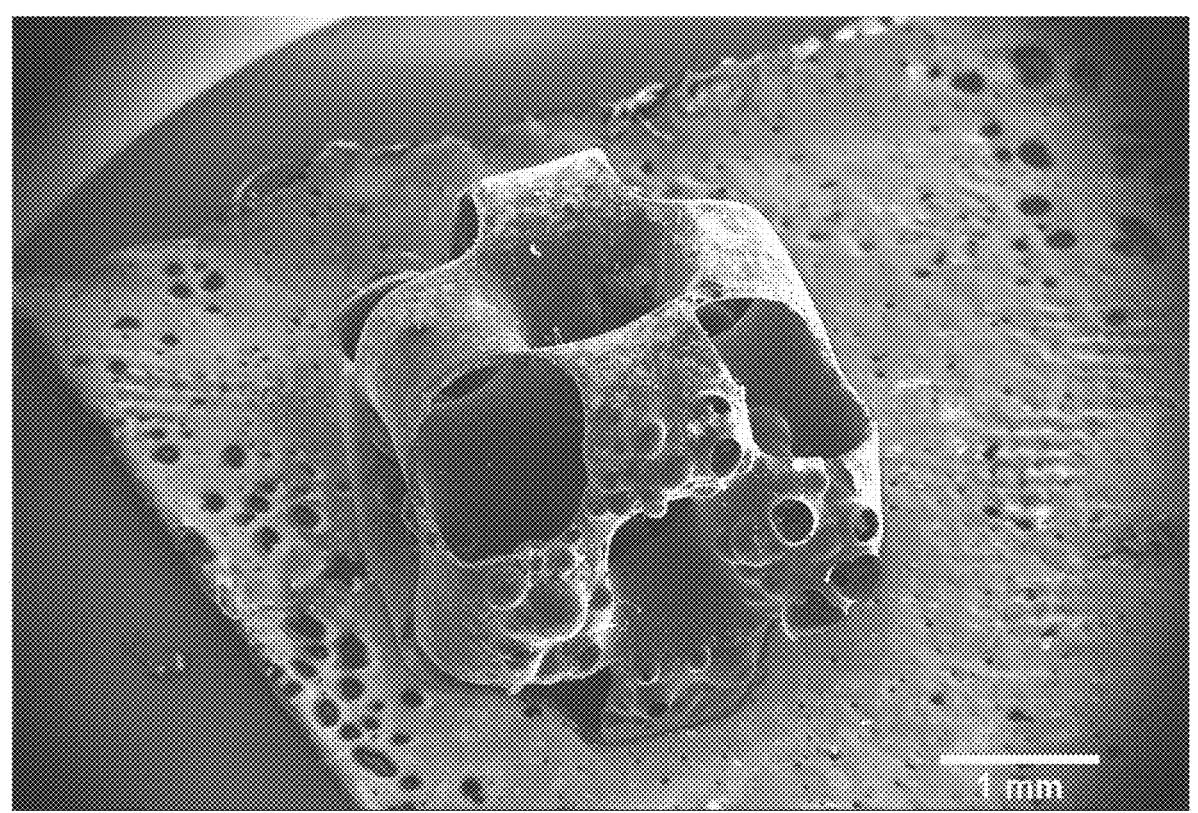
Figure 61B:
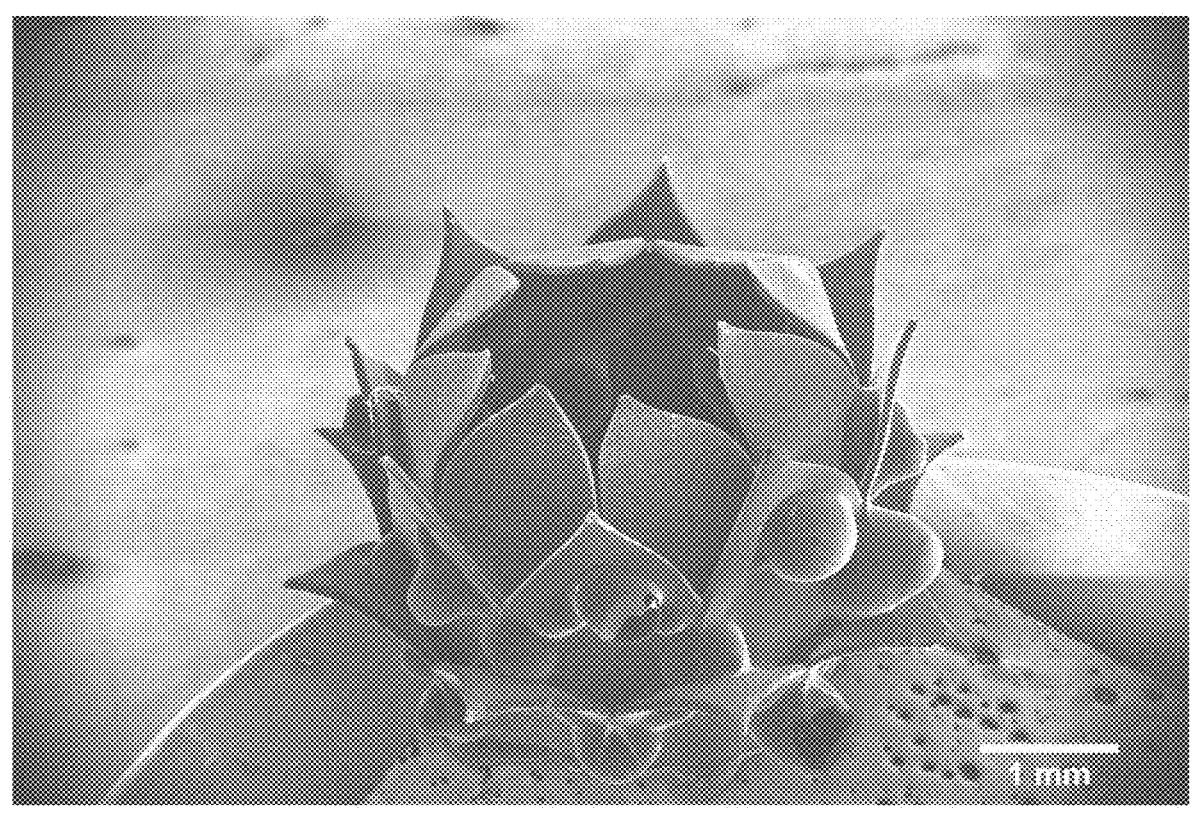

FIG. 61A and FIG. 61B. Images showing architected three-dimensional structures having node-free geometries, according to certain embodiments of the invention. Additional exemplary node-free geometries may be found in Abueidda, et al. ("Effective conductivities and elastic moduli of novel foams with triply periodic minimal surfaces", Mechanics of Materials, vol. 95, April 2016, pages 102-115), which is incorporated herein by reference.

Figures 62A, 62B, 62C, 62D, 62E, 62F:
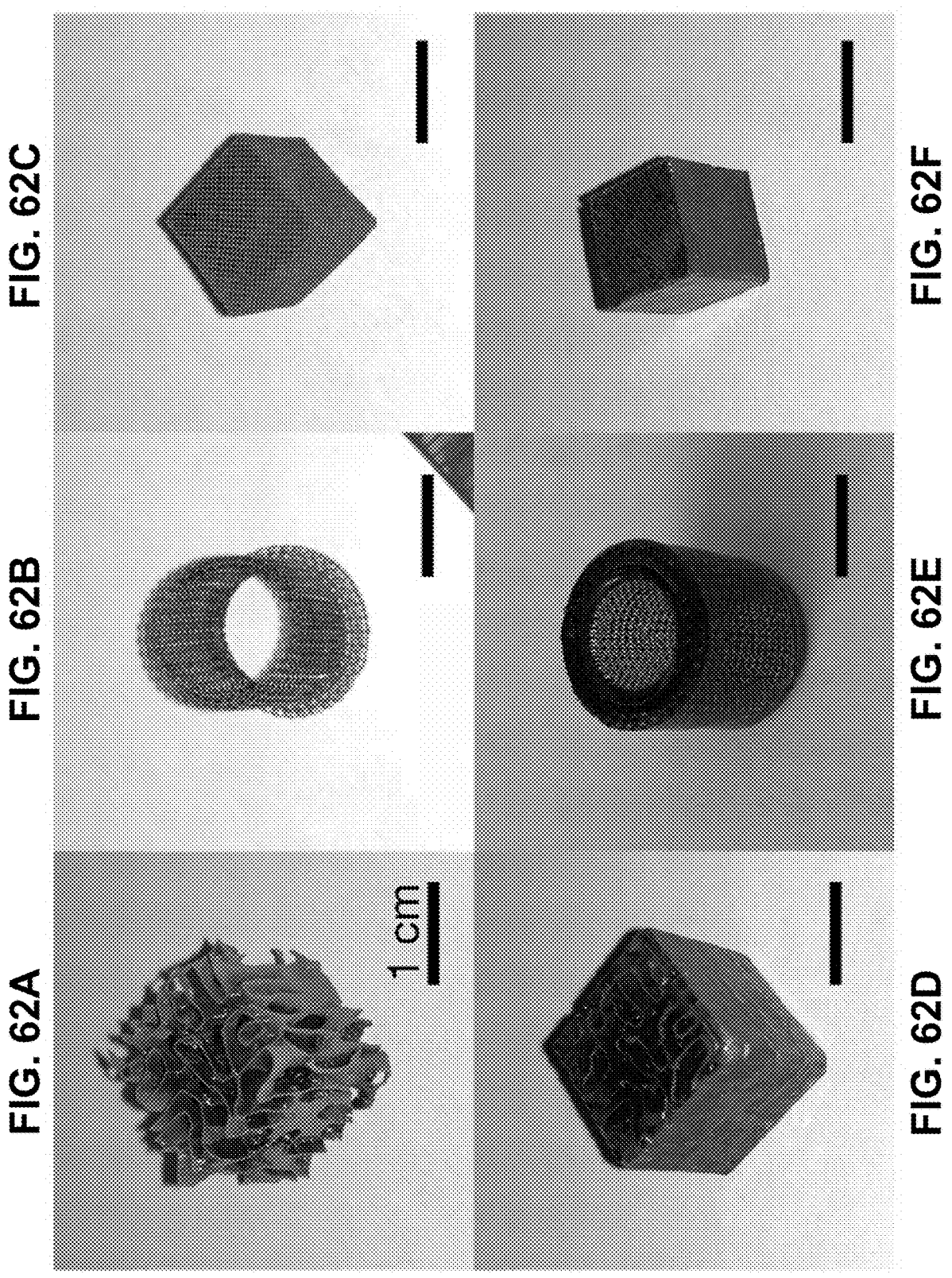

FIGS. 62A-62F. Infiltration of reinforcing phases. FIG. 62A. Shell-based spindodal reinforcing phase, (FIG. 62B) tetrakaidecahedron-tube structure, (FIG. 62C) octet-cube structure, (FIGS. 62D-62F) epoxy-infiltrated composites from the reinforcing phases depicted in FIGS. 62A-62C.

FIGS. 63A-63D. Octet carbon material in compression. FIG. 63A. Sample prior to compression, (FIG. 63B) failed sample after catastrophic event, (FIG. 63C) final geometry of a tested sample depicting fractured surfaces, (FIG. 63D) stress-strain response for two identical samples.

FIGS. 64A-64C. Octet carbon-epoxy material in compression. FIG. 64A. Sample prior to compression, (FIG. 64B) densified sample after ε=0.5, (FIG. 64C) stress-strain response of samples.

Figures 65A, 65B, 65C, 65D:
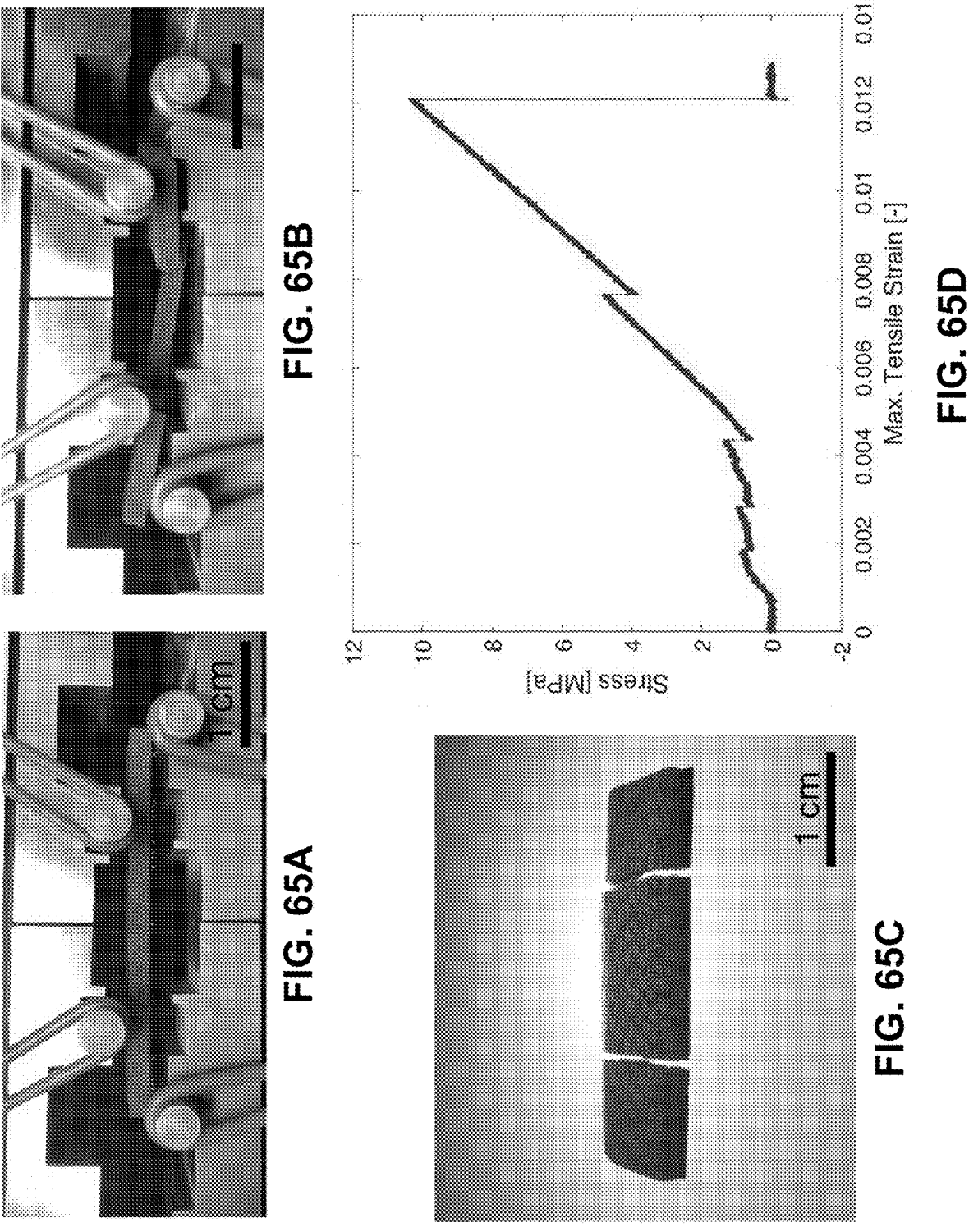

FIGS. 65A-65D. Four-point bending of carbon octet material. FIG. 65A. Sample prior to experiment, (FIG. 65B) sample after catastrophic fracture event, (FIG. 65C) final sample morphology, (FIG. 65D) resulting stress-strain response, corresponding to the outermost edge of the material.

Figures 66A, 66B, 66C, 66D:
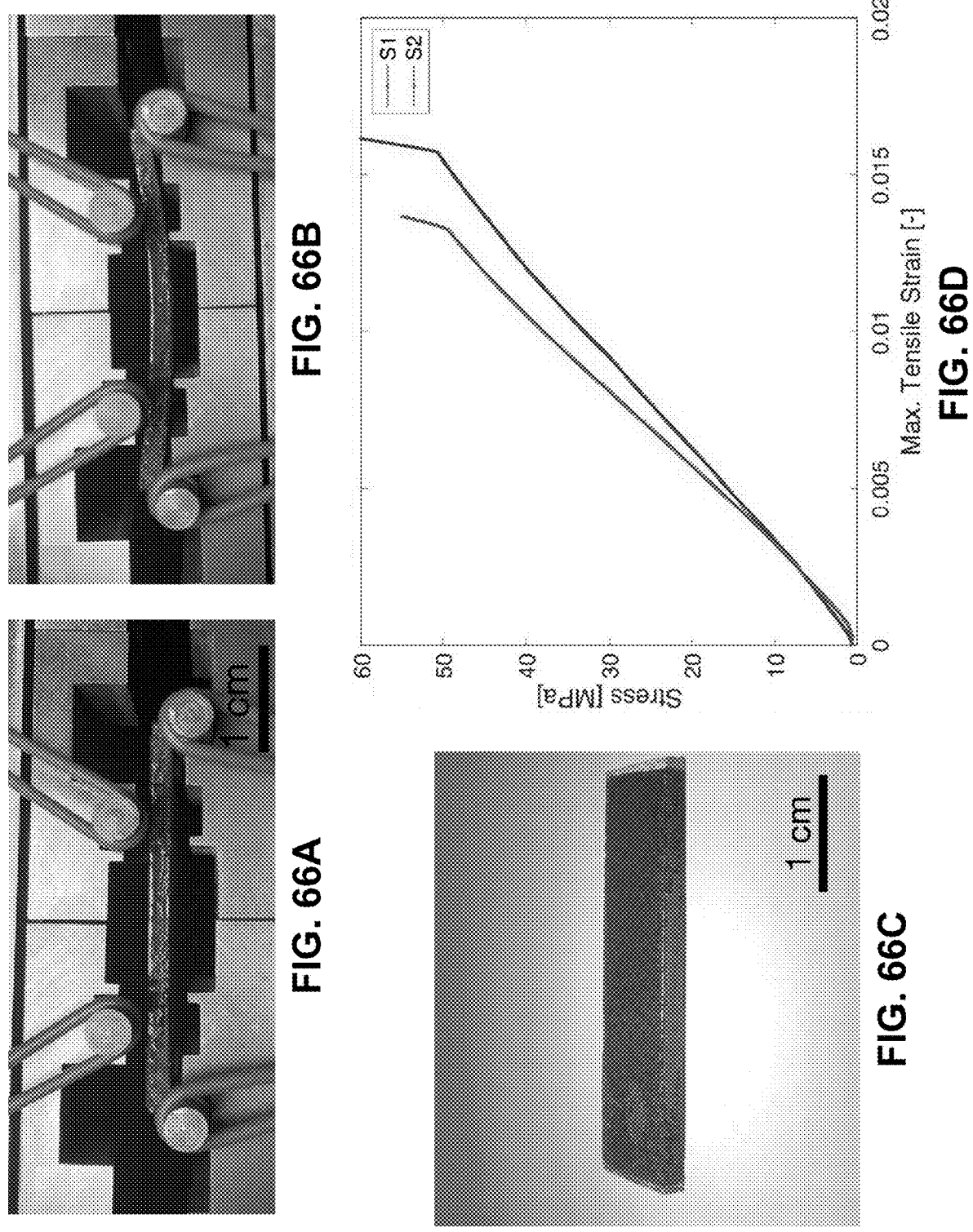

FIGS. 66A-66D. Four-point bending of epoxy-infiltrated carbon octet materials. FIG. 66A. Sample prior to experiment, (FIG. 66B) sample at highest bending load, (FIG. 66C) sample morphology after unload showing no visible damage, (FIG. 66D) resulting stress-strain response, corresponding to the outermost edge of the material.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

The term "monolithic" refers to a system, structure, geometry, or other element that is a unitary interconnected and continuous element. In an embodiment, a monolithic element is formed or composed of a material without joints or seams. In an embodiment, the term "interconnected" refers to a system, structure, geometry, or other element of which every first portion or first feature is either (i) directly connected to a second portion or second feature of the system, structure, geometry, or other element, or (ii) indirectly connected to a second portion or second feature of the system, structure, geometry, or other element via a third portion or third feature of the system, structure, geometry, or other element. In an embodiment, no portion or feature of an interconnected system, structure, geometry, or other element is fully isolated from the rest of the system, structure, geometry, or other element. In an embodiment, the term "continuous" refers to a system, structure, geometry, or other element of which every first portion or first feature is directly or indirectly bonded to, fused with, or otherwise belongs to the same uninterrupted phase with respect to a second portion or second feature of system, structure, geometry, or other element. In an embodiment, two features which are connected merely by superficial contact (e.g., touching) but are otherwise isolated with respect to each other, are not continuous. In an embodiment, two distinct features, such as fibers or particles, which are merely touching or are woven together may be interconnected but are not continuous with respect to each other. In an embodiment, a structure or geometry consisting of a plurality of features, such as fibers or particles, each of which is merely touching or woven together with another feature, such as a fiber or particle, may be an interconnected structure or geometry but is not a continuous structure or geometry.

The term "deterministic" refers a system, structure, geometry, or other element characterized by at least one feature and/or at least one property (e.g., vibrational frequency band gap) that is known and/or controlled to be within 20%, preferably within 10%, more preferably within 5%, more preferably within 1%, or more preferably within 0.1% of a determined or desired value. In an embodiment, a deterministic geometry is characterized one or more features each independently having at least one physical dimension which, prior to or during formation of said structure, is pre-determined to be within 20%, preferably within 10%, more preferably within 5%, more preferably within 1%, or more preferably within 0.1% of a determined or desired value. For example, a deterministic architected three-dimensional geometry of a structure comprises a plurality of features, such as trusses, having one or more physical dimensions (e.g., width, thickness, diameter, length) the values of which are within 20%, preferably within 10%, more preferably within 5%, more preferably within 1%, or still more preferably within 0.1% of the value(s) of the one or more physical dimensions designed, such as via a CAD technique, or determined prior to formation of the structure. Stochastic geometries or structures, such as random or natural foams, are not deterministic.

The term "architected" refers to a system, structure, geometry, or feature having features that are designed and formed according to the design. In an embodiment, an architected structure is deterministic or formed according to deterministic process(es). In an embodiment, substantially all features, and physical dimensions thereof, are designed, or pre-determined, and formed according to the design such that the substantially all features, and physical dimensions thereof, are substantially equivalent to those of the design.

The term "three dimensional geometry" refers to a geometry characterized by a three-dimensional geometric configuration. In an embodiment, a structure has a three dimensional geometry when a three-coordinate system of physical space is required to fully describe the physical dimensions of a unit cell of the structure. A three dimensional geometry may be nano-architected and/or micro-architected. In an embodiment, a structure characterized by a nano-architected three dimensional geometry is a structure characterized one or more features having at least one physical size dimension (e.g., length, width, diameter, or height) the value of which is in the range of approximately 1 nm to less than 1 μm. The one or more "features" include, but are not limited to, beams, struts, ties, trusses, sheets, shells, and nodes. In an embodiment, a structure characterized by a nano-architected three dimensional geometry is a structure characterized by a unit cell having at least one physical size dimension (e.g., length, width, or height) the value of which is in the range of approximately 1 nm to less than 1 μm. In an embodiment, a structure characterized by a micro-architected three dimensional geometry is a structure characterized one or more features having at least one physical size dimension (e.g., length, width, or height) the value of which is in the range of approximately 1 μm to 1000 μm. In an embodiment, a structure characterized by a micro-architected three dimensional geometry is a structure characterized by a unit cell having at least one physical size dimension (e.g., length, width, or height) the value of which is in the range of approximately 1 μm to 1000 μm.

As used herein, a "feature" of a system, such as a composite material system according to an embodiment, structure, or geometry, such as a three-dimensional geometry according to an embodiment, refers to an element such as, but not limited to, a beam, a strut, a tie, a truss, a sheet, a shell, a sphere, an ellipse, a node, or a combination of these. In an embodiment, a fillet, a bevel, a chamfer, or similar attribute is a portion of a feature but is not a feature itself. For example, a fillet, or rounding of an interior or exterior corner, is a portion of one or more features but is not a "feature", as used herein, itself. For example, a fillet between a first truss and a second truss is a portion of the first truss, of the second truss, or a portion of each of the first and second trusses, but the fillet is not itself a "feature", as used herein, of the three-dimensional geometry or structure. A "longitudinal feature" refers to an element whose length (or, size along its longitudinal axis) is at least 50% greater than each of its other characteristic size dimensions (i.e., width, height, thickness, or diameter). Exemplary longitudinal feature may include, but are not limited to, beams, struts, ties, and trusses. In an embodiment, a surface feature is a feature that may be better characterized as a flat and/or curved planar feature than a longitudinal feature. In an embodiment, a surface feature corresponds to a feature that may be approximated or characterized as a mathematical two-di-mensional manifold, having a uniform or non-uniform thick-ness. In an embodiment, a surface feature corresponds to a feature that may be approximated or characterized as a mathematical two-dimensional manifold, having a uniform or non-uniform thickness, and is an open surface. Exemplary surface features include, but are not limited to, sheets and shells.

A "matrix phase" refers to a material, or a combination of materials, that may at least partially infiltrate a structure of a composite material system. A matrix phase may be uni-form or non-uniform. A matrix phase may be homogeneous or non-homogeneous. At least partial infiltration of the structure refers to at least partial filling of void space of a structure. In an embodiment, at least partial infiltration of the structure refers to at least partial filling of accessible void space of a structure. Non-accessible void space of a structure may refer to closed void regions (e.g., hollow truss or hollow portion of a spinodal geometry) into a matrix phase may not penetrate without first etching or performing another destructive process on said structure. In some embodiments of the systems and methods disclosed herein, the matrix phase is not a coating, such as a coating deposited via ALD, sputtering, or electrophoretic deposition. In some embodi-ments of the systems and methods disclosed herein, the matrix phase is not an electrolyte, such as an electrolyte of an electrochemical cell, including solid-state electrolytes.

A "vibrational frequency band gap" refers to a frequency, or frequency range, corresponding to vibration (or, oscilla-tion) of a structure, composite material system, or structure thereof, where the magnitude or energy of oscillation(s) at said frequency, or said frequency range, is at least 10 times (one order-of-magnitude), at least 20 times, at least 50 times, preferably at least 100 times (two orders-of-magnitude), preferably for some applications at least 200 times, or still more preferably for some applications at least 500 times, less than the magnitude or energy of oscillations at frequen-cies outside of the "vibrational frequency band gap." In some embodiments, a vibrational frequency band gap may be characterized by a midpoint frequency and/or a frequency width. In an embodiment, a partial vibrational frequency band gap is a vibrational frequency band gap existing along one or more directions (e.g., X, Y, Z, or any direction or vector in between), but not existing along all directions. In an embodiment, a complete vibrational frequency band gap is a vibrational frequency band gap existing along all directions (e.g., X, Y, Z, or any direction or vector in between).

The term "cross-sectional physical dimension" refers to a physical dimension of a feature measured in a transverse or cross-sectional axis. In an embodiment, the transverse axis is perpendicular to a longitudinal axis of the feature. In an embodiment, a cross-sectional physical dimension corresponds to a width or a diameter of a feature such as a beam, strut, or tie. In an embodiment, a longitudinal physical dimension is a dimension of a feature along the longitudinal axis of the feature, wherein the longitudinal axis is perpen-dicular to a cross-sectional axis. Optionally, the longitudinal physical dimension is measured between two nodes. Option-ally, the longitudinal physical dimensions is measured between to physical ends of a structure.

The term "unit cell" refers to the smallest arrangement, configuration, or geometry of a plurality of features such that an entire structure, or three-dimensional geometry thereof, characterized by said unit cell can be formed by repetition of said unit cell. For example, repetition of the unit cell in three dimensions may form a three-dimensional structure. The entire structure may be a three-dimensional structure, such as a three-dimensional porous structure.

"Young's modulus" is a mechanical property of a mate-rial, device or layer which refers to the ratio of stress to strain for a given substance. Young's modulus may be provided by the expression:

$$E = \frac{(\text{stress})}{(\text{strain})} = \left(\frac{L_0}{\Delta L}\right)\left(\frac{F}{A}\right), \tag{I}$$

where E is Young's modulus, $L_0$ is the equilibrium length, $\Delta L$ is the length change under the applied stress, F is the force applied, and A is the area over which the force is applied. Young's modulus may also be expressed in terms of Lame constants via the equation:

$$E = \frac{\mu(3\lambda + 2\mu)}{\lambda + \mu}, \tag{II}$$

where $\lambda$ and $\mu$ are Lame constants. The Young's modulus may be measured according a method conventionally known, or not yet known, in the art. For example, the Young's modulus corresponds to the slope of a linear portion of a stress-strain curve as described by Roylance ("Stress-Strain Curves," MIT course, Aug. 23, 2001; accessed at time of filing at http://web.mit.edu/course/3/3.11/www/modules/ss.pdf).

The term "average," when used in reference to a material or structure property, refers to a calculated arithmetic mean of at least two, or preferably at least three, identical mea-surements or calculations of said property. For example, an average density of a structure is the arithmetic mean of at least two measurements performed identically, of the density of said structure.

The term "density" refers to volumetric mass density. Density is represented in units of mass-per-volume (e.g., $g/cm^3$). When referring to a material, the term density corresponds to the volumetric mass density of the material. When referring to a structure, the term density corresponds to the volumetric mass density of the structure, which is a function of the geometric configuration (geometry) of the structure as well as a function of the material(s) of which the structure is formed, such that an increase in porosity of said structure corresponds to a decrease in density of said struc-ture. The density of a structure, such as a structure having a three-dimensional geometry according to an embodiment of the invention, may be measured according a method con-ventionally known, or not yet known, in the art. For example, the density of a structure may be determined by determining mass, height, and diameter for a disk-shape sample, and then calculating the determined mass divided by volume for the sample, with assuming the sample is substantially a complete circle.

The term "relative density" refers to a volume fraction of solid material in a composite material system, structure, or feature. In an embodiment, a relative density corresponds to a ratio of density of a structure to density solid material (or the combination of materials), of which the structure is composed. Relative density may be represented as a fraction (the ratio of densities) or as a percentage (the ratio of densities×100%). In an embodiment, relative density of a structure, or a three-dimensional geometry thereof, before pyrolysis is substantially the same to that after pyrolysis.

The term "specific strength" refers to a ratio of strength to density of a material, system, structure, or feature where strength refers to force per unit area at the point of failure of the material, element, or structure. Specific strength may also be referred to as strength-to-weight ratio. In an embodiment, "strength" refers to compressive strength. In an embodiment, "strength" refers to tensile strength. In an embodiment, compressive strength is the maximum stress a material can sustain under crush loading. In an embodiment, compressive strength of a material, structure, or element that fails by shattering fracture can be defined within fairly narrow limits as an independent property. In an embodiment, the compressive strength of a material, structure, or element that does not shatter in compression is the amount of stress required to distort the material an arbitrary amount. In an embodiment, compressive strength of a material, structure, system, feature, or element that does not shatter in compression can be calculated as the stress at a 0.2% strain offset from the linear portion in a stress-strain curve. In an embodiment, compressive strength is calculated by dividing the maximum load, on the material, structure, or element, by the original cross-sectional area of the material, structure, or element being examined.

The term "stiffness" refers to an extent to which a material, structure, system, or feature resists deformation in response to an applied force. Stiffness corresponds to a ratio of force applied to a material, structure, or element versus the displacement produced by the applied force along the same degree of freedom (e.g., same axis or direction) exhibited by the material, structure, or element. The term "specific stiffness" refers to a ratio of stiffness to density of the material, element, or structure. In an embodiment, the stiffness of a material, structure, or element is the Young's modulus of the material, structure, or element.

According to certain embodiments, a structure has a node-free geometry (i.e., free of node features). The node-free geometry has exceptional mechanical resilience. Mechanical resilience may be understood, for example, in terms of strain-to-failure and strength-to-failure. In an embodiment, strength-to-failure of a material, element, or structure corresponds to compressive strength of the material, element, or structure. In an embodiment, a structure of the invention has a strain-to-failure of 2% to 5%, optionally 2.9% to 3.5%. Strain-to-failure may be determined according a method conventionally known, or not yet known, in the art. For example, strain-to-failure may be determined from the strain value corresponding a linear portion, such as the third linear portion, of stress vs. strain data until sudden stress loss (fracture) of a structure.

The term "additive manufacture" refers to a process for forming a structure or feature via deposition, or otherwise building up, of a material. The terms "additive manufacture process" and "additive manufacturing process" may be used interchangeably. An additive manufacture process may involve layer-by-layer deposition of a material to form a complex three-dimensional structure or element. The deposited material may include, but is not limited to, inorganic materials, hybrid organic-inorganic materials, polymers, metals, or combinations of these. Exemplary additive manufacture processes include, but are not limited to, 3D printing, stereolithography (SLA), fused deposit modeling (FDM), and 2-photon lithography. In some embodiments, an additive manufacture process does not require a subtractive manufacture to form the structure or element. Examples of subtractive manufacture processes include, but are not limited to, milling, machining, electron discharge machining, carving, shaping, grinding, drilling, and etching. In an embodiment, an additive manufacture process involves or is aided by computer-aided design (CAD).

In an embodiment, the term "defect" may refers to a fabrication-induced imperfection, or unintended feature or property, such as, but not limited to, local deformation, crack, beam junction offset, beam bulging, curvature of a strut, and pit or void.

The term "node" may refer to a junction or intersection of a plurality of features, such as beams or struts. A structure may have a three-dimensional geometry that is a node-free geometry.

The term "core," when referring to a feature of a structure having a three-dimensional geometry, according to an embodiment, refers to an inner volume of the feature up to and excluding the external surface of the feature. In an embodiment, the core of a feature corresponds to the feature's internal volume excluding that of any coatings, particularly coatings introduced after a pyrolysis process, present thereon.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

The term "substantially" refers to a property that is within 10%, within 5%, within 1%, or is equivalent to a reference property. The term "substantially equal", "substantially equivalent", or "substantially unchanged", when used in conjunction with a reference value describing a property or condition, refers to a value that is within 10%, optionally within 5%, optionally within 1%, optionally within 0.1%, or optionally is equivalent to the provided reference value. For example, a ratio is substantially equal to 1 if it the value of the ratio is within 10%, optionally within 5%, optionally within 1%, or optionally equal to 1. The term "substantially greater", when used in conjunction with a reference value describing a property or condition, refers to a value that is at least 2%, optionally at least 5%, or optionally at least 10% greater than the provided reference value. The term "substantially less", when used in conjunction with a reference value describing a property or condition, refers to a value that is at least 2%, optionally at least 5%, or optionally at least 10% less than the provided reference value.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

In an embodiment, the term "mitigated energy" or "energy mitigated" refers to the energy that is redirected from a composite system, structure, feature, or material and does not cause failure of the composite system, structure, feature, or material (e.g., the energy of a particle before impact plus the energy of the particle after only if the velocity vector is different than the initial one). In an embodiment, the term "impact energy" refers to energy of an impactor before impact. In an embodiment, the term "energy absorbed" or "absorbed energy" refers to a difference between the impact energy and the rebound energy of an impactor (e.g., a particle). In an embodiment, the term "specific energy absorption" refers to the ratio of strain energy density (W, defined as $W=\int\sigma d\varepsilon$) to the material density ($\rho$). In an embodiment, the term "specific energy absorption" refers to the ratio of strain energy density (W, defined as $W=\int\sigma d\varepsilon$) to a composite system, structure, material, or feature density ($\rho$).

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

In an embodiment, a composite material system has at least one monolithic structure (or, "reinforcing phase") with a three-dimensional geometry where the centerline of a truss element does not extend from an edge through the entirety of the material (as opposed to a waveguide process), but instead can initiate and terminate at arbitrary points within the material. In the same fashion, the centerline of truss elements can be placed in any orientation within the material—including perpendicular to the thickness direction—as opposed to waveguide processes where this is not possible. Similarly, a given truss element can have arbitrary cross-section, which can also change throughout the truss element. Lastly, the centerline of a given truss element is allowed to have non-zero curvature. One or more matrix phases fill the volume around the reinforcing phase(s). The phases can be composed of different material classes, including but not limited to, polymer, ceramic, carbon, and metal.

In an embodiment, the composite material system has a continuous reinforcing phase with a three-dimensional shell or surface geometry, with negative, zero, or positive Gaussian curvature. The walls or membranes of the shell geometry can have varying thickness throughout the material. The surface geometry can conform enclosed cavities that are separated from an external matrix phase. One or more matrix phases fill the volume around the reinforcing phase(s). The phases can be composed of different material classes, including but not limited to, polymer, ceramic, carbon, and metal.

In an embodiment, a modular three-dimensional structural element of an arbitrary shape is made of the composite material described in previous embodiments. The reinforcing phase of the material will have the geometry of the ultimate structural component, as a continuous phase. The topology of the structural element can have zero or multiple holes (i.e., monolithic composite component or tubular component, respectively). The resulting holes can be infiltrated with a different matrix phase or left unaltered.

In an embodiment, a structural component of an arbitrary shape is made of the composite material described in previous embodiments, with functionally graded geometry of one or more of the phases. The continuous lattice architectures or surfaces of the reinforcing phase(s) can change through-thickness and in-plane, while remaining continuous. The cross-sections and thicknesses can also change without affecting the continuity of the phases.

In an embodiment, the microstructure of the continuous reinforcing phase of the composite material presented in previous embodiments can have features that serve as resonators and provide damping to the material. The resonators could be surrounded by or isolated by a matrix phase.

A method of making a three-dimensional composite material system with arbitrary architecture may include designing an arbitrary architecture (which can be periodic) through Computer Aided Design (CAD) tools, selecting a desired precursor resin, and exposing the resin to the desired layer-by-layer pattern characteristic of additive manufacturing technologies including but not limited to SLA and DLP. Optionally, additional resin is then removed and the sample is post-cured with UV and heat treatments, followed by a pyrolysis process with specified temperature profile and in a controlled environment. The structure is then infiltrated with one or more materials, aided by vacuum and sonication processes, ultimately forming the composite material with continuous and arbitrarily shaped phases.

The composite material systems disclosed herein provide an improvement from typical carbon fiber composite materials in that the weak interlaminar interfaces are eliminated, resulting in superior material response under bending and compression. Having fully interconnected reinforcing phases may also provide benefits for impact absorption applications, in which the in-plane properties of a thin material can determine the degree of damage. Additionally, the method presented above provides a clear advantage in manufacturing structural components by avoiding any shaping processes but instead fabricating the reinforcing phase in the final desired geometry.

The following is a description of exemplary, illustrative, embodiments of the composite material systems and methods disclosed herein.

Figure 1:
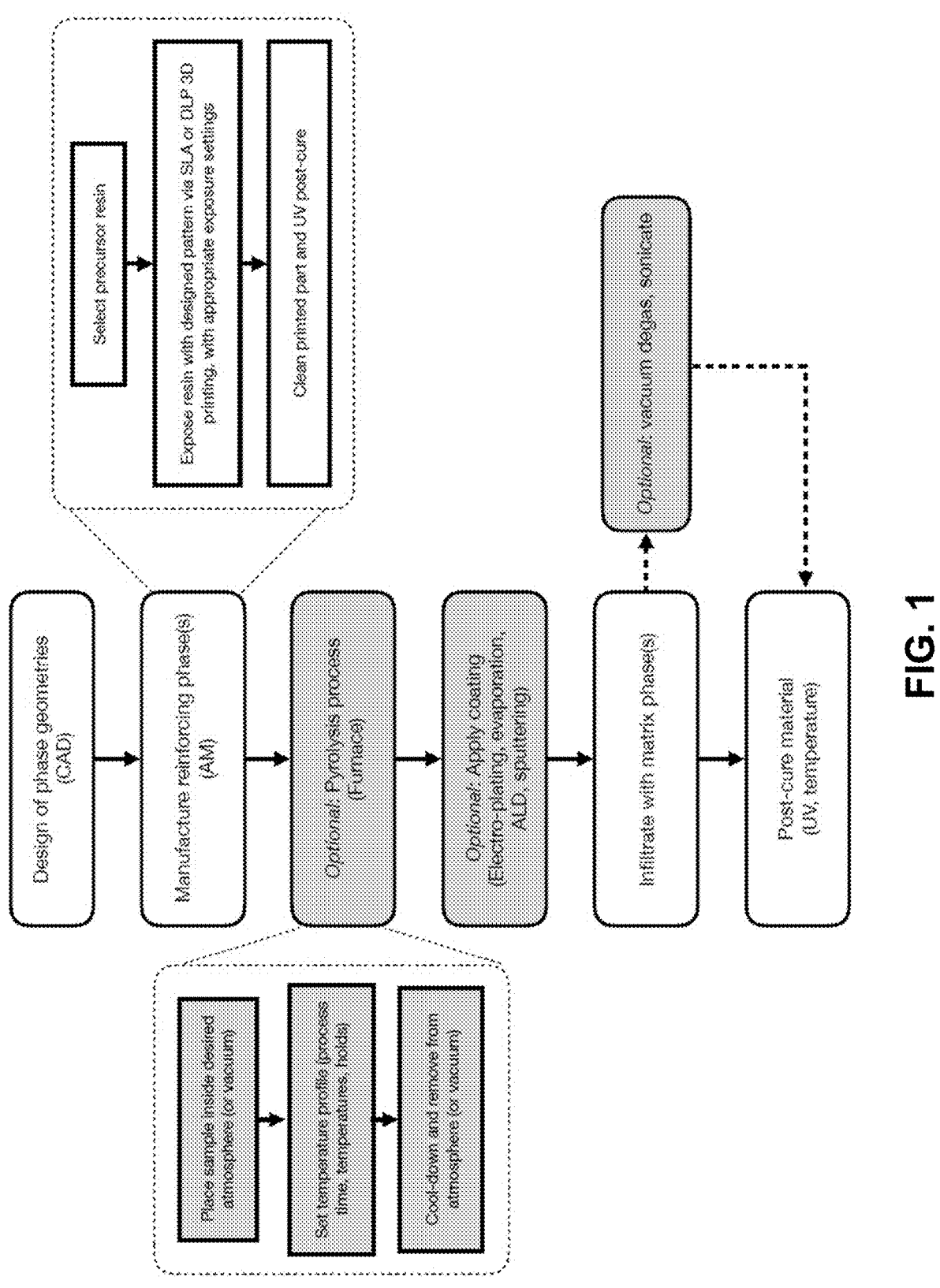
FIG. 1. Flowchart of method to fabricate composite materials with continuous arbitrary phases.

The fabrication process embodied by FIG. 1 begins with the design of one or more geometries that will serve as the reinforcing phase of the composite material. The precursor resin may determine the constitutive properties of the resulting reinforcing phase, while the architecture will determine the structural response (i.e., stretching or bending dominated). The structure is fabricated using additive manufacturing technologies such as Stereolithography (SLA) or Digital Light Processing (DLP) 3D printing, which allows arbitrary, continuous geometries to be made. The printed structure may then be placed in a furnace to undergo a pyrolysis process in vacuum or inert atmospheres. The resulting reinforcing phase can be a carbon or ceramic material. An optional coating process could be done prior to infiltrating the resulting reinforcing phase with a selected matrix phase. During the infiltration step, additional processes such as vacuum degassing or sonicating can help ensure complete infiltration of the matrix phase. Lastly, the resulting composite can be post-cured through UV or heating processes.

Figures 2A, 2B:
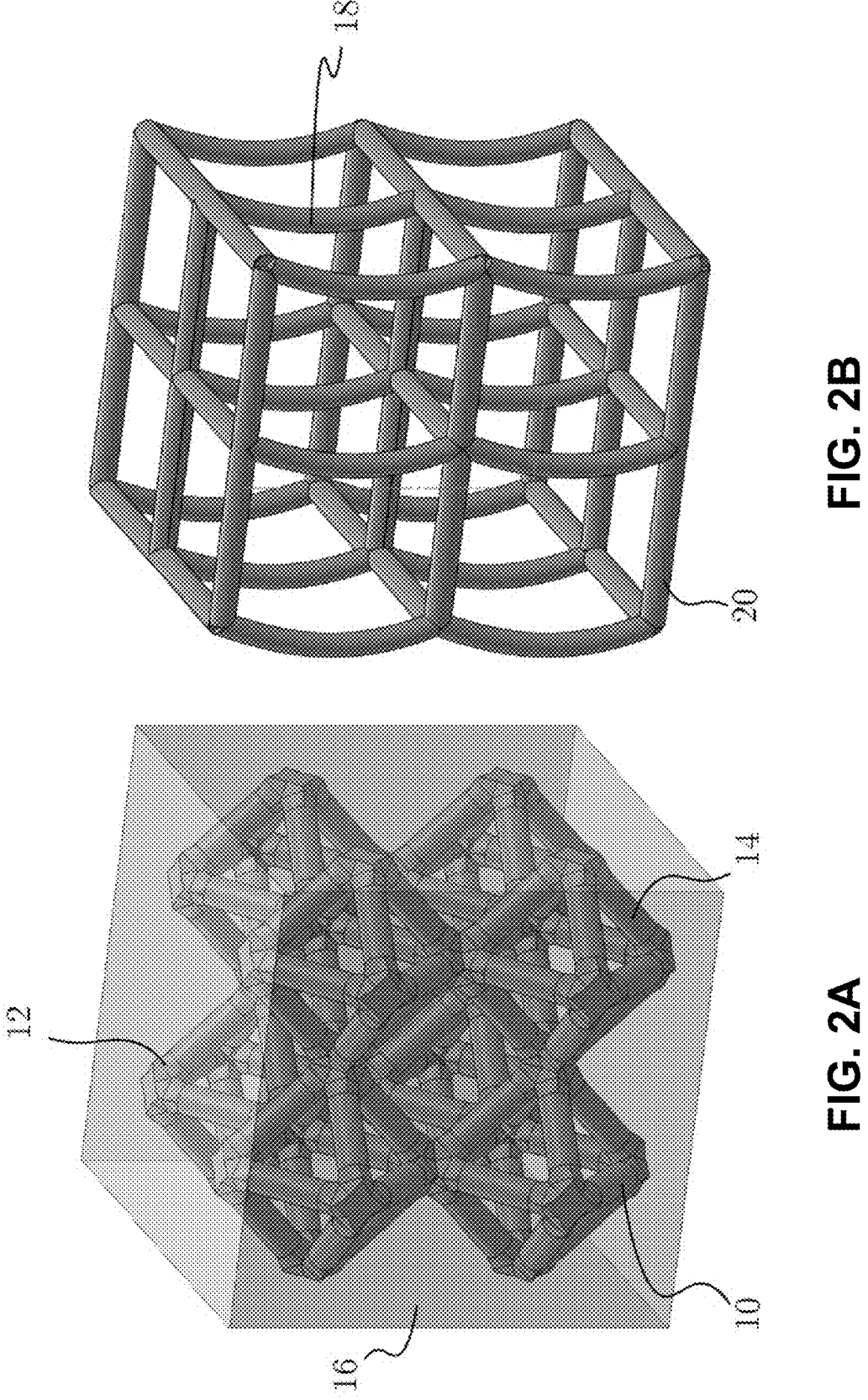
FIGS. 2A-2B. Embodiment of a composite material with continuous three-dimensional phases with arbitrary geometries.

In an embodiment presented in FIG. 2A, a subset of a carbon reinforcing phase 10 made through the process described above is embedded in an epoxy matrix 16. In this case, a stretching-dominated architecture was chosen due to its high stiffness-to-density ratio—unattainable by the bending-dominated architectures achievable via polymer waveguide patterns. A given truss element in this structure also has a variable cross-section, reinforcing the lattice nodes 12 and increasing the stiffness compared to a constant cross-section structure. In this particular geometry, truss elements 14 can initiate and terminate at any point within the material, not necessarily at an edge, as required by waveguide processes. A modification of this embodiment is shown in FIG. 2B, where a given truss element is allowed to have non-zero curvature 18, and truss elements can be oriented perpendicular to the thickness direction 20.

Figure 3:
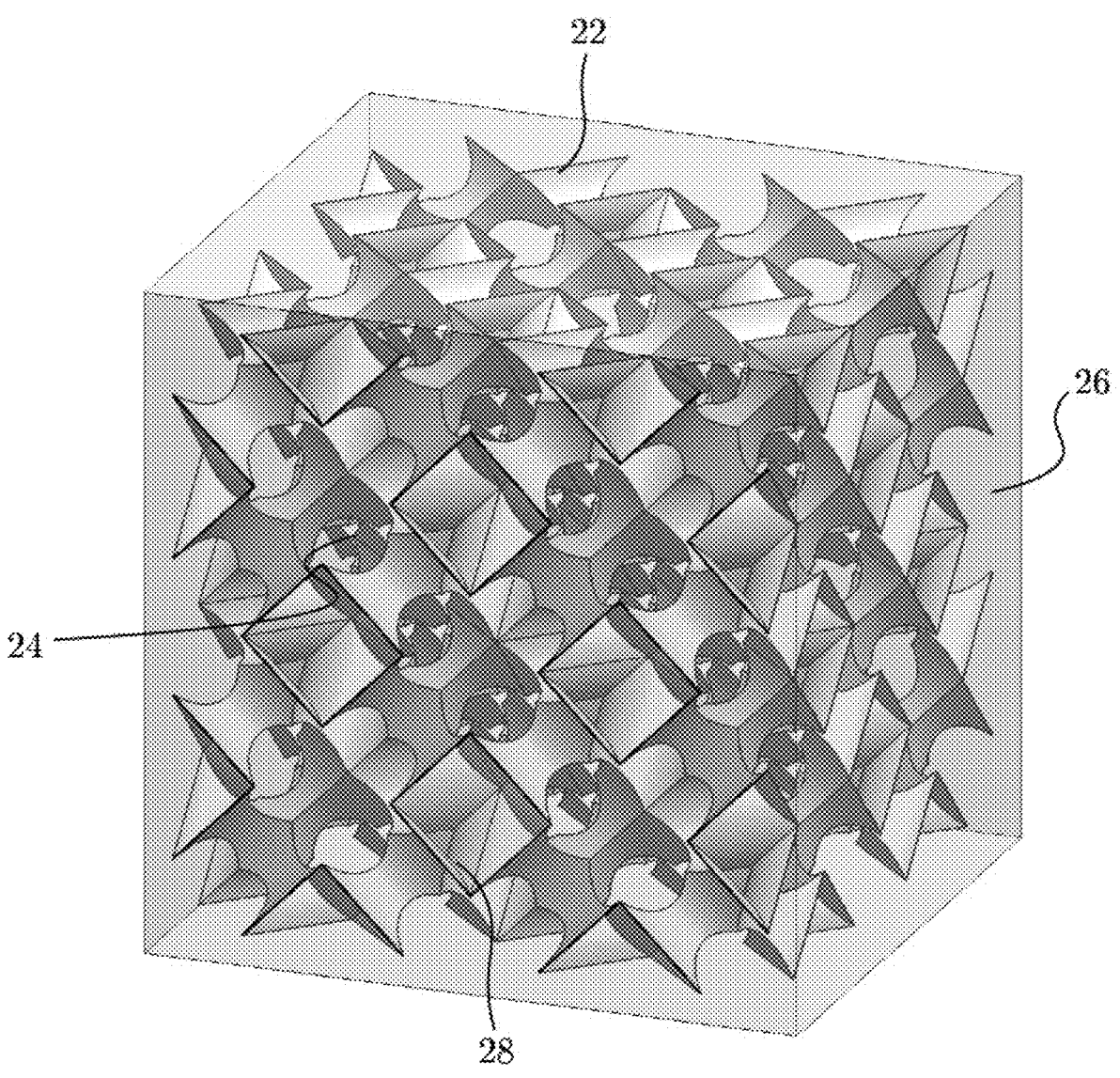
FIG. 3. Embodiment of a composite material with continuous three-dimensional phases of shell or surface geometries, with one or more matrix phases.

An embodiment presented in FIG. 3 shows a subset of a continuous 3D carbon phase made of shells or surfaces 22, which is infiltrated by an epoxy matrix phase 26. The surfaces in the reinforcing phase can have a non-zero Gaussian curvature, which cannot be attained through waveguide processes. This geometry was achieved by using the surfaces of an octet-truss structure. In this geometry, isolated regions 28 can be fabricated to prevent infiltration from the matrix phase 26, constituting a gaseous phase. Lastly, the thickness of the surfaces in this structure are designed to be non-constant 24, which is not possible through waveguide processes.

Figure 4:
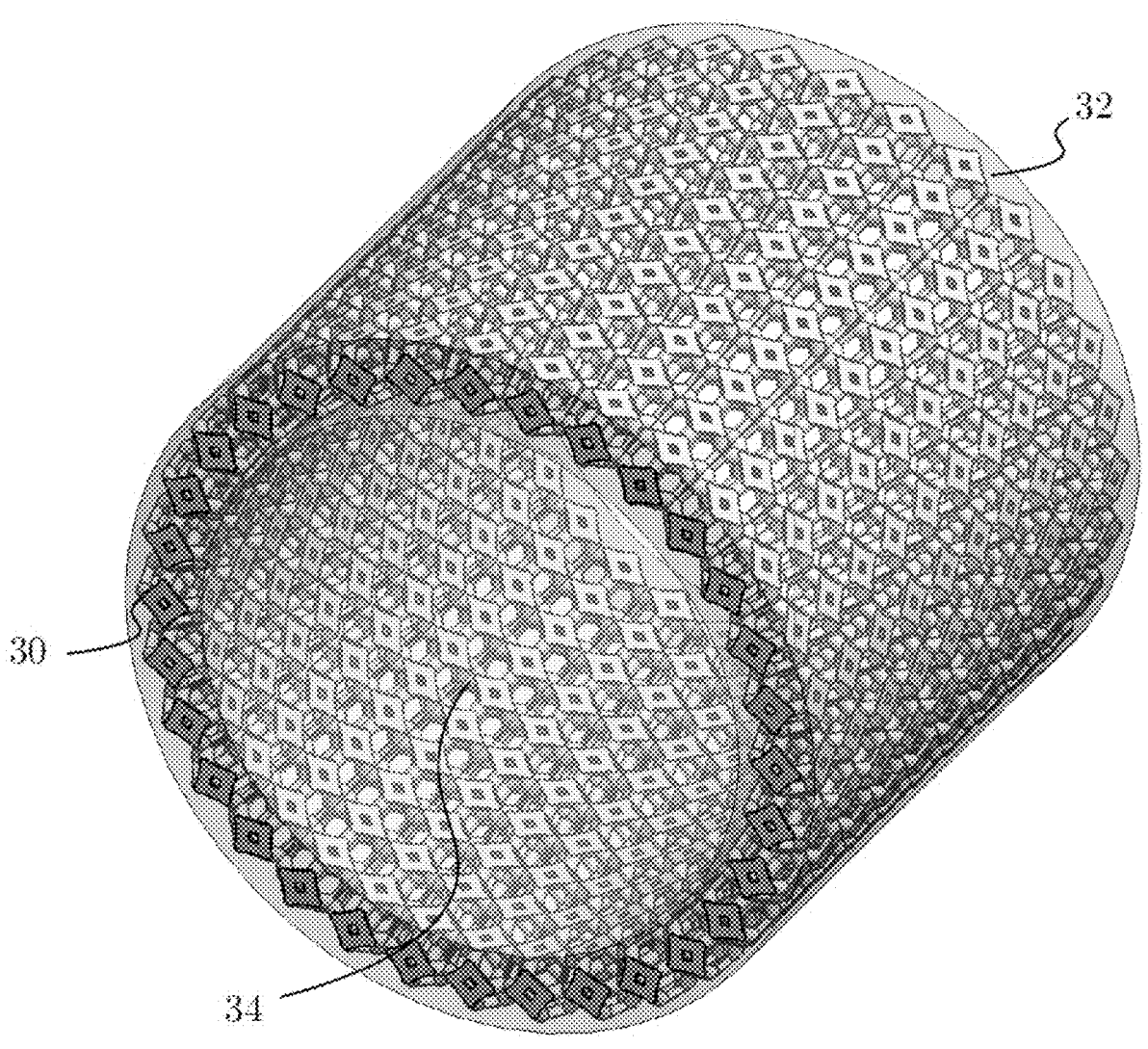
FIG. 4. Embodiment of a modular three-dimensional structural element made a composite material described in the previous embodiments. The reinforcing phase does not require a shaping process; the geometry is defined a priori.

Another embodiment, presented in FIG. 4, shows a modular structural element made of a composite material as described in previous embodiments. Unlike typical fiber-based composite materials, the reinforcing phase 30 is designed to have the same shape as the structural component (e.g., a tube), requiring no additional shaping processes. In this case, a bending-dominated architecture was chosen to add compliance and increase the energy absorption capability of the part. The structural component has a primary matrix phase 32, while the inner volume of the tube can be left empty or it can be filled with a secondary matrix phase 34.

Figures 5A, 5B:
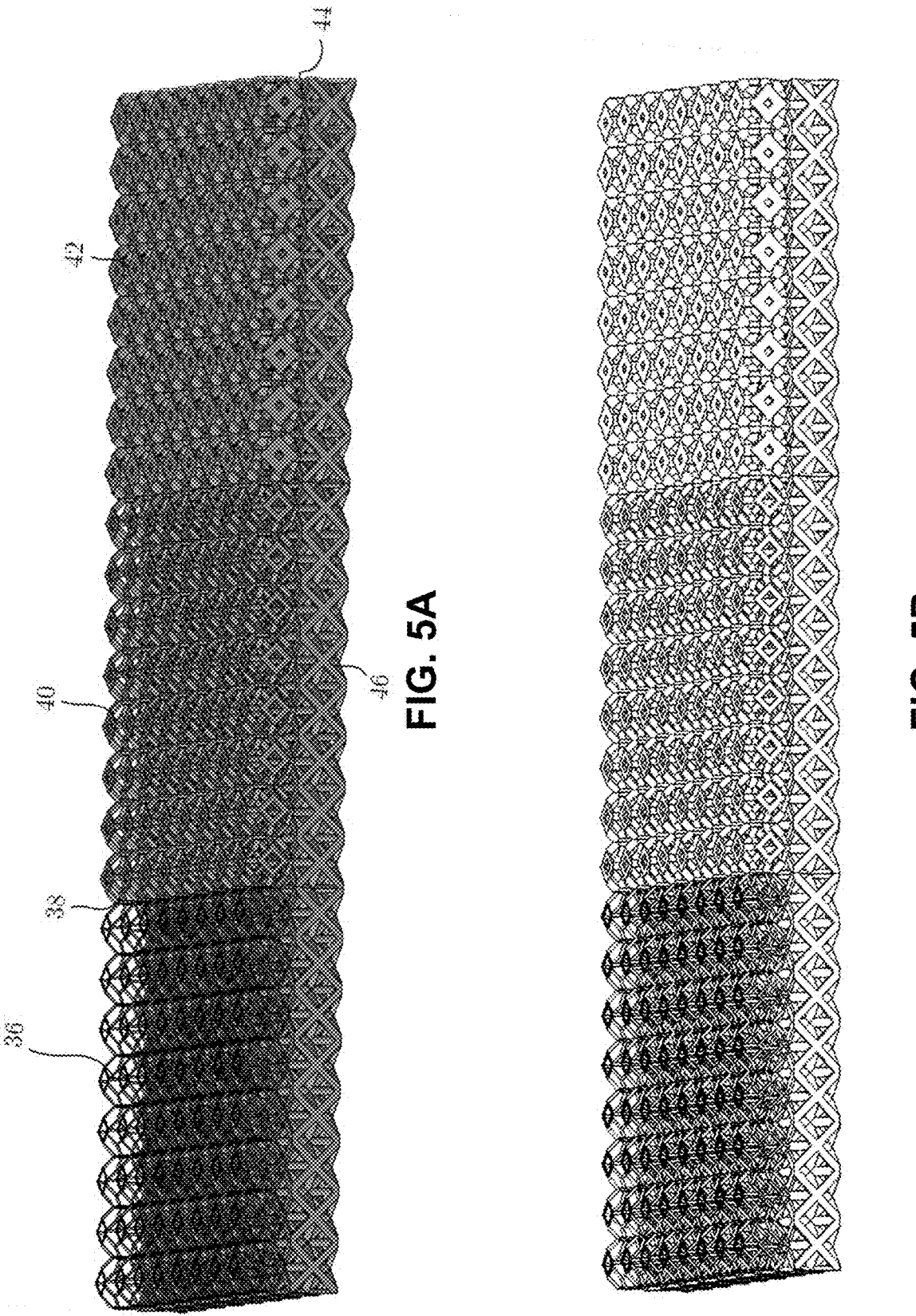
FIGS. 5A-5B. Embodiment of a structural element made of a composite material described in the previous embodiments, where the in-plane and through-thickness geometries are functionally graded. The resulting part has continuous three-dimensional phases.

FIGS. 5A-5B present an embodiment in which functional grading of a structural component (made from a composite material as described in previous embodiments) is achieved. The structural part has one continuous reinforcing phase with several different geometries 36, 40, 42, and 46. A bending-dominated tetrakaidecahedron architecture is used for the top region, in which the cross-sectional area of the elliptical truss elements increases from 36 to 40 to 42. The domain transition 38 from region 36 to region 40 is continuous, and the connectivity is unaltered (i.e., truss elements do not end abruptly—as is the case with some functional grading attained through waveguide processes). The bottom region 46 consists of a stretching-dominated octet-truss architecture with circular cross-section truss elements and continuous transition 44 to the top region.

Figure 6:
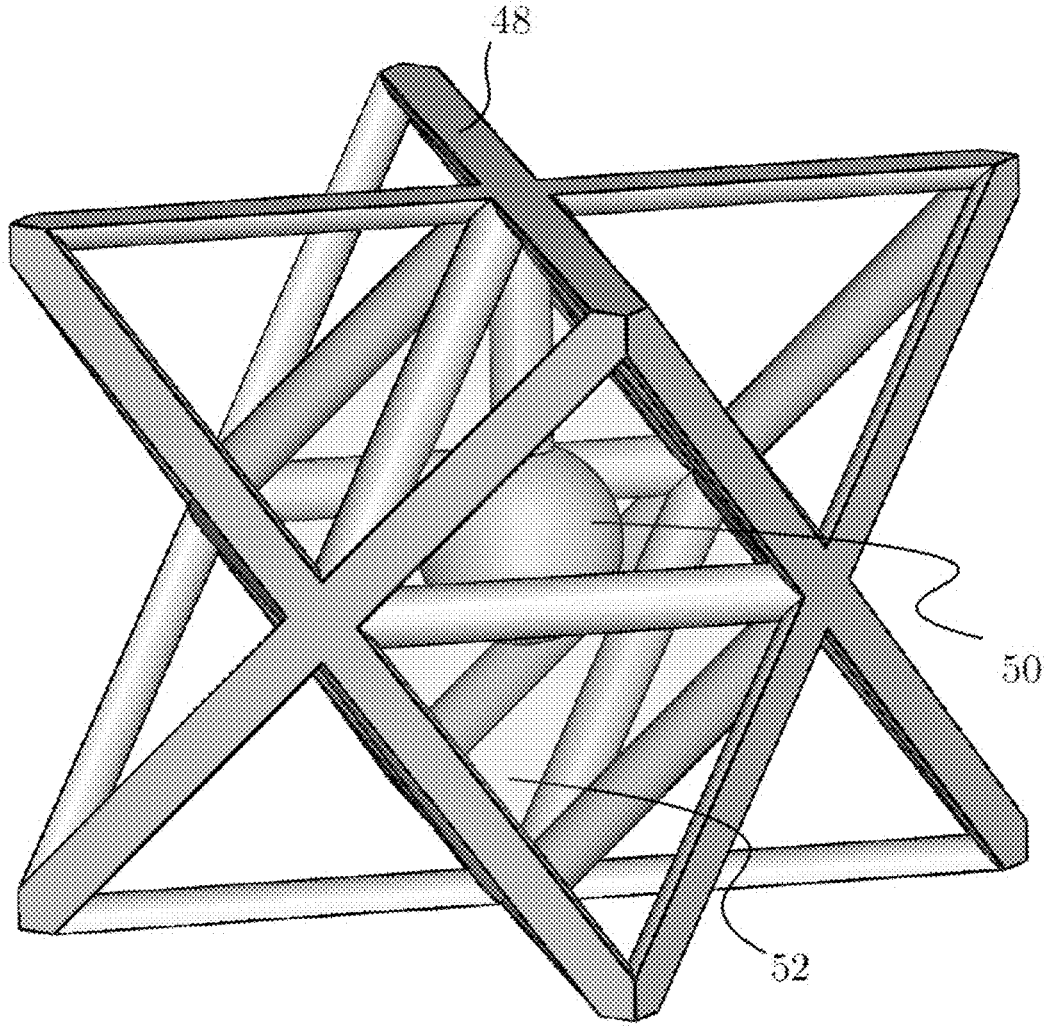
FIG. 6. Embodiment of a phase microarchitecture where resonators are designed to dissipate vibration and provide damping to the material. The resulting part has continuous three-dimensional phases.

In one embodiment a stiff and damping composite material is made through the design of resonators in the microstructure of the phases, as shown in FIG. 6. The unit cell 48 is made of an octet-truss architecture with a resonator 50 inside the unit cell. The resonator consists of a cantilever beam with added micro-inertia at the free end, which is tuned to resonate at a given frequency ω, determined by the length of the beam and the amount of micro-inertia at the free end. The unit cell can be made with a combination of truss elements and shells, which can isolate the resonator from the primary matrix that infiltrates the reinforcing unit cell 48. If shells are present, the inner volume of the octahedron within the octet 52 can be left empty to allow free vibration of the resonator, allowing damping properties in an otherwise stiff material.

Figures 7A, 7B, 7C:
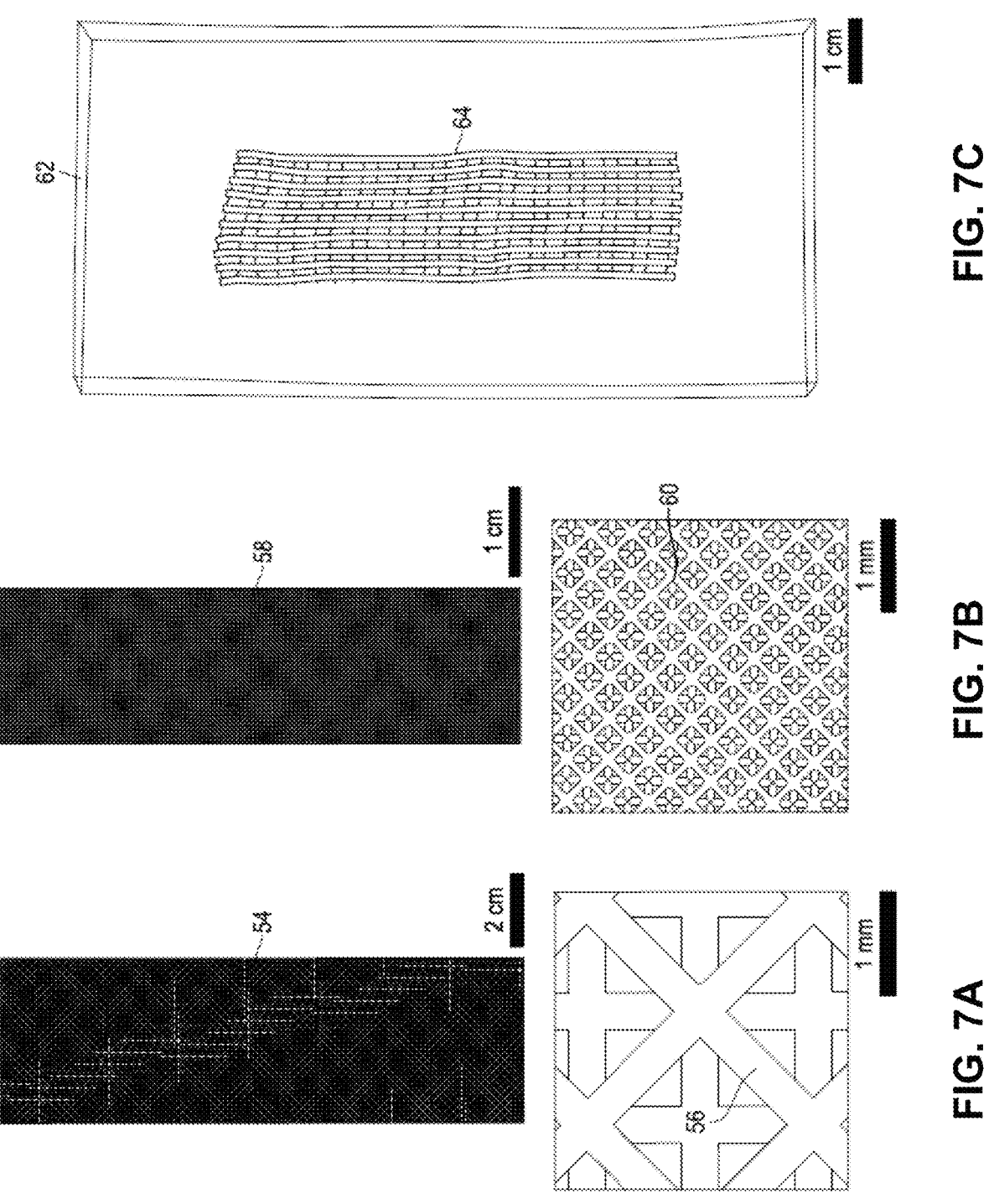
FIGS. 7A-7C. Sample embodiment of a composite material with continuous three-dimensional phases with arbitrary geometries, reduced to practice.

An embodiment which has been reduced to practice is depicted in FIGS. 7A-7C. In this embodiment, a sheet with a three-dimensional continuous octet-truss architecture 54, of overall dimensions 12.5×4×0.13 cm, is fabricated via DLP 3D printing using an Autodesk Ember printer and the PR-48 resin. The unit cell size in the resin structure 56 is ~1.3 mm, with circular cross-section truss elements. The resin structure is then pyrolyzed in a furnace in an inert atmosphere at a peak temperature of 1000° C. The resulting carbon structure 58 undergoes isotropic shrinkage to 40% of the original volume, with only 7% of the original mass. The resulting carbon unit cells 60 maintain the original octet-truss geometry and a characteristic size of ~500 μm. The carbon structure is then infiltrated by an epoxy matrix phase 62, becoming the reinforcing phase 64 of the composite structural sheet.

Figure 8:
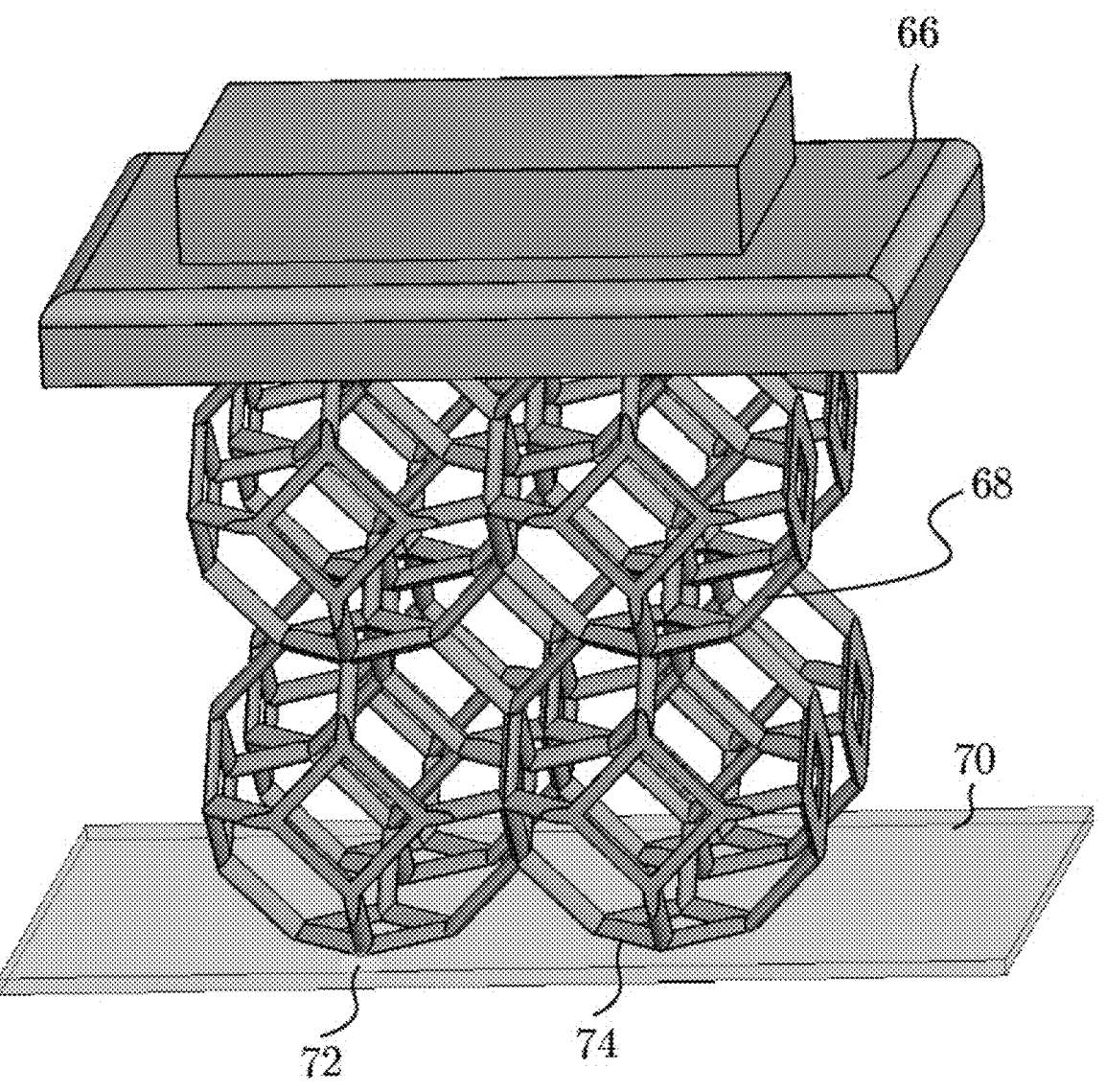
FIG. 8. Manufacturing process of continuous reinforcing phase with arbitrary geometry via additive manufacturing.
Figure 9A:
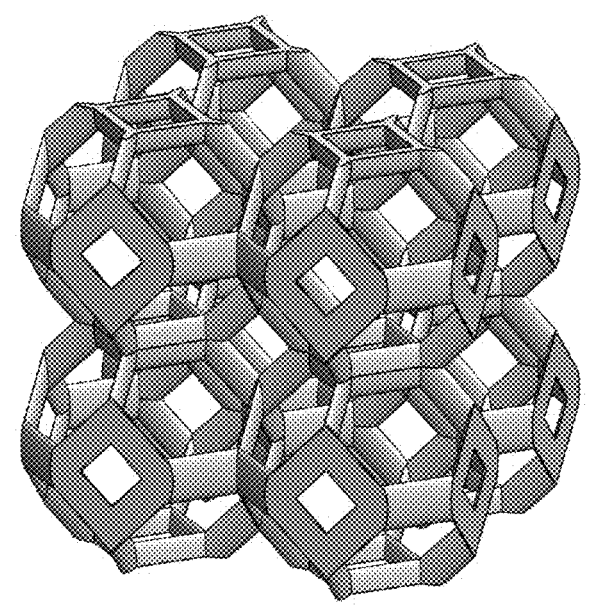
FIGS. 9A-9B. A schematic of a structure with a three-dimensional geometry, or unit cell thereof, that is a tetrakaidekahedron (FIG. 9A), and a composite material system (FIG. 9B) having the structure of FIG. 9A infiltrated by a matrix phase.
Figure 9B:
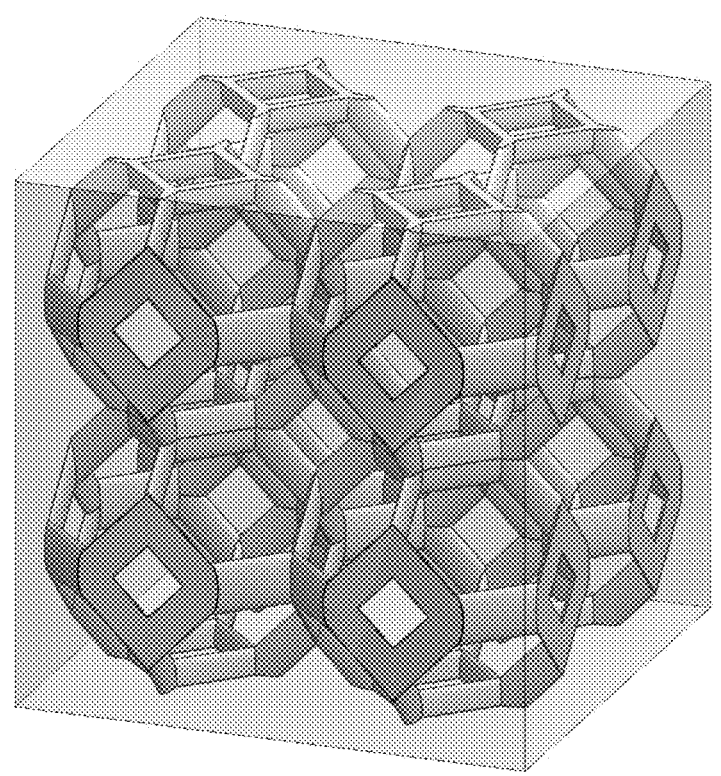

FIG. 8 depicts one possible method of manufacturing the reinforcing phase of the composite material described in previous embodiments via DLP or SLA 3D printing. A printer head 66 is bonded to the edge of the reinforcing phase, and pulls the structure vertically during the printing process. The print screen 70 has a layer of uncured precursor resin which polymerizes as an arbitrary exposure pattern 72 is projected from below. Note that this allows truss elements 68 with arbitrary cross-sections which commence and terminate away from the edges of the structure, in addition to truss elements which are perpendicular 74 to the build direction.

In general, certain illustrative embodiments of a composite material system with three-dimensional, arbitrarily architected, fully interconnected phases and a method of making the same are presented. Certain embodiments in which the reinforcing phase is fully interconnected and made up of truss elements with varying cross-sections and non-zero curvatures—infiltrated by a continuous matrix phase—are described. Interconnected three-dimensional reinforcing phases with shells of non-zero curvature and varying thickness are made possible through these composite material systems. Modular structural parts made of the composite material described above, with functionally graded continuous phases, are presented in some embodiments. In addition, certain embodiments present enhanced vibrational damping in the composite material through the design of resonators in the microstructure, without the need of dissipative viscoelastic phases that affect the material's stiffness.

REFERENCES CORRESPONDING TO THE
BACKGROUND AND DESCRIPTION

[1] Z. Hashin, "Analysis of Composite MaterialsA Survey," Journal of Applied Mechanics, vol. 50, no. 3, p. 481, 1983. [Online]. Available: http://appliedmechanics.asme-digitalcollection.asme.org/article.aspx?arti-cleid=1407040

[2] I. Daniel and O. Ishai, Engineering Mechanics of Composite Materials. Oxford University Press, 2006.

[3] T. Ishikawa and T.-w. Chou, "Elastic Behavior of Woven Hybrid Composites," Journal of Composite Materials, vol. 16, no. 1, pp. 2-19, 1982. [Online]. Available: http://journals.sagepub.com/doi/10.1177/002199838201600101

[4] I. M. Daniel, J. J. Luo, P. M. Schubel, and B. T. Werner, "Interfiber/interlaminar failure of composites under multi-axial states of stress," Composites Science and Technology, vol. 69, no. 6, pp. 764-771, 2009. [Online]. Available: http://dx.doi.ora/10.1016/j.compscitech.2008.04.016

[5] J. W. Klett, T. D. Burchell, and A. Choudry, "Pitch-based carbon foam and composites and use thereof," U.S. Pat. No. 7,070,755B2, Jul. 4, 2006. [Online]. Available: https://patents.google.com/patent/US7070755B2/

[6] B. E. Williams, J. Brockmeyer, and R. H. Tuffias, "Composite foam structures," U.S. Pat. No. 6,929,866B1, Aug. 16, 2005. [Online]. Available: https://patents-.google.com/patent/US6929866B1/

[7] R. J. Grylls and C. M. Austin, "Article made of ceramic foam joined to a metallic nonfoam, and its preparation," U.S. Pat. No. 6,582,812B1, Apr. 24, 2003. [Online]. Available: https://patents.google.com/patent/US6582812B1/

[8] G. Rettenbacher, J. Reiter, F. Feuchtenschlager, P. Schulz, and P.-F. Louvigne, "Multilayer composite armour," U.S. Pat. No. 7,226,045B2, Apr. 11, 2006. [Online]. Available: https://patents.google.com/patent/US70226045B2/

[9] J. Zeschky, F. Goetz-Neunhoeffer, J. Neubauer, S. H. Lo, B. Kummer, M. Scheffler, and P. Greil, "Preceramic polymer derived cellular ceramics," Composites Science and Technology, vol. 63, no. 16, pp. 2361-2370, 2003.

[10] M. Tehrani, A. Y. Boroujeni, T. B. Hartman, T. P. Haugh, S. W. Case, and M. S. Al-Haik, "Mechanical characterization and impact damage assessment of a woven carbon fiber reinforced carbon nanotube-epoxy composite," Composites Science and Technology, vol. 75, pp. 42-48, 2013. [Online]. Available: http://dx.doi.org/10.1016/j.compscitech.2012.12.005

[11] S. S. Wicks, R. G. de Villoria, and B. L. Wardle, "Interlaminar and intralaminar reinforcement of composite laminates with aligned carbon nanotubes," Composites Science and Technology, vol. 70, no. 1, pp. 20-28, 2010. [Online]. Available: http://dx.doi.org/10.1016/j.comp-scitech.2009.09.001

[12] A. J. Jacobsen, W. B. Barvosa-Carter, A. F. Gross, R. Cumberland, K. W. Kirby, and D. Kisailus, "Composite structures with ordered three-dimensional (3d) continuous interpenetrating phases," U.S. Pat. No. 8,320,727B1, Nov. 27, 2012. [Online]. Available: https://patents.google.com/patent/US8320727B1/

[13] S. S. Yang and A. J. Jacobsen, "Micro-truss materials having in-plane material property variations," U.S. Pat. No. 9,405,067B2, Aug. 2, 2016. [Online]. Available: https://patents.google.com/patent/US9405067B2/

[14] J. M. Hundley, T. A. Schaedler, S. S. Yang, and A. J. Jacobsen, "Architected materials for enhanced energy absorption," U.S. Pat. No. 9,375,864B2, Jun. 28, 2016. [Online]. Available: https://patents.google.com/patent/US9375864B2/

[15] T. A. Schaedler, A. J. Jacobsen, W. Carter, and G. McKnight, "Constrained microlayer cellular material with high stiffness and damping," U.S. Pat. No. 9,217,084B2, Dec. 22, 2015.[Online]. Available: https://patents.google.com/patent/US20140272277A1/

[16] R. A. Manning and A. J. Bronowicki, "Composite damping structures and related method," U.S. Pat. No. 5,507,477A, Apr. 16, 1996. [Online]. Available: https://patents.google.com/patent/US5507477A/

[17] J. Bauer, A. Schroer, R. Schwaiger, and O. Kraft, "Approaching theoretical strength in glassy carbon nano-lattices," Nature Materials, vol. 8, no. February, 2016.

[18] X. Chen, G. Zhao, Y. Wu, Y. Huang, Y. Liu, J. He, L. Wang, Q. Lian, and D. Li, "Cellular carbon microstructures developed by using stereolithography," Carbon, vol. 123, pp. 34-44, 2017. [Online]. Available: http://dx-.doi.org/10.1016/j.carbon.2017.07.043

[19] Q. Zhang, F. Zhang, S. P. Medarametla, H. Li, C. Zhou, and D. Lin, "Three-Dimensional Printing of Graphene Aerogel," Small, vol. 12, no. January, 2016.

The invention can be further understood by the following non-limiting examples.

Example 1: Impact Response of 3D Carbon Architectures

Fabrication and design of materials with high stiffness- or strength-to-density ratios has been studied through the use of cellular materials. In particular, beam-based lattice architectures have enabled the creation of lightweight-but-stiff materials (1; 2) as well as strong materials that approach theoretical bounds (3). Many of these studies have focused on the static response of these materials, while few works have studied the dynamic response of lattice architectures. In particular, some works have studied the dynamic compression of lattice structures at the μm-scale (4), while others have studied the impact of macro-scale structures such as lattice-core sandwich plates (5). Due to the length scales and tessellations associated with these studies, neither achieves proper separation of scales in which the length-scale of the boundary conditions is much greater than that of the inherent microstructure. Such separation would allow probing of the true material properties as opposed to the discrete structure's properties.

In the present Example, we describe the supersonic impact response of carbon lattice architectures (i.e., a form of reinforcing phase in the present composite materials) while maintaining proper separation of scales. Using a two-photon lithography manufacturing process, we fabricate three-dimensional lattice architectures with nanometer-scale features of different unit cell geometries and relative densities (8 to 26%) and observe marginal damage after impacts at supersonic velocities (500 to 1100 m/s). These results show how a lightweight architected phase (prior to any infiltration) can provide extreme resilience to impact.

1.1 Sample Design and Fabrication

Figure 10A:
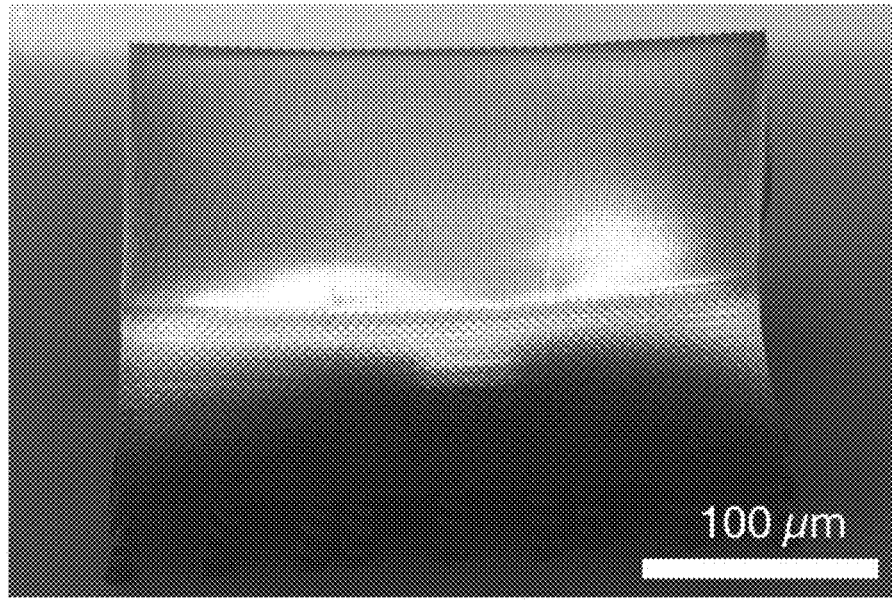
FIGS. 10A-10B. Polymeric octet lattices.
Figure 10B:
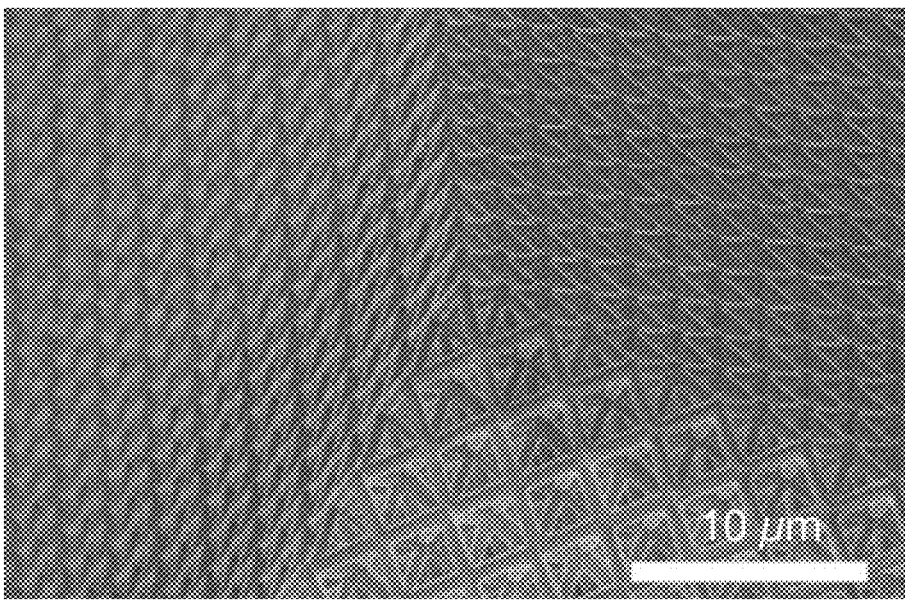
Figure 11A:
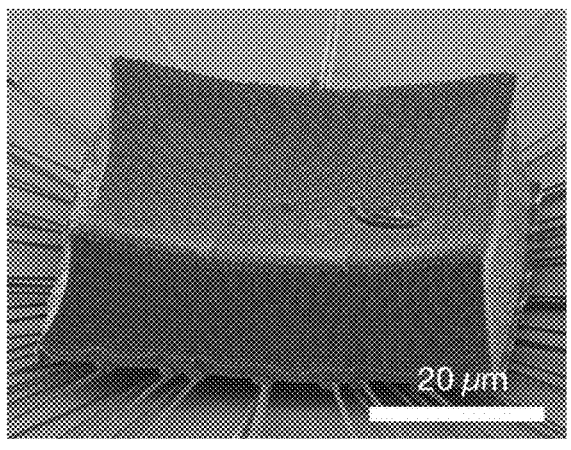
FIGS. 11A-11D. Pyrolyzed carbon lattices.
Figure 11B:
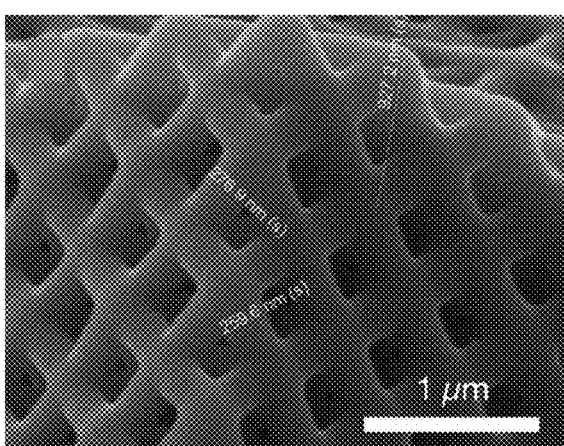
Figure 11C:
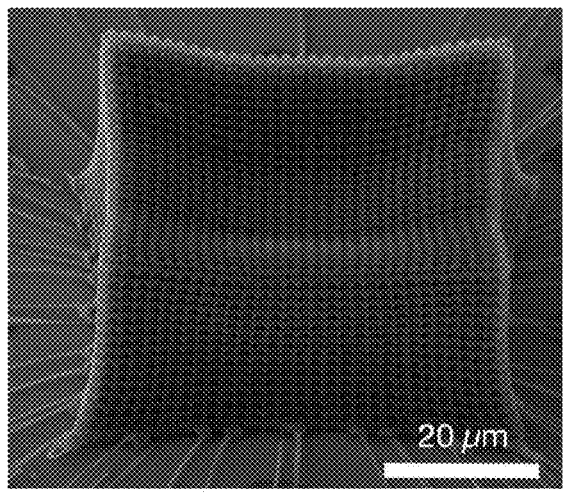
Figure 11D:
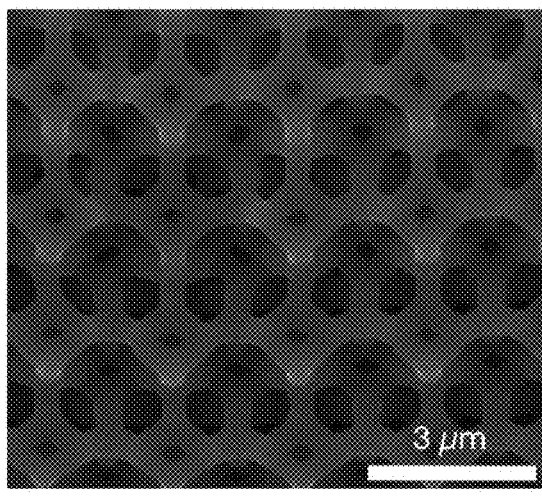

Since architecture leads to different mechanical properties in the static regime (6; 7), the objective was to explore the effect of architecture on supersonic impact of lattice architectures. Polymeric lattices of rigid octet and non-rigid tetrakaidecahedron unit cells were fabricated using a two-photon lithography process (Nanoscribe), with unit cell sizes ranging from 5 to 10 μm (see FIGS. 10A-10B). Additionally, the beam radii were modified such that samples with three distinct relative densities of 8, 17, and 26% were achieved.

A sufficiently large tessellation (approximately 60×60×15 unit cells) was selected such that the effective sample size was much greater than the size of a unit cell, allowing the lattice to be approximated as an effective material. The polymeric samples were then subjected to a pyrolysis process in vacuum up to 900° C., resulting in monolithic carbon lattices with isotropic shrinkage of 80%, while retaining the original geometry (see FIGS. 11A-11D).

For the smallest initial unit cells (i.e., 5 μm), the resulting carbon unit cells had sub-micron dimensions, with beam diameters down to ~200 nm. Although minor warping takes place during pyrolysis, the final unit cell geometry corresponds to the original polymeric one.

1.2 Impact Experiments

Figure 12:
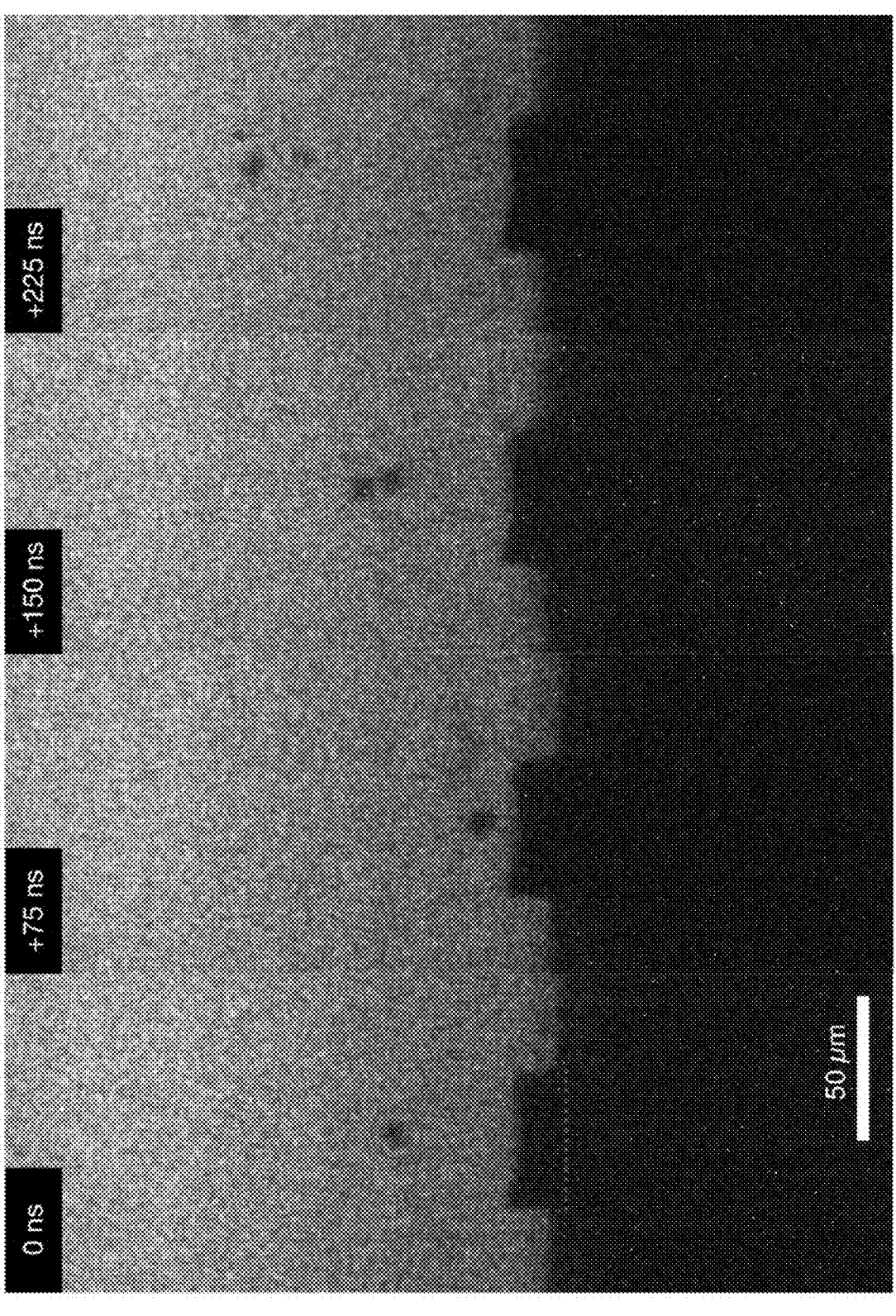
FIG. 12. Impact of a 7 μm $SiO_2$ bead on an octet lattice with 27% relative density. The projectile and the lattice are both highlighted in red in the initial frame, prior to impact. Subsequent frames reveal the projectile rebounding from the lattice, with minor debris being ejected. The impact and rebound velocities were 1060 and 560 m/s, respectively.

The resulting carbon architectures (i.e., the reinforcing phases) were subjected to supersonic impact by accelerating $SiO_2$ particles with diameters ranging from 7 to 14 μm. In all cases the particle diameter was at least one order-of-magnitude larger than the characteristic unit cell size. The method employed is defined as laser induced particle impact test (LIPIT) (8; 9), which enables controllable impact velocities of up to 1 km/s while capturing the impact process with high-speed cameras. FIG. 12 shows a characteristic experiment for an octet lattice with 26% relative density, and an impact velocity of 1060 m/s.

For all lattices tested the projectile rebounded and the impact and rebound velocities were measured. Due to poor adhesion between the lattices and the substrate, the samples delaminated a few milliseconds after impact, requiring modifications to the samples that would enable post-mortem characterization. To effectively tether the samples to the substrate, a thin layer of PMMA resist was spun onto the substrate, resulting in a coating of a few hundred nanometers which bonded the lattices to the substrate (see FIGS. 13A-13C).

1.3 Theoretical Elastic Wave Speeds

Figure 14A:
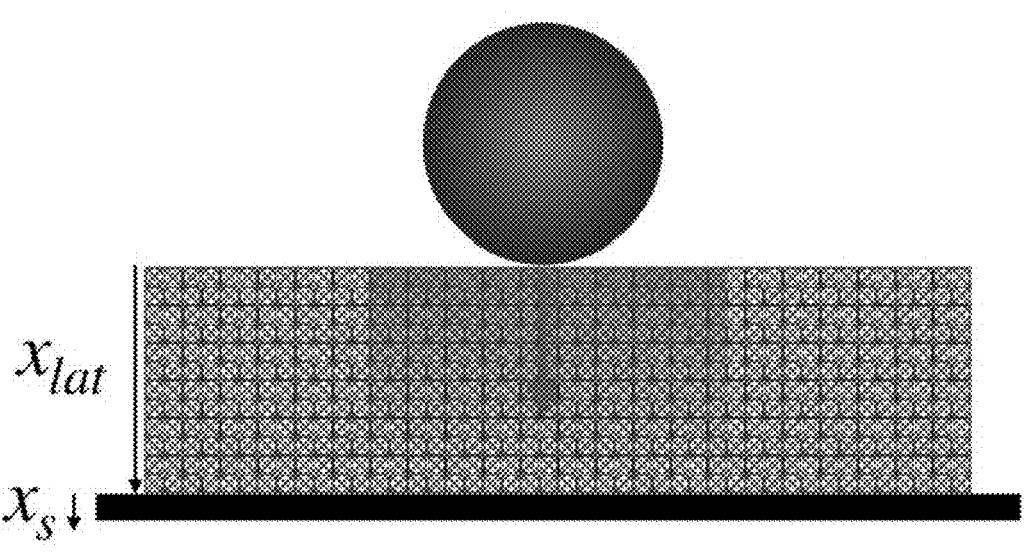
FIGS. 14A-14B. Approximation of impact as a planar wave through the lattice material.
Figure 14B:
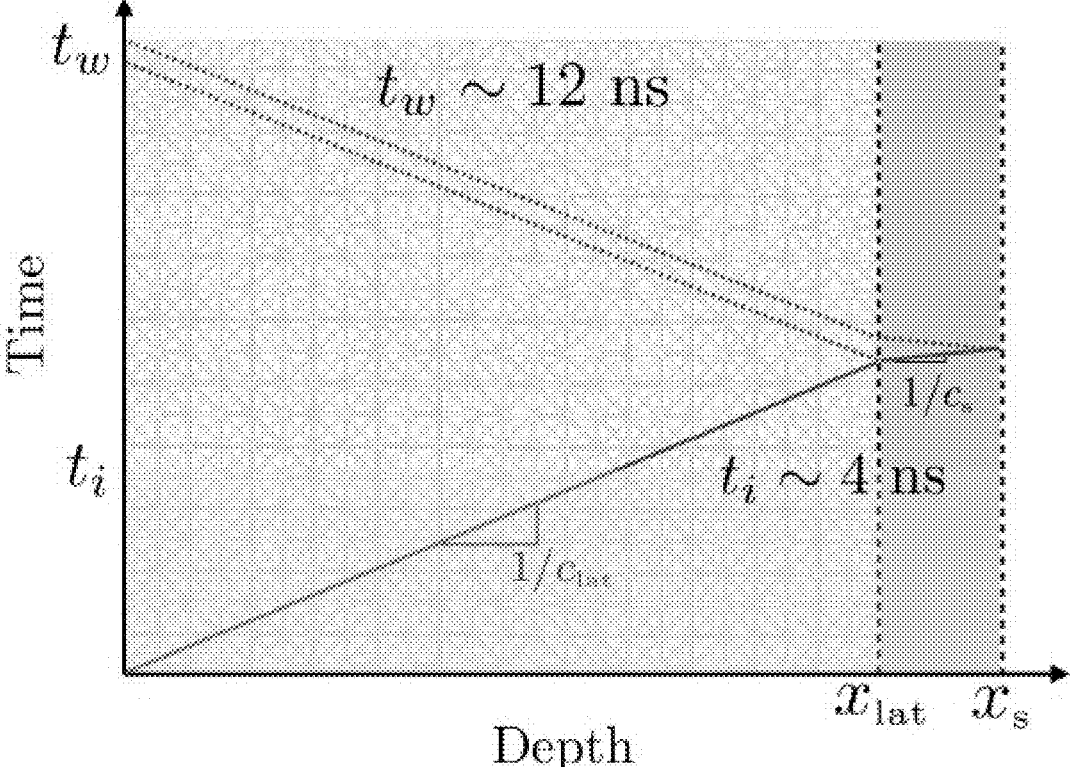
Figure 15A:
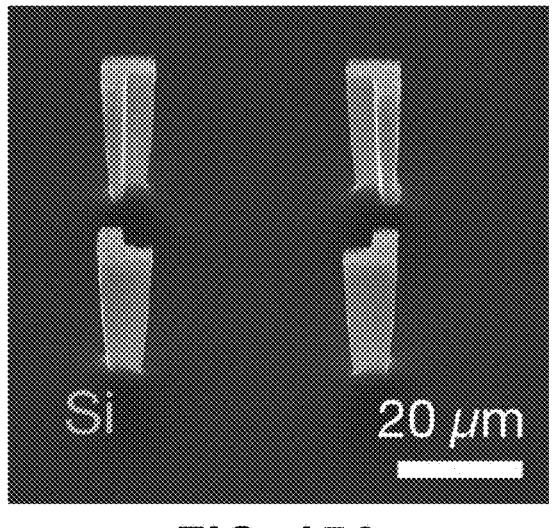
FIGS. 15A-15D. Suspended sample fabrication process.
Figure 15B:
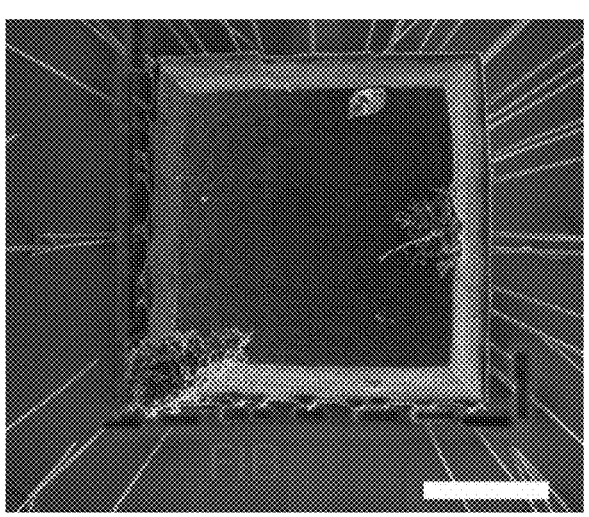
Figure 15C:
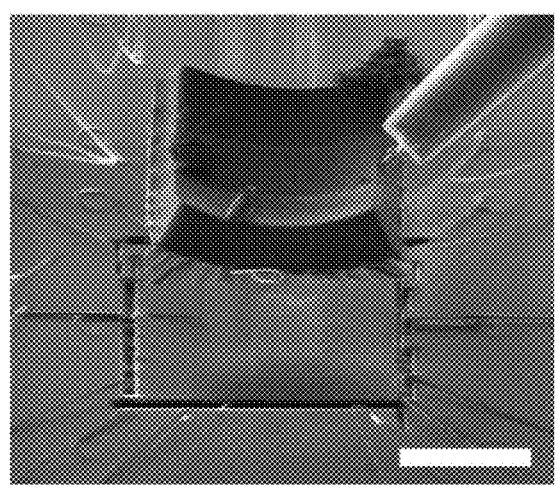
Figure 15D:
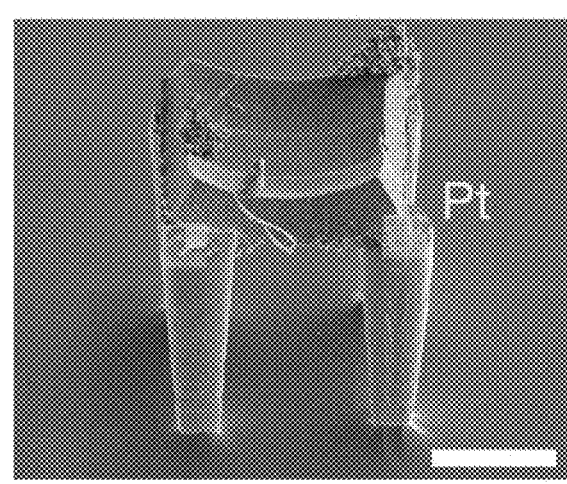

To confirm that the observed behavior is substrate-independent (i.e., unaffected by the stiffness or thickness of the substrate), we propose a simplified problem in which a planar elastic wave emanates from the impact site through the thickness of the lattice, as shown in FIG. 14A. Given that the effective Young's Modulus of a non-slender octet lattice can be estimated (7) as $$E^* = E_s\left[2.95\left(\frac{r}{l}\right)^2 + 103.3\left(\frac{r}{l}\right)^{3.93}\right],\tag{1}$$

where $E_s$ is the constituent material's Young's Modulus and r/l is the strut radius-to-length ratio, the elastic wave speed can be approximated as $$c_{lat} = \sqrt{\frac{E^*}{\rho}},\tag{2}$$

where $\rho$ is the effective lattice density. Using worst-case values such as r/l=0.2, $\rho$=1252 kg/m$^3$ (corresponding to a carbon octet with 60% relative density), and a sample thickness of 14 μm, the elastic wave would take ~12 ns to traverse the sample twice (i.e., roundtrip). Since the high-speed camera frames allow approximate measurements of impact time, an average impact time of 4 ns implies that no information about the substrate is transmitted to the particle prior to rebound. In other words, the rebound behavior is solely a function of the lattice material and not the substrate. This is summarized in the x-t diagram presented in FIG. 14B.

To experimentally validate this claim, we designed a suspended sample experiment in which an identical lattice was mounted on Si stilts, several microns away from the substrate. This experiment mimicked a macro-scale drop tower impact experiment in which a plate with fixed-fixed boundary conditions is impacted by an accelerated mass (see FIGS. 15A-15D). In this way, the lattice was completely decoupled from the Si substrate it rested on previously.

Figure 16:
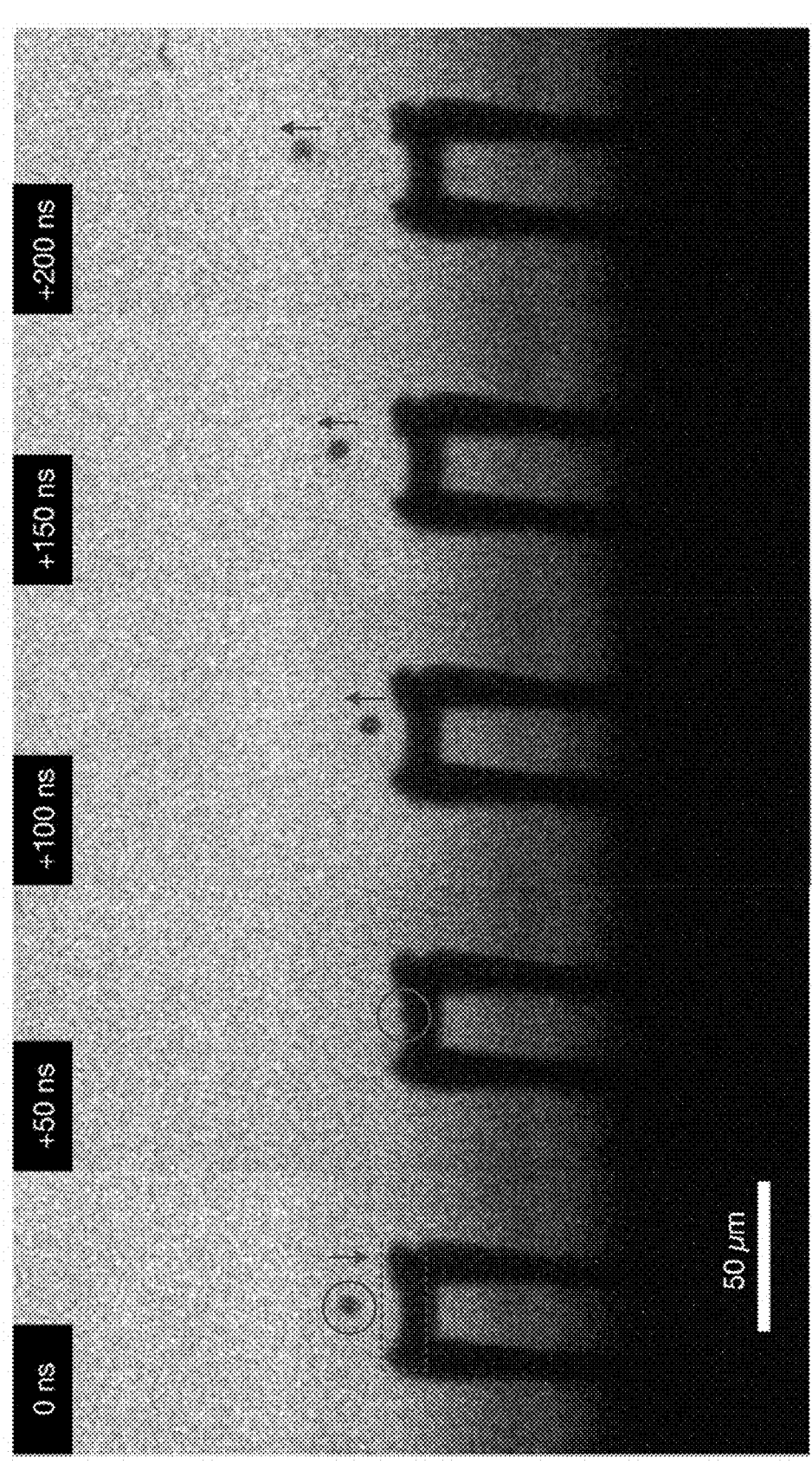
FIG. 16. Suspended sample impact experiment. The same rebounding behavior was observed, without any through-thickness complete penetration or catastrophic sample fracture.

Performing the same experiment on the suspended sample, at an impact velocity of 588 m/s, resulted in the same rebounding behavior and a rebound velocity of 320 m/s (see FIG. 16). This result confirmed that the observed response was substrate-independent.

1.4 Energy Absorption Scaling Behavior

Performing impact experiments on samples of both rigid and non-rigid architectures, at different relative densities, yielded the results in FIG. 17. The experiments at low impact energy (i.e., $$mv_0^2,$$

where $v_0$ is the impact velocity), yielded the highest restitution coefficients (i.e., the restitution coefficient is the ratio between rebound velocity and impact velocity, $v_r/v_0$).

Although rigid and non-rigid architectures can have up to an order-of-magnitude difference in modulus in the static regime (7), no conclusive difference was observed in supersonic impact conditions. Octet and tetrakaidecahedron samples had similar restitution coefficients throughout the regime of kinetic energy probed.

The trend observed in FIG. 17 seems to point to a correlation between impact energy and restitution coefficient, independent of architecture. Experiments with higher impact energies and different relative densities seemed to show a decrease in restitution as relative density decreased, possibly due to a lower effective material strength and more energy being dissipated in localized damage. Despite this slightly localized damage at high impact energies, these results show benefits in using an architecture for impact mitigation, since energy can be distributed more readily away from the impact site and localized damage can be reduced. Given that the impact process does not allow time for the elastic waves to reach the projectile before rebound takes place, it is highly likely that this process is dominated by inertia and not architecture, which still requires careful design and control of material distribution.

Additional notes: The matrix phase may increase energy dissipation or mitigation because the matrix phase corresponds to additional inertia (i.e., mass). In terms of damping, a viscoelastic matrix such as a polymer may further dampen vibrations or impact energy. The strength of the material may also increase, since the matrix may serve to prevent cracks from opening/propagating. Specific values of these increases may depend heavily on the choice of architecture and materials.

One example is a 'coated sample' (covered by a thin layer of epoxy), which corresponds to a composite material system having a structure partially infiltrated by a matrix phase (e.g., epoxy). Referring to FIGS. 13B and 17, adding a thin polymeric layer decreased the restitution coefficient to about 0.65 of that for the uncoated sample (35% reduction). This translates to the particle having 58% less kinetic energy upon rebound. The energy mitigation measure does not change since the particle still rebounds and structural integrity is maintained, but the energy dissipated/absorbed (i.e., transformed into heat or permanent deformation) increases by 20% when compared to the sample with no matrix (the energy absorbed by the uncoated sample was 66% of the impact energy, while the coated sample absorbed 86%). Since this was a thin coating, this may be a lower bound of absorption increase when adding a matrix, in an embodiment. Note that energy absorbed corresponds to the difference between the impact energy and the kinetic energy of the impactor after rebound.

Generally, inclusion of a matrix may result in a reduction of the restitution coefficient, but an increase in energy absorption. This means less energy will be transferred back to the impactor to travel in the opposite direction, since some of it is absorbed due to the viscoelastic/plastic properties of the matrix. Having a matrix may enhance all damping properties compared to the structure free of the matrix phase. For instance, it may increase a vibrational frequency band gap width or even decrease the transmission intensity of vibrations at some frequencies. From a static perspective, the strength of the materials may significantly increase when the matrix phase is present compared to a structure free of the matrix phase, and the failure may go from catastrophic/brittle to ductile-like.

Example 2: Material Damping Through Architecture

Careful design of architected materials can lead to interesting dispersive behavior, which can translate to energetic dissipation. Works have shown large 3D-printed effective materials that can dampen vibrations (10) as well as microscale materials that dissipate ultrasonic waves in water (11), through the use of dispersion mechanisms such as Bragg scattering and local resonance. Proper design of architecture, while accounting for material density and stiffness, can lead to effective material damping with stiff, non-dissipative constituent materials.

In the present Example, we utilize careful design of architecture to take advantage of Bragg scattering and local resonance mechanisms to dissipate vibrational energy with stiff, non-damping constituent materials.

2.1 Bragg Scattering: Tetragonal Lattice

Starting with a tetragonal unit cell such as the one depicted in FIG. 18A, volumetric expansion of its members would result in buckling instabilities that change the unit cell to the ones shown in FIGS. 18B-18C, depending on the degree of volumetric expansion.

Introducing curvature to the beams not only changes the unit cell geometry, but it also changes its effective mechanical properties, particularly in the in-plane directions. We numerically explore the effect of this buckled geometry on the dynamic properties of a material made up of these tetragonal unit cells.

For this numerical study, each unit cell was assumed to have a polymeric core with a Si coating. The horizontal beams had a polymer minor radius of 0.25 μm, a major radius of 0.9 μm, and a Si coating of 0.4 μm, while the vertical beams had a polymer radius of 0.9 μm and an identical coating. The original tetragonal unit cell had dimensions 20×20×5 μm.

An eigenfrequency analysis on the three-dimensional unit cells at each stage of buckling was performed using the commercial finite element package COMSOL Multiphysics. Each unit cell was divided into the horizontal- and vertical-beam domains, each containing an elastic material model for the corresponding homogenized beam's properties. The homogenized properties were obtained using a weighted volume average from the known volumes of each material (i.e., polymer and silicon) and the corresponding Young's moduli, densities, and Poisson's ratios for each material.

Using the tetragonal unit cells presented in FIGS. 18A-18F, Bloch boundary conditions were applied to the corresponding faces of the unit cells. Using the irreducible Brillouin zone depicted in FIG. 19D, the wavevector was swept through the boundaries and the eigenfrequencies were calculated at each state. Tetrahedral elements were used and mesh convergence was confirmed in all cases.

FIGS. 19A-19D show the appearance of partial band gaps in the x- and -y directions (due to symmetry), corresponding to frequencies that cannot propagate throughout a material comprised of said unit cells. Given that no band gaps appear in the unbuckled case in FIG. 19A, the appearance of band gaps in FIGS. 19B-19C, is attributed to Bragg scattering enabled by the buckled geometry. The vibrational frequency band gap widths may scale linearly with the characteristic length in the architecture. Specifically, the Bragg condition states that significant effects might occur at frequencies where $\Delta L=c/f$, where $\Delta L$ is the characteristic dimension of the microstructure, c is the speed of sound in the material, and f is the frequency (showing the linear relation with frequency).

These results show the tunability of architected structures which enables dispersion mechanisms that can lead to damping. The absolute frequency and width of the resulting band gaps can be tuned by changing unit cell sizes and constituent materials. The results depicted here were achieved with a fully elastic material model, meaning that the same behavior can be attained with stiff materials that are not inherently damping, such as metals, ceramics, or carbon.

2.2 Local Resonance: Auxetic Architectures with Resonators

Besides Bragg scattering, local resonance can be used to enable band gaps, commonly at lower frequencies. In this study, we utilize the auxetic unit cell presented by Krodel et al. (12), while adding a resonator (i.e., a lumped mass attached to a cantilever beam) to the unit cell, as shown in FIGS. 20A-20B.

We performed a numerical study as done in Section 2.1, assuming a fully polymeric unit cell with dimensions 60×60×210 μm. An elastic material model was used (i.e., no contituent material damping assumed), and the dispersion relations in the Γ-X direction (see FIG. 19D) were calculated.

The dispersion relation of the unmodified auxetic unit cell (see FIG. 21A) shows no band gaps in the direction of interest, while adding a resonator (see FIG. 21B) introduces a band gap at 1.5 MHz. Just as in Section 2.1, the width and location of this band gap is fully tunable based on unit cell dimensions, materials, and resonator parameters.

To experimentally validate the numerical results from FIGS. 21A-21B, we fabricated samples of the same dimensions, materials, and parameters and tested them in a custom vibration transmission experiment in vacuum (see FIGS. 22A-22C).

Using the setup presented above, a continuous sine wave with varying frequencies between 1-3 MHz was transmitted through the samples (see FIGS. 23A-23E).

Performing a frequency sweep showed a band gap centered at a frequency of approximately 2.4 MHz for the resonator unit cell, as shown in FIG. 23C. The band gap took place at a slightly higher frequency than the one predicted by the simulations in FIGS. 21A-21B, since establishing proper contact with the transducer strained the lattices, which can change the dispersive behavior (see the difference in strain between FIGS. 23D-23E).

To further validate this band gap, we performed an additional transmission experiment where a chirp (instead of a continuous wave) was transmitted through the lattice. In this case, the chirp contained frequencies between 1-3 MHz, and a Fast Fourier Transform (FFT) was applied to the transmitted signal to analyze its frequency content (see FIGS. 24A-24C).

These experiments and simulations on a polymeric auxetic lattice show the possibility of adding local resonance as a mechanism to introduce damping to a material. Since the material properties in the simulations were fully linear elastic, this behavior can be extended to a variety of materials including metals, ceramics, and carbon.

Example 3: Fully Tunable Elasticity Through Spinodal Decomposition-Derived Architectures Architected materials with beam-based architectures have been shown to be effective in achieving high stiffness-to-density ratios (1; 6), but they still fall short from the theoretical bounds. Additionally, their mechanical properties deviate from the theoretical predictions due to the existence of nodes (7), which also serve as stress concentrations that can lead to failure.

In this Example, we describe the use of spinodal decomposition to create shell-based microstructures that lack nodes and achieve superior mechanical properties and higher mechanical tunability than beam-based architectures.

3.1 Elastic Surface Tunability

Using spectral methods and an anisotropic energy functional (13), numerical spinodal decomposition can lead to microstructures with fully tunable elasticity. (For exemplary methods describing computational spinodal decomposition, see: A. Vidyasagar, S. Krödel, and D. M. Kochmann, "Microstructural patterns with tunable mechanical anisotropy obtained by simulating anisotropic spinodal decomposition," Proceedings of the Royal Society A: Mathematical, Physical and Engineering Science, vol. 474, no. 2218, p. 20180535, 2018.) Using only the boundaries of the resulting microstructure (i.e., shells), we computed the 3D elastic surfaces using the commercial finite element code Abaqus and show full tunability of the effective Young's modulus of the microstructure (see FIGS. 25A-25D).

The elastic surfaces shown in FIGS. 25A-25D show unparalleled elastic tunability, which cannot be achieved with commonly studied beam-based architectures. Besides this highly tunable behavior, spinodal structures can exhibit Young's moduli that approach the theoretical bounds and are substantially greater than other structures such as trusses and triply-periodic minimal surfaces (14-16), as shown by numerical simulations on these structures (see FIG. 26).

Applying periodic boundary conditions on the columnar structure, the P-cell minimal surface, and a hollow octet truss with equal relative densities shows that the spinodal structure has a superior elastic modulus when probed in the z-direction, coming closer to the Voigt bound. Additionally, applying a fit of the form $E^*/E_s \; \alpha \bar{\rho}^\alpha$, where $E^*$ is the effective Young's modulus, $E_s$ is the constituent material's Young's modulus, $\rho$ is the relative density, and $\alpha$ is the scaling exponent, yields a lower (more desirable) scaling exponent for the spinodal structure.

As mentioned above, one clear benefit of spinodal structures is their lack of nodes, which reduces stress concentrations at which cracks may initiate. This leads to surfaces with a quasi-constant, low curvature as opposed to trusses which have infinite curvature at nodes (see FIGS. 27A-27B).

The curvature distribution for the octet truss above shows a bimodal distribution even when applying fillets to the nodes. Although this bounds the maximum curvature in the structure, the absolute values are much larger than those of the spinodal structure.

It should be mentioned that the effective modulus of the structures, geometries, and/or systems disclosed herein, comes closer to the theoretical bound (Voigt bound) than that of typical trusses or transverse fibers (i.e., the points will lie closer to the black "Voigt" line in FIG. 26). In terms of elastic tunability, it should also be mentioned that composite material systems disclosed herein, as those having a structure with a spinodal geometry, may be characterized by deterministic anisotropy (or isotropy if desired) of elasticity, damping, impact energy absorption, and/or other properties or features.

3.2 Fabrication of Shell-Based Spinodal Materials

We fabricated polymeric spinodal structures at the microscale using a two-photon lithography process. Using deposition techniques such as atomic layer deposition (ALD) or magnetron sputtering we then deposited anywhere from 5 nm to 5 μm of a metal or ceramic. In this case, the resulting material is a composite whose reinforcing phase is shell-based. Alternatively, the polymeric core can be removed and left empty or replaced with another matrix. To expose the polymer under the newly applied coating, we used focused ion beam (FIB) milling to remove small sections of the coating. Lastly, introducing the structure in an etching chamber such as $O_2$ plasma, we removed the inner polymeric core, resulting in a shell-based spinodal structure.

We fabricated these structures at the micro-to-centimeter scale as well using a DLP 3D printing method as shown in FIGS. 29A-29D. The resulting shell-based polymeric structure was then pyrolyzed in vacuum up to 1300° C., resulting in a shell-based carbon reinforcing phase which can be subsequently infiltrated by a matrix.

Example 4: Micrographs of Pyrolyzed Plate for Blast Impact Testing

FIGS. 30A-30C. Architected plate for blast impact testing. FIG. 30A. Polymeric precursor plate and resulting pyrolyzed plate, (FIG. 30B) micrograph of an octet carbon architecture, (FIG. 30C) micrograph of a tetrakaidecahedron architecture.

Example 5: Reinforcing-phase Blocks of Varying Architectures

FIGS. 31A-31F. Cubes of example reinforcing phases. FIG. 31A. Polymeric octet cube, (FIG. 31B) pyrolyzed carbon octet cube from FIG. 31A, (FIG. 31C) pyrolyzed carbon 3D kagome beam, (FIGS. 31D-31F) close-ups of FIGS. 31A-31C.

Example 6: Direct Fabrication of Tubular Architected Components

FIGS. 32A-32F. Tubular architected component. FIG. 32A. Polymeric tube with tetrakaidecahedron architecture, (FIG. 32B) top view of FIG. 32A, (FIG. 32C) close up of FIG. 32B, (FIG. 32D) pyrolyzed carbon tube with tetrakaidecahedron architecture prior to infiltration, (FIGS. 32E-32F) close-ups of FIG. 32D.

REFERENCES CORRESPONDING TO EXAMPLES 1-6

[1] X. Zheng, H. Lee, T. H. Weisgraber, M. Shusteff, J. DeOtte, E. B. Duoss, J. D. Kuntz, M. M. Biener, Q. Ge, J. A. Jackson, S. O. Kucheyev, N. X. Fang, and C. M. Spadaccini, "Ultralight, ultrastiff mechanical metamaterials," Science, vol. 344, no. 6190, pp. 1373-1377, June 2014. [Online]. Available: http://www.ncbi.nlm.nih.gov/pubmed/24948733http://www.sciencemag.org/cgi/doi/10.1126/science.1252291

[2] L. R. Meza, S. Das, and J. R. Greer, "Strong, lightweight, and recoverable three-dimensional ceramic nanolattices," Science, vol. 5, no. 6202, pp. 1322-1326, 2014. [Online]. Available: www.sciencemag.org/content/345/6202/1322/suppl/DC1

[3] J. Bauer, A. Schroer, R. Schwaiger, and O. Kraft, "Approaching theoretical strength in glassy carbon nanolattices," Nature Materials, vol. 8, no. February, 2016.

[4] J. A. Hawreliak, J. Lind, B. Maddox, M. I. Barham, M. C. Messner, N. Barton, B. J. Jensen, and M. Kumar, "Dynamic Behavior of Engineered Lattice Materials," Scientific Reports, vol. 6, p. 28094, 2016. [Online]. Available: http://www.nature.com/articles/srep28094

[5] C. J. Yungwirth, H. N. G. Wadley, J. H. O'Connor, A. J. Zakraysek, and V. S. Deshpande, "Impact response of sandwich plates with a pyramidal lattice core," International Journal of Impact Engineering, vol. 35, no. 8, pp. 920-936, 2008.

[6] L. R. Meza, G. P. Phlipot, C. M. Portela, A. Maggi, L. C. Montemayor, A. Comella, D. M. Kochmann, and J. R. Greer, "Reexamining the mechanical property space of three-dimensional lattice architectures," Acta Materialia, vol. 140, pp. 424-432, 2017. [Online]. Available: http://dx.doi.org/10.1016/j.actamat.2017.08.052

[7] C. M. Portela, J. R. Greer, and D. M. Kochmann, "Impact of node geometry on the effective stiffness of non-slender three-dimensional truss lattice architectures," Extreme Mechanics Letters, vol. 22, pp. 110-138, 2018. [Online]. Available: https://doi.org/10.1016/j.eml.2018.06.004

[8] J.-h. Lee, D. Veysset, J. P. Singer, M. Retsch, G. Saini, T. Pezeril, K. A. Nelson, and E. L. Thomas, "High strain rate deformation of layered nanocomposites," Nature Communications, vol. 3, no. May, pp. 1164-1169, 2012. [Online]. Available: http://dx.doi.org/10.1038/ncomms2166

[9] D. Veysset, A. J. Hsieh, S. Kooi, A. A. Maznev, K. A. Masser, and K. A. Nelson, "Dynamics of supersonic microparticle impact on elastomers revealed by real time multi frame imaging," Nature Publishing Group, pp. 1-6, 2016. [Online]. Available: http://dx.doi.org/10.1038/srep25577

[10] K. H. Matlack, A. Bauhofer, S. Krodel, A. Palermo, and C. Daraio, "Composite 3D-printed meta-structures for low frequency and broadband vibration absorption," PNAS, pp. 1-5, 2015. [Online]. Available: http://arxiv.org/abs/1511.09465{%}0Ahttp://dx.doi.org/10.1073/pnas.1600171113

[11] S. Krödel and C. Daraio, "Microlattice Metamaterials for Tailoring Ultrasonic Transmission with Elastoacoustic Hybridization," Physical Review Applied, vol. 6, no. 6, p. 064005, 2016.[Online]. Available: http://link.aps.org/doi/10.1103/PhysRevApplied.6.064005

[12] S. Krodel, T. Delpero, A. Bergamini, P. Ermanni, and D. M. Kochmann, "3D auxetic micro-lattices with independently controllable acoustic band gaps and quasi-static elastic moduli," Advanced Engineering Materials, vol. 16, no. 4, pp. 357-363, 2014.

[13] A. Vidyasagar, S. Krodel, and D. M. Kochmann, "Microstructural patterns with tunable mechanical anisotropy obtained by simulating anisotropic spinodal decomposition," Proceedings of the Royal Society A: Mathematical, Physical and Engineering Science, vol. 474, no. 2218, p. 20180535, 2018. [Online]. Available: http://rspa.royalsocietypublishing.org/lookup/doi/10.1098/rspa.2018.0535

[14] L. Zhang, S. Feih, S. Daynes, S. Chang, M. Y. Wang, J. Wei, and W. F. Lu, "Energy absorption characteristics of metallic triply periodic minimal surface sheet structures under compressive loading," Additive Manufacturing, no. August, 2018. [Online]. Available: https://linkinghub.elsevier.com/retrieve/pii/S2214860418304688

[15] B. D. Nguyen, S. C. Han, Y. C. Jung, and K. Kang, "Design of the P-surfaced shellular, an ultra-low density material with micro-architecture," Computational Materials Science, vol. 139, pp. 162-178, 2017. [Online]. Available: http://dx.doi.org/10.1016/j.commatsci.2017.07.025

[16] O. Al-Ketan, R. Rezgui, R. Rowshan, H. Du, N. X. Fang, and R. K. Abu Al-Rub, "Microarchitected Stretching-Dominated Mechanical Metamaterials with Minimal Surface Topologies," Advanced Engineering Materials, vol. 1800029, p. 1800029, 2018. [Online]. Available: http://doi.wiley.com/10.1002/adem.201800029

Example 7: Energetic Calculations of Impact and Comparison to Kevlar

The impact behavior of an octet carbon architecture fabricated through the two-photon lithography process described in the technical writeup (with relative density of $\bar{\rho}=26\%$) was compared to a Kevlar 170 g/m$^2$ satin weave fabric[1].

An area-normalized energy mitigation metric can be defined as $$\psi = \frac{W}{A},$$

where W is the absolute energy mitigated (absorbed and/or redirected) and A is the area associated with the impact. Using the values for a single sheet of this type of Kevlar (with areal density of $\rho_{a,Kev}=0.17$ kg/m$^2$), the obtained value was $\psi_{Kev}=3.26\times10^5$ J/m$^2$ compared to $\psi_{Lat}=2.61\times10^4$ J/m$^2$. The difference in this metric is due largely to the difference in scales associated with the experiments. It must also be noted that the Kevlar sheets were perforated by the projectile and lost physical integrity, while the lattice underwent minor permanent deformation and was not perforated by the impactor.

Performing one last normalization based on the areal density of each material ($\rho_{a,Lat}=0.008$ kg/m$^2$ for the lattice), provides a metric of energy mitigation per kg (or, "density-normalized impact energy mitigation metric") of material of $1.9\times10^6$ and $3.2\times10^6$ J/kg for Kevlar and the lattice, respectively.

REFERENCES CORRESPONDING TO
EXAMPLE 7

[1] F. Figucia, US Army R&D Command (1980)

Example 8: Carbon by Design Through
Atomic-Level Architecture

Overview: It has been a longstanding challenge to design and create materials with a combination of high strength, high deformability/ductility, large elastic limit and low density, as these properties may be mutually exclusive. Here, we have created pyrolytic carbon micropillars with a specific type of atomic-level architecture by controlling the precursor material and conditions of pyrolysis. Nanomechanical experiments demonstrated that the pyrolytic carbon micropillars exhibit a tensile strength of ~2.5 GPa and a compressive strength approaching theoretical limit of ~11.0 GPa, a substantial elastic limit of 20-30%, and a low density of 1.0-1.8 g/cm$^3$, corresponding to a specific strength of 8.07 GPa/g cm$^3$ which surpasses the property of all existing structural materials. Pyrolytic carbon micropillars with diameters below 2.3 μm exhibited a rubber-like behavior and sustained a large compressive strain of approximately 50% without catastrophic failure, while larger ones exhibited brittle fracture at a strain of ~20%. Large-scale atomistic simulations revealed that these excellent mechanical properties are enabled, at least in part, by the local deformation of 1 nm curled graphene fragments within the pyrolytic carbon microstructure, the interactions between neighboring fragments, and the presence of strong covalent bonds between the carbon atoms.

In modern advanced material design, the creation of high-performance materials that combine high strength, substantial deformability, a large elastic limit, and low density is a longstanding goal and challenge. Two pairs of apparent conflicts exist for nearly all structural materials: high strength versus high deformability/ductility and high strength versus low density. For example, metals and alloys are ductile and can sustain fracture strain beyond 10% due to accommodation of dislocation plasticity during deformation[1], but their yield strengths are usually limited on the order of ~100 MPa and their elastic limits are only around 2%. Ceramics have higher strength (up to several GPa), but their fracture strains are usually below 5% due to the absence of mobile lattice dislocations during deformation[1]. Metallic and ceramic materials generally have densities beyond 2.7 g/cm$^3$. Polymers[2] and porous materials (like foams[3], nanolattices[4], nanosponges[5]) are lightweight, and their densities are much lower than those of most metals and ceramics. These materials are significantly deformable and can typically sustain elastic strains beyond 50%[2-5], but their strengths are only on the order of ~10 MPa.

Numerous studies[6-13] have shown that mechanical properties (such as strength and ductility) of materials are significantly determined by their microstructures and intrinsic and extrinsic dimensions. Therefore, tailoring the microstructures or intrinsic and extrinsic dimensions is an effective way to alter the mechanical properties of materials. For some polycrystalline metals, reducing the grain size and incorporating nanotwinned microstructure[6,7] at the atomic level have increased their strengths from ~100 MPa to ~1 GPa. High-entropy alloys (HEAs), which contain five or more principal elements with nearly equal atomic concentrations, exhibit high yield strengths of 1-3 GPa and fracture strains of 10-30%[8] due to solid solution, which is controlled by the mixture of multiple principal elements at the lattice scales[8]. Single crystalline metals with extrinsic dimensions (i.e., sample size) below ~10 μm exhibit the so-called "smaller and stronger" size effect[9-11]; examples include Au nanowires/nanopillars with diameters of tens of nanometers that exhibit ultra-high tensile strengths of 5.6 GPa, close to the theoretical limits[10]. This ultra-high strength is associated with a pristine and nearly defect-free crystalline microstructure and/or dislocation source exhaustion[9] at nanoscale. For ceramics, recent studies[12] showed that micro-sized shape memory zirconia pillars with few crystal grains along the gauge section can withstand pseudo-elastic strains of approximately 7% by undergoing a martensitic phase transformation; the compressive strengths of these ceramic pillars were up to 1.5-2.5 GPa. For polymer, when strong and hard phases (in forms of nanofibers or nanoparticles) are introduced into polymer matrices, the resultant polymer-based composite typically have strengths up to ~0.5 GPa[13,14].

Carbon-family materials contain a large number of allotropes[15] due to the unique electronic structure of the carbon atom, which allows the formation of sp-, sp$^2$- and sp$^3$-hybridized bonds. The mechanical and physical properties of carbon materials can vary widely as a result of different bonding structures. As two representative carbon allotropes, graphene and carbon nanotubes with 100% sp$^2$ bonds have been reported to have ultra-high tensile strengths up to 100 GPa[16]. The mechanical properties of these two allotropes are extremely sensitive to defects such as vacancies, pentagon-heptagon pairs, and grain boundaries, which can significantly decrease their strength due to stress concentrations around the defects[16-20]. The small dimensions of individual graphene sheets and nanotubes render them impractical for structural applications at larger scales, but their three-dimensional (3D) assemblies exhibit superelastic behavior via buckling and bending of the basic building blocks and can be scaled up to the macroscopic level[21-24]. The porous microstructure of 3D graphene assemblies makes it possible for these architectured materials to be extremely lightweight, with low densities of 0.001-1.0 g/cm$^3$ and superior elastic limits up to 50%, but strengths as low as 10 MPa[21-23]. Recently, various pyrolytic carbon materials[25-28] have been synthesized via pyrolysis using polymeric precursors. Bulk pyrolytic carbon samples[26] prepared at 1000° C. had an optimal hardness of 4 GPa and a density of 1.1-1.4 g/cm$^3$. Micro-sized glassy carbon[27] synthesized at a high temperature of 400-1000° C. and a high pressure of 10-25 GPa exhibited a compressive strength of 9 GPa and a density of 2.0-2.5 g/cm$^3$. The pyrolytic carbon materials usually have a cleavage plane with a fracture strain below 3%[27]. Glassy carbon nanolattices[28,29] with characteristic strut sizes of approximately 200 nm and densities of 0.3-0.7 g/cm$^3$ have been fabricated via pyrolysis using photoresist-based microarchitectures made via two-photon lithography, achieving a compressive strength of approximately 300 MPa at a fracture strain below 10%. The microstructures of these pyrolytic carbon materials typically consist of curved carbon layers or fullerene-like fragments with dimensions of a few nanometers, leading to a strong dependence of their mechanical properties and performance on the initial precursors, the atomic-level microstructure after pyrolysis, and processing temperature and pressure[25,26]. These studies suggest that multiple properties (including density, strength and deformability) of materials could be simultaneously improved by designing and controlling the atomic-level architectures and reducing the characteristic dimensions. It also highlights both the promise and the challenges associated with the design and fabrication of high-performance materials that possess a combination of high strength, substantial ductility, large elastic limit, and low density.

In this illustrative Example, we disclose pyrolytic carbon micropillars with diameters of 0.7-12.7 μm through two-photon lithography and pyrolysis. Characterization based on transmission electron microscopy (TEM), Raman spectroscopy and electron energy loss spectroscopy (EELS) revealed that these micropillars comprise 1 nm-sized curled graphene fragments, an atomic-level architecture achieved by controlling the precursor material and conditions of pyrolysis. In situ nanomechanical testing showed that the pyrolytic carbon have ultra-large elastic limits of 20-30%, high tensile and compressive strengths of 2.5 and 11.0 GPa, low densities of 1.0-1.8 g/cm$^3$, and ultra-high specific strengths up to 8.07 GPa/g cm$^3$, and that samples with diameters below 2.3 μm can undergo substantial plastic deformation without failure even at applied strains in excess of 40%, exhibiting a rubber-like behavior. We incorporated the experimentally obtained microstructures into large-scale atomistic simulations to investigate the deformation mechanisms underlying the superior mechanical properties of the pyrolytic carbon pillars under uniaxial compression and tension.

FIG. 33A shows a schematic of the fabrication process of cylindrical micropillars with diameters of 6-50 μm and heights of 12-100 μm, printed using two-photon lithography direct laser writing (TPL DLW) from IP-Dip, a commercial acrylate-based photoresist. During fabrication via TPL DLW, the sample geometry and dimension can be accurately controlled. The subsequent pyrolysis at 900° C. for 5 hours in vacuum leads to complete carbonization and 98% volume shrinkage of the polymeric samples[29]. The resulting pyrolytic carbon pillars have diameters ranging from 1.28 to 12.7 μm (20-25% of the dimension prior to pyrolysis) (FIGS. 33B-33C). A residual carbon ring visible on the silicon substrate represents the footprint of the original pillar and the constraint posed by the substrate during pyrolysis. Some samples were fabricated with caps to accommodate the grips for uniaxial tension experiments. More details on the synthesis are provided below in this Example.

FIG. 33D contains a representative high-resolution TEM (HRTEM) image of the pyrolytic carbon pillar, with the selected area electron diffraction (SAED) pattern in the inset, revealing its amorphous microstructure. The magnified TEM images in FIGS. 33E-33F indicate the presence of numerous 1.0-1.5 nm-sized curled atomic fragments, which create sub-nanometer-sized voids (indicated by red arrows in FIGS. 33E-33F), distributed randomly throughout the pillar volume. Both the size of the carbon layer fragments and spacing between neighboring layers in our pyrolytic carbon samples are much smaller than those (about 4-6 nm and 1.67-1.99 nm, respectively) fabricated previously[26,27]. These microstructural features provide a useful foundation for estimating the density of pyrolytic carbon micropillars by augmenting a reported geometric model developed for non-graphitized glassy carbon[26]. In this geometric model, the density is dependent on the average size and curvature of the carbon layer and on the spacing between neighboring layers. Using this model, we determined the density of the pyrolytic carbon micropillars in this work to be 1.0-1.8 g/cm$^3$, which is close to that of low-density type-I glassy carbon[27,30]. The relevant method details are provided later in this Example. FIG. 33G shows the Raman spectrum of a representative pyrolytic carbon micropillar, which contains two prominent peaks at Raman shifts of 1359 cm$^{-1}$ and 1595 cm$^{-1}$ that correspond to the graphitic D and G peaks, respectively. The ratio ($I_D/I_G$) of the integrated area under the D band to that under the G band allowed us to calculate the approximately characteristic crystallite size L of the curled carbon layer fragment[31] observed in the HRTEM images (FIGS. 33E-33F), as indicated by the following equation[31]:

$$L \approx \alpha \lambda_l^4 \left( \frac{I_D}{I_G} \right)^{-1} \tag{1}$$

where α is a constant of $2.4 \times 10^{-10}$, and $\lambda_l$ is the wavelength (in units of nanometers) of the laser used in the Raman experiment. Using this equation, the characteristic crystallite size of the carbon layer fragment was calculated to be 2.4 nm, which is basically consistent with the size of 1.0-1.5 nm determined from our HRTEM observations. It should be noted that for evaluation of the crystallite size in the carbon layer, HRTEM observations have higher accuracy than the approximate prediction from Eq. (1) based on Raman spectrum. In the subsequent calculations, the characteristic crystallite size of the curled carbon layer were determined to be 1.0-1.5 nm, as derived from the HRTEM observations. EELS, as shown in FIG. 33H, revealed the presence of a 1s-σ* peak at 292 eV and a 1s-π* peak at 285 eV, which are consistent with the σ and π bonds characteristic of sp$^2$-hybridized carbon. The fraction of sp$^2$ bonds was estimated by using the two-window method[32] and adopting all-sp$^2$ raw glassy carbon as a reference material[27]. The fraction of sp$^2$ bonds is as high as 96.5%, which indicates the dominance of sp$^2$ hybridization in the pyrolytic carbon micropillars. This result is consistent with previous experimental observations that pyrolytic carbon materials treated at high temperature contain mainly disordered sp$^2$ bonds[27] because sp$^3$-hybridized amorphous carbon is unstable above ~700° C.[30]. This result also implies that these bonds correspond to layers of graphene. More details on the estimations and analyses based on the Raman spectra and EELS data are supplied in the description of method later in this Example. The above microstructural characterization revealed that our pyrolytic carbon is an assembly of nanometer-sized curled graphene fragments interspersed with sub-nanometer-sized voids. Overall, this specific and delicate microstructure was designed and created by selecting the precursor materials, and controlling the dimensions/geometry of the printed samples and the pyrolysis conditions.

To characterize the mechanical properties of the pyrolytic carbon micropillars, we carried out a series of nanomechanical experiments. The ex situ uniaxial compression experiments were conducted in a nanoindenter equipped with a 120 μm-diameter flat punch indenter tip. FIG. 34A shows all compressive stress-strain data sets for micropillars with diameters from 4.6 μm to 12.7 μm. It appears that all the micropillars deformed smoothly until failure, first deforming elastically up to approximately 20-30% strain, then yielding and plastically deforming over an additional ~8-10% strain before fracture. Nonlinear behaviors occurred under the first ~1-3% strain due to slight misalignment at the top surface of the micropillars. We estimated the Young's modulus to be 16-26 GPa based on fitting the linear elastic portions of the stress-strain curves in FIG. 34A. The failure strength of these micropillars increased from 3.8 GPa to 5.6 GPa with decreasing diameter. FIG. 34B shows SEM images of a typical micropillar with a diameter of 7.17 μm before and after deformation, demonstrating that it broke into small pieces via brittle facture.

We also carried out similar and in situ compression experiments on micropillars with diameters of ~2 μm and smaller. The in situ compression experiments were conducted in a custom-made in situ nanomechanical instrument (SEMentor), which allows the precise control of deformation with simultaneous video capture[33]. FIG. 34C shows the compressive stress-strain response of a 2.25 μm-diameter micropillar, which is characterized by a linear elastic regime up to ~10% strain, followed by an extensive plateau-like plastic region up to ~25% strain, and a final stage in which the stress rapidly increased from 5.48 to 12.63 GPa over a strain increase of ~18%. This stress-strain curve is similar to that of rubber. After unloading from the maximum stress of 12.63 GPa, the micropillar partially recovered upon the release of approximately 10% elastic strain. FIG. 34C depicts a sequence of snapshots of this sample during the experiment, with the numbered frames corresponding to the same numbered red arrows in the data. We observed that the micropillar shortened and thickened gradually, without localization or catastrophic failure until the maximum applied strain of 43.6%. (In situ compression of pyrolytic carbon micropillar with diameter of 2.25 μm is performed. During compression, the micropillar shortens and thickens gradually with increasing of compressive strain. A slight tilt sometimes occurs during compression. After unloading, the micropillar has an elastic recovery of about 10% strain.) SEM images obtained from front and back views of the pillar revealed a vertically aligned splitting microcrack, which likely nucleated under a large applied compressive stress and led to a slight strain burst, indicated by the blue arrow in the stress-strain data (FIG. 34C). In this Example 1, the compressive strength of such samples corresponds to the stress at the first burst. FIG. 42 shows the detailed in situ deformation process of another micropillar with a diameter of 2.26 μm under compression and captures the nucleation and propagation of the splitting microcrack. The corresponding stress-strain data in FIG. 42, panel (d), show similar features to the plot in FIG. 34C. A clear difference between these two data sets is that a large strain burst is visible in FIG. 42, panel (d), which may be caused by the fast propagation of microcracks. A similar deformation and failure signature is observed during the compression of nearly all the 2 μm-diameter micropillars. To eliminate the possible influence of the residual carbon ring (FIG. 34B), we focus ion beam (FIB) milling to remove the ring from the samples (see FIG. 34C and FIG. 42, panel (d), before compression). FIG. 43 the compressive deformation of a 1.86-μm-diameter micropillar that retained the residual carbon ring, which bulged and detached from the substrate during compression and led to a substantial strain burst at a strain of ~36%, as shown in FIG. 43, panel (d). The maximum attained stresses in FIG. 43, panel (d), are comparable to those in FIG. 34C and FIG. 42, panel (d), which suggests a marginal contribution of the residual carbon ring to the strength.

Uniaxial tension experiments on dog-bone-shaped specimens fabricated using the same procedure were conducted in situ, inside an SEMentor, which enables tensile testing that cannot be accomplished in a regular nanoindenter[33]. FIG. 34D summarizes the tensile stress-strain data for samples with diameters of 0.7-2.0 μm. We observed that all the samples failed after linear elastic loading to an elongation of 10-25% via brittle fracture. (In situ tension of pyrolytic carbon micropillar with diameter of 1.5 μm is performed. The micropillar is stretched to fail with a smooth fracture surface; the tensile fracture strain is up to about 26%.) A typical smooth fracture surface is shown in FIG. 34E. A statistical distribution of the tensile strengths of all tested pyrolytic carbon samples is shown in FIG. 34F and fits a two-parameter Weibull distribution, $$f(\sigma_y) = \frac{m}{\sigma_0} \left( \frac{\sigma_y}{\sigma_0} \right)^{m-1} e^{-\left( \frac{\sigma_y}{\sigma_0} \right)^m},$$

where $\sigma_0$ and m are material parameters. This distribution yields a characteristic strength $\sigma_0$ of 1.78 GPa and a low Weibull modulus m of 3.42, which indicates high variability in the failure strength. This high variability in the failure strength of pyrolytic carbon samples suggests that their failure likely originates from internal flaws.

FIG. 35A presents all experimental data obtained from the compression experiments, where the strength is defined as the compressive fracture stress. This plot reveals that for samples with diameters larger than 2.3 μm, the compressive strength $\sigma_y$ increases with decreasing diameter D according to a power law, $\sigma_y \sim D^{-0.37}$ (FIG. 35A). This scaling law agrees well with the theoretical prediction of $\sigma_y \sim D^{-0.40}$, which was derived from the asymptotic analysis of a fracture mechanics-based model[34] describing the compressive failure of quasi-brittle columns with characteristic diameter D. In this model, the columns are found to fail via the propagation of a splitting crack with an initial length h, similar to the experimental observations (e.g., FIG. 34C and FIG. 42). This model also offers an expression for the theoretical limit, $\sigma_{th}$, of the compressive strength[34]:

$$\sigma_{th} \approx 2.76 \left( \frac{E^3 \Gamma^2}{h^2} \right)^{1/5} \tag{2}$$

where E is the Young's modulus, and $\Gamma$ is the fracture energy. Using the modulus E=19.5 GPa (the average modulus obtained from the compression experiments on all samples) and the fracture energy of glassy carbon, $\Gamma$=29.9-61.9 J/m$^2$, reported in Ref. 35, we used Eq. 2 to calculate a theoretical limit range of $\sigma_{th}$=4.0-13.5 GPa for the initial length of the splitting crack, h=100 nm-1 μm. This predicted range is similar to the experimentally acquired compressive strengths of 3.8-11.3 GPa (FIG. 35A), which implies that the strength of pyrolytic carbon pillars with diameters less than 2.3 μm approaches the theoretical limit. In the highlighted region above the average strength (indicated by a blue dashed line in FIG. 35A), the micropillars can sustain an ultra-high compressive stress of 7.2-11.3 GPa and a high compressive strain in excess of 40%. The significant fluctuations in the compressive strength of the micropillars with D<2.3 m mainly arise from the variation in the length of the initial splitting microcrack h. The compressive strengths of the micropillars with D<2.3 μm are, on average, higher by a factor of 3.5 than the corresponding tensile strengths of 0.8-2.5 GPa. This tension-compression asymmetry is consistent with the theoretical prediction of an asymmetry factor of 2.5-4.4 that arises in high-strength, covalently bonded isotropic materials, as determined from a recent ellipse fracture criterion[36]. The compression and tension experiments revealed that the pyrolytic carbon micropillars with D<2.3 μm exhibit high deformability, i.e., >40% compressive strain and ~20% tensile strain prior to failure. The cyclic compression experiments on these samples exhibited nearly full recovery after each cycle beyond the first one. FIG. 35B shows a 20-cycle force-displacement data set of a 1.28 μm-diameter micropillar with a maximum compressive strain of 23%. These data, in combination with the pre-/post-deformation SEM images shown in the insets of FIG. 35B, indicate that after 20 cycles of compression to 23% strain, the micropillar recovered 95% of its original height.

To reveal the underlying mechanisms that enable the observed large deformability and ultra-high strength of the small-scale pyrolytic carbon, we performed large-scale molecular dynamics (MD) simulations of the uniaxial compression and tension of pyrolytic carbon pillars with diameters of 10-20 nm and a constant aspect ratio of 2 via LAMMPS[37]. During the simulations, nanopillars were compressed or stretched along the axial direction with a constant strain rate of $5 \times 10^8$ s$^{-1}$ and a constant temperature of 300 K. Throughout the simulations, we used the adaptive intermolecular reactive empirical bond order force field[38] to describe the interatomic interactions. This force field is capable of capturing the formation and breakage of carbon bonds[38]. A complete description of the atomistic simulations is presented in Methods. The simulated samples consist of many ~1 nm-sized curled graphene layer fragments and possess a density of 1.4 g/cm$^3$, which is consistent with the TEM observations of our experimental samples, as illustrated in FIG. 36A. These fragments were connected by covalent bonding or van der Waals interactions. The magnified image in FIG. 36A shows that the spacing between neighboring graphene fragments is approximately 0.4 nm and that several sub-nanometer-sized voids are present adjacent to them, as in the HRTEM images in FIGS. 33D-33F. The hybridization of carbon atoms in graphene is typically such that the sp bonds are mainly concentrated within the edges of graphene layers, and the sp$^3$ bonds generally connect the neighboring graphene layers to each other or form at their high-energy curved surfaces (FIG. 36A). In certain simulated samples, the fraction of sp$^2$ bonds is at least one order of magnitude higher than the fractions of sp and sp$^3$ (see FIG. 44) bonds, indicating the dominance of sp$^2$ bonds, which is consistent with the above analyses from EELS. FIGS. 36B-36C present the compressive and tensile stress-strain response determined from the MD simulations and reveal similar trends and stresses to those in the experimental data. This result partially confirms the similarity of the microstructure and densities of the simulated and experimental samples. FIGS. 36D-36G depict several snapshots of the cross-section of a simulated deformed sample at different compressive strains. In the initial elastic stage, the curled graphene layers approached each other, and some bent significantly (FIG. 36D). As the applied compressive strain increased, several graphene layers slipped relative to the neighboring ones, which led to the abrupt fracture of the graphene layers under shear (FIGS. 36D-36E). Such discrete failure events gave rise to stress fluctuations in the mechanical response at a strain of 21.5%, as shown in FIG. 36B. At a compressive strain of 50%, the sub-nanometer-sized voids collapsed and caused densification of the nanopillars. Slight tilting occurred in the nanopillar due to the interlayer slipping and shear of neighboring graphene layers (FIG. 36F). During unloading, the nanopillar exhibited recovery associated with the release of the stored elastic strain energy; the distances between graphene layers increased, and the sub-nanometer-sized voids partially reopened (FIG. 36G). The recovered strain is 19%, which is comparable to the experimental results (FIG. 36B). (Additionally, atomistic simulation of uniaxial compression on pyrolytic carbon nanopillars with diameter of 20 nm is performed. In the initial compressive stage, the curled graphene layers approach each other, and some graphene layers bend significantly. As the compressive strain increases, a few graphene layers slip relative to the neighboring layers, leading to the abrupt fracture of the graphene layers under shear. When the compressive strain is 50%, the sub-nanometer-sized voids tend to close, resulting in the densification of the pillars. Slight tilting occurs in the nanopillar due to the interlayer slipping and shear of neighboring graphene layers. During unloading, the nanopillar exhibits a certain elastic recovery. The distances between graphene layers increases and the sub-nanometer-sized voids partially reopen.)

Another similarity to the experiments is that all simulated nanopillars subjected to tension failed after undergoing nearly linear elastic deformation (FIG. 36C). FIGS. 36H-36J show a sequence of snapshots of the cross-section of a stretched sample at different strains. We observed that a number of nanoscale cavities nucleated, expanded under tension, and then coalesced, leading to the formation of nanoscale cracks (FIG. 36I and FIG. 45A). Eventually, these nanoscale cracks propagated in the direction normal to the tensile loading, resulting in a smooth fracture surface (FIG. 36J and FIG. 45B). This cleavage fracture is similar to the experimental observations shown in FIG. 34E. (Additionally, atomistic simulation of uniaxial tension on pyrolytic carbon nanopillars with diameter of 20 nm is performed. During tension, the curved graphene layers are stretched. A number of nanoscale cavities nucleate, grow up and then coalesce, leading to the formation of nanoscale cracks. Eventually, these nanoscale cracks propagate in the direction normal to the tensile direction, resulting in a smooth fracture surface.) FIG. 36C shows that the tensile strength of a nanopillar without initial cracks is above 20 GPa, which stems from the requirement for significant forces to break the strong covalent bonds. The strength is reduced to approximately 12 GPa after introducing cracks into the nanopillar, which indicates that the presence of initial flaws/imperfections facilitates a significant reduction in the tensile strength of pyrolytic carbon pillars. FIG. 46 shows the deformation processes of nanopillars with initial 4- and 8 nm-long nanocracks. We observe that their failure always originated from the growth and extension of the pre-existing nanocracks, leading to a smaller fracture strain and a smoother fracture surface than in nanopillars without nanocracks. The tensile strengths of the simulated samples are much higher than those of the experimental samples, which is a common phenomenon caused by a difference of approximately 10-11 orders of magnitude in the applied strain rate, a difference of approximately 1-2 orders of magnitude in sample size and non-equivalent flaw concentrations in the experiments and simulations. The MD simulations also revealed some mechanistic details regarding the compression and tension of pyrolytic carbon pillars. During compression, the large deformation is accommodated by the closure of sub-nanometer-sized voids, densification of the structures and slipping/shear of the graphene layer fragments. Under tension, samples with initial flaws fail via the coalescence and extension of pre-existing flaws. For samples without initial flaws, tensile deformation is dominated by the nucleation, growth and coalescence of nanoscale cavities and the propagation of the resultant nanoscale cracks (FIGS. 36H-36J and FIGS. 45A-45B). These underlying deformation mechanisms provide reasonable explanations for the observed high deformability, high elastic limit and high strength of the pyrolytic carbon micropillars.

To examine the properties of the pyrolytic carbon materials explored in this work in their context, we plotted a strength-versus-density material parameter landscape for various structural materials in FIG. 37A, which also includes conventional structural materials[4,25,26,39] and recently reported high-strength nanomaterials[6,10,40-43]. This plot reveals that the strengths of the pyrolytic carbon in this work are approximately 1-3 orders of magnitude higher than those of most structural materials, including bulk pyrolytic carbon (PyCs)[25,26,39], graphite, carbon fiber-reinforced carbon (C/C)[40] graphene oxide paper (GOP)[41], copper nanopillars (Cu-NPs)[42], gold nanopillars (Au-NPs)[43], and bulk nanotwinned copper (NT-Cu)[6], and approaches the upper bound for the uniaxial strength of structural materials proposed in Ref. 28. The strength of the pyrolytic carbon micropillars is comparable to those of carbon microfibers[44] and gold nanowires (Au-NWs)[10], but its density is approximately 79% and 7.3% of those of carbon fibers and Au-NWs, respectively. FIG. 47 shows an analogous property plot of the strength versus fracture strain for various materials, including shape memory zirconia[12], SU-8 composites[14], carbon microfibers[44], GOP[41], Cu-NPs[42], NT-Cu[6], and Zr-based metallic glasses (MG)[45]. The pyrolytic carbon micropillars in this work exhibit a superior combination of high strength and high deformability, which implies that they overcome the classical trade-off between strength and deformability that has plagued all materials to date. It appears that the pyrolytic carbon micropillars simultaneously possess high tensile and compressive strengths of 2.5 GPa and 11.0 GPa and a low density of 1.0-1.8 $g/cm^3$, thereby partially overcoming the conflict between high strength and low density, leading to an ultra-high specific strength of 8.07 GPa/g $cm^3$. FIG. 37B shows the specific tensile and compressive strengths of various materials and reveals that the pyrolytic carbon micropillars have at least one order of magnitude greater specific strength than those of GOP, NT-Cu and Au-NWs, comparable to that of carbon microfibers. Their specific compressive strengths exceed that of diamond, which has the highest specific compressive strength to date[28], of common hard ceramics[46] (such as $B_4C$, SiC, and $Al_2O_3$), of metallic nanopillars (Cu-NPs[42] and Au-NPs[43]), and of carbon materials (PyCs[25,26,39], graphite, and C/C[40]). FIG. 37C shows an Ashby plot of specific strength versus fracture strain for our pyrolytic carbon and other various materials, including titanium alloys, magnesium alloys, carbon fiber reinforced polymer (CFRP) and diamond. Notably, our pyrolytic carbon occupies the unexplored space in the Ashby diagram, where no other materials reach. Our experiments and simulations revealed that pyrolytic carbon micropillars exhibit a unique combination of high deformability, an ultra-large elastic limit, and ultra-high strength and specific strength. These superior mechanical properties of the pyrolytic carbon micropillars arise from their microstructures and constituent materials. As basic building blocks, curled graphene layers with a size of 1 nm have high in-plane rigidity and out-of-plane flexibility as well as high strength. The dense assembly of these graphene layers forms pyrolytic carbon micropillars via covalent bonding or van der Waals interactions. As a result, the pyrolytic carbon micropillars can sustain large elastic distortion and resist large compression and stretching. These results offer a new design route of assembling nanometer-sized curled graphene fragments into high-performance carbon materials.

It is noted that our pyrolytic carbon micropillars exhibit 1.5-8.2 times higher compressive strength and at least one order of magnitude larger fracture strain than existing bulk and micro-sized pyrolytic carbon[26,27]. These differences in mechanical properties can be attributed to differences in microstructures and sample sizes between these materials. First, both the crystallite size of the carbon layer fragments and spacing between neighboring layers in our pyrolytic carbon are much smaller than those (about 4-6 nm and 1.67-1.99 nm) of the existing bulk and micro-sized pyrolytic carbon[26,27]. These different microstructures are induced by different pyrolysis precursor materials and conditions (such as temperature and duration time). Second, our pyrolytic carbon with high strength and large deformability are several microns in diameters, which are 2-4 orders of magnitude smaller than diameters (beyond hundreds of microns) of bulk and micro-sized pyrolytic carbon[26,27]. Therefore, designing/controlling atomic-level microstructures and sample dimension have resulted in significant enhancement of the mechanical properties of pyrolytic carbon.

In summary, we have synthesized new pyrolytic carbon micropillars derived from a polymeric photoresist via DLW and pyrolysis. These micropillars consist of curled graphene fragments with an average size of approximately 1.0-1.5 nm. Both compressive and tensile tests showed that these micropillars exhibit an exceptional combination of large deformability, an ultra-large elastic limit, and ultra-high strength and specific strength. Large-scale MD simulations provided some mechanistic details of the deformation of pyrolytic carbon pillars, i.e., compressive deformation was dominated by densification of the structure and slipping/shear of the graphene layers, while tensile deformation was governed by the extension of initial flaws or by the nucleation, growth and coalescence of nanoscale cavities. These deformation mechanisms are responsible for the unique combination of desirable properties such as high deformability, a high elastic limit and high strength. Our results reveal the critical connections between the microstructure, deformation mechanisms and mechanical properties of pyrolytic carbon materials and thereby provide potential routes for designing and synthesizing new high-performance carbon materials.

Methods:

Fabrication of samples: The fabrication process of pyrolytic carbon micropillars includes two steps: two-photon lithography and high-temperature pyrolysis. We first synthesized the pillars using 3D TPL DLW (Photonic Professional, Nanoscribe GmbH) with the dip-in laser lithography configuration, a 63× objective and commercial IP-Dip photoresist. For pyrolysis, the printed polymeric samples were heated to 900° C. at a ramp rate of 7.5° C. $min^{-1}$ in a vacuum tube furnace, then maintained at the target temperature for 5 hours, and finally cooled to the room temperature at a natural rate. After pyrolysis, the pillar dimensions shrank to approximately 20%-25% of their original values, which corresponds to a 98% volumetric contraction. The diameter D of the pyrolytic carbon pillars for the compression experiments varied from 1.28 to 12.7 μm. Dog-bone shaped samples with gauge sections of 0.7 to 2.0 μm were also synthesized using the same procedure for the tensile experiments. The aspect ratios (i.e., height to diameter) of the pyrolytic carbon samples were 1.4-1.8 for compression and 1.5-4.3 for tension.

Microstructural characterization: The microstructure of the pyrolytic carbon micropillars was characterized by an FEI Technai TF-30 TEM at an accelerating voltage of 300 kV. EELS was conducted in an FEI Technai TF-20 at an accelerating voltage of 200 kV to estimate the relative fractions of $sp^2$ and $sp^3$ bonds. Samples for TEM analyses were prepared using a site-specific lift-out procedure, attaching the detached lamella to the TEM grid, and final thinning to a final thickness of 60.73 nm using a voltage of 15 kV and a current of 10 pA in the focused ion beam (FIB, FEI Versa).

Raman spectra were collected at room temperature using a Raman spectrometer (Renishaw M1000 Micro) with a 514.5 nm laser.

Nanomechanical experiments: Uniaxial compression on samples with diameters of 1.28-2.28 μm and all uniaxial tension experiments were conducted at a constant nominal strain rate of $10^{-3}$ s$^{-1}$ in a custom-made in situ nanomechanical instrument (SEMentor)[33] with a 10 μm-diameter flat punch indenter tip. Samples with larger diameters of 4.6-12.7 μm were compressed in a nanoindenter (Nanoindenter G200 XP, Agilent/Keysight Technologies) with a 120 μm-diameter flat punch at a constant loading rate of 0.02-0.2 mN s$^{-1}$ because of the load limit in the in situ instrument. Additional compression experiments were conducted on samples with diameters of 2.21-12.7 μm in the G200 to independently validate the results of the in situ experiments.

Estimation of the density of pyrolytic carbon micropillars from TEM analysis: HRTEM images reveal that the pyrolytic carbon micropillars consist of nanometer-sized, randomly distributed curved graphene layers. FIG. 41 provides a comprehensive set of images that pertain to the estimation of density in these materials. FIG. 41, panel (a), illustrates the distribution of the curved graphene segments, and FIG. 41, panel (b), shows an individual representative graphene segment, where the average end-to-end length is L and the spacing between neighboring layers $L_s$. We built upon an existing geometric model[26] to estimate the density ($\rho_{PC}$) of pyrolytic carbon. The density of the curved graphene layers, $\rho_{CGL}$, can be expressed as $$\rho_{CGL} = \frac{\beta L_G}{L_s} \rho_G \tag{1}$$

where $\rho_G$ is the density of single crystalline graphite ($\rho_G$=2.25 g/cm$^3$), $L_G$ is the interlayer distance in single crystalline graphite ($L_G$=0.34 nm), and β is a shape factor that reflects the curvature of the curved graphene layer: β=1 represents a flat graphene layer, and β=π/2 corresponds to a semi-circle. FIG. 41, panel (c), is a schematic that represents a reasonable stacking structure of two curved graphene layers. Using this geometry as a guide, the density of pyrolytic carbon can be estimated as[26]

$$\rho_{PC} = \rho_{CGL}\left(\frac{1}{1 + 0.5(L/L_s)\sin\theta\cos\theta}\right) \tag{2}$$

where θ is the orientation angle between two graphene layers in a typical unit cell (see FIG. 41, panel (c)), and θ=45° corresponds to isotropic pyrolytic carbon[26], where the curved graphene layers are randomly distributed. Based on TEM observations (FIGS. 33E-33F), we obtained β=1 or π/2, θ=π/4, $L_s$=0.4 nm, and L=1.0-1.5 nm. By substituting these parameters into Eqs. (1-2), we obtain $\rho_{PC}$=1.0-1.8 g/cm$^3$. FIG. 41, panel (d), compares our modified model, a previous geometric model and the experimental data on bulk pyrolytic carbon. The predictions from this modified model agree with the experimental data[25,39].

Estimation of carbon fragment size based on Raman spectra: Raman spectroscopy is widely used to investigate defects and disorder in carbon materials at the nanoscale level, including graphene, carbon nanotubes and glassy carbon[31,47]. The ratio of the integrated area under the D peak and that under the G peak, $I_D/I_G$, in a Raman spectrum is related to the in-plane crystallite size (L) of carbon materials by Eq. (1)[31]. We first fitted the Raman spectra of a pyrolytic carbon micropillar using four Lorentzian-shaped bands (G, $D_1$, $D_2$, $D_4$) at the Raman shifts of ~1580, 1350, 1620 and 1200 cm$^{-1}$ and a Gaussian-shaped band ($D_3$) at 1500 cm$^{-1}$ in Ref. 47. The Raman spectrum shown in FIG. 33G has $I_D/I_G$=6.937 and the laser wavelength $\lambda_l$=514.5 nm, which gives L=2.4 nm by Eq. (1). This result is in agreement with the characteristic size of 1.0-1.5 nm of curved graphene layers estimated based on HRTEM analysis.

Estimation of fraction of sp$^2$ bonds based on EELS: EELS spectra provide quantitative information about the electronic structure of carbon materials[27,32]. We used the common two-window method[32] to estimate the fraction of sp$^2$ bonds in the pyrolytic carbon micropillars and used the EELS data of raw glassy carbon, which is fully sp$^2$-hybridized, as a reference. From the EELS data of pyrolytic carbon in FIG. 33H and raw glassy carbon, we calculated the areas under the two windows around the π* and σ* peaks, denoted by $I_\pi$ and $I_\sigma$, of the pyrolytic carbon and of raw glassy carbon. A normalized ratio $N_{int}$ can then be calculated as[27,32]

$$N_{int} = \frac{I_\pi^{PC}/I_\sigma^{PC}}{I_\pi^{RG}/I_\sigma^{RG}} \tag{3}$$

where the superscripts "PC" and "RG" represent pyrolytic carbon and raw glassy carbon, respectively. The normalized ratio $N_{int}$ is also a function of the fraction of sp$^2$ bonds f as follows[27,32]:

$$N_{int} = \frac{3f}{4-f} \tag{4}$$

Setting Eq. (3) and Eq. (4) equal to each other, we found the fraction of sp$^2$ bonds in the pyrolytic carbon micropillars to be 96.5%.

Atomistic simulations: We performed a series of large-scale atomistic simulations that emulate the uniaxial compression and tension of pyrolytic carbon nanopillars using LAMMPS[37]. We used the adaptive intermolecular reactive empirical bond order force field[38] in all simulations to describe the interatomic interactions. This force field describes the bonded interactions based on the bond order, the non-bonded interactions (i.e., van der Waals) and the torsional interactions, which enables it to capture the formation and breakage of carbon bonds[38]. We first constructed the simulated samples using the microstructure determined experimentally from the HRTEM images, which contained many curved graphene fragments with an average size of 1 nm. These graphene fragments were extracted from $C_{84}$ fullerene. A large number of such graphene fragments with random orientations were initially hexagonally close-packed in a simulation box with dimensions of 27.5×27.2×54.3 nm$^3$. This system was then equilibrated by an energy minimization and a free relaxation at 300 K for 50 ps under an NPT ensemble. After equilibration, the simulated system was hydrostatically compressed at a constant strain rate of 10$^9$ s$^{-1}$ at 300 K for 550 ps via an NVT ensemble until the density of the simulated sample condensed to 1.40 g/cm$^3$ (the estimated median density of the pyrolytic carbon micropillars based on the microstructural features). After compression, the hydrostatic pressure increased to 10 GPa. We then performed a melting-and-quenching process while holding the volume constant by confining all the dimensions of the simulation box. During this process, we first gradually increased the temperature from 300 K to 1200 K within 50 ps, then held the temperature at 1200 K for 300 ps to fuse the graphene flakes at high temperature and high pressure, and finally reduced the temperature from 1200 K to 300 K in 50 ps. We then relaxed the simulated sample at 300 K for 200 ps under an NPT ensemble to fully relieve the pressure to zero. After relaxation, the simulated sample had dimensions of 20.5×20.4×40.8 nm$^3$ and a density of ~1.40 g/cm$^3$. Throughout these processes, periodic boundary conditions were imposed in all three directions of the simulated samples.

We then extracted the nanopillars with diameters of 10 and 20 nm from the above relaxed cubic sample to perform uniaxial deformation simulations. We maintained the aspect ratios of all nanopillars near 2 to mimic the experiments. After equilibration, we compressed or stretched the nanopillars along the axial direction at a constant strain rate of $5×10^8$ s$^{-1}$ and a constant temperature of 300 K via an NVT ensemble. During simulations, the stress of each atom was calculated based on the Virial stress theorem. The compressive and tensile stresses were obtained by averaging over the axial stresses of all atoms in nanopillars.

We also investigated the influence of flaws, such as nanoscale cracks, on the tensile response of simulated samples. We introduced a few nanoscale cracks with lengths of 4 or 8 nm by removing some atoms from the "as-constructed" samples. After equilibration, we applied the same tensile loading to the samples with nanocracks as to the "as-constructed" ones and compared their stress-strain response and fracture. Throughout the simulations, periodic boundary conditions were imposed along the axial direction of the simulated nanopillars. We identified the sp, sp$^2$, and sp$^3$ bonds of the simulated samples by counting the coordination number of each atom. We found that the sp bonds were mainly distributed at the edges of the curved graphene layers, and the sp$^3$ bonds either connected the neighboring graphene layers to each other or were formed at the high-energy curved surfaces of the graphene layers (see FIG. 44). The fractions of sp, sp$^2$ and sp$^3$ hybridized bonds in the "as-constructed" samples were 8.8%, 89.1% and 1.8%, respectively, indicating that sp$^2$ bonding was dominant in the simulated samples, which was consistent with the experimental results (FIG. 33H). The remaining 0.3% of bonds were dangling bonds.

REFERENCES CORRESPONDING TO EXAMPLE 8

1. Meyers, M. A. & Chawla, K. K. *Mechanical Behavior of Materials* (Cambridge Univ. Press, Cambridge, 2009).

2. Ashby, M. F. Material Property Charts. in *Materials Selection in Mechanical Design* (Butterworth-Heinemann, Oxford, ed. 4, 2011), chap. 4, pp. 57-96.

3. Muth, J. T., Dixon, P. G., Woish, L., Gibson, L. J. & Lewis, J. A. Architected cellular ceramics with tailored stiffness via direct foam writing. *Proc. Natl. Acad. Sci. USA* 114, 1832-1837 (2017).

4. Lucas, R., Meza, L. R., Das, S. & Greer, J. R. Strong, lightweight, and recoverable three-dimensional ceramic nanolattices. *Science* 345, 1322-1326 (2014).

5. Wang, H. et al. Ultralight, scalable, and high-temperature-resilient ceramic nanofiber sponges. *Sci. Adv.* 3, e1603170 (2017).

6. Lu, L., Shen, Y., Chen, X., Qian, L. & Lu, K. Ultrahigh strength and high electrical conductivity in copper. *Science* 304, 422-426 (2004).

7. Sanders, P. G., Eastman, J. A., & Weertman, J. R. Elastic and tensile behavior of nanocrystalline copper and palladium. *Acta Mater.* 45, 4019-4025 (1997).

8. Zhang, Y. et al. Microstructures and properties of high-entropy alloys. *Prog. Mater. Sci.* 61, 1-93 (2014).

9. Greer, J. R. & Hosson, J. T. Plasticity in small-sized metallic systems: Intrinsic versus extrinsic size effect. *Prog. Mater. Sci.* 56, 654-724 (2011).

10. Wu, B., Heidelberg, A. & Boland, J. J. Mechanical properties of ultrahigh-strength gold nanowires. *Nat. Mater.* 4, 525-529 (2005).

11. Lowry, M. B. et al. Achieving the ideal strength in annealed molybdenum nanopillars. *Acta Mater.* 58, 5160-5167 (2010).

12. Lai, A., Du, Z., Gan, C. L. & Schuh, C. A. Shape memory and superelastic ceramics at small scales. *Science* 341, 1505-1508 (2013).

13. Jordan, J., Jacob, K. I., Tannenbaum, R., Sharaf, M. A. & Jasiuk, I. Experimental trends in polymer nanocomposites-a review. *Mater. Sci. Eng. A* 393, 1-11 (2005).

14. Dusoe, K. J. et al. Ultrahigh elastic strain energy storage in metal-oxide-infiltrated patterned hybrid polymer nanocomposites. *Nano Lett.* 17, 7416-7423 (2017).

15. Gogotsi, Y. Not just graphene: The wonderful world of carbon and related nanomaterials. *MRS Bull.* 40, 1110-1121 (2015).

16. C. Lee, C., X. Wei, X., J. W. Kysar, J. W. & Hone, J. Measurement of the elastic properties and intrinsic strength of monolayer graphene. *Science* 321, 385-388 (2008).

17. Rasool, H. I., Ophus, C., Klug, W. S., Zettl, A. & Gimzewski, J. K. Measurement of the intrinsic strength of crystalline and polycrystalline graphene. *Nat. Commun.* 4, 2811 (2013).

18. Zhang, P. et al. Fracture toughness of graphene. *Nat. Commun.* 5, 3782 (2014).

19. Wei, Y. et al. The nature of strength enhancement and weakening by pentagon-heptagon defectsin graphene. *Nat. Mater.* 11, 759-763 (2012).

20. Song, Z., Artyukhov, V. I., Wu, J., Yakobson, B. I. & Xu, Z. Defect-detriment to graphene strength Is concealed by local probe: the topological and geometrical effects. *ACS Nano* 9, 401-408 (2015).

21. Cao, A., Dickrell, P. L., Sawyer, W. G., Ghasemi-Nejhad, M. N. & Ajayan, P. M. Super-compressible foam-like carbon nanotube films. *Science* 310, 1307-1310 (2005).

22. Qu, L., Dai, L., Stone, M., Xia, Z. & Wang, Z. L. Carbon nanotube arrays with strong shear binding-on and easy normal lifting-off. *Science* 322, 238-242 (2008).

23. Barg, S. et al. Mesoscale assembly of chemically modified graphene into complex cellular networks. *Nat. Commun.* 5, 4328 (2014).

24. Qin, Z., Jung, G. S., Kang, M. J. & Buehler, M. J. The mechanics and design of a lightweight three-dimensional graphene assembly. *Sci. Adv.* 3, e1601536 (2017).

25. Zhang, H., Lopez-Honorato, E. & Xiao, P. Fluidized bed chemical vapor deposition of pyrolytic carbon-Ill. Relationship between microstructure and mechanical properties. *Carbon* 91, 346-357 (2015).

26. Stein, I. Y. et al. Structure-mechanical property relations of non-graphitizing pyrolytic carbon synthesized at low temperatures. *Carbon* 117, 411-420 (2017).

27. Hu, M. et al. Compressed glassy carbon: An ultrastrong and elastic interpenetrating graphene network. *Sci. Adv.* 3, e1603213 (2017).

28. Bauer, J., Schroer, A., Schwaiger, R. & Kraft, O. Approaching theoretical strength in glassy carbon nano-lattices. *Nat. Mater.* 15, 438-443 (2016).

29. Li, X. & Gao, H. Mechanical metamaterials: Smaller and stronger. *Nat. Mater.* 15, 373-374 (2016).

30. Harris, P. J. New perspectives on the structure of graphitic carbons. *Crit. Rev. Solid State* 30, 235-253 (2005).

31. Cançado, G. L. et al. General equation for the determination of the crystallite size of nanographite by Raman spectroscopy. *Appl. Phys. Lett.* 88, 163106 (2006).

32. J Bruley, J., Williams, D. B., Cuomo, J. J. & Pappas, D. P. Quantitative near-edge structure analysis of diamond-like carbon in the electron microscope using a two-window method. *J. Microsc.* 180, 22-32 (1995).

33. Jennings, A. T. & Greer, J. R. Tensile deformation of electroplated copper nanopillars *Phil. Mag.* 91, 1108-1120 (2011).

34. Bazant, Z. P. & Xiang, Y. Size effect in compression fracture: Splitting crack band propogation. *J. Eng. Mech.* 13, 162-172 (1997).

35. Zhao, J. X., Bradt, R. C. & Walker, P. L. The fracture toughness of glassy carbons at elevated temperatures. *Carbon* 23, 15-18 (1985).

36. Qu, R. & Zhang, Z. A universal fracture criterion for high-strength materials. *Sci. Rep.* 3, 1117 (2013).

37. Plimpton, S. Fast parallel algorithms for short-range molecular dynamics. *J. Comp. Phys.* 117, 1-19 (1995).

38. Stuart, S. J., Tutein, A. B. & Harrison, J. A. A reactive potential for hydrocarbons with intermolecular interactions. *J. Chem. Phys.* 112, 6472-6486 (2000).

39. Yajima, S., Hirai, T. & Hayase, T. Micro-hardness of pyrolytic graphite and siliconated pyrolytic graphite. *Tanso* 69, 41-47 (1972).

40. Oku, T., Kurumada, A., Imamura, Y. & Ishihara, M. Effects of ion irradiation on the hardness properties of graphites and C/C composites by indentation tests. *J. Nucl. Mater.* 381, 92-97 (2008).

41. Dikin, D. et al. Preparation and characterization of graphene oxide paper. *Nature* 448, 457-460 (2007).

42. Jang, D., Li, X., Gao, H. & Greer, J. R. Deformation mechanisms in nanotwinned metal nanopillars. *Nat. Nanotechnol.* 7, 594-601 (2012).

43. Greer, J. R., Oliver, W. C. & Nix, W. D. Size dependence of mechanical properties of gold at the micron scale in the absence of strain gradients. *Acta Mater.* 53, 1821-1830 (2005).

44. Fu, S. Y., Lauke, B., Mäder, E., Yue, C. Y. & Hu, X. Tensile properties of short-glass-fiber- and short-carbon-fiber-reinforced polypropylene composites. *Composites Part A* 31, 1117-1125 (2000).

45. Jang, D. & Greer, J. R. Transition from a strong-yet-brittle to a stronger-and-ductile state by size reduction of metallic glasses. *Nat. Mater.* 9, 215-219 (2010).

46. Dunlay, W. A., Tracy, C. A. & Perrone, P. J. A proposed uniaxial compression test for high strength ceramics. DTIC Document, (1989).

47. Sadezky, A., Muckenhuber, H., Grothe, H., Niessner, R. & Poschl, U. Raman microspectroscopy of soot and related carbonaceous materials: Spectral analysis and structural information. *Carbon* 43, 1731-1742 (2005).

Example 9: Lightweight, Flaw Tolerant and Strong Nano-Architected Carbon

Abstract of this illustrative Example: A long-standing challenge in modern materials design is to create low-density materials that are robust against defects and can withstand extreme thermomechanical environments because these properties typically are mutually exclusive: the lower the density, the weaker and more fragile the material. We developed a simple process to create nano-architected carbon that can attain a specific strength (strength-to-density ratio) of $1.90 \, GPa \, g^{-1} \, cm^3$, which represents greater than 1-3 orders of magnitude improvement over that of all nano- and micro-architected materials to date. We used two-photon lithography followed by pyrolysis in vacuum at 900° C. to fabricate two prototype topologies of pyrolytic carbon: octet- and iso-truss, with unit-cell dimensions of ~2 m, beam diameters between 261 nm and 679 nm, and densities of 0.24 to 1.0 $g/cm^3$. Micromechanical experiments demonstrate a Young's modulus of 0.34-18.6 GPa, strengths of 0.05-1.9 GPa, and an average strain-to-fracture of 14%-17%. Experiments and simulations demonstrate that for densities higher than 0.95 $g/cm^3$, these nanolattices become insensitive to fabrication-induced defects, which gives rise to their nearly attaining the theoretical strength of constitute materials and lends nano- and micro-architected carbon to being particularly promising candidates for structural applications under harsh thermomechanical environments. We discuss this combination of high specific strength, low density, and extensive deformability prior to failure in the context of interplay among atomic-level microstructure of pyrolytic carbon, nano-sized beam dimensions, and optimized lattice topology.

Significance:

Strength and density of porous materials typically scale together. A long-standing challenge in modern material design has been to create porous materials that are simultaneously lightweight, strong and stiff. Here we demonstrated the creation of pyrolytic carbon nanolattices with designable topologies by a two-step procedure: direct laser writing and pyrolysis at high temperature. The smallest characteristic size of the struts in nanolattices approached the limits of resolution of the available three-dimensional lithograph technologies. We demonstrated that these pyrolytic carbon nanolattices are 1-3 orders of magnitude stronger nearly all micro-/nano-architected materials reported so far.

Lightweight porous materials, such as wood, bone, Euplectella sponges, diatoms and bamboo, are ubiquitous in nature. These natural structural materials have been extensively investigated (1-5) and shown to be resilient against externally applied loads, as well as powerful in absorbing and dissipating impact energy. Such mechanical resilience is enabled by two main design principles: (i) the multi-scale hierarchy in constituent materials and length scales of natural materials, which generally consist of complex multi-level architectures with characteristic dimensions from nano- to macroscale (5) and (ii) their tolerance to flaws when the characteristic material length scale is below a critical value (4). Both principles have been applied to engineering advanced materials with various degrees of success (5,6).

A general guideline for a material to be considered "lightweight" is for its density to be less than that of water (i.e., $\rho \leq 1.0 \, g/cm^3$) (16). Recent breakthroughs in material processing techniques, especially in three-dimensional (3D) microfabrication and additive manufacturing provide a particularly promising pathway to fabricate lightweight materials, which often possess a suite of other beneficial properties like high specific stiffness, high specific strength and good resilience/recoverability (7-27). The penalty for the ultra light weight in these nano- and micro-architected materials is a severe reduction in their stiffness and strength through power law scaling: $\sigma_y \sim (\rho/\rho_s)^m$, $E \sim (\rho/\rho_s)^n$, where $\sigma_y$ is the yield strength, E is the Young's modulus, $\rho$ is the density, and $\rho_s$ is the density of the fully-dense constituent solid (1). The exponents m and n are generally greater than 1, which renders developing methodologies to create materials that are simultaneously lightweight and strong/stiff, while maintaining their other properties—i.e. thermal stability, electrical conductivity, magnetism, recoverability, etc.—a grand unsolved challenge because of the restricted material choices and limited architectures.

Most work on micro-/nano-architected materials to date has been focused on hollow-beam based architectures, which offer exceptionally light weight with a concomitant high compliance, for example nickel-based hollow-tube microlattices with a modulus of 529 kPa and a compressive strength of ~10 kPa at a density of ~0.010 g/cm³ (7) and ceramic hollow-tube nanolattices with Young's moduli of 0.003-1.4 GPa, compressive strengths of 0.07-30 MPa at densities of 0.006 to 0.25 g/cm³ (10-14). These micro-/nano-architected materials have a common feature of length scale hierarchy, i.e. relevant dimensions of their structural elements span 3-5 orders of magnitude, from tens of nanometers to hundreds of micrometers and even greater. Structural features of nickel-alloy hollow-tube nanolattices fabricated using large-area projection microstereolithography span 7 orders of magnitude in spatial dimensions, from tens of nanometers to tens of centimeters, and attained tensile strains of >20% with a low modulus of 125 kPa and a low tensile strength of ~80 kPa at a density of ~0.20 g/cm³, which corresponds to the relative density of 0.15% (17). The deformability of these nanolattices was attributed to a combination of bending-dominant and stretching-dominated hierarchical architectures distributed over successive hierarchies and shell buckling, an elastic instability characteristic of thin-walled hollow cylinders (17). Among the thin-walled architectures, 3D periodic graphene aerogel microlattices have been synthesized via direct ink writing; these materials are exceptionally lightweight, with a density of 0.031-0.123 g/cm³, very compliant, with a modulus of 1-10 MPa, and weak, with a low strength of 0.10-1.6 MPa, and exhibit nearly complete recovery after compression to 90% strain (23).

Some efforts have also been dedicated to the synthesis and mechanical properties of micro- and nano-architected materials that are comprised of non-hollow beams of various materials, which offer greater stiffness and higher densities compared with the hollow-beam counterparts. Most of these studies have been on architectures comprised of core-shell types of beams, usually with an acrylic polymer core and a thin, from tens of nanometers to several hundred nanometers, rigid outer coating. For example, triangular-truss microlattices with polymer-core-alumina-shell beams have been synthesized by combining TPL and ALD and sustained a modulus of ~30 MPa at a low fracture strain of ~4-6% and a density of 0.42 g/cm³ (16). Octet-truss nanolattices made up of 262-774 nm-diameter polymer beams with sputtered 14-126 nm-thick high-entropy alloy (HEA)-coatings were reported to have a Young's modulus of 16-95 MPa and a compressive strength of 1-10 MPa at densities between 0.087 and 0.865 g/cm³ (20). Samples with HEA thicknesses of less than 50 nm completely recovered after >50% compressions (20). Beyond core-shell-beamed nano- and micro-architected materials, several reports exist on the fabrication and deformation of 3D structural meta-materials with monolithic beams. For example, nanocrystalline nickel octet-truss nanolattices with 300-400 nm-diameter monolithic beams and 2 μm unit cells, created via TPL on custom-synthesized resins followed by pyrolisis exhibited a modulus of ~90 MPa, a compressive strength of 18 MPa, a high fracture strain of >20% at a density of 2.5 g/cm³ (20). Reports on vitreous carbon octet-truss microlattices with beam diameters of ~100 m, fabricated by pyrolyzing a UV-mask patterned polymer template, reported a modulus of 1.1 GPa, a compressive strength of 10.2 MPa, and a fracture strain of only ~3% at a density of 0.19 g/cm³ (24). Glassy carbon microlattices with rhombic dodecahedron unit cell and beam diameters of 50-150 μm, fabricated by using stereolithography and pyrolysis had densities of 0.03-0.05 g/cm³, moduli of 5-25 MPa, and compressive strengths of 0.08-0.35 MPa, and fractured at a strain of ~5% (25). Glassy carbon nanolattices with tetrahedral unit cells created via TPL and pyrolysis had smaller dimensions, 0.97-2.02 μm unit cells and beam diameters of ~200 nm, a modulus of 3.2 GPa and a compressive strength of ~280 MPa at a density of ~0.35 g/cm³ (18). This brief overview highlights the coupling between density and compliance of architected materials, i.e. the lower the density, the softer and the weaker the material.

We developed an approach to fabricate nano-architected pyrolytic carbon and demonstrate two prototype unit cell geometries, octet- and iso-truss, shown in FIGS. 48A-48F, using two-photon lithography and pyrolysis. The octet-truss architecture has cubic anisotropy and superior overall properties compared to other conventional lattices, such as triangular, tetrahedral, or cubic trusses and foams (28), while the iso-truss structure is isotropic and has been theorized to possess optimal stiffness compared to traditional lattice topologies (29). Uniaxial compression experiments revealed their Young's moduli to be 0.34-18.6 GPa, their fracture strengths to be 0.05-1.9 GPa, and pre-failure deformability of 14-17% at density varying from 0.24 to 1.0 g/cm³. The highest specific strength is up to 1.90 GPa g⁻¹ cm³, which outperforms all other reported mechanically robust lightweight meso-/micro-/nano-lattices (7-27). We attribute this distinction to optimized unit-cell geometries, reduced feature sizes, and high quality of pyrolytic carbon.

Results:

FIG. 48A illustrates the fabrication process, which begins with printing 5×5×5 unit cells microlattices out of IP-Dip photoresist using TPL. We used the high-speed galvo mode in a layer-by-layer fashion to print 7-10 μm-long struts with 0.8-3.0 μm-diameter circular cross sections. The polymer samples were then heated in a vacuum furnace at a ramp rate of 7.5° C. min⁻¹ up to 900° C., pyrolyzed for 5 hours, and cooled down to room temperature at a natural rate (see Methods for more details). FIGS. 48B and 48D show CAD designs of 10 μm-sized octet- and iso-truss unit cells. Strut diameters d in the octet-truss were designed to be 0.8-2.4 μm. In the iso-trusses, the vertical strut diameters $d_1$ were 1.4-3.0 μm, and the prescribed slanted strut diameters $d_2$ were maintained as $$d_2 = \sqrt{3\sqrt{3}}\, d_1/2,$$

with the $d_2/d_{21}$ ratio of ~1.14 based on topological optimization (29). After pyrolysis, the polymer transformed into a form of carbon and underwent significant volumetric shrinkage and mass loss (30). Each strut shrunk to ~20%-25% of its initial dimensions (FIGS. 48C and 48E) with a concomitant shrinkage in unit-cell size from ~10 μm to ~2 μm. The resulting strut diameters of ~261-679 nm after pyrolysis are significantly below the limits of resolution of most available 3D lithographic technologies (0,0,0). We estimated the relative density $\bar{\rho}$ of pyrolytic carbon nanolattices to be between 17% to 72% by calculating the volume fraction of solid materials in the nanolattices based on 3D CAD models and dimensions measured by the scanning electron microscopy (SEM). The magnified image in FIG. 48E reveals that the $d_2/d_1$ is preserved at ~1.14 after pyrolysis, which suggests uniform volume shrinkage. FIG. 48F shows a high-resolution transmission electron microscopy (HRTEM) image of a typical sample extracted from the nanolattice via focused-ion-beam (FIB) milling and indicates its glassy/amorphous microstructure. In our earlier work, we estimated the density of pyrolytic carbon produced under these conditions to be ~1.40 g/cm³ by using a combination of atomic model and experimental measurements (31), which is consistent with that of type-I glassy carbon fabricated under the pyrolysis temperature of below 2000° C. (32). We calculated the density of nanolattices by multiplying this absolute density by the relative density of nanolattices to vary from 0.24 g/cm³ to 1.0 g/cm³, well within the lightweight range.

We performed uniaxial compressions on all polymer microlattices and pyrolytic carbon nanolattices (see details in Methods). Engineering stresses versus strains were obtained by normalizing the load-displacement data from compression experiments by the cross-sectional footprint area of the overall samples and the initial height. FIGS. 49A and 49B convey the compressive stress-strain response of some representative octet- and iso-truss pyrolytic carbon nanolattices, which appear to be similar across all samples. As the relative density of the octet-truss nanolattices ranged from 24% to 68%, its Young's modulus increased from 2.57 GPa to 10.73 GPa, and its compressive strength increased from 0.21 GPa to 1.73 GPa (FIG. 49A). The relative density of the iso-truss nanolattices was slightly higher, from 28-72%, its Young's modulus increased from 2.28 GPa to 9.67 GPa, and its compressive strength rose from 0.14 GPa to 1.90 GPa (FIG. 49B). The initial nonlinearity in the stress-strain data arises from the imperfect initial contact and slight initial misalignment between the rough lattice surfaces and the flat punch (16). Linear elastic loading persists up to a strain of about 10-20%, after which all pyrolytic samples catastrophically failed via brittle fracture (FIGS. 49C-49F). The average fracture strains were 14.0% for octet- and 16.7% for the iso-truss nanolattices, which exceed ~10% reported for glassy carbon nanolattices (18) and ~3-5% for glassy carbon microlattices (24,25). This enhanced deformability is enabled by better mechanical stability of circular struts, which are able to transfer load more uniformly than the elliptical ones (33) and a longer pyrolysis time to ensure sufficient carbonation. FIGS. 53A-53H show the compressive stress-strain data of typical polymer microlattices with octet- (FIG. 53A) and iso-truss (FIG. 53E) unit cells for comparison and completeness. This data also has the initial nonlinear region over ~2.5% strain caused by the slightly imperfect initial contact and misalignment between the rough lattice surfaces and the flat punch (16). Linear elastic loading commences over the strain range of ~2.5-7.5% followed by plastic deformation, followed by a stress plateau that extends over 5-7.5%. Such stress plateau corresponds to buckling of the struts, as evidenced by SEM images (FIGS. 53C and 53G). Table 1 summarizes the Young's moduli and strengths of the tested polymeric microlattices with different relative densities, the Young's modulus of iso-truss microlattices is a factor of ~2, and the strength is 1.3× higher than those of the octet-truss microlattices, consistent with predictions (29).

TABLE 1

| Mechanical properties of polymer microlattices under compression | | | |
|---|---|---|---|
| Unit cell geometry | Relative density $\bar{\rho}$ (%) | Young's modulus E (MPa) | Strength $\sigma_y$ (MPa) |
| Iso | 9.21 | 112 | 4.47 |
| | 12.38 | 172 | 7.20 |
| Octet | 11.85 | 89 | 5.52 |
| | 16.22 | 109 | 7.49 |

FIGS. 50A-50B show the material property space for Young's modulus (FIG. 50A) and compressive strength (FIG. 50B) versus density of the pyrolytic carbon nanolattices in this work in the context of all reported micro-/nano-architected materials made up of carbon, ceramics or ceramics-polymer composites (11,16,18,22-26). These plots reveal that their moduli and strengths are ~1-2 orders of magnitude greater compared to carbon aerogels (22), vitreous carbon microlattices (24) and alumina-polymer nanolattices (16) with comparable densities. The mechanical attributes of pyrolytic carbon nanolattices in this work span a large density range, from 0.24 to 1.0 g/cm³, and reveal a ~40% higher scaling exponent between mechanical attributes and density, compared with glassy carbon nanolattices (18). These results imply that at densities greater than ~0.4 g/cm³, the strength and stiffness of nano-architected carbon in this work surpass those of all previously reported architected materials. The strength of pyrolytic carbon nanolattices with iso-truss geometries at a density of 1.0 g/cm³ is 1.90 GPa, and that for the octet-truss at a density of 0.95 g/cm³ is 1.73 GPa, which are comparable to the theoretical strength of glassy carbon of ~$E_s$/10, i.e. 2-3 GPa, where $E_s$ is the modulus of glassy carbon (0,0,0). FIG. 50A demarcates the theoretical limit of Young's modulus as a function of density, expressed as $E=250\rho$ (11), and FIG. 50B includes the theoretical limit of strength versus density, whose lower bound is defined by diamond and the upper bound corresponds to graphene (18). More details about the determination of these theoretical limits are supplied in Methods.

FIGS. 54A and 54B show the variations of Young's modulus and compressive strength with the relative density, respectively. As the relative density spans from 17% to 72%, our pyrolytic carbon nanolattices have the scaling relations of Young's modulus as $E{\sim}\bar{\rho}^{2.25}$ for the octet-truss and $E{\sim}\bar{\rho}^{1.90}$ for the iso-truss, and those of compressive strength as $\sigma_y{\sim}\bar{\rho}^{2.41}$ for the octet-truss and $\sigma_y{\sim}\bar{\rho}^{2.50}$ for the iso-truss. These scaling relations deviate from theoretical predictions for ideal, stretching-dominated structures (1), i.e., $E{\sim}\bar{\rho}$ and $\sigma_y{\sim}\bar{\rho}$, which is mainly attributed to the fabrication-induced structural imperfections and to the non-slender beams. SEM images in FIGS. 49C and 49E show some of the representative detectable fabrication-induced defects that we found to be present in virtually all samples, including beam junction offsets and bulges, slight curvature of the struts, and micro-pits and voids. During compression, these imperfections induce localized deformation and micro-cracking around the nodes, as well as buckling/bending of struts, which leads to premature structural failure (11). When such local deformation and failure occur in stretching-dominated lattices, the scaling exponents for modulus and strength of lattices exceed theoretical predictions and are generally in the range of 1.4-2.5, as exemplified by previous studies (8,11,12,18). The slenderness ratio, defined as R/L, where R is the beam radius and L is the beam length, as well as the nodal geometry have been shown to have significant effect on the stiffness and strength of lattices (9,12,37). The nodes generally form solid joints that impede beam rotation and, to some extent, shorten the effective length of the adjoining beams and lead to stiffening of overall lattices (12). The recent computational and experimental studies found that for solid-beam octet-truss lattices, with a beam slenderness ratio greater than 0.06 and the corresponding relative density beyond 10%, the scaling relations for modulus and strength diverge from existing analytic theories, with the exponents of 2.20 and 1.88 instead of 1.0 (12). The beam slenderness ratios, RIL, of the octet-truss nanolattices in this work are 0.07-0.24, similar to 0.07-0.12 of the monolithic polymer octet-truss nanolattices (12), as well as to 0.06-0.20 of glassy carbon nanolattices with tetrahedral unit cells (18). The scaling exponents of 2.25 (octet-truss) and 1.90 (iso-truss) for Young's modulus and of 2.41 (octet-truss) and 2.50 (iso-truss) for strength found for nano-architected carbon with a relative density between 15% and 80% in this work agree with these existing report (12). FIGS. 50A-50B convey that these relatively high scaling exponents for the mechanical attributes of pyrolytic carbon nanolattices lead to highest stiffness and strength reported to date (11,18).

To further investigate the influence of the initial imperfections on mechanical properties of pyrolytic carbon nanolattices, we performed a series of finite-element (FE) simulations of compressing samples with relative densities varying from 15.9% to 70%. Details of FE simulations are provided in Methods. The simulated nanolattices had three types of unit-cell geometries: octet-truss and iso-truss for comparison with experiments, and tetrahedron-truss for comparison with previous literature (18), which found that the initial deflection of struts can reduce the compressive strength of nanolattices at lower relative densities. FIGS. 51A-51C show the simulated nanolattices with different unit cells, where pre-existing defects were created by imposing the corresponding buckling eigenmodes with a maximum deflection of the struts prescribed as 5%, 10% and 15% of the edge length, similar to (18). After introducing these initial deflections, some struts remained pre-bent before compression, which resembles structural imperfections in the experimental samples (FIGS. 49C and 49E). We also simulated the compression of a perfect nanolattice as a reference. FIGS. 51D-51F show the compressive stress-strain response up to 12% strain of simulated nanolattices and reveals that the strengths of nanolattices with initial deflection are always lower than those of their perfect counterparts. FIG. 55 shows that FE simulations reveal similar trends in the dependence of modulus and strength on relative density as experimental measurement. FIGS. 56A-56B quantify the variation in strength reduction as a function of initial deflection relative to that of a perfect nanolattice and indicates that (i) for a given relative density and architecture, the relative reduction in strength increases with greater initial deflection; (ii) for a given architecture, the nanolattices with higher densities experience smaller relative weakening with defects; and (iii) nanolattices with tetrahedron-truss unit cells are most susceptible to flaws, followed by octet-truss and iso-truss for all densities. For example, for the relative density of 15.9%, the relative reduction in strength is 2% for the iso-truss and 15% for the octet-truss architectures at a maximum deflection of 15%. The same relative weakening for a relative density of 70% is only <1%.

The results from our current experimental and computational studies indicate that carbon nanolattices with iso-truss and octet-truss architectures, which are intrinsically brittle, exhibit a reduced susceptibility to flaws at higher densities. This can be explained by the local failure in individual struts re-distributing stored elastic energy among other load-bearing truss members instead of triggering catastrophic structural failure. This is consistent with the attainment of nearly-theoretical strengths of carbon nanolattices with densities higher than 0.95 g/cm$^3$. When the struts' diameter is reduced by hundreds of nanometers to dimensions comparable to the critical size for flaw insensitivity of constitute, the struts exhibit high strength and good flaw tolerance, which to some extent contributes to the high strength of carbon nanolattices, which is dictated by local stresses and the volume fractions of the struts (4). Nanolattices with lower densities have thinner and more slender struts, which leads to higher local stresses during compression due to their smaller cross-sectional areas, and the nodal contributions are negligible (12,37). In this case, the higher local stresses lead to earlier buckling of some struts or higher stress concertation around the nodes. Together with the lower volume fraction of thinner struts, the nanolattices with lower densities (i.e. thinner struts) might fail at lower global stresses. In contrast, nanolattices with higher densities (i.e. thicker struts) have lower local stresses because of the greater cross-sectional area in each strut, with significant contribution of the nodes to the load-bearing ability, which results in a relatively uniform distribution of applied load throughout the nanolattice (12,37). Under these conditions, the nanolattices fail when the local stresses in the struts approach the theoretical strength of constitute carbon. Such local stress and higher volume fraction of struts eventually result in high strength of nanolattices at higher densities. The optimized unit-cell geometries, such as octet- and iso-truss, with better flaw tolerance also facilitate the achievement of high strength.

FIG. 52 shows that the specific strengths of pyrolytic carbon nanolattices range from 0.146 to 1.90 GPa g$^{-1}$ cm$^3$, which represents 2-3 orders of magnitude improvement over all nano- and micro-architected periodic lattices reported to date, including hollow-tube nickel (7) and NiP (8), copper (19), and TiAl$_6$V$_4$ (27) microlattices, as well as of hollow-beam alumina (11), alumina-polymer (16) and metallic glass Zr$_{54}$Ni$_{28}$Al$_{18}$ nanolattices (33). The maximum specific strength of the carbon nanolattices in this work, at a density of 1.0 g/cm$^3$, is 2.4 times higher than that of 0.80 GPa g$^{-1}$ cm$^3$ reported for glassy carbon nanolattices (18), and represents 35% of fully-dense diamond, at 5.60 GPa g$^{-1}$ cm$^3$, which has the highest specific strength of all bulk materials (18). Such ultra-high specific strength of our pyrolytic carbon nanolattices arises from both the nano-sized beam diameters and the optimized lattice topology.

In this illustrative Example, we developed an additive fabrication methodology to create micro- and nano-architected pyrolytic carbon with densities below 1.0 g/cm$^3$, GPa-level strengths, and >10% deformability before failure. As a point of departure from all existing work on micro-/nano-lattices (11,16,18,22-26), the modulus and strength of nano-architected carbon in this work approach their theoretical limits. Rational design of lattice topologies with appropriate microstructure and nano- and micro-scale characteristic materials dimensions enabled us to create prototype architectures of octet- and iso-truss pyrolytic carbon nanolattices with a Young's modulus of 0.34-18.6 GPa and strengths of 0.05-1.90 GPa at densities of 0.24-1.0 g/cm$^3$, which translates into a specific strength of 0.146-1.90 GPa g$^{-1}$ cm$^3$ that has not been attained by any carbon-based or architected material. This nano-architected carbon also exhibited average fracture strains of 14.0%-16.7%, exceeding those of all other reported brittle architected materials. Experiments and simulations demonstrate that for densities higher than 0.95 g/cm$^3$, these samples become virtually insensitive to fabrication-induced defects, which gives rise to their attaining nearly-theoretical strength of 1.90 GPa and lends them to being particularly lucrative candidates for structural applications. This work provides insights into fundamental scientific principles that govern the design and properties of nano-architected materials and provides a feasible pathway for their use in scalable fabrication because of their emergent robustness against defects, ultralight weight, and superior strength.

Materials and Methods:

Fabrication of pyrolytic carbon nanolattice. We first fabricated polymeric microlattices out of IP-Dip photoresist, using TPL DLW (Nanoscribe, GmbH) with a speed of 10,000 $\mu$m s$^{-1}$ and laser power of 17.5 mW. During the DLW process, we printed the struts with 0.8-3.0 $\mu$m-diameter circular cross sections via the high-speed galvo mode in a layer-by-layer fashion. All the printed polymeric microlattices have two typical unit-cell geometries: one is the octet-truss (FIG. 48B), and another is the iso-truss (FIG. 48D). The unit-cell size of polymeric microlattices is about 10 $\mu$m. Then the polymeric microlattices were pyrolized at 900° C. for 5 hours in a vacuum, with a ramp rate of 7.5° C. min$^{-1}$ up to the target temperature and then cooled down to room temperature at a natural rate. After pyrolysis, the polymeric microlattices transformed into pyrolytic carbon nanolattices, due to the mass-loss-induced carbonation of the polymers at elevated temperature (30). The diameters of all struts in pyrolytic carbon nanolattices isotropically shrunk to about 261-679 nm, which is about 20%-25% of their initial dimensions (FIGS. 48C and 48E). The unit-cell size of all pyrolytic carbon nanolattices is about 2 $\mu$m.

Mechanical testing. We conducted uniaxial compression experiments on all fabricated polymer microlattices and pyrolytic carbon nanolattices. Some of these experiments were performed in an in situ instrument (InSEM, Nanomechanics) with a 170 $\mu$m-diameter flat diamond punch at a constant strain rate of 10$^{-3}$ s$^{-1}$ to reveal the deformation morphology simultaneously with mechanical data acquisition. Other experiments were carried out at a constant loading rate of 0.2 mN s$^{-1}$ in a nanoindenter (G200, Agilent/Keysight Technologies) using a 120 $\mu$m-diameter diamond flat punch.

Finite element modelling. We carried out a series of FE modelling for the compression of pyrolytic carbon nanolattices via Abaqus. The isotropic linear elastic material was used for modelling. All nanolattices were modeled with beam element. The Young's modulus of material is 20 GPa (34) and the Poisson's ratio was 0.15 (18). The simulated nanolattices have three types of unit-cell geometries, including octet-truss, iso-truss and tetrahedron-truss. For each type of nanolattice, the unit-cell size sets to be 2 $\mu$m, and the relative density varies from 15.9% to 70% by alternating the diameter of struts. Before compression, we introduce initial deflection to the struts of simulated nanolattices by imposing the corresponding buckling eigenmodes of nanolattices (e.g., FIGS. 51A-51C). The maximum deflection of the struts is set as 5%, 10% and 15% of the edge length. After introducing initial deflection, some struts remain pre-bent before compression, which is very similar to some structural imperfections in the experimental samples (FIGS. 49C and 49E). During compression, the bottom of nanolattice was fixed, and the top is imposed by the displacement loading. We simulated the compression of nanolattice with perfectly straight struts as a reference to address the influence of imperfections/flaws on mechanical properties and response of nanolattice.

Determination of theoretical limits for Young's modulus and strength versus density. The modulus-density theoretical limit is taken from the literature (11) and determined by the bound of many data of real materials based on Granta Design, which is a standard software for materials selection and graphical analysis of materials properties. More information about Granta Design can be found in the webpage (https://wwvvw.qgrantadesign.com/) and relevant software documentation. The strength-density limit is defined in the literature (18) and just a specific range based on the measurements for all materials to date. The lower bound of this range is defined by diamond, which has the highest specific strength of all bulk materials, while the upper bound is determined by graphene, which holds the highest strength in all materials so far.

REFERENCES CORRESPONDING TO EXAMPLE 9

1. Gibson L J, Ashby M F (1999) Cellular Solids: Structure and Properties (Cambridge University Press, Cambridge, U K), 2nd ed.
2. Hamm C E, Merkel R, Springer O, Jurkojc P, Maier C, Prechtel K, Smetacek V (2003) Architecture and material properties of diatom shells provide effective mechanical protection. *Nature* 421:841-843.
3. Weiner S, Wagner H D (1998) The material bone: structure-mechanical function relations. *Annu. Rev. Mater. Sci.* 28:271-298.
4. Gao H, Ji B, Jäger I L, Arzt E, Fratzl P (2003) Materials become insensitive to flaws at nanoscale: lessons from nature. *Proc. Natl. Acad. Sci. U.S.A.* 100:5597-5600.
5. Wegst U G K, Bai H, Saiz E, Tomsia A P, Ritchie R O (2015) Bioinspired structural materials. *Nat. Mater.* 14:23-36.
6. Libonati F, Gu G, Qin Z, Vergani L, Buehler M J (2016) Bone-inspired materials by design: Toughness amplification observed using 3D printing and testing. *Adv. Eng. Mater.* 18:1354-1363.
7. Schaedler T A, Jacobsen A J, Torrents A, Sorensen A E, Lian J, Greer J R, Valdevit L, Carter W B (2011) Ultralight metallic microlattices. *Science* 334:962-965.
8. Torrents A, Schaedler T A, Jacobsen A J, Carter W B, Valdevit L (2012) Characterization of nickel-based microlattice materials with structural hierarchy from the nanometer to the millimeter scale. *Acta Mater.* 60:3511-3523.
9. Valdevit L, Godfrey S W, Schaedler T A, Jacobsen A J, Carter W B (2013) Compressive strength of hollow microlattices: Experimental characterization, modeling, and optimal design. *J. Mater. Res.* 28:2461-2473.
10. Jang D, Meza L R, Greer F, Greer J R (2013) Fabrication and deformation of three-dimensional hollow ceramic nanostructures. *Nat. Mater.* 12:893-898.
11. Meza L R, Das S, Greer J R (2014) Strong, lightweight, and recoverable three-dimensional ceramic nanolattices. *Science* 345:1322-1326.
12. Meza L R, Phlipot G P, Portela C M, Maggi A, Montemayor L C, Comella A, Kochmann D M, Greer J R (2017) Reexamining the mechanical property space of three-dimensional lattice architectures. *Acta Mater.* 140:424-432.
13. Maggi A, Li H, Greer J R (2017) Three-dimensional nano-architected scaffolds with tunable stiffness for efficient bone tissue growth. *Acta Biomater.* 63:294-305.

14. Meza L R, Zelhofera A J, Clarke N, Mateosa A J, Kochmanna D M, Greer J R (2015) Resilient 3D hierarchical architected metamaterials. *Proc. Natl. Acad. Sci. U.S.A.* 112:11502-11507.

15. Zheng X, Lee H, Weisgraber T H, Shusteff M, DeOtte J, Duoss E B, Kuntz J D, Biener M M, Ge Q, Jackson J A, Kucheyev S O, Fang N X, Spadaccini C M (2014) Ultralight, ultrastiff mechanical metamaterials. *Science* 344:1373-1377.

16. Bauer J, Hengsbach S, Tesari I, Schwaiger R, Kraft O (2014) High-strength cellular ceramic composites with 3D microarchitecture. *Proc. Natl. Acad. Sci. U.S.A.* 111: 2453-2458.

17. Zheng X, Smith W, Jackson J, Moran B, Cui H, Chen D, Ye J, Fang N, Rodriguez N, Weisgraber T, Spadaccini C M (2016) Multiscale metallic metamaterials. *Nat. Mater.* 15:1100-1106.

18. Bauer J, Schroer A, Schwaiger R, Kraft O (2016) Approaching theoretical strength in glassy carbon nanolattices. *Nat. Mater.* 15:438-444.

19. Gu X W, Greer J R (2015) Ultra-strong architected Cu meso-lattices. *Extreme Mech. Lett.* 2:7-14.

20. Vyatskikh A, Delalande S, Kudo A, Zhang X, Portela C M, Greer J R (2018) Additive manufacturing of 3D nano-architected metals. *Nat. Commun.* 9:593.

21. Zhang X, Yao J, Liu B, Yan J, Lei L, Li Y, Gao H, Li X (2018) Three-dimensional high-entropy alloy-polymer composite nanolattices that overcome the strength-recoverability trade-off. *Nano Lett.* 18:4247-4256.

22. Fairén-Jiménez D, Carrasco-Marin F, Moreno-Castilla C (2007) Adsorption of benzene, toluene, and xylenes on monolithic carbon aerogels from dry air flows. *Langmuir* 23:10095-10101.

23. Zhu C, Han T Y, Duoss E B, Golobic A M, Kuntz J D, Spadaccini C M, Worsley M A (2015) Highly compressible 3D periodic graphene aerogel microlattices. *Nat. Commun.* 6:6962.

24. Jacobsen A J, Mahoney S, Carter W B, Nutt S (2011) Vitreous carbon micro-lattice structures. *Carbon* 49:1025-1032.

25. Chen X, Zhao G, Wu Y, Huang Y, Liu Y, He J, Wang L, Lian Q, Li D (2017) Cellular carbon microstructures developed by using stereolithography. *Carbon* 123:34-44.

26. Eckel Z C, Zhou C, Martin J H, Jacobsen A J, Carter W B, Schaedler T A (2016). Additive manufacturing of polymer-derived ceramics. *Science* 351:58-62.

27. Challis V J, Xu X, Zhang L, Roberts A P, Grotowski J F, Sercombe T B (2014) High specific strength and stiffness structures produced using selective laser melting. *Mater. Design* 63, 783-788.

28. Deshpande V S, Fleck N A, Ashby M F (2001) Effective properties of the octet-truss lattice material. *J. Mech. Phys. Solids* 49:1747-1769.

29. Messner M C (2016) Optimal lattice-structured materials. *J. Mech. Phys. Solids* 96:162-183.

30. Li X, Gao H (2016) Smaller and stronger. *Nat. Mater.* 15:373-374.

31. Zhang X, Zhong L, Mateos A, Kudo A, Vyatskikh A, Gao H, Greer J R, Li X (2018) Carbon by design through atomic-level architecture. *Under submission.*

32. Harris P J (2005) New perspectives on the structure of graphitic carbons. *Crit. Rev. Solid State* 30:235-253.

33. Liontas R, Greer J R (2017) 3D nano-architected metallic glass: Size effect suppresses catastrophic failure. *Acta Mater.* 133:393-407.

34. Stein Y I, Constable A J, Morales-Medina N, Sackier C V, Devoe M E, Vincent H M, Wardle B L (2017) Structure-mechanical property relations of non-graphitizing pyrolytic carbon synthesized at low temperatures. *Carbon* 117:411-420.

35. Cowlard F C, Lewis J C (1967) Vitreous carbon-a new form of carbon. *J. Mater. Sci.* 2, 507-512.

36. Zhao J X, Bradt R C, Walker P L J (1985) The fracture toughness of glassy carbons at elevated temperatures. *Carbon* 23, 15-18.

37. Portela C M, Greer J R, Kochmann D M (2018) Impact of node geometry on the effective stiffness of non-slender three-dimensional truss lattice architectures. *Extreme Mech. Lett.* 22:138-148.

Example 10: Scalable Fabrication Method of 3D Architected Structure Usinq Additive Manufacturing and Pyrolysis Thereof FIGS. 57A-57D exhibit characterizations of the microstructure of the 3D architected carbon. A cross-section image of the 3D architected carbon, shown in FIG. 57A, demonstrates its monolithic structure without any micropores. EDS analysis on the cross-section surface showed that the 3D architected carbon was composed of 98.4% carbon in an average with minor content of oxygen. Line analysis showed homogeneous elemental composition across the cross-section (FIG. 58A). FIG. 57B shows XRD patterns with three broad peaks at 23.5°, 44.3° and 79.8° in $2\theta$, corresponding to (002), (100)/(101) and (110) of graphite. The average interlayer spacing for graphene sheets and crystallite size along (002) (i.e. $d_{002}$ and $L_c$) were estimated to be 3.78 Å and 9.3 Å using the Bragg's law and Scherrer equation respectively, which suggested that there existed several stacked graphitic layers in average. Raman spectra, shown in FIG. 57C, was deconvoluted into five peaks: strong peaks of D1 (at 1355 cm$^{-1}$) and G (at 1603 cm$^{-1}$) and weak peaks of D2 (at 1613 cm$^{-1}$), D3 (at 1539 cm$^{-1}$) and D4 (1225 cm$^{-1}$). The G peak corresponds to in-plane bond-stretching motion of pairs of C sp$^2$ atoms with $E_{2g}$ symmetry.[24] The D1 peak appears only in the presence of the disorder of graphite and corresponds to a graphitic lattice vibration mode with $A_{1g}$ symmetry.[24] The D2 peak was considered attributed to a graphitic lattice vibration, and D3 and D4 peaks have been seen in amorphous or glassy carbon in other studies.[25,26] The high-resolution image of TEM in FIG. 57D confirmed the tangled microstructure containing several stacked graphitic layers. Diffused diffraction rings at (002), (100)/(101) and (110) in the inset illustrated disordered carbon microstructure, which agreed with broad peaks of the XRD pattern.

Mechanical behaviors of the 3D architected carbon were evaluated by using uniaxial compression tests with a microcamera. FIGS. 59A-59B show representative mechanical response with in-situ compression side-views of a part of the architecture around each collapse event (full movie is accessible in Supplemental). Note that the bottom side of the 3D architecture was chipped when removing it from a substrate of the DLP 3D printer.

The first stress release was followed by the gradual decrease of the load with local failure events as pointed by red circles in FIG. 59B II-a, II-b, and II-c. The second stress release event occurred when the contact part of 3D architected carbon on the substrate was fractured by a half layer (FIG. 59B IV). At the third stress release, the 3D architected carbon was almost fully contacted on the substrate and collapsed by a half layer with showing the largest yield stress (29.9 MPa). These two collapse events with small yield strength and the subsequent third collapse with high strength were repeatedly observed (FIG. 60). Average yield strengths at each stress release event were tabulated in Table 2.

TABLE 2

| Average values and standard deviations of the $1^{st}$, $2^{nd}$ and $3^{rd}$ yield strength | | | |
|---|---|---|---|
| | $1^{st}$ yield | $2^{nd}$ yield | $3^{rd}$ yield |
| Average (MPa) | 9.2 | 14.2 | 27.1 |
| SD (MPa) | 2.9 | 6.4 | 5.3 |

Example 11: Node Free Geometries

FIG. 61A and FIG. 61B. Images showing architected three-dimensional structures having node-free geometries, according to certain embodiments of the invention. Additional exemplary node-free geometries may be found in Abueidda, et al. ("Effective conductivities and elastic moduli of novel foams with triply periodic minimal surfaces", Mechanics of Materials, vol. 95, April 2016, pages 102-115), which is incorporated herein by reference.

Example 12: Infiltration of Carbon Reinforcing Phases

The architected carbon reinforcing phases were infiltrated with a low-viscosity epoxy and cured at room temperature for 8 hours.

The spinodal cube depicted in FIGS. 62A and 62D underwent a density transition from $\rho$=123.7 kg/m$^3$ to 1152 kg/m$^3$, while the octet-cube in FIGS. 62C and 62F went from 255 kg/m$^3$ to 1160 kg/m$^3$. The resulting composite materials had an average density of at least two times lower than that of light metals (i.e., $\rho_{Al}$=2700 kg/m$^3$), and at least 40% lower than some carbon fiber reinforced polymers, which commonly have a density around 1600-1800 kg/m$^3$.

Example 13: Mechanical Testing

Uniaxial Compression of Octet Phases and Composites

We performed quasi-static uniaxial compression on octet carbon reinforcing phases with and without epoxy infiltration. The experiments were performed at a strain rate of $\dot{\epsilon}$=10$^{-3}$ s-1. Since the underlying tessellation consisted of 17×17×17 unit cells (with a characteristic unit cell size of ~590 μm), we assume sufficient separation-of-scales to discuss effective material (rather than structural) properties.

The experiments depicted in FIGS. 63A-63D were used to obtain an effective modulus and yield strength for this given carbon material with approximately 15% relative density. Young's moduli of 669.7 and 495 MPa were calculated, while the yield strengths—defined as the stress at the initial catastrophic fracture event—were calculated to be 11.33 and 8.67 MPa. These carbon phases, without a matrix phase, were susceptible to defects in the sample.

Upon infiltration with epoxy, the mechanical behavior of these materials changed significantly. Most notably, the material did not undergo any catastrophic events and underwent significant strain hardening past $\epsilon$>0.1. FIGS. 64A-64C show the response of the material under compression, with significant densification after $\epsilon$=0.5 but no catastrophic failure or through-sample cracks.

These experiments resulted in Young's moduli of 1.82 and 2.24 GPa, and yield strengths of 59.8 and 69.6 MPa. At these strength values, this material as strong as some metals (e.g., copper), while having 7.7× lower density. We define the yield strength $\sigma_y$ for these materials using the 0.2% strain offset from the linear regime, and we also define a flow stress $\sigma_f$ corresponding to the maximum stress before a negative tangent modulus was observed. The flow stress for these samples were calculated to be 71.9 and 78.2 MPa. These values and comparisons to some metals are summarized in Table 3.

TABLE 3

| Mechanical parameters of tested carbon octet materials including comparison to some metals. | | | | |
|---|---|---|---|---|
| Material | Density [kg/m$^3$] | E | $\sigma_y$ [MPa] | $\sigma_f$ [MPa] |
| Carbon octets 1 | 291 | 669.7 MPa | 11.33 | — |
| Carbon octets 2 | 273 | 495 MPa | 8.67 | — |
| Composite octets 1 | 1157 | 1.82 GPa | 59.8 | 71.9 |
| Composite octets 2 | 1159 | 2.24 GPa | 69.6 | 78.2 |
| Aluminum | 2700 | 69 GPa | 95 | — |
| Copper | 8960 | 117 GPa | 70 | — |

The non-catastrophic and strain-hardening response for these composites makes them well suited for energy absorption applications. For these quasi-static experiments, the specific energy absorption (SEA) can be defined as $$\psi = \frac{w}{\rho},$$

where W is the strain energy density, defined as W=∫σdε, and $\rho$ is the material density. Calculating this metric for the experiments in FIG. 64C yielded W=30.9 MJ/m$^3$ and $\psi$=26.7 J/g, at a density of $\rho$=1159 kg/m$^3$. Comparing these metrics to those of stainless steel 316L octets (1), whose reported values were $\psi$=10.1 J/g and $\rho$=2160 kg/m$^3$, shows that the carbon octet composites have twice the SEA capacity while at half the density.

4-Point Bending of Octet Phases and Composites

We also explored the bending behavior of octet carbon materials using a 4-point bending setup following ASTM standard D6272.

Bending of the carbon phase without a matrix showed catastrophic failure, as observed in the compression experiments. FIGS. 65A-65D show the experiment and corresponding data, which yielded an approximate flexural strength of 10.34 MPa, and a bending modulus of $E_B$=1.4 GPa.

The same experiment was performed on epoxy-infiltrated materials, which resulted in bending moduli of 3.3 and 3.9 GPa. A flexural strength value was not calculated since no failure was observed within the allowable strain limit of this ASTM standard. After undergoing significant bending, the samples returned to their original shape with no evident permanent deformation or cracks.

REFERENCES CORRESPONDING TO EXAMPLES 11-12

1. T. Tancogne-Dejean, A. B. Spierings, and D. Mohr, "Additively-manufactured metallic micro-lattice materials for high specific energy absorption under static and dynamic loading," Acta Materialia, vol. 116, pp. 14-28, 2016. [Online]. Available: http://linkinghub.elsevier.com/retrieve/pii/S1359645416304153

STATEMENTS REGARDING INCORPORATION
BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every system, structure, geometry, feature, combination thereof, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A composite material system comprising:

a porous structure having an architected three-dimensional geometry;

wherein said three-dimensional geometry is monolithic and deterministic; and wherein the three-dimensional geometry is a non-stochastic geometry;

wherein said structure comprises glassy carbon, graphitic carbon, amorphous carbon, pyrolytic carbon, graphite, carbon black, or any combination thereof; and a matrix phase comprising a polymer, an epoxy, a carbon allotrope, a ceramic, a metal, a viscous fluid, or any combination thereof;

wherein said matrix phase infiltrates said structure by at least 20% by volume.

2. The composite material system of claim 1, wherein the three-dimensional geometry is a nano- or micro-architected three-dimensional geometry.

3. The composite material system of claim 1, wherein the structure is characterized by an area-normalized impact energy mitigation metric ($\psi$) selected from the range of $2\times10^4$ $J/m^2$ to $4\times10^5$ $J/m^2$; or wherein the structure is characterized by a density-normalized impact energy mitigation metric ($\psi$) selected from the range of $1.9\times10^6$ $J/kg$ to $4\times10^6$ $J/kg$.

4. The composite material system of claim 1, wherein said structure is characterized by a restitution coefficient that is selected from the range of 0.8 to 0.3.

5. The composite material system of claim 1, wherein said structure is characterized by at least one vibrational frequency band gap.

6. The composite material system of claim 5, wherein said at least one vibrational frequency band gap is deterministic.

7. The composite material system of claim 5, wherein said at least one vibrational frequency band gap is within the range of 0.1 MHz to 200 MHz.

8. The composite material system of claim 1 being characterized by a damping ratio of at least 1.2.

9. The composite material system of claim 1, wherein said three-dimensional geometry comprises at least one surface feature.

10. The composite material system of claim 9, wherein: at least a portion of said at least one surface feature is characterized by a non-zero Gaussian curvature, at least a portion of said at least one surface feature is characterized by a non-zero mean curvature, at least a portion of said at least one surface feature is characterized by a zero mean curvature, said at least one surface feature is characterized by a non-uniform Gaussian curvature or a non-uniform mean curvature, said at least one surface feature is characterized by a uniform Gaussian curvature or a uniform mean curvature, a thickness dimension of said at least one surface feature is non-uniform throughout said at least one surface feature, or a thickness dimension of said at least one surface feature is uniform throughout said at least one surface feature.

11. The composite material system of claim 1, wherein the three-dimensional geometry is characterized as a spinodal geometry.

12. The composite material system of claim 1, wherein the structure is characterized by a slope of normalized effective elastic modulus versus relative density that is selected from the range of 1 to 1.3.

13. The composite material system of claim 1, wherein the three-dimensional geometry comprises a resonator.

14. The composite material system of claim 13, wherein the resonator comprises a micro-inertia feature.

15. The composite material system of claim 13, wherein the resonator comprises a cantilever beam feature and a micro-inertia feature connected to an end of said cantilever beam feature.

16. The composite material system of claim 1, wherein the three-dimensional geometry is characterized by a unit cell geometry, said unit cell geometry comprising a resonator.

17. The composite material system of claim 1, wherein said structure is characterized by deterministic anisotropic damping characterized by damping at least 1% greater along a first direction than along a second direction.

18. The composite material system of claim 1, wherein said structure exhibits vibrational Bragg scattering and wherein said structure does not exhibit vibrational local resonance.

19. The composite material system of claim 1, wherein said structure comprises a carbon allotrope material, a polymer, a ceramic material, a metal material, or any combination thereof.

20. The composite material system of claim 1, wherein said three-dimensional geometry is a node-free geometry.

21. The composite material system of claim 1, wherein the structure comprises at least one hollow feature.

22. The composite material system of claim 1, wherein said three-dimensional geometry comprises at least one longitudinal feature, and wherein: at least a portion of said at least one longitudinal feature is characterized by a non-zero curvature along a longitudinal direction of said feature, said at least one longitudinal feature is characterized by a non-uniform curvature along a longitudinal direction of said feature, or said at least one longitudinal feature has at least one cross-sectional dimension that is non-uniform along a longitudinal direction of said feature.

23. The composite material system of claim 1, wherein said three-dimensional geometry comprises at least one feature having a cross-sectional shape that is non-uniform.

24. The composite material system of claim 1, wherein said structure defines a three-dimensional external boundary shape; and wherein said three-dimensional geometry comprises at least one feature that intersects said boundary shape at only one or zero points of intersection.

25. The composite material system of claim 1, wherein a three-dimensional external boundary shape defined by said structure corresponds to a shape of the composite material system.

26. The composite material system of claim 1, wherein a three-dimensional external boundary shape defined by said structure is hollow.

27. The composite material system of claim 1, wherein said three-dimensional geometry is an overall three-dimensional geometry comprising at least a primary three-dimensional geometry and a secondary three-dimensional geometry, wherein said primary and said secondary three-dimensional geometries are different.

28. The composite material system of claim 1, wherein said structure comprises a closed region that is free of said matrix phase.

29. The composite material system of claim 1, wherein said structure is enclosed within said matrix phase such that no portion of said structure exists beyond external boundaries of said matrix phase.

30. The composite material system of claim 1, wherein at least a portion of said three-dimensional geometry is characterized as a tetrakaidecahedron, Weaire-Phelan geometry, honeycomb geometry, auxetic geometry, an octet-truss geometry, an octahedron, a diamond lattice, a 3D kagome geometry, a tetragonal geometry, a cubic geometry, a tetrahedron, a space-filling polyhedron, a periodic minimal surface, a triply periodic minimal surface geometry, a spinodal geometry, a chiral geometry, or a combination of these.

31. The composite material system of claim 1, wherein structure is characterized by one or more features having at least one physical size dimension, wherein said features comprise one or more of struts, beams, ties, trusses, sheets, surfaces, spheres, ellipses, and shells.

32. The composite material system of claim 1, wherein said structure is characterized by a relative density selected from the range of 5% to 99.9%.

33. The composite material system of claim 1, wherein said structure is characterized by an elasticity, said elasticity of said structure being deterministic.

34. The composite material system of claim 1, wherein said structure is characterized as having a bending-dominated mode or a stretching-dominated mode.

35. The composite material system of claim 1, wherein said structure comprises a coating.

36. The composite material system of claim 1, wherein the three-dimensional geometry comprises a unit cell geometry.

37. The composite material system of claim 1, wherein the three-dimensional geometry is characterized by at least one unit cell geometry, the unit cell having at least one overall physical dimension selected from the range of 10 nm to 20 μm.

38. The composite material system of claim 1, wherein the three-dimensional geometry is characterized by at least one unit cell geometry, the unit cell having at least one overall physical dimension selected from the range of 1 μm to 200 μm.

39. The composite material system of claim 1, wherein the structure is at least 1% by-mass infiltrated by the matrix phase.

40. The composite material system of claim 1, wherein said structure is not a foam.

41. The composite material system of claim 1, wherein said three-dimensional geometry is both unitary interconnected and continuous.

42. The composite material system of claim 1, wherein every portion or feature of the three-dimensional geometry is directly or indirectly bonded to, fused with, or otherwise belongs to the same uninterrupted phase with respect to another portion or another feature, respectively, of the three-dimensional geometry.

43. The composite material system of claim 1, wherein the structure comprises a pyrolytic carbon.

44. The composite material system of claim 1, wherein at least a portion of said three-dimensional geometry is characterized by a beam- or shell-based geometry; wherein said beam- or shell-based geometry is not symmetric, is not periodic, or is not regularly tessellated.

45. The composite material system of claim 1, wherein said three-dimensional geometry is not symmetric.

46. The composite material system of claim 1, wherein said three-dimensional geometry is a spinodal geometry and is not symmetric.

47. The composite material system of claim 1, wherein said three-dimensional geometry is not periodic.

48. The composite material of claim 1, wherein the structure comprises at least 50% by volume of the glassy carbon, graphitic carbon, amorphous carbon, pyrolytic carbon, graphite, carbon black, or any combination thereof.

49. A method of making a composite material system, said method comprising steps of:

preparing a structure via an additive manufacturing process; wherein:

said structure has an architected three-dimensional geometry; and said three-dimensional geometry is monolithic and deterministic; and wherein the three-dimensional geometry is a non-stochastic geometry;

wherein said structure comprises glassy carbon, graphitic carbon, amorphous carbon, pyrolytic carbon, graphite, carbon black, or any combination thereof;

infiltrating said structure with a matrix phase such that said structure is infiltrated by said matrix phase by at least 20% by volume; wherein the matrix phase comprises a polymer, an epoxy, a carbon allotrope, a ceramic, a metal, a viscous fluid, or any combination thereof;

thereby making said composite material system.

* * * * *